US012266144B2

(12) United States Patent

Mustikovela et al.

(10) Patent No.: US 12,266,144 B2

(45) Date of Patent: Apr. 1, 2025

(54) TRAINING AND INFERENCING USING A NEURAL NETWORK TO PREDICT ORIENTATIONS OF OBJECTS IN IMAGES

(71) Applicant: NVIDIA Corporation, Santa Clara, CA (US)

(72) Inventors: Siva Karthik Mustikovela, Lowell, MA (US); Varun Jampani, Nashua, NH (US); Shalini De Mello, San Francisco, CA (US); Sifei Liu, Santa Clara, CA (US); Umar Iqbal, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 882 days.

(21) Appl. No.: 16/690,015

(22) Filed: Nov. 20, 2019

(65) Prior Publication Data

US 2021/0150757 A1 May 20, 2021

(51) Int. Cl.

*G06V 10/24* (2022.01)
*G06F 18/21* (2023.01)

(Continued)

(52) U.S. Cl.

CPC .......... *G06V 10/242* (2022.01); *G06F 18/214* (2023.01); *G06F 18/217* (2023.01); *G06N 3/045* (2023.01); *G06N 3/08* (2013.01); *G06T 7/74* (2017.01); *G06V 10/454* (2022.01); *G06V 10/764* (2022.01); *G06V 10/7784* (2022.01);

(Continued)

(58) Field of Classification Search

CPC ............. G06K 9/00791; G06K 9/3208; G06K 9/4628; G06K 9/6256; G06K 9/6262; G06K 9/6263; G06K 9/6274; G06N 3/0454; G06N 3/08; G06T 2207/20081; G06T 2207/20084; G06T 2207/30196; G06T 2207/30252; G06T 7/74

See application file for complete search history.

(56) References Cited

U.S. PATENT DOCUMENTS

| | | | | |
|---|---|---|---|---|
| 9,311,713 | B2 * | 4/2016 | Han ..................... | G06V 40/113 |
| 2012/0033087 | A1 * | 2/2012 | Takeda ................... | H04N 23/71 348/E17.002 |

(Continued)

FOREIGN PATENT DOCUMENTS

| | | | |
|---|---|---|---|
| CN | 110175572 | A | 8/2019 |
| EP | 0665507 | A1 | 8/1995 |
| JP | 2018022416 | A | 2/2018 |

OTHER PUBLICATIONS

Jianming Wang et al., "Accurate Pose Estimation of Rigid Body by Manifold Embedding,"Jan. 1, 2018, 2017 Chinese Automation Congress (CAC), pp. 1-4.*

(Continued)

*Primary Examiner* — Omar S Ismail

(74) *Attorney, Agent, or Firm* — Davis Wright Tremaine LLP

(57) ABSTRACT

Apparatuses, systems, and techniques to identify orientations of objects within images. In at least one embodiment, one or more neural networks are trained to identify an orientations of one or more objects based, at least in part, on one or more characteristics of the object other than the object's orientation.

52 Claims, 62 Drawing Sheets

(51) Int. Cl.

| | |
|---|---|
| ***G06F 18/214*** | (2023.01) |
| ***G06N 3/045*** | (2023.01) |
| ***G06N 3/08*** | (2023.01) |
| ***G06T 7/73*** | (2017.01) |
| ***G06V 10/44*** | (2022.01) |
| ***G06V 10/764*** | (2022.01) |
| ***G06V 10/778*** | (2022.01) |
| ***G06V 10/82*** | (2022.01) |
| ***G06V 20/56*** | (2022.01) |

(52) U.S. Cl.

CPC .............. *G06V 10/82* (2022.01); *G06V 20/56* (2022.01); *G06T 2207/20081* (2013.01); *G06T 2207/20084* (2013.01); *G06T 2207/30196* (2013.01); *G06T 2207/30252* (2013.01)

(56) References Cited

U.S. PATENT DOCUMENTS

| | | | | |
|---|---|---|---|---|
| 2013/0002525 | A1 | 1/2013 | Foote | |
| 2017/0124415 | A1* | 5/2017 | Choi | G06T 7/73 |
| 2018/0373980 | A1* | 12/2018 | Huval | G06F 18/41 |
| 2019/0080456 | A1* | 3/2019 | Song | G06T 7/174 |
| 2019/0147221 | A1* | 5/2019 | Grabner | G06T 7/75 382/103 |
| 2019/0147642 | A1 | 5/2019 | Cole et al. | |
| 2019/0294907 | A1 | 9/2019 | Yoo et al. | |
| 2020/0041276 | A1* | 2/2020 | Chakravarty | G01C 21/3848 |
| 2020/0082180 | A1* | 3/2020 | Wang | G06V 20/647 |
| 2020/0134446 | A1* | 4/2020 | Soni | G06N 3/047 |
| 2021/0015449 | A1 | 1/2021 | Brandl et al. | |
| 2021/0110552 | A1* | 4/2021 | Bhat | G06T 7/70 |
| 2021/0124993 | A1* | 4/2021 | Singh | G06F 18/2451 |
| 2023/0244368 | A1* | 8/2023 | Sil | G06T 7/11 |

OTHER PUBLICATIONS

Kota Hara et al., "Designing Deep Convolutional Neural Networks for Continuous Object Orientation Estimation, "Feb. 6, 2017, Computer Vision and Pattern Recognition, arXiv:1702.01499v1, pp. 1-6.*

Supasorn Suwajanakorn et al., "Discovery of Latent 3D Keypoints via End-to-end Geometric Reasoning,"Nov. 23, 2018, Advances in Neural Information Processing Systems 31 (NeurIPS 2018), arXiv:1807.03146v2, pp. 1-8.*

Mengshi Zhang et al., "DeepRoad: GAN-Based Metamorphic Testing and Input Validation Framework for Autonomous Driving Systems," Sep. 3, 2018, ASE '18: Proceedings of the 33rd ACM/IEEE International Conference on Automated Software Engineering, pp. 132-141.*

Thu Nguyen-Phuoc et al., "HoloGAN: Unsupervised Learning of 3D Representations From Natural Images," Oct. 2019, Proceedings of the IEEE/CVF International Conference on Computer Vision (ICCV), 2019, pp. 7588-7594.*

Albert Pumarola et al., "Unsupervised Person Image Synthesis in Arbitrary Poses," Jun. 2018, Proceedings of the IEEE Conference on Computer Vision and Pattern Recognition (CVPR), 2018, pp. 8620-8626.*

Hao Su et al., "Render for CNN: Viewpoint Estimation in Images Using CNNs Trained with Rendered 3D Model Views," Dec. 2015, Proceedings of the IEEE International Conference on Computer Vision (ICCV), 2015, pp. 2686-2693.*

Sergey Prokudin et al., "Deep Directional Statistics: Pose Estimation with Uncertainty Quantification," Sep. 2018, Proceedings of the European Conference on Computer Vision (ECCV), 2018, pp. 1-13.*

Fukai Zhang et al., "Vehicle Detection in Urban Traffic Surveillance Images Based on Convolutional Neural Networks with Feature Concatenation," Jan. 30, 2019, Sensors 2019, 19, 594, pp. 1-15.*

Grabner et al., "3D Pose Estimation and 3D Model Retrieval for Objects in the Wild," Conference on Computer Vision and Pattern Recognition (CVPR), Mar. 30, 2018, 10 pages.

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

International Electrotechnical Commission, "Functional safety of electrical/electronic/programmable electronic safety-related systems," IEC Standard 61508-1, Apr. 2014, 23 pages.

International Organization for Standardization, "Road vehicles—Functional safety," ISO Standard 26262, https://www.iso.org/obp/ui/#iso:std:iso:26262:-1:ed-1:v1:en, Nov. 11, 2011, 35 pages.

Prokudin et al., "Deep Directional Statistics: Pose Estimation with Uncertainty Quantification," European Conference on Computer Vision (ECCV '18), Sep. 8, 2018, 18 pages.

Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.

Hara et al., "Designing Deep Convolutional Neural Networks for Continous Object Orientation Estimation," Feb. 6, 2017, 10 pages.

International Search Report and Written Opinion mailed Apr. 16, 2021, for Application No. PCT/US2020/060917, filed Nov. 17, 2020, 24 pages.

Pumarola et al., "Unsupervised Person Image Synthesis in Arbitrary Poses," IEEE/CVF Conference on Computer Vision and Pattern Recognition, Jun. 18, 2018, 9 pages.

Su et al., "Render for CNN: Viewpoint Estimation in Images Using CNNs Trained with Rendered 3D Model Views," IEEE International Conference on Computer Vision, Dec. 7, 2015, 9 pages.

Nguyen-Phuoc et al., "HoloGAN: Unsupervised Learning of 3D Representations from Natural Images," International Conference on Computer Vision, 2019, 10 pages.

Simonyan et al., Very Deep Convolutional Networks for Large-Scale Image Recognition, ICLR, Apr. 10, 2015, 14 pages.

Kawanishi et al., "A Study on GANs Based on Pose Manifold for Rigid Object Pose Estimation," IEICE Technical Report, 117(238): 2017, 6 pages.

Ninomiya et al., "Preliminary Study on Deep Manifold Embedding for 3D Object Pose Estimation," IEICE Technical Report, 116(91): 2016, 6 pages.

Office Action for Japanese Application No. 2022-524086, mailed Aug. 7, 2024, 12 pages.

* cited by examiner

TRAINING AND INFERENCING USING A NEURAL NETWORK TO PREDICT ORIENTATIONS OF OBJECTS IN IMAGES

TECHNICAL FIELD

At least one embodiment pertains to processing resources used to train a neural network to predict viewpoints of objects in images. For example, at least one embodiment, pertains to processors or computing systems used to train neural networks according to various novel techniques described herein.

BACKGROUND

Training neural networks can use significant memory, time, or computing resources. Training neural networks that require ground truth annotations may be more challenging than training neural networks that do not require some or all training data to be annotated with ground truth, at least because ground truth annotations may not always be available and/or may be difficult to obtain. Amounts of memory, time, and/or computing resources used to train neural networks can be improved.

DETAILED DESCRIPTION

Figure 1:
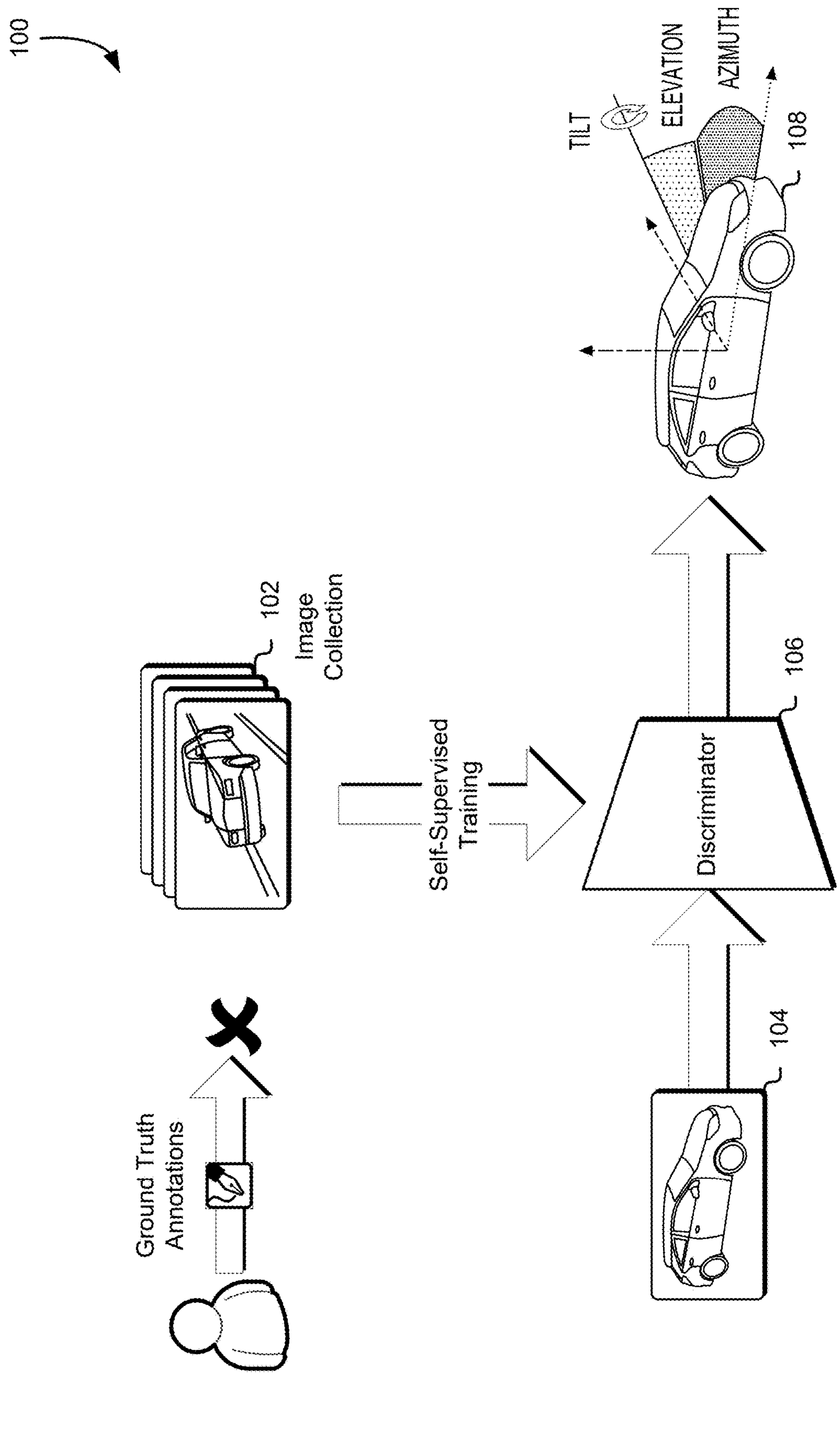
FIG. 1 illustrates a diagram that depicts predicting a viewpoint of an object using a neural network trained in a self-supervised manner, according to at least one embodiment.

In at least one embodiment, a neural network is trained to identify an orientation of an object within an image in a self-supervised manner on a collection of images such as those described elsewhere in this disclosure. In at least one embodiment, a neural network is trained to identify an orientation of an object within an image in a self-supervised manner by at least computing one or more loss functions as part of training that evaluate one or more characteristics of images of a training set (e.g., collection of images). In at least one embodiment, a neural network is trained on a collection of images that lacks ground truth annotations or ground truth annotations are otherwise unavailable (e.g., such data is withheld from a neural network during training). In at least one embodiment, a neural network is trained to generate, from an object within a first image having a predicted orientation, a second image having a same orientation. In at least one embodiment, a predicted orientation or viewpoint is encoded as azimuth, elevation, and tilt parameters.

In at least one embodiment, one or more neural networks is trained in a self-supervised manner on a collection of images of different objects of a same category as an object of an image to be inferred. In at least one embodiment, different objects of a same category may refer to different images which may be one or more images of a first car at one or more orientations, one or more images of a different second car at one or more orientations, and so on. In at least one embodiment, an image of an object to be inferred is included in a collection of images used to train one or more neural networks to inference orientations. In at least one embodiment, one or more neural networks are trained in a self-supervised manner by at least using a set of loss functions to evaluate one or more characteristics of objects within images. In at least one embodiment, one or more characteristics of objects refers to properties of objects that can be used to infer orientations. In at least one embodiment, a neural network is trained in a self-supervised manner to generate synthetic images of objects with a specific orientation, which may be a same orientation as a predicted orientation of an input image. In at least one embodiment, a synthetic image is created using a deep generative model such as a variational autoencoder (VAE), differentiable renderer, or generative adversarial network (GAN), or via a renderer. In at least one embodiment, an object whose orientation to be inferred can be a vehicle, airplane, drone, human being, face (e.g., of a human or animal), and more.

In at least one embodiment, self-supervised learning (e.g., training) refers to a form of learning in which a neural network is trained on a training set, in which data of said training set do not comprise any ground truth annotations, but data of said training set are partially labelled (e.g., semi-supervised learning). In at least one embodiment, a neural network trained in a self-supervised manner to identify an orientation of an object within an image utilizes a training set of images for training, in which images of said training set do not comprise ground truth annotations denoting orientations of objects within said images, but do comprise labels or otherwise other information identifying various objects of said images (e.g., an image of said images comprises labels or otherwise other information that identifies objects of said image, but does not comprise any annotations denoting orientations of said objects).

In at least one embodiment, semi-supervised learning refers to a form of learning in which a neural network is trained on a training set, in which only a portion of data of said training set comprises ground truth annotations. In at least one embodiment, fully-supervised learning refers to a form of learning in which a neural network is trained on a training set, in which all data of said training set comprises ground truth annotations. In at least one embodiment, unsupervised learning refers to a form of learning in which a neural network is trained on a training set, in which none of data of said training set comprises ground truth annotations.

FIG. 1 illustrates a diagram 100 illustrating predicting a viewpoint of an object using a neural network trained in a self-supervised manner, according to at least one embodiment. In at least one embodiment, diagram 100 is implemented by one or more systems such as a system described in FIGS. 18-46. In at least one embodiment, diagram 100 includes one or more neural networks that are associated with a discriminator 106 that is trained using self-supervised learning on a collection of images of a category to infer viewpoints of objects within other images of that category. In at least one embodiment, an image is provided as an input to a neural network to detect an orientation of an object of a category. In at least one embodiment, an input image is provided to a plurality of neural networks trained using self-supervised learning techniques described herein to identify orientations or viewpoints of different objects in said input image.

In at least one embodiment, a viewpoint of an image refers to an orientation of an object within an image, which refers to a three-dimensional orientation of an object captured within a two-dimensional image. In at least one embodiment, a camera is used to capture a two-dimensional image of a real-world object, such as a car, that is at a specific orientation relative to camera. In at least one embodiment, an object's orientation (e.g., viewpoint) is encoded on a set of parameters comprising an azimuth parameter, an elevation parameter, and a tilt parameter. In at least one embodiment, an orientation of an object within an image is encoded as a set of three vectors that define a direction of said object relative to a canonical x, y, and z axis.

In at least one embodiment, an image collection 102 is obtained. In at least one embodiment, image collection 102 is a collection of one or more images of a type of object. In at least one embodiment, image collection 102 is used to train one or more neural networks to identify orientations of objects within images. In at least one embodiment, image collection 102 is categorized or labeled as each displaying a same type or category of object. In at least one embodiment, image collection 102 is a collection of images of cars that can include different types of cars at different orientations, in different weather, under different lighting, and so on. In at least one embodiment, image collection 102 includes images of same car or same type of car at different orientations. In at least one embodiment, at least a portion of image collection 102 lacks ground truth annotations that specify orientation of objects within such training images. In at least one embodiment, all images of image collection 102 lack ground truth annotations that specify azimuth, elevation, and tilt, of objects within images of collection. In at least one embodiment, a ground truth annotation refers to, for one or more neural networks configured to determine one or more characteristics of an image in which said one or more neural networks are trained on a training set of images, an annotation that an image of said training set of images can comprise that indicates expected one or more characteristics of said image. In at least one embodiment, image collection 102 includes one or more synthetic images, such as an image created from a variational autoencoder (VAE), generative adversarial network (GAN), or a renderer. In at least one embodiment, all images of image collection 102 are real images, as opposed to those synthesized or created from a generative model such as a variational autoencoder (VAE), renderer, or generative adversarial network. In at least one embodiment, image collection 102 is collected and aggregated from a website that sorts images by category.

In at least one embodiment, discriminator 106 is trained to identify an orientation of an object within an image 104 based, at least in part, on one or more characteristics of said object other than said object's orientation. In at least one embodiment, discriminator 106 is a classifier within one or more neural networks. In at least one embodiment, discriminator 106 is a component of one or more neural networks, and comprises other neural networks, classifiers, and various other machine learning components. In at least one embodiment, discriminator 106 is a discriminative network of a generative adversarial network. In at least one embodiment, discriminator 106 is part of one or more neural networks and is trained to infer a viewpoint and a set of appearance attributes from an input image. In at least one embodiment, discriminator 106 is trained on a collection of images of a category (e.g., cars) to infer orientations of other objects of same category captured within other images. In at least one embodiment, discriminator 106 is trained in a self-supervised manner on image collection 102. In at least one embodiment, discriminator 106 is trained to identify an orientation of an object within image 104 in a self-supervised manner by at least computing one or more loss functions as part of training that evaluate one or more characteristics of images of a training set (e.g., image collection 102). In at least one embodiment, a neural network associated with discriminator 106 is trained based at least in part on computing a generative consistency loss, a symmetry loss, a nearest neighbor and farthest neighbor loss, and a disentanglement loss. In at least one embodiment, neural networks to identify orientations of objects may be trained in accordance with techniques described in connection with FIGS. 2-10. In at least one embodiment, discriminator 106 is trained on a collection of images that lacks ground truth annotations or ground truth annotations are otherwise unavailable (e.g., such data is withheld during training).

In at least one embodiment, image 104 is obtained for discriminator 106. In at least one embodiment, an object within image 104 is of a same type as objects within images of image collection 102 that are used to train one or more neural networks. In at least one embodiment, image 104 is provided to a neural network for inferencing to predict an orientation. In at least one embodiment, a first system trains one or more neural networks and a second different system uses those one or more neural networks to perform inferencing to identify orientations of objects within images. In at least one embodiment, discriminator 106 is trained in a self-supervised manner on image collection 102 of objects of a specific category to infer orientations of other objects of said category (e.g., object within image 104). In at least one embodiment, one or more neural networks associated with discriminator 106 are trained on a collection of images of cars and are used to infer orientations of cars captured in real-time by a camera or other suitable video/image capture device attached to a vehicle. In at least one embodiment, discriminator 106 is trained in a self-supervised manner on image collection 102 to determine an orientation 108 of an object depicted in image 104. In at least one embodiment, discriminator 106 determines orientation 108 of a car depicted in image 104.

Figure 2:
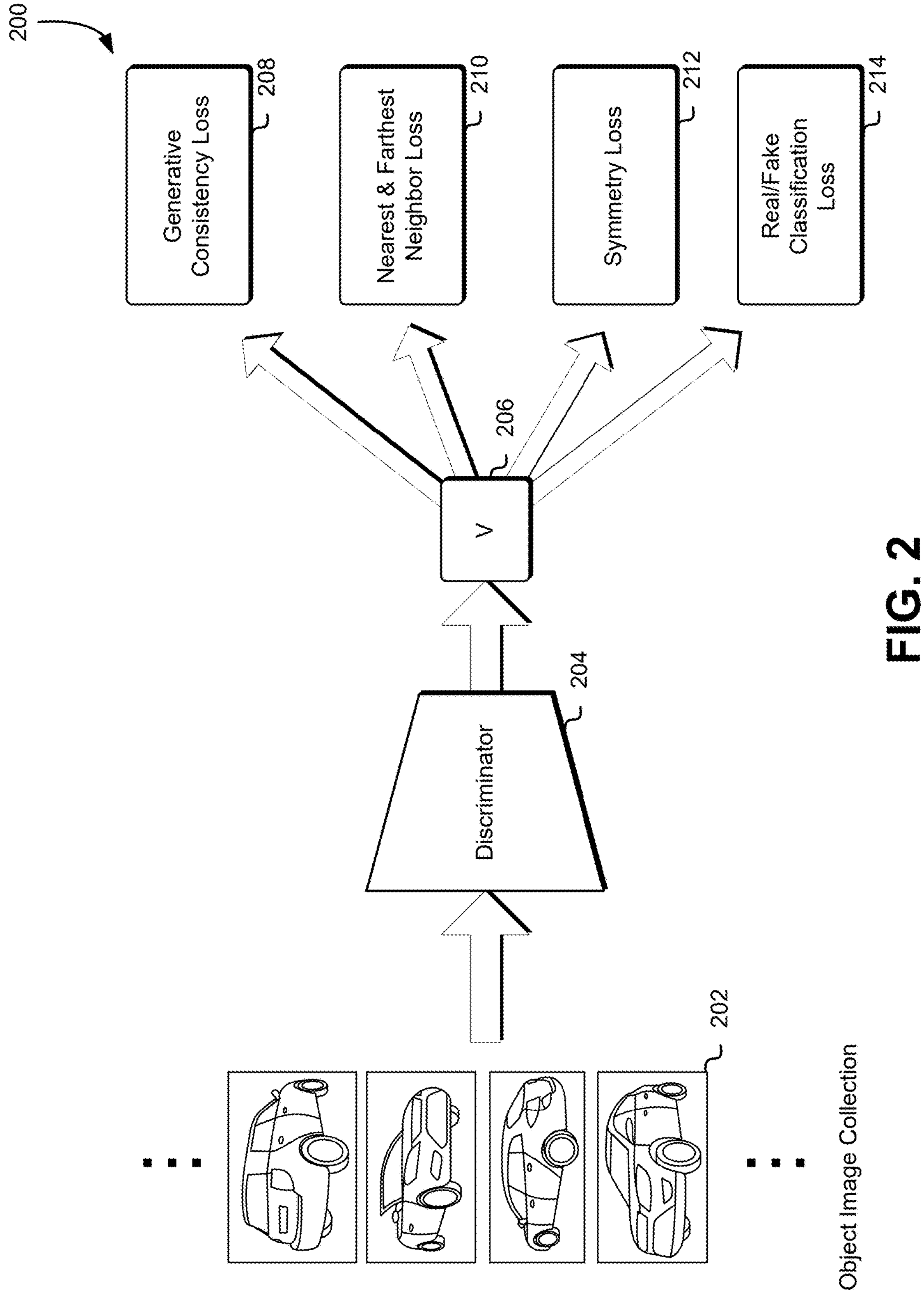
FIG. 2 illustrates a diagram that depicts loss functions, according to at least one embodiment.

FIG. 2 illustrates a diagram 200 that depicts loss functions, according to at least one embodiment. In at least one embodiment, diagram 200 is implemented by one or more systems such as a system described in FIGS. 18-46. In at least one embodiment, a discriminator 204 is associated with one or more neural networks and is trained using at least one of a real-image generative consistency loss 208, a nearest & farthest neighbor loss 210, a symmetry loss 212, and a real/fake classification loss 214. In at least one embodiment, discriminator 204 is part of one or more neural networks that are trained to infer viewpoints from an input image, and said one or more neural networks comprise various parameters that are associated with one or more processes of said one or more neural networks, and are updated based at least in part on real-image generative consistency loss 208, nearest & farthest neighbor loss 210, and symmetry loss 212.

In at least one embodiment, an object image collection 202 of a type of object is obtained for discriminator 204. In at least one embodiment, object image collection 202 comprises images that all include a same type of object. In at least one embodiment, object image collection 202 comprises images that include cars at different orientations, in different weather, under different lighting, and so on. In at least one embodiment, a system obtains object image collection 202 in accordance with techniques described elsewhere in this disclosure, such as FIG. 13.

In at least one embodiment, an image of object image collection 202 is selected as an input image to discriminator 204. In at least one embodiment, images of a collection are selected in any suitable manner for learning, which may be randomly or pseudo-randomly sampled from a training set. In at least one embodiment, discriminator 204 predicts a viewpoint 206 of an input image. In at least one embodiment, viewpoint 206 of an input image is inferred by discriminator 204 through one or more processes involving one or more neural networks, which comprise one or more input parameters that dictate one or more processes involving said one or more neural networks. In at least one embodiment, viewpoint 206 is determined based on ground truth annotations provided as part of training for at least a portion of object image collection 202. In at least one embodiment, viewpoint 206 corresponds to a prediction of an orientation of an object within an image input to discriminator 204. In at least one embodiment, an object's orientation (e.g., viewpoint) is encoded on a set of parameters comprising an azimuth parameter, an elevation parameter, and a tilt parameter.

In at least one embodiment, generative consistency loss 208 is computed for discriminator 204. In at least one embodiment, generative consistency loss 208 is computed based at least in part on image consistency loss of comparing a selected image with an image generated by a deep generative model and a viewpoint consistency loss of comparing the input viewpoint to a generative model and its value predicted by the discriminator. In at least one embodiment, generative consistency loss 208 is computed using techniques described elsewhere in this disclosure, such as those discussed in connection with FIGS. 4-7. In at least one embodiment, generative consistency loss 208 includes at least two components: a synthetic-image viewpoint consistency loss and a real-image consistency loss. In at least one embodiment, a viewpoint consistency loss can be denoted as an orientation consistency loss. In at least one embodiment, generative consistency loss is applied to real images (e.g., images from object image collection 202) as opposed to synthesized images created by a generator. In at least one embodiment, viewpoint consistency loss and image consistency loss are utilized to determine generative consistency loss. In at least one embodiment, generative consistency loss is a combination of viewpoint consistency loss and image consistency loss. In at least one embodiment, generative consistency loss is determined by a following symbolic mathematical equation:

$$L_{gc}=L_{vc}L_{ic}$$

where $L_{gc}$ corresponds to generative consistency loss, $L_{vc}$ corresponds to viewpoint consistency loss, and $L_{ic}$ corresponds to image consistency loss.

In at least one embodiment, image consistency loss is computed based at least in part on an image of object image collection 202 which is input to discriminator 204, which determines at least two properties from said input image: viewpoint 206 and a set of appearance parameters. In at least one embodiment, viewpoint 206 and a set of appearance parameters are provided to a generator to create a synthesized image. In at least one embodiment, a generative adversarial network (GAN) receives viewpoint 206 and a set of appearance parameters and generates a synthetic (e.g., fake) image that is in accordance with viewpoint 206 and set of appearance parameters. In at least one embodiment, a synthesized image and an input image are compared to determine image consistency loss. In at least one embodiment, a cosine distance between an input image and a synthesized image are compared to determine feature similarities wherein closer similarity corresponds to lower loss. In at least one embodiment, L1, L2, or cosine distances are used to determine image consistency loss between two images.

In at least one embodiment, a viewpoint consistency loss is computed based at least in part on a viewpoint (e.g., viewpoint 206) of an input image. In at least one embodiment, a generator is used to create a synthetic image from viewpoint 206 predicted by discriminator 204 from an input image. In at least one embodiment, a synthetic image generated from viewpoint 206 is provided to discriminator 204 that determines a second viewpoint, of said synthetic image. In at least one embodiment, viewpoint 206 is compared against a second viewpoint of a synthetic image generated based at least in part on viewpoint 206. In at least one embodiment, a distance between viewpoint 206 and a second viewpoint of a synthetic image is used to compute a viewpoint consistency loss, wherein closer viewpoints correspond to lower loss. In at least one embodiment, generative consistency loss is computed in accordance with techniques described in connection with FIG. 15.

In at least one embodiment, real/fake classification loss 214 is calculated based on whether discriminator 204 is able to correctly predict whether an input image to discriminator 204 is a real image or a synthesized image. In at least one embodiment, real/fake classification loss 214 is computed based on whether discriminator 204 is able to correctly predict whether sets of input images are real or fake, wherein discriminator 204 can be provided either real or fake (e.g., synthetic) images and is to predict whether those images are real or fake. As part of training discriminator 204, ground truth as to whether an image provided to discriminator 204 is real or fake is available as part of training (e.g., to compute loss).

In at least one embodiment, symmetry loss 212 is computed by at least comparing an input image with a transformed version of that input image. In at least one embodiment, an input image is selected from object image collection 202. In at least one embodiment, a transform is applied to an input image to generate a transformed image. In at least one embodiment, an input image is flipped horizontally to generate a transformed image. In at least one embodiment, discriminator 204 is used to predict viewpoint 206 of an input image and a second viewpoint of a transformed image. In at least one embodiment, viewpoint 206 is predicted for an input image and a second viewpoint is predicted for a horizontally flipped version of that input image. In at least one embodiment, loss is calculated based on whether certain properties hold true. In at least one embodiment, a transform or inverse thereof is applied to a predicted viewpoint of a transformed version of an input image. In at least one embodiment, if an input image is rotated by $(\phi, \theta, \psi)$ angles to produce a transformed image, then an inferred viewpoint of that transformed image may be inversely rotated by $(-\phi, -\theta, -\psi)$ angles. In at least one embodiment, loss is computed by comparing magnitudes of azimuth, elevation, and tilt of viewpoint 206 of an input image with a second viewpoint of a transformed image, wherein zero loss results when magnitudes of each orientation parameters are equal. In at least one embodiment, symmetry loss is computed in accordance with techniques described elsewhere in this disclosure, such as those discussed in connection with FIGS. 8 and 16. In at least one embodiment, loss is computed by determining how closely a first set of appearance parameters predicted by discriminator 204 for an image match a second set of appearance parameters predicted by discriminator 204 for a transformed version of that image.

In at least one embodiment, nearest neighbor and farthest neighbor loss 210 is computed by at least comparing an input image of object image collection 202 to its nearest and farthest neighbors based at least in part on a viewpoint graph of object image collection 202. In at least one embodiment, nearest neighbor and farthest neighbor loss 210 are computed in accordance with techniques described in connection with FIGS. 4, 9, and 17. In at least one embodiment, object image collection 202 is used to generate a viewpoint graph wherein nodes of such graph correspond to images and edges correspond to their viewpoint-equivariant distances (e.g., cosine distances). In at least one embodiment, cosine distances are computed based on feature similarities of pairs of images using a convolutional neural network (CNN). In at least one embodiment, an anchor image is selected from object image collection 202. In at least one embodiment, an anchor image is located from a viewpoint graph and a nearest neighbor and farthest neighbor are selected based on edge weights. In at least one embodiment, a nearest neighbor has a shortest edge that is connected to an anchor image. In at least one embodiment, a farthest neighbor has a farthest edge that is connected to an anchor image. In at least one embodiment, discriminator 204 predicts a first viewpoint for an anchor image (e.g., viewpoint 206 predicted for said anchor image) and predicts a second viewpoint for a nearest neighbor image (e.g., viewpoint 206 predicted for said nearest neighbor image) and loss is computed so that closer distance between those viewpoints correspond to less loss. In at least one embodiment, a neural network of discriminator 204 predicts a first viewpoint for an anchor image and predicts a third viewpoint for a farthest neighbor image (e.g., viewpoint 206 for said farthest neighbor image) and loss is computed so that longer distance between those viewpoints correspond to less loss.

In at least one embodiment, computed losses (e.g., generative consistency loss 208, nearest and farthest neighbor loss 210, symmetry loss 212, and real/fake classification loss 214) are utilized to update parameters of one or more neural networks associated with discriminator 204 being trained on object image collection 202. In at least one embodiment, a system implementing diagram 200 includes executable code to continuously update parameters of one or more neural networks associated with discriminator 204 such that said one or more neural networks and discriminator 204 are trained to infer a viewpoint and other characteristics of an input image. In at least one embodiment, training is performed according to any suitable technique and may include selecting and utilizing various additional images of object image collection 202 to compute losses and refine parameters for one or more neural networks being trained to infer viewpoints. In at least one embodiment, once training is completed, a trained neural network is made available (e.g., a neural network or parameters thereof transferred to a different system) for inferencing.

Figure 3:
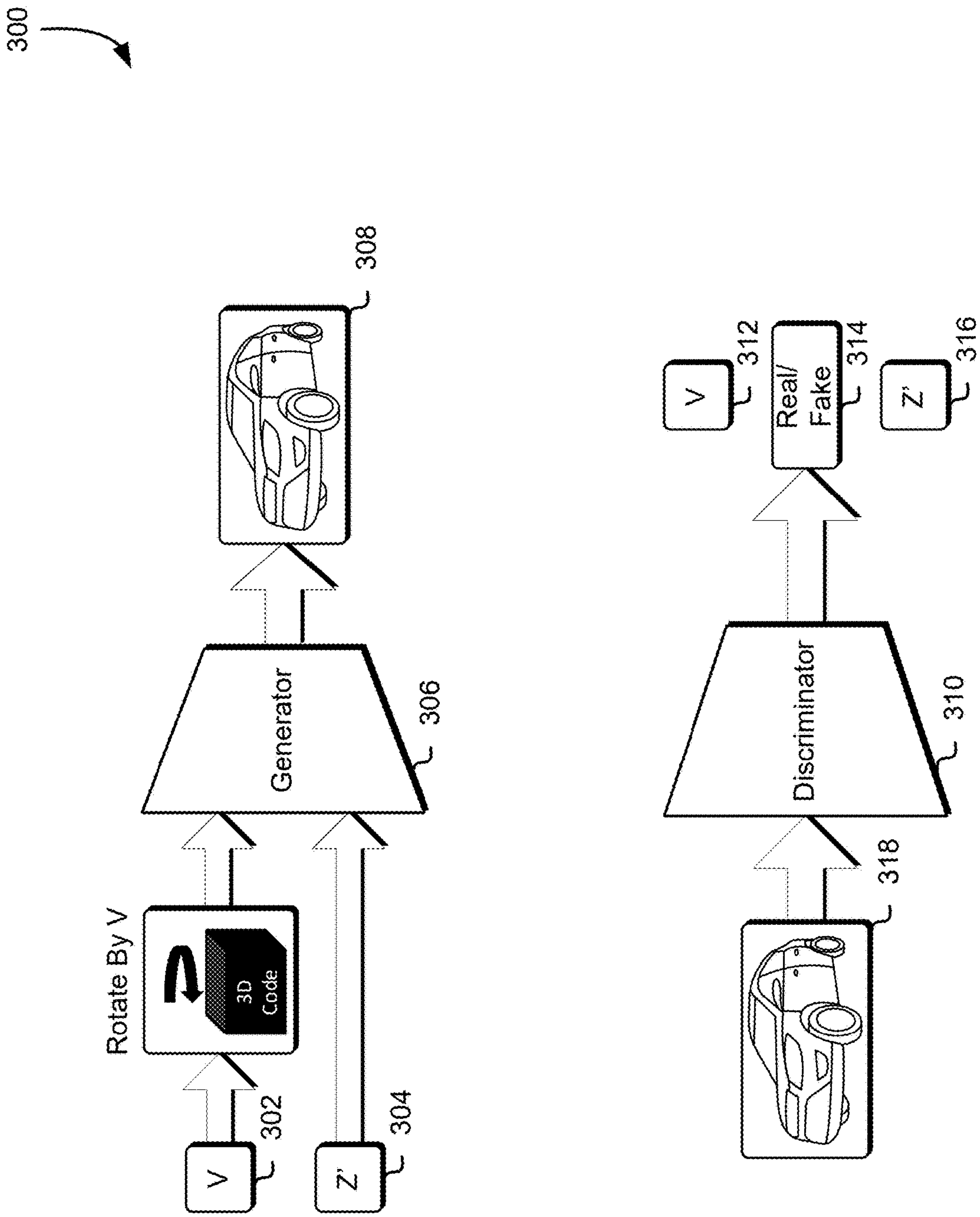
FIG. 3 illustrates a diagram that depicts a generative adversarial network, according to at least one embodiment.

FIG. 3 illustrates a diagram 300 that depicts a generative adversarial network, according to at least one embodiment. In at least one embodiment, diagram 300 is implemented by one or more systems such as a system described in FIGS. 18-46. In at least one embodiment, diagram 300 includes a generator 306, which utilizes an input viewpoint 302 and an input set of appearance parameters 304, a synthetic image 308. In at least one embodiment, diagram 300 illustrates a discriminator 310, which utilizes an input image 318, and outputs an output viewpoint 312, an output determination 314, and an output set of appearance parameters 316. In at least one embodiment, parameters of generator 306 and/or discriminator 310 are selected using techniques described in connection with FIG. 4-7.

In at least one embodiment, input viewpoint 302 corresponds to an orientation of an object within an image, which refers to a three-dimensional orientation of an object captured within a two-dimensional image. In at least one embodiment, an object's orientation (e.g., viewpoint) is encoded on a set of parameters comprising an azimuth parameter, an elevation parameter, and a tilt parameter. In at least one embodiment, input viewpoint 302 corresponds to a specific orientation of an object, and comprises specific values for a set of parameters comprising an azimuth parameter, an elevation parameter, and a tilt parameter. In at least one embodiment, input viewpoint 302 indicates a 3D rotation of an object (e.g., input viewpoint 302 can specify a rotation of an object by a specified number of degrees on a specified axis, and variations thereof). In at least one embodiment, input set of appearance parameters 304 are parameters that define an appearance of an object. In at least one embodiment, an object includes a vehicle, airplane, drone, human being, face (e.g., of a human or animal), and more. In at least one embodiment, input set of appearance parameters 304 correspond to appearance parameters of a car, such as color, size, wheel type, and various other parameters that define appearance of a car.

In at least one embodiment, input viewpoint 302 and input set of appearance parameters 304 are provided to generator 306 to create image 308. In at least one embodiment, generator 306 and discriminator 310 are part of a generative adversarial network (GAN). In at least one embodiment, generator 306 is a generative network in a generative adversarial network. In at least one embodiment, generator 306 is part of one or more neural networks and is trained to generate an image based on an input viewpoint and an input set of appearance parameters. In at least one embodiment, generator 306 receives input viewpoint 302 and input set of appearance parameters 304 and generates image 308, which is a synthetic (e.g., fake) image that is in accordance with input viewpoint 302 and input set of appearance parameters 304. In at least one embodiment, generator accepts two separate (e.g., independent) parameters which are used to create image 308—input viewpoint 302 which indicates a particular viewpoint (e.g., encoded azimuth, elevation, and tilt parameters) which image 308 is to be generated with and appearance parameters 304 that encode appearance properties of image 308 (e.g., for a car, such properties may include color, make, model, year of manufacture, and more). In at least one embodiment, generator 306 generates image 308, which comprises an object generated in accordance with input set of appearance parameters 304 that is oriented in accordance with input viewpoint 302. In at least one embodiment, image 308 is a synthetic image comprising a car, in which said car's appearance corresponds to input set of appearance parameters 304 and said car's orientation corresponds to input viewpoint 302.

In at least one embodiment, a generative adversarial network (GAN) includes discriminator 310. In at least one embodiment, discriminator 310 accepts input image 318 and generates output viewpoint 312, output determination 314, and output set of appearance parameters 316. In at least one embodiment, input image 318 can be a real image or synthetic image. In at least one embodiment, input image 318 is retrieved from one or more other sources, such as an image database, one or more cameras, and/or variations thereof. In at least one embodiment, discriminator 310 processes image 308. In at least one embodiment, discriminator 310 comprises various neural networks and machine learning processes. In at least one embodiment discriminator 310 is implemented in accordance with those described elsewhere in this disclosure, such as those discussed in connection with FIG. 2. In at least one embodiment, discriminator 310 is associated with one or more neural networks that are trained to infer a viewpoint as well as other characteristics of an input image. In at least one embodiment, discriminator 310 is refined through various processes that involve computations of various loss functions, which are used to update various parameters associated with discriminator 310.

In at least one embodiment, discriminator 310 receives input image 318 and generates output viewpoint 312, output determination 314, and output set of appearance parameters 316. In at least one embodiment, output viewpoint 312 is a predicted viewpoint of input image 318 generated by one or more processes of discriminator 310. In at least one embodiment, output determination 314 is a determination generated by one or more processes of discriminator 310 that indicates whether input image 318 is a real image or a synthetic (e.g., fake) image. In at least one embodiment, determination 314 is a binary output (e.g., TRUE/FALSE indicator for whether discriminator 310 believes input image 318 is a real image or a synthetic image). In at least one embodiment, determination 314 is a numeric value between 0 and 1 (inclusive or exclusive of one or both endpoints) that encodes a confidence value of whether discriminator 310 thinks input image 318 is real for fake (e.g., 0.5 indicates it is equally likely that an image is real or fake; 0 indicates high likelihood an image is fake). In at least one embodiment, output set of appearance parameters 316 are a predicted set of appearance parameters of input image 318 generated by one or more processes of discriminator 310.

In at least one embodiment, if discriminator 310 is calibrated accurately (e.g., discriminator 310 is trained to a desired degree of accuracy, or desired degree of acceptable loss) and image 308 is generated by generator 306, output determination 314 indicates that image 308 is fake, and output viewpoint 312 and output set of appearance parameters 316 are identical to input viewpoint 302 and input set of appearance parameters 304, respectively. In at least one embodiment, if discriminator 310 is not calibrated accurately (e.g., discriminator 310 is not fully trained to a desired degree of accuracy, or desired degree of acceptable loss) and image 308 is generated by generator 306, output determination 314 indicates an incorrect determination (e.g., if image 308 is synthetic, output determination 314 would indicate that image 308 is real), and output viewpoint 312 and output set of appearance parameters 316 are different from input viewpoint 302 and input set of appearance parameters 304, respectively. In at least one embodiment, a comparison between output viewpoint 312 and output set of appearance parameters 316, and input viewpoint 302 and input set of appearance parameters 304, respectively, is utilized to evaluate and further process, train, and/or calibrate discriminator 310 and generator 306.

Figure 4:
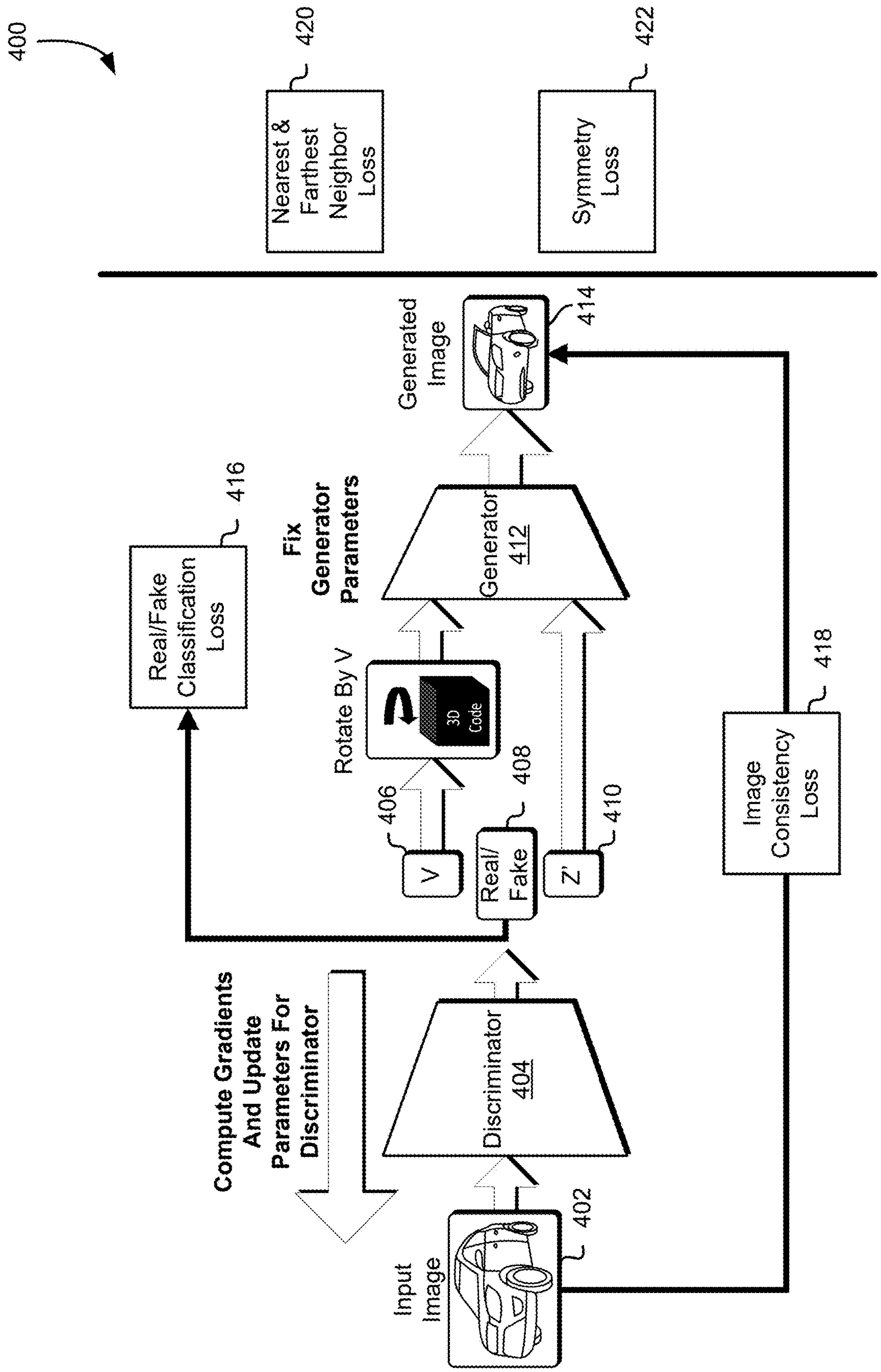
FIG. 4 illustrates a diagram that depicts discriminator update, according to at least one embodiment.

FIG. 4 illustrates a diagram 400 that depicts discriminator update, according to at least one embodiment. In at least one embodiment, loss functions are computed and used to update parameters of discriminator 404 that are used to predict various outputs from an input image. In at least one embodiment, FIG. 4 illustrates an input image 402; discriminator 404; a predicted viewpoint 406; a predicted determination 408 of whether input image 402 is real or fake; a set of appearance parameters 410; a generator 412; a generated image 414; real/fake classification loss 416; image consistency loss 418; nearest and farthest neighbor loss 420; and symmetry loss 422. In at least one embodiment, FIG. 4 illustrates discriminator update using a real image (e.g., an image that was not synthesized by a generator). In at least one embodiment, techniques described in connection with FIG. 4 are coextensive with those described in connection with FIGS. 5-7 to train generators and/or discriminators.

In at least one embodiment, discriminator 404 processes input image 402. In at least one embodiment, discriminator 404 is associated with one or more neural networks that are trained to infer a viewpoint as well as other characteristics of an input image. In at least one embodiment, discriminator 404 receives input image 402 and generates a predicted viewpoint 406, a determination 408 of whether input image 402 is real or fake, and a set of appearance parameters 410. In at least one embodiment, viewpoint 406 is a predicted viewpoint of input image 402 determined by one or more processes of discriminator 404. In at least one embodiment, viewpoint 406 corresponds to a predicted specific orientation of an object within an image, and comprises specific values for a set of parameters comprising an azimuth parameter, an elevation parameter, and a tilt parameter. In at least one embodiment, viewpoint 406 indicates a 3D rotation of an object (e.g., viewpoint 406 can specify a rotation of an object by a specified number of degrees on a specified axis, and variations thereof). In at least one embodiment, viewpoint 406 comprises a predicted orientation of a car depicted in input image 402. In at least one embodiment, determination 408 is a determination of whether input image 402 is a real image or fake image. In at least one embodiment, a fake image refers to a synthesized image created by a generative adversarial network. In at least one embodiment, determination 408 is a binary value (e.g., TRUE/FALSE value indicating a prediction of whether input image 402 is real or fake). In at least one embodiment, determination 408 is a non-binary value indicating a degree of confidence in whether input image 402 is real or fake. In at least one embodiment, set of appearance parameters 410 are a predicted set of appearance parameters of input image 402 generated by one or more processes of discriminator 404. In at least one embodiment, set of appearance parameters 410 are predicted parameters that define an appearance of an object depicted in input image 402. In at least one embodiment, set of appearance parameters 410 correspond to a set of predicted appearance parameters of a car depicted in input image 402, such as predicted color, size, wheel type, and various other parameters that define an appearance of a car depicted in input image 402.

In at least one embodiment, viewpoint 406 and set of appearance parameters 410 are provided to a generator 412 to generate a generated image 414. In at least one embodiment, generator 412 creates a synthesized image. In at least one embodiment, generator 412 is part of a generative adversarial network (GAN). In at least one embodiment, generator 412 receives viewpoint 406 and set of appearance parameters 410 and generates generated image 414, which is a synthetic (e.g., fake) image that is in accordance with viewpoint 406 and set of appearance parameters 410. In at least one embodiment, generator 412 generates generated image 414, which comprises an object generated in accordance with set of appearance parameters 410, and oriented in accordance with viewpoint 406. In at least one embodiment, generated image 414 is a synthetic image comprising a car, in which said car's appearance corresponds to set of appearance parameters 410 and said car's orientation corresponds to viewpoint 406.

In at least one embodiment, determination 408 is used to determine a classification loss such as a real/fake classification loss 416. In at least one embodiment, real/fake classification loss 416 is calculated based on whether discriminator 404 is able to correctly predict whether an input image to discriminator 404 is a real image or a synthesized image. In at least one embodiment, real/fake classification loss 416 is computed based on whether discriminator 404 is able to correctly predict whether sets of input images are real or fake, wherein discriminator 404 can be provided either real or fake (e.g., synthetic) images and is to predict whether those images are real or fake. As part of training discriminator 404, ground truth as to whether an image provided to discriminator 404 is real or fake is available as part of training (e.g., to compute loss).

In at least one embodiment, generated image 414 and input image 402 are compared to determine an image consistency loss 418. In at least one embodiment, a cosine distance between input image 402 and generated image 414 are compared to determine feature similarities wherein closer similarity corresponds to lower loss. In at least one embodiment, at least one of L1, L2, or cosine distances are used to determine image consistency loss 418 between input image 402 and generated image 414. In at least one embodiment, L1 distance is determined by a following symbolic mathematical equation:

$$L_1\text{Distance}=I_{in}-I_{gen}$$

where $I_{in}$ corresponds to a representation of an input image and $I_{gen}$ corresponds to a representation of a generated image.

In at least one embodiment, L2 distance is determined by a following symbolic mathematical equation:

$$L_2\text{Distance}=\sum_{j=1}^{3}(I_{in}^{j}-I_{gen}^{j})^2$$

where $I_{in}$ corresponds to a representation of an input image and $I_{gen}$ corresponds to a representation of a generated image.

In at least one embodiment, cosine distance is determined by a following symbolic mathematical equation:

$$\text{Cosine Distance}=f_{in}-f_{gen}$$

where $f_{in}$ corresponds to a representation of features of an input image and $f_{gen}$ corresponds to a representation of features of a generated image.

In at least one embodiment, additional loss functions are calculated as part of discriminator updates described in connection with FIG. 4. In at least one embodiment, a nearest and farthest neighbor loss 420 is computed. In at least one embodiment, a symmetry loss 422 is computed. In at least one embodiment, nearest and farthest neighbor loss 420 and/or symmetry loss 422 are computed in accordance with techniques described elsewhere, such as those discussed in connection FIGS. 8-10. In at least one embodiment, computed losses (e.g., those illustrated in FIG. 4) are used to compute gradients and update parameters for discriminator 410 while holding parameters of generator 412 constant using any suitable technique, such as gradient descent.

Figure 5:
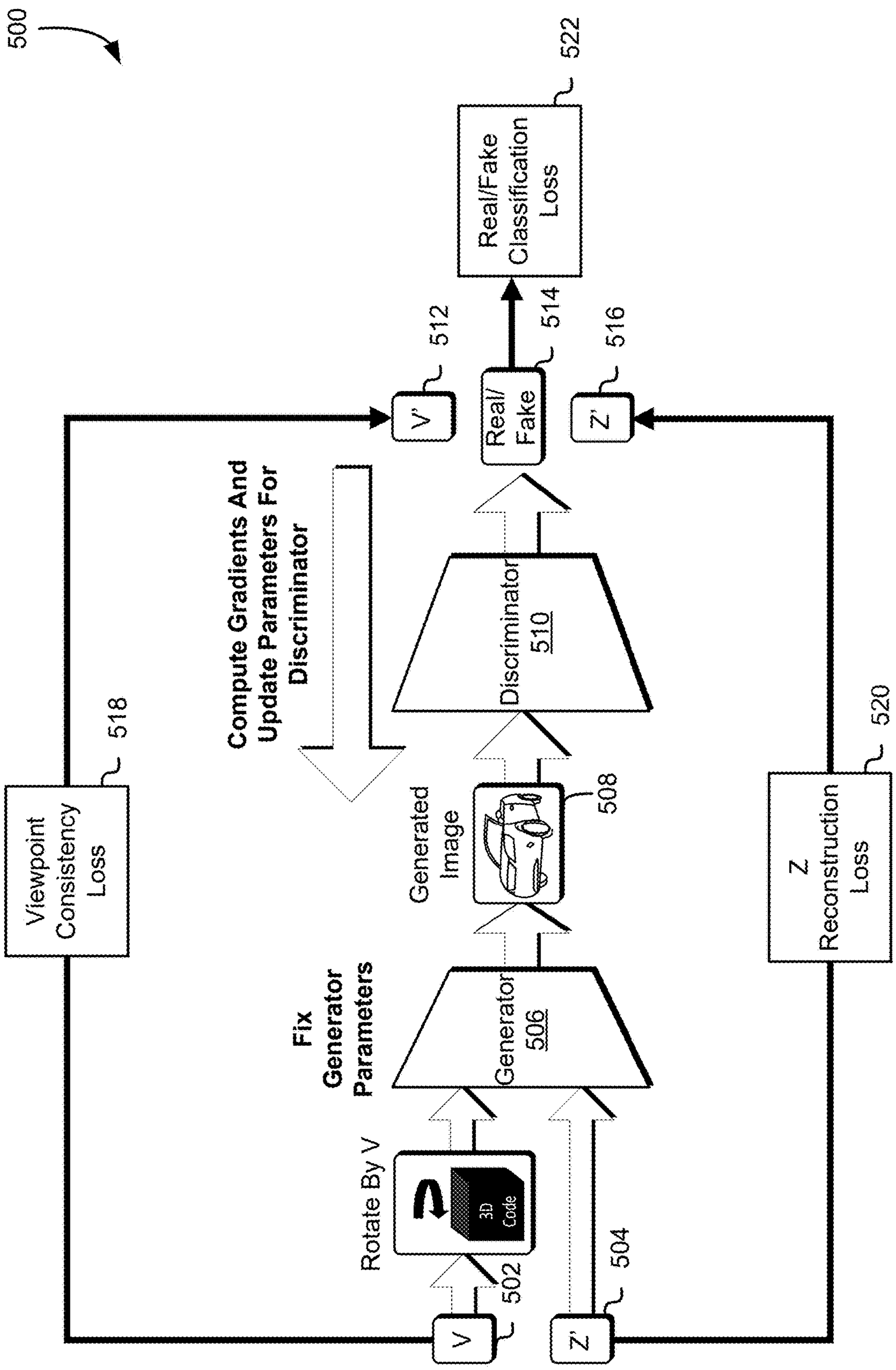
FIG. 5 illustrates a diagram that depicts discriminator update, according to at least one embodiment.

FIG. 5 illustrates a diagram 500 that depicts discriminator update, according to at least one embodiment. In at least one embodiment, loss functions are computed and used to update parameters of discriminator 504 that are used to predict various outputs from an input image. In at least one embodiment, FIG. 5 illustrates a viewpoint 502; a set of appearance parameters 504; a generator 506; a generated image 508; a discriminator 510; a predicted viewpoint 512; a predicted determination 514 of whether generated image 508 is real or fake; a predicted set of appearance parameters 516; viewpoint consistency loss 518; Z reconstruction loss 520; and real/fake classification loss 522. In at least one embodiment, FIG. 5 illustrates discriminator update using a synthesized image (e.g., an image that created by a generative adversarial network). In at least one embodiment, techniques described in connection with FIG. 5 are coextensive with those described in connection with FIGS. 4, 6, and 7 to train generators and/or discriminators.

In at least one embodiment a viewpoint 502 and set of appearance parameters 504 are selected in any suitable manner, which may include random selection of parameter values, weighted random selection, and more. In at least one embodiment, viewpoint 502 and set of appearance parameters 504 are disentangled parameters that can be independently selected. In at least one embodiment, generator 506 accepts viewpoint 502 and set of appearance parameters 504 as inputs and creates a generated image 508. In at least one embodiment, generated image 508 is a synthetic image with appears generated based on set of appearance parameters 504 and oriented according to viewpoint 502.

In at least one embodiment, a set of images (e.g., generated image 508) is provided to a discriminator 510 as an input and discriminator predicts various properties of that set of images. In at least one embodiment, discriminator 510 receives generated image 508 and produces a predicted viewpoint 512; a predicted determination 514 of whether generated image 508 is real or fake; and a predicted set of appearance parameters 516. In at least one embodiment, discriminator lacks access to viewpoint 502 and a set of appearance parameters 504 used to create generated image 508 (e.g., such information is withheld from discriminator 510 during prediction). In at least one embodiment, outputs of discriminator 510 are used to compute loss. In at least one embodiment, loss functions are used to compute gradients (e.g., using gradient descent) and update parameters for discriminator 510 while fixing parameters of generator 506 constant.

In at least one embodiment, viewpoint consistency loss 518 is computed. In at least one embodiment, viewpoint consistency loss refers to a loss function that is computed based on how accurate discriminator 510 is at predicting viewpoints. In at least one embodiment, viewpoint consistency loss 518 is computed as a difference or distance between input viewpoint 502 and predicted viewpoint 512. In at least one embodiment, viewpoint consistency loss is a component of generative consistency loss. In at least one embodiment, a distance (e.g., L1 distance, L2 distance, cosine distance, and/or variations thereof) between input viewpoint 502 and predicted viewpoint 512 is used to compute a viewpoint consistency loss 518, wherein closer viewpoints (e.g., viewpoints with shorter distances from each other) correspond to lower loss.

In at least one embodiment, Z reconstruction loss 520 is computed. In at least one embodiment, Z reconstruction loss refers to a difference or distance between an input set of appearance parameters 504 and a predicted set of appearance parameters 516. In at least one embodiment, Z reconstruction loss refers to a loss function that is computed based on how accurate discriminator 510 is at predicting appearance parameters or appearance properties of an image.

In at least one embodiment, determination 514 is used to determine a classification loss such as a real/fake classification loss 522. In at least one embodiment, real/fake classification loss 522 is calculated based on whether discriminator 514 is able to correctly predict whether generated image 508 submitted to discriminator 510 is a real image or a synthesized image. In at least one embodiment, real/fake classification loss 522 is computed based on whether discriminator 510 is able to correctly predict whether sets of input images are real or fake, wherein discriminator 510 can be provided either real or fake (e.g., synthetic) images and is to predict whether those images are real or fake.

Figure 6:
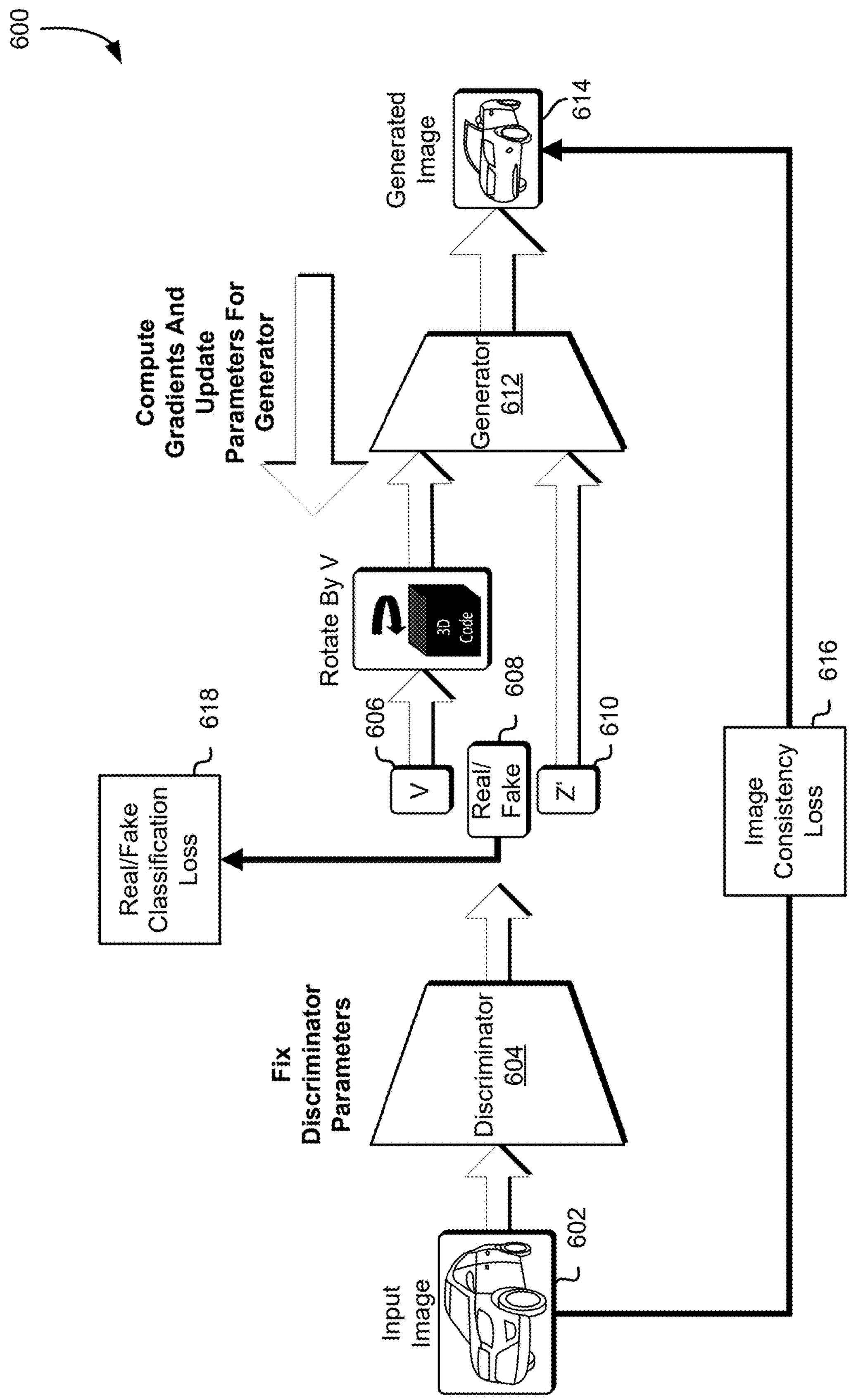
FIG. 6 illustrates a diagram that depicts generator update, according to at least one embodiment.

FIG. 6 illustrates a diagram 600 that depicts generator update, according to at least one embodiment. In at least one embodiment, loss functions are computed and used to update parameters of a generator that are used to create synthetic images. In at least one embodiment, FIG. 6 illustrates input image 602; discriminator 604; a predicted viewpoint 606; a predicted determination 608 of whether input image 602 is real or fake; a predicted set of appearance parameters 610; generator 612; generated image 614; image consistency loss 616; and real/fake classification loss 618. In at least one embodiment, FIG. 6 illustrates generator update using a real image (e.g., an image that was not created by a generative adversarial network). In at least one embodiment, techniques described in connection with FIG. 6 are coextensive with those described in connection with FIGS. 4, 5, and 7 to train generators and/or discriminators.

In at least one embodiment, input image 602 is input to discriminator 604. In at least one embodiment, input image 602 is a real image that is selected from a set of training data. In at least one embodiment, input image 602 is selected from an object image collection, such as those described in connection with FIG. 2. In at least one embodiment, discriminator 604 processes input image 602. In at least one embodiment, discriminator 604 receives input image 602 and generates a predicted viewpoint 606, a predicted determination of whether input image 602 is a real or fake image, and a predicted set of appearance parameters 608. In at least one embodiment, viewpoint 606 is a predicted viewpoint of input image 602 determined by one or more processes of discriminator 604. In at least one embodiment, determination 608 is a prediction of whether input image 602 is a real image or fake image (e.g., synthetic image created by a generative adversarial network). In at least one embodiment, determination 608 is a binary value or a confidence value over a non-binary range (e.g., 0-100). In at least one embodiment, set of appearance parameters 610 are a predicted set of appearance parameters of input image 602 generated by one or more processes of discriminator 604. In at least one embodiment, set of appearance parameters 610 are predicted parameters that define an appearance of an object depicted in input image 602.

In at least one embodiment, viewpoint 606 and set of appearance parameters 610 are provided as inputs to generator 612 to produce a generated image 614. In at least one embodiment, generated image 614 is a synthetic (e.g., fake) image created by generator 612 with an orientation and appearance according to viewpoint 606 and set of appearance parameters 610, which are, as illustrated in FIG. 6, also predicted viewpoint and appearance of input image 602.

In at least one embodiment, image consistency loss 616 is computed based at least in part on input image 602 which is provided to discriminator 604 which is used to disaggregate at least two properties from input image 602: a predicted viewpoint 606 and predicted set of appearance parameters 610. In at least one embodiment, predicted viewpoint 606 and predicted set of appearance parameters 610 are provided to generator 612 to create a generated image 614. In at least one embodiment, a generative adversarial network (GAN) receives a viewpoint and set of appearance parameters and generates a synthetic (e.g., fake) image that is in accordance with whichever viewpoint and set of appearance parameters was provided. In at least one embodiment, input image 602 and generated image 614 are compared to determine image consistency loss 616. In at least one embodiment, a cosine distance between an input image and a synthesized image are compared to determine feature similarities wherein closer similarity corresponds to lower loss. In at least one embodiment, L1, L2, or cosine distances are used to determine image consistency loss 616 between two images.

In at least one embodiment, determination 608 is used to determine a classification loss such as a real/fake classification loss 618. In at least one embodiment, real/fake classification loss 618 is calculated based on whether discriminator 604 is able to correctly predict whether input image 602 submitted to discriminator 604 is a real image or a synthesized image. In at least one embodiment, real/fake classification loss 618 is computed based on whether discriminator 604 is able to correctly predict whether sets of input images are real or fake, wherein discriminator 604 can be provided either real or fake (e.g., synthetic) images and is to predict whether those images are real or fake. In at least one embodiment, one or more loss functions are computed. In at least one embodiment, parameters of generator 612 are updated by at least computing gradients (e.g., performing stochastic gradient descent) while fixing discriminator parameters.

Figure 7:
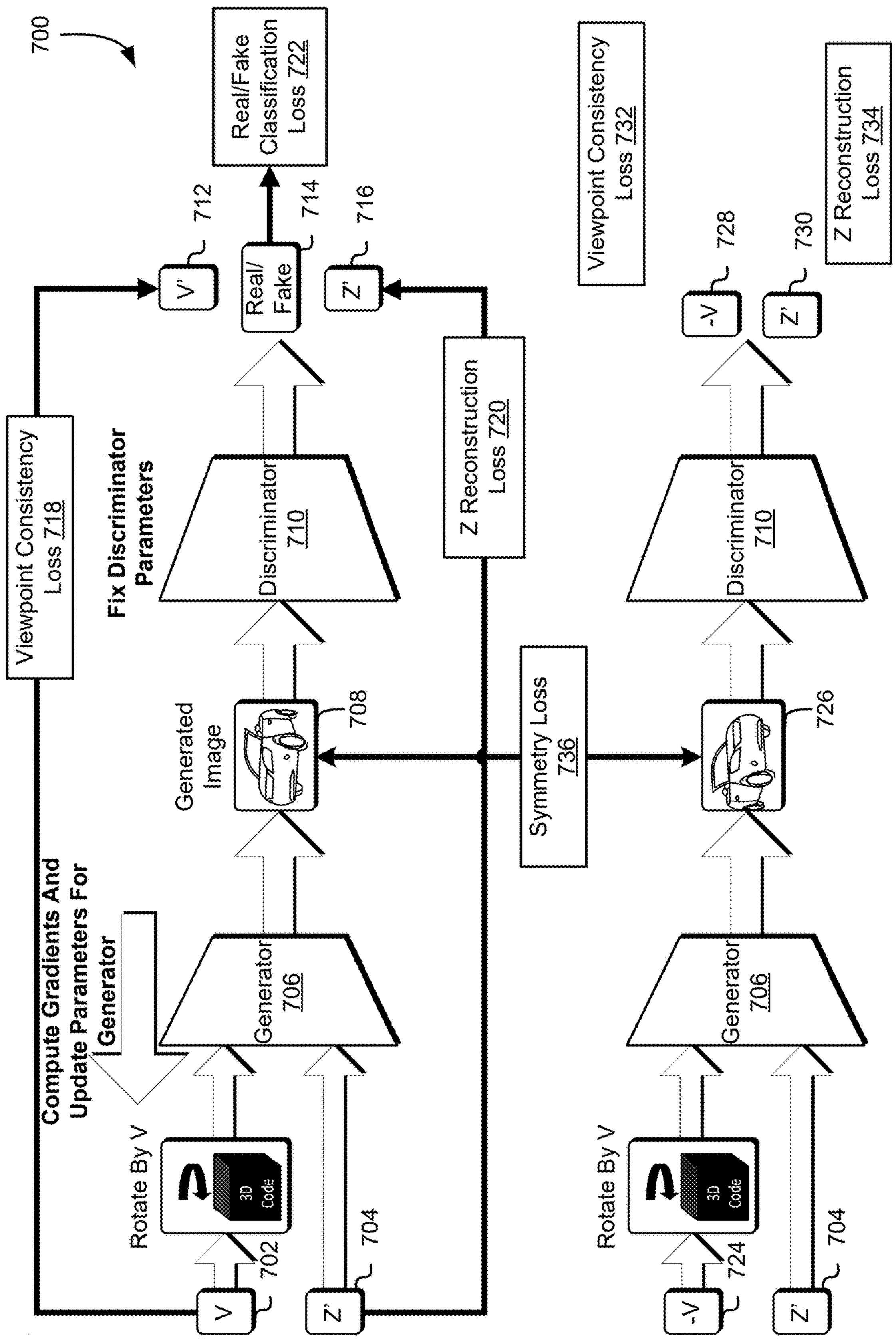
FIG. 7 illustrates a diagram that depicts generator update, according to at least one embodiment.

FIG. 7 illustrates a diagram 700 that depicts generator update, according to at least one embodiment. In at least one embodiment, loss functions are computed and used to update parameters of a generator that are used to create synthetic images. In at least one embodiment, FIG. 7 illustrates a first viewpoint 702; a set of appearance parameters 704; a generator 706; a first generated image 708; a discriminator 710; a predicted first viewpoint 712; a predicted determination 714 of whether generated image 708 is real or fake; a predicted first set of appearance parameters 716; viewpoint consistency loss 718; Z reconstruction loss 720; real/fake classification loss 722; second viewpoint 724; a second generated image 726; a predicted second viewpoint 728; a predicted second set of appearance parameters 730; viewpoint consistency loss 732; Z reconstruction loss 734; and symmetry loss 736. In at least one embodiment, FIG. 6 illustrates generator update using a fake image (e.g., a synthetic or generated image created by a generative adversarial network). In at least one embodiment, techniques described in connection with FIG. 7 are coextensive with those described in connection with FIGS. 4-6 to train generators and/or discriminators.

In at least one embodiment, first viewpoint 702 and set of appearance parameters 704 are disentangled parameters that can be independently selected. In at least one embodiment, generator 706 accepts first viewpoint 702 and set of appearance parameters 704 as inputs and creates a first generated image 708. In at least one embodiment, first generated image 708 is a synthetic image with appears generated based on set of appearance parameters 704 and oriented according to first viewpoint 702. Generator 706 may be in accordance with those described elsewhere in this disclosure, such as those discussed in connection with FIG. 2.

In at least one embodiment, a set of images (e.g., first generated image 708) is provided to a discriminator 710 as an input and discriminator predicts various properties of that set of images. In at least one embodiment, discriminator 710 receives first generated image 708 and produces a predicted first viewpoint 712; a predicted determination 714 of whether generated image 708 is real or fake; and a predicted first set of appearance parameters 716. In at least one embodiment, discriminator 710 lacks access to first viewpoint 702 and set of appearance parameters 704 used to create first generated image 708 (e.g., such information is withheld from discriminator 710 during prediction). In at least one embodiment, outputs of discriminator 710 are used to compute loss. In at least one embodiment, loss functions are used to compute gradients (e.g., using gradient descent) and update parameters for discriminator 710 while fixing parameters of generator 706 constant.

In at least one embodiment, viewpoint consistency loss 718 is computed. In at least one embodiment, viewpoint consistency loss refers to a loss function that is computed based on how accurate discriminator 710 is at predicting viewpoints. In at least one embodiment, viewpoint consistency loss 718 is computed as a difference or distance between first viewpoint 702 and predicted first viewpoint 712. In at least one embodiment, viewpoint consistency loss is a component of generative consistency loss. In at least one embodiment, a distance (e.g., L1 distance, L2 distance, cosine distance, and/or variations thereof) between first viewpoint 702 and predicted first viewpoint 712 is used to compute a viewpoint consistency loss 718, wherein closer viewpoints (e.g., viewpoints with shorter distances from each other) correspond to lower loss.

In at least one embodiment, Z reconstruction loss 720 is computed. In at least one embodiment, Z reconstruction loss refers to a difference or distance between set of appearance parameters 704 and a predicted first set of appearance parameters 716. In at least one embodiment, Z reconstruction loss refers to a loss function that is computed based on how accurate discriminator 710 is at predicting appearance parameters or appearance properties of an image.

In at least one embodiment, determination 714 is used to determine a classification loss such as a real/fake classification loss 722. In at least one embodiment, real/fake classification loss 722 is calculated based on whether discriminator 714 is able to correctly predict whether first generated image 708 submitted to discriminator 710 is a real image or a synthesized image. In at least one embodiment, real/fake classification loss 722 is computed based on whether discriminator 710 is able to correctly predict whether sets of input images are real or fake, wherein discriminator 710 can be provided either real or fake (e.g., synthetic) images and is to predict whether those images are real or fake.

In at least one embodiment, second viewpoint 724 is a transform of first viewpoint 702. In at least one embodiment, first viewpoint 702 is flipped horizontally to produce second viewpoint 724. In at least one embodiment, any suitable transform of azimuth, tilt, and elevation parameters on first viewpoint 702 produces second viewpoint 724. In at least one embodiment, second viewpoint 724 is determined in accordance with techniques described elsewhere in this disclosure, such as those discussed in connection with FIG. 8. In at least one embodiment, if first viewpoint 702 has azimuth, elevation, and tilt parameters as $\Phi$, $\theta$, $\psi$ respectively, then second viewpoint 724 has azimuth, elevation, and tilt parameters as $-\Phi$, $\theta$, $-\psi$.

In at least one embodiment, set of appearance parameters 704 is used to generate a second image. In at least one embodiment, second viewpoint 724 and set of appearance parameters 704 are provided as inputs to generator 706 to create a second generated image 726. In at least one embodiment, if second generated image 726 is flipped horizontally, it produces first generated image 708.

In at least one embodiment, symmetry loss 736 is computed based on first generated image 708 and second generated image 726. In at least one embodiment, symmetry loss 736 is computed by comparing magnitudes of azimuth, elevation, and tilt of predicted first viewpoint 712 of generated image 708 with predicted second viewpoint 728 of second generated image 726, wherein zero loss results when magnitudes of each viewpoint parameters are equal, and loss increases as a difference between magnitudes of each viewpoint parameters increases. In at least one embodiment, symmetry loss 736 is computed in accordance with techniques described elsewhere in this disclosure, such as those discussed in connection with FIG. 8. In at least one embodiment, disentanglement loss is applied within context of FIG. 7. In at least one embodiment, a viewpoint $V_1$ and set of appearance parameters $Z_1$ are selected and provided to a generator to produce a first synthetic image $I_1$. In at least one embodiment, a second image 12 is generated by holding viewpoint constant (e.g., using $V_1$) and perturbing appearance parameters by using a second set of appearance parameters $Z_2$ different from $Z_1$ used to generate a first image $I_1$. In at least one embodiment, a third image $I_3$ is generated by holding appearance parameters constant relative to image $I_1$ (e.g., using $Z_1$) and perturbing viewpoint by using a second viewpoint $V_2$ different from viewpoint $V_1$ to generate a third image $I_3$. In at least one embodiment, a synthetic image $I_1$ generated using a specific viewpoint $V_1$ and set of appearance parameters $Z_1$ is compared against synthetic image 12 generated using viewpoint $V_1$ and a second set of appearance parameters $Z_2$ and/or synthetic image $I_3$ generated using a second viewpoint $V_2$ and set of appearance parameters $Z_1$. Techniques described in connection with FIG. 10 may be applicable to entanglement loss described in connection with FIG. 7, according to at least one embodiment.

Figure 8:
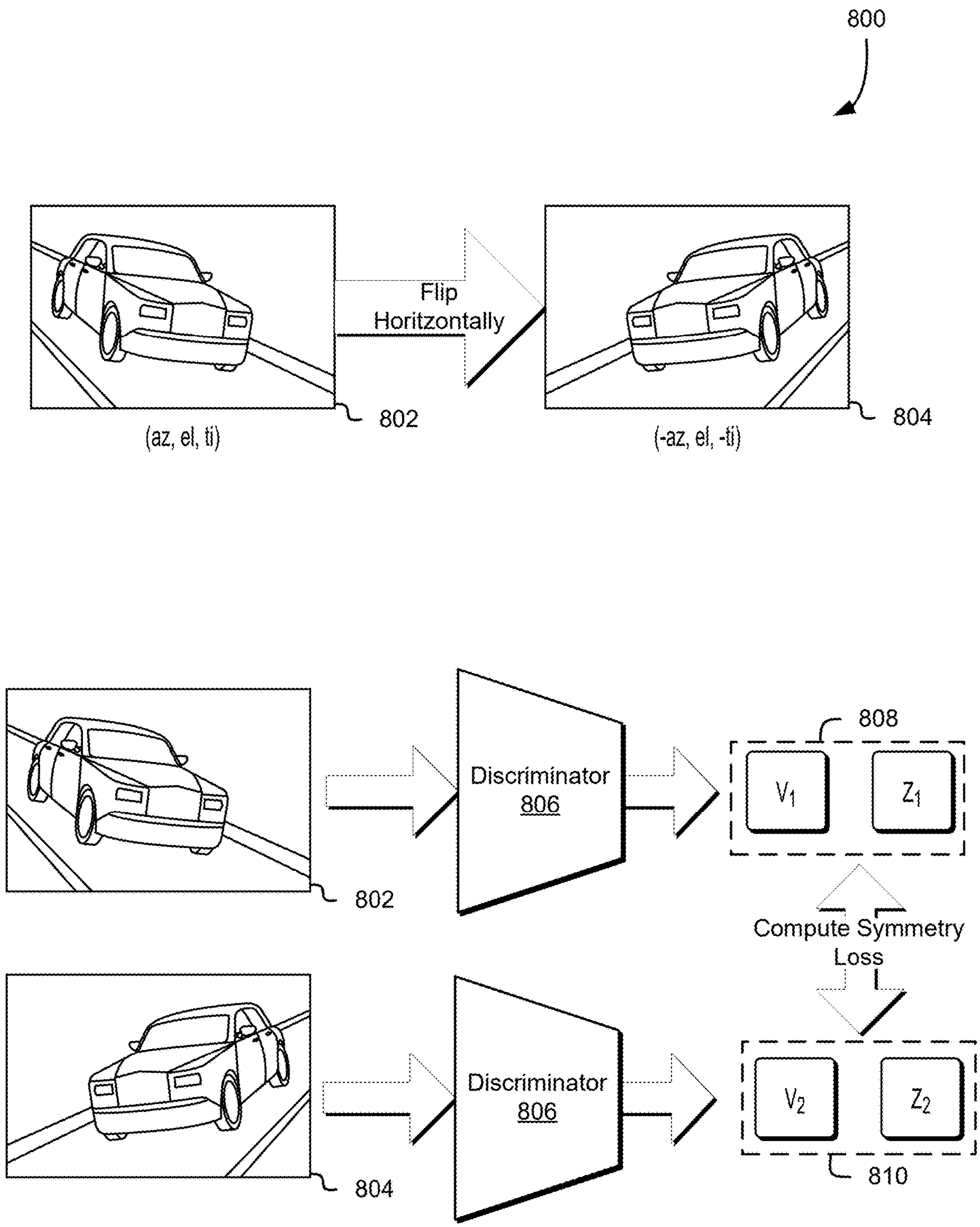
FIG. 8 illustrates a diagram that depicts symmetry loss, according to at least one embodiment.

FIG. 8 illustrates a diagram 800 that depicts computing symmetry loss, according to at least one embodiment. In at least one embodiment, symmetry loss is utilized to train one or more neural networks associated with a discriminator such as a discriminator 806. In at least one embodiment, symmetry loss is utilized with one or more other loss functions to refine parameters associated with a discriminator.

In at least one embodiment, diagram 800 includes an input image 802. In at least one embodiment, input image 802 is part of a collection of one or more images of a type of object. In at least one embodiment, input image 802 is an image depicting a car in a specific orientation comprising specific appearance characteristics. In at least one embodiment, input image 802 is selected from a collection of one or more images. In at least one embodiment, images of a collection are selected in any suitable manner for learning, which may be randomly or pseudo-randomly sampled from a training set.

In at least one embodiment, a transform is applied to input image 802 to generate a transformed image 804. In at least one embodiment, input image 802 is flipped horizontally to generate transformed image 804. In at least one embodiment, a transform is applied by one or more systems associated with discriminator 806. In at least one embodiment, discriminator 806 applies one or more image processing techniques to input image 802 to generate transformed image 804. In at least one embodiment, angles of azimuth and tilt (depicted in diagram 800 as "az" and "ti") of a viewpoint of an object within input image 802 are reversed when input image 802 is flipped and/or transformed to generate transformed image 804, while angles of elevation (depicted in diagram 800 as "el") remain same across input image 802 and transformed image 804. In at least one embodiment, transformed image 804 is generated by applying one or more image transformations to input image 802. In at least one embodiment, transformed image 804 is generated by at least flipping input image 802 horizontally, flipping input image 802 horizontally, flipping input image

802 according to a specified axis, rotating input image 802 by a specified number of degrees, and/or various other 2D transformations applied to input image 802.

In at least one embodiment, discriminator 806 processes input image 802. In at least one embodiment, discriminator 806 is associated with one or more neural networks that are trained to infer a viewpoint as well as other characteristics of an input image. In at least one embodiment, discriminator 806 receives input image 802 and generates a first prediction 808. In at least one embodiment, first prediction 808 corresponds to a predicted specific orientation of an object within an image, and comprises specific values for a set of parameters comprising an azimuth parameter, an elevation parameter, and a tilt parameter. In at least one embodiment, a first prediction 808 comprises a first predicted viewpoint $V_1$ and a first predicted set of appearance parameters $Z_1$ of input image 802. In at least one embodiment, first prediction 808 comprises a predicted orientation of a car depicted in input image 802. In at least one embodiment, discriminator 806 processes transformed image 804. In at least one embodiment, discriminator 806 receives transformed image 804 and generates a second prediction 810. In at least one embodiment, second prediction 810 corresponds to a predicted specific orientation of an object within an image, and comprises specific values for a set of parameters comprising an azimuth parameter, an elevation parameter, and a tilt parameter. In at least one embodiment, a second prediction 810 comprises a second predicted viewpoint $V_2$ and a second predicted set of appearance parameters $Z_2$ of transformed image 804. In at least one embodiment, second prediction 810 comprises a predicted orientation of a car depicted in transformed image 804.

In at least one embodiment, first prediction 808 is predicted for input image 802 and second prediction 810 is predicted for transformed image 804, which is a horizontally flipped version of input image 802. In at least one embodiment, loss is calculated based on whether certain properties hold true. In at least one embodiment, a transform or inverse thereof is applied to second prediction 810. In at least one embodiment, if input image 802 is rotated by ($\phi$, $\theta$, $\psi$) angles to produce transformed image 804, then second prediction 810 may be inversely rotated by ($-\phi$, $-\theta$, $-\psi$) angles. In at least one embodiment, symmetry loss is computed by comparing magnitudes of azimuth, elevation, and tilt of first prediction 808 of input image 802 with second prediction 810 of transformed image 804, wherein zero loss results when magnitudes of each viewpoint parameters are equal and/or appearance parameters predicted for input image 802 match those predicted for transformed image 804. In at least one embodiment, loss increases as a difference between magnitudes of each viewpoint parameters increases. In at least one embodiment, symmetry loss is computed in accordance with techniques described elsewhere in this disclosure, such as those discussed in connection with FIG. 16. In at least one embodiment, symmetric loss is computed based at least in part on how closely predicted appearance parameters for input image 802 match those predicted for transformed image 804. In at least one embodiment, weights and parameters of discriminator 806 are trained to predict that appearance parameters for input image 802 match appearance parameters predicted for a transformed version of input image 802 (e.g., transformed image 804).

In at least one embodiment, discriminator 806 predicts a first set of appearance parameters for input image 802 and predicts a second set of appearance parameters for transformed image 804. In at least one embodiment, a loss function is computed based on how similar a first set of appearance parameters predicted for input image 802 is to a second set of appearance parameters predicted for transformed image 804. In at least one embodiment, discriminator 806 is trained to predicted parameters for input image 802 and transformed image 804 are equivalent.

Figure 9:
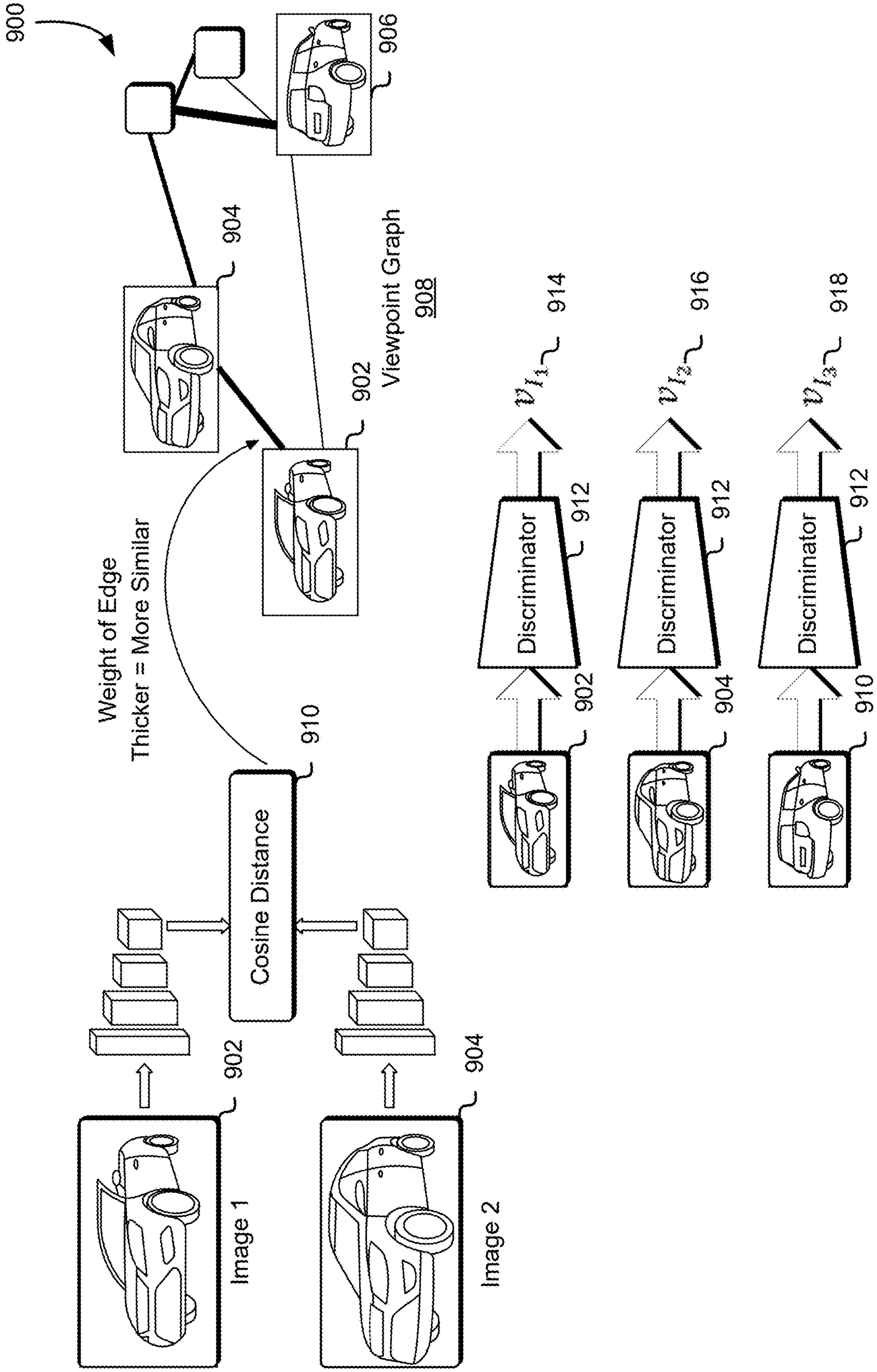
FIG. 9 illustrates a diagram that depicts nearest neighbor and farthest neighbor loss, according to at least one embodiment.

FIG. 9 illustrates a diagram 900 that depicts a viewpoint graph, according to at least one embodiment. In at least one embodiment, a viewpoint graph 908 is utilized to determine a nearest neighbor and farthest neighbor loss, which is utilized with one or more other loss functions to refine parameters associated with a discriminator. In at least one embodiment, viewpoint graph 908 is constructed through one or more processes and systems associated with a discriminator. In at least one embodiment, viewpoint graph 908 is generated based on a collection of one or more images of a type of object. In at least one embodiment, a first image 902 and a second image 904 are part of a collection of one or more images of a type of object. In at least one embodiment, first image 902 and second image 904 are part of a collection of one or more images that include cars. In at least one embodiment, first image 902 and second image 904 are images depicting cars in specific orientations.

In at least one embodiment, viewpoint graph 908 is generated based on viewpoint-equivariant distances (e.g., cosine distances) between images of a collection of images. In at least one embodiment, cosine distance is a mathematical complement of cosine similarity (e.g., cosine distance=1−cosine similarity). In at least one embodiment, cosine similarity is a measure of similarity between two vectors, which can represent images, text, data, and/or variations thereof, based on a cosine of an angle between them. In at least one embodiment, when two images comprise features corresponding to objects having similar viewpoints, a cosine distance calculated for said images is low. In at least one embodiment, when two images comprise features corresponding to objects having different viewpoints, a cosine distance calculated for said images is high.

In at least one embodiment, a collection of images is used to generate viewpoint graph 908 wherein nodes of viewpoint graph 908 correspond to images and edges correspond to their cosine distances. In at least one embodiment, cosine distances are computed based on feature similarities of pairs of images using a convolutional neural network. In at least one embodiment, edges of viewpoint graph 908 are weighted such that thicker edges between two images correspond to a higher degree of similarity between said two images, and thinner edges between two images correspond to a lower degree of similarity between said two images. In at least one embodiment, a cosine distance 910 is calculated between first image 902 and second image 904. In at least one embodiment, first image 902 and second image 904 are utilized as part of viewpoint graph 908, and are connected with an edge corresponding to calculated cosine distance 910. In at least one embodiment, first image 902 and second image 904 comprise cars oriented in similar orientations and/or viewpoints, and a thick edge utilized between first image 902 and second image 904 within viewpoint graph 908 reflects such similarities.

FIG. 9 illustrates a diagram 900 that depicts computing nearest neighbor and farthest neighbor loss, according to at least one embodiment. In at least one embodiment, a nearest neighbor and farthest neighbor loss is utilized to train one or more neural networks associated with a discriminator such as a discriminator 912. In at least one embodiment, nearest neighbor and farthest neighbor loss is utilized with one or more other loss functions to refine parameters associated with a discriminator. In at least one embodiment, nearest and farthest neighbor loss can be viewed as a type of viewpoint equivariance loss. Techniques described herein that apply to nearest and farthest neighbor loss (e.g., described in connection with FIG. 9 and elsewhere), in at least one embodiment, are also applicable to viewpoint equivariance loss.

In at least one embodiment, a viewpoint graph 908 is constructed through one or more processes and systems associated with discriminator 912. In at least one embodiment, viewpoint graph 908 is generated based on a collection of one or more images of a type of object. In at least one embodiment, images 902-906 are part of a collection of one or more images of a type of object. In at least one embodiment, images 902-906 are part of a collection of one or more images that include cars. In at least one embodiment, images 902-906 are images depicting cars in specific orientations.

In at least one embodiment, discriminator 912 processes images 902-906. In at least one embodiment, discriminator 912 is associated with one or more neural networks that are trained to infer a viewpoint as well as other characteristics of an input image. In at least one embodiment, discriminator 912 receives image 902 and generates a viewpoint 914. In at least one embodiment, discriminator 912 receives image 904 and generates a viewpoint 916. In at least one embodiment, discriminator 912 receives image 906 and generates a viewpoint 918. In at least one embodiment, viewpoints 914-918 correspond to predicted specific orientations of objects depicted in images 902-906, and comprise specific values for sets of parameters comprising azimuth parameters, elevation parameters, and tilt parameters. In at least one embodiment, viewpoints 914-918 comprise predicted orientations of cars depicted in images 902-906, respectively.

In at least one embodiment, nearest neighbor and farthest neighbor loss is computed by at least comparing a selected image to its nearest and farthest neighbors based at least in part on viewpoint graph 908 of a collection of images. In at least one embodiment, nearest neighbor and farthest neighbor loss comprises a nearest neighbor loss and a farthest neighbor loss. In at least one embodiment, an anchor image is selected from a collection of training images. In at least one embodiment, image 902 is selected as an anchor image. In at least one embodiment, image 902 is located from viewpoint graph 908 and a nearest neighbor and farthest neighbor are selected based on edge weights. In at least one embodiment, a nearest neighbor, such as image 904, has a shortest edge that is connected to image 902. In at least one embodiment, a farthest neighbor, such as image 906, has a farthest edge that is connected to image 902.

In at least one embodiment, image 904 is determined as a nearest neighbor to image 902. In at least one embodiment, nearest neighbor loss is computed between viewpoint 914 and viewpoint 916. In at least one embodiment, nearest neighbor loss is computed such that higher similarity between viewpoint 914 and viewpoint 916 corresponds to less loss. In at least one embodiment, nearest neighbor loss is computed based on a following symbolic mathematical equation:

$$L_{nn}=d(v_{I_1},v_{I_2})$$

where $L_{nn}$ is nearest neighbor loss, $v_{I_1}$ is a viewpoint of an anchor image, $v_{I_2}$ is a viewpoint of a nearest neighbor image, and $d(v_{I_1}, v_{I_2})$ is a function determining a distance (e.g., L1 distance, L2 distance, cosine distance, and/or variations thereof) or difference between viewpoints.

In at least one embodiment, image 906 is determined as a farthest neighbor to image 902. In at least one embodiment, farthest neighbor loss is computed between viewpoint 914 and viewpoint 916. In at least one embodiment, farthest neighbor loss is computed such that lower similarity between viewpoint 914 and viewpoint 918 corresponds to less loss. In at least one embodiment, farthest neighbor loss is computed based on a following symbolic mathematical equation:

$$L_{fn}=\min(0,t-d(v_{I_1},v_{I_3}))$$

where $L_{fn}$ is farthest neighbor loss, $v_{I_1}$ is a viewpoint of an anchor image, $v_{I_3}$ is a viewpoint of a farthest neighbor image, min( ) is a function determining a minimum between two values, $d(v_{I_1},v_{I_3})$ is a function determining a distance (e.g., L1 distance, L2 distance, cosine distance, and/or variations thereof) or difference between viewpoints, and t is a minimum threshold, which is determined by one or more processes. In at least one embodiment, t is determined by a discriminator, one or more systems associated with a discriminator, and/or variations thereof. In at least one embodiment, t is a parameter that is set through one or more processes prior to start of training, and is a threshold value for which farthest neighbor loss is considered to have no loss.

In at least one embodiment, nearest and/or farthest neighbors are selected non-deterministically. In at least one embodiment, a probability is assigned to each edge to be selected as a nearest and/or farthest neighbor of an anchor image. In at least one embodiment, probabilities of a nearest neighbor is inversely proportional to edge weights (e.g., node that has lowest edge weight connected to an anchor image has highest probability of being selected). In at least one embodiment, probabilities of a farthest neighbor is directly proportional to edge weights (e.g., node that has highest edge weight connected to an anchor image has highest probability of being selected).

Figure 10:
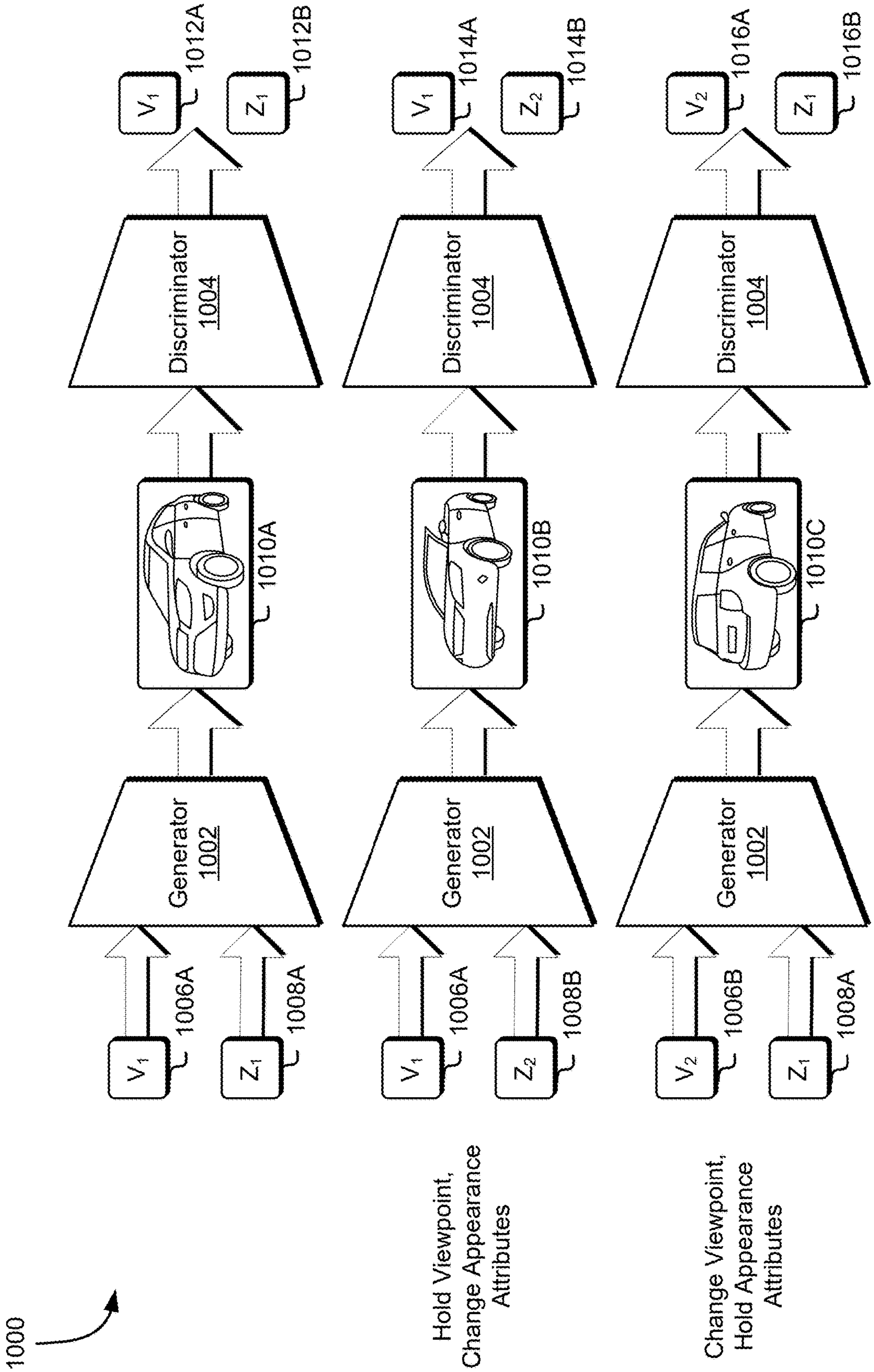
FIG. 10 illustrates a diagram that depicts disentanglement loss, according to at least one embodiment.

FIG. 10 illustrates a diagram 1000 that depicts disentanglement loss, according to at least one embodiment. In at least one embodiment, a disentanglement loss is utilized to train one or more neural networks associated with a generator such as a generator 1002. In at least one embodiment, disentanglement loss is utilized with one or more other loss functions to refine parameters associated with generator 1002. In at least one embodiment, disentanglement loss operates when generator parameters are updated. In at least one embodiment, disentanglement loss operates at a generator update stage.

In at least one embodiment, generator 1002 is associated with a generative model such as a variational autoencoder (VAE), differentiable renderer, generative adversarial network, or renderer. In at least one embodiment, generator 1002 is part of one or more neural networks that are trained to generate an image based on an input viewpoint and an input set of appearance parameters, and said one or more neural networks comprise various parameters that are associated with one or more processes of said one or more neural networks. In at least one embodiment, discriminator 1004 is part of one or more neural networks that are trained to infer a viewpoint and a set of appearance attributes from an input image, and said one or more neural networks comprise various parameters that are associated with one or more processes of said one or more neural networks.

In at least one embodiment, a first viewpoint 1006A and a first set of appearance attributes 1008A are obtained. In at least one embodiment, first viewpoint 1006A and first set of appearance attributes 1008A are randomly generated. In at least one embodiment, first viewpoint 1006A and first set of appearance attributes 1008A are obtained from one or more processes associated with generator 1002 and discriminator 1004. In at least one embodiment, generator 1002 generates an image 1010A based on first viewpoint 1006A and first set of appearance attributes 1008A. In at least one embodiment, image 1010A is input to discriminator 1004. In at least one embodiment, discriminator 1004 performs one or more processes and determines a first predicted viewpoint 1012A and a first predicted set of appearance attributes 1012B based on input image 1010A.

In at least one embodiment, a second set of appearance attributes 1008B is obtained. In at least one embodiment, second set of appearance attributes 1008B is randomly generated. In at least one embodiment, second set of appearance attributes 1008B is obtained from one or more processes associated with generator 1002 and discriminator 1004. In at least one embodiment, generator 1002 generates an image 1010B based on first viewpoint 1006A and second set of appearance attributes 1008B. In at least one embodiment, image 1010B is input to discriminator 1004. In at least one embodiment, discriminator 1004 performs one or more processes and determines a second predicted viewpoint 1014A and a second predicted set of appearance attributes 1014B based on input image 1010B.

In at least one embodiment, a second viewpoint 1006B is obtained. In at least one embodiment, second viewpoint 1006B is randomly generated. In at least one embodiment, second viewpoint 1006B is obtained from one or more processes associated with generator 1002 and discriminator 1004. In at least one embodiment, generator 1002 generates an image 1010C based on second viewpoint 1006B and first set of appearance attributes 1008A. In at least one embodiment, image 1010C is input to discriminator 1004. In at least one embodiment, discriminator 1004 performs one or more processes and determines a third predicted viewpoint 1016A and a third predicted set of appearance attributes 1016B based on input image 1010C.

In at least one embodiment, disentanglement loss comprises a z reconstruction loss and a viewpoint reconstruction loss. In at least one embodiment, z reconstruction loss is computed by comparing a prediction, which is generated by a discriminator such as discriminator 1004, of a set of appearance parameters for an image to an input set of appearance parameters utilized to generate said image, which is generated by a generator such as generator 1002, wherein lower loss results when said prediction of a set of appearance parameters and said input set of appearance parameters are more similar, and higher loss results when said prediction of a set of appearance parameters and said input set of appearance parameters are less similar. In at least one embodiment, viewpoint reconstruction loss is computed by comparing a prediction, which is generated by a discriminator such as discriminator 1004, of a viewpoint for an image to an input viewpoint utilized to generate said image, which is generated by a generator such as generator 1002, wherein lower loss results when said prediction of a viewpoint and said input viewpoint are more similar, and higher loss results when said prediction of a viewpoint and said input viewpoint are less similar.

In at least one embodiment, z reconstruction loss and viewpoint reconstruction loss are calculated for each set of predicted viewpoints and appearance attributes (e.g., first predicted viewpoint 1012A and first predicted set of appearance attributes 1012B based on input image 1010A, second predicted viewpoint 1014A and second predicted set of appearance attributes 1014B based on input image 1010B, and third predicted viewpoint 1016A and third predicted set of appearance attributes 1016B based on input image 1010C). In at least one embodiment, z reconstruction loss and viewpoint reconstruction loss are utilized to determine disentanglement loss. In at least one embodiment, additional loss functions are also computed as part of disentanglement loss. In at least one embodiment, disentanglement loss is computed based on a following symbolic mathematical equation:

$$\text{Disentanglement Loss} = \Sigma \text{viewpoint reconstruction loss} + z \text{ reconstruction loss} + \text{other loss functions}$$

In at least one embodiment, disentanglement loss is utilized to refine one or more parameters associated with generator 1002. In at least one embodiment, parameters of generator 1002 are updated such that loss from at least disentanglement loss is minimized.

Figure 11:
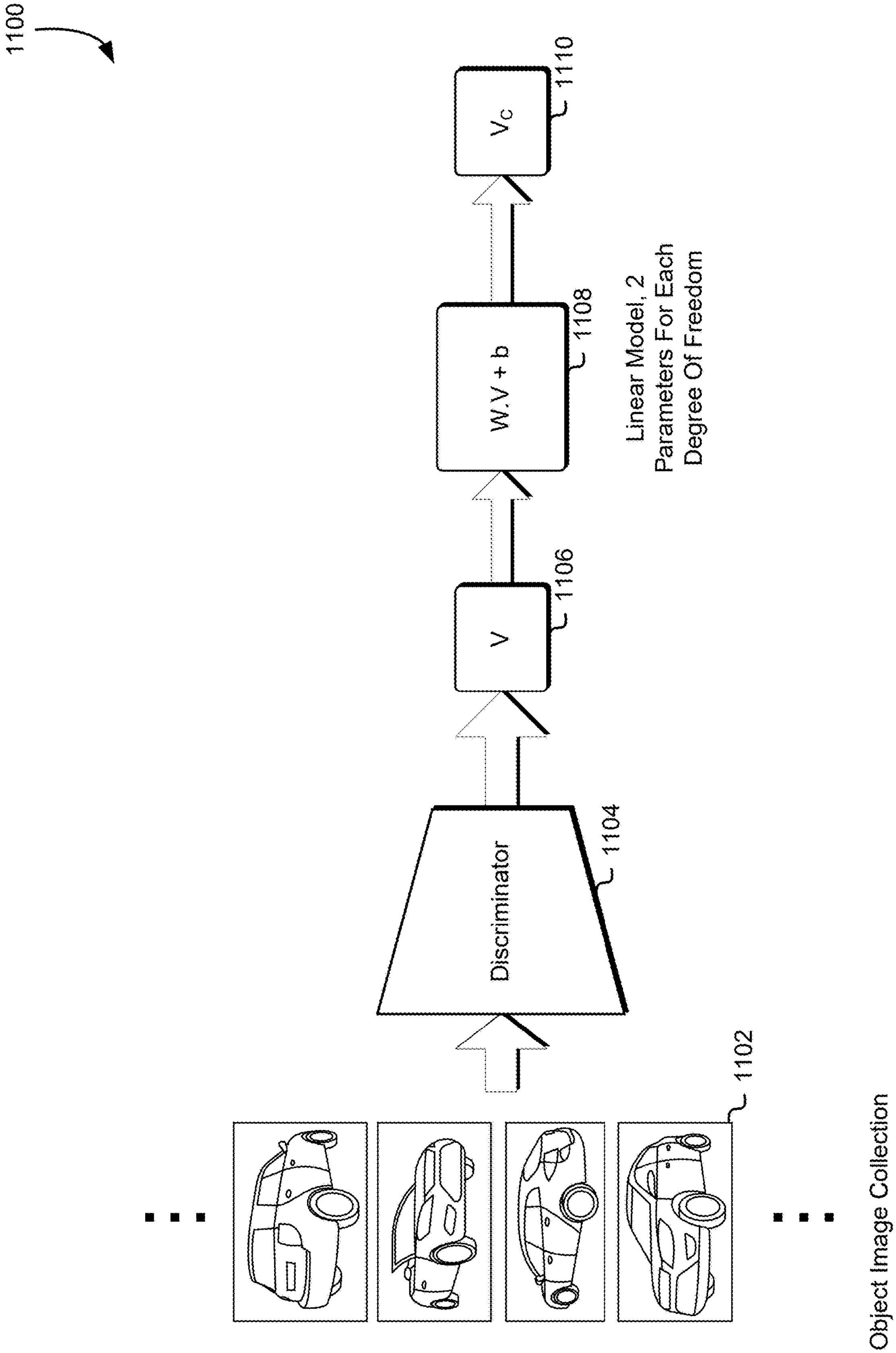
FIG. 11 illustrates a diagram that depicts calibrating a neural network, according to at least one embodiment.

FIG. 11 illustrates a diagram 1100 that depicts calibrating a neural network, according to at least one embodiment. In at least one embodiment, a discriminator is trained on a set of images, and is calibrated on a portion of said set of images comprising ground truth annotations. In at least one embodiment, a discriminator 1104 is part of one or more neural networks trained to identify an orientation of an object within an image based, at least in part, on one or more characteristics of said object other than said object's orientation. In at least one embodiment, discriminator 1106 trained on a collection of images to infer orientations of other objects of same category captured within other images.

In at least one embodiment, discriminator 1104 is trained to identify a viewpoint of an object within an image in a self-supervised manner on a collection of images such as those described elsewhere in this disclosure. In at least one embodiment, discriminator 1104 is trained to identify an orientation of an object within an image in a self-supervised manner by at least computing one or more loss functions as part of training that evaluate one or more characteristics of images of a training set. In at least one embodiment, discriminator 1106 is trained based at least in part on computing losses such as one or more of: a generative consistency loss, a symmetry loss, a nearest neighbor and farthest neighbor loss, and a disentanglement loss, which can be in accordance with those described in connection with FIGS. 4-10. In at least one embodiment, discriminator 1104 is trained on a collection of images that lacks ground truth annotations or ground truth annotations are otherwise unavailable.

In at least one embodiment, an object image collection 1102 is obtained to calibrate discriminator 1104. In at least one embodiment, object image collection 1102 comprises images with ground truth annotations. In at least one embodiment, object image collection 1102 comprises images depicting objects that discriminator 1104 is trained to analyze and determine viewpoints for. In at least one embodiment, object image collection 1102 is a portion of a collection of images used to train discriminator 1104. In at least one embodiment, discriminator 1104 is trained on a collection of images different from object image collection 1102. In at least one embodiment, discriminator 1104 obtains an image of object image collection 1102, and determines a viewpoint 1106 for said image. In at least one embodiment, although discriminator 1104 is trained, viewpoint 1106 does not match a ground truth viewpoint of an image of object image collection 1102. In at least one embodiment, viewpoint 1106 is a correct viewpoint of an image of object image collection 1102 that is translated in one or more dimensions.

In at least one embodiment, a linear model 1108 is determined that translates viewpoints determined by discriminator 1104 for images of object image collection 1102 to their respective correct positions indicated by ground truth annotations. In at least one embodiment, linear model 1108 is a linear function that is determined by a comparison of viewpoints generated by discriminator 1104 for images of object image collection 1102 to ground truth annotations of viewpoints for said images of object image collection 1102. In at least one embodiment, linear model 1108 is determined through one or more processes, such as various regression algorithms, mathematical processes, and/or variations thereof. In at least one embodiment, linear model 1108 is determined such that a viewpoint determined by discriminator 1104 for an image can be translated and/or corrected to match a ground truth viewpoint for said image. In at least one embodiment, linear model 1108 calibrates a viewpoint determined by discriminator 1104 for an image into a coordinate system of a ground truth viewpoint for said image. In at least one embodiment, linear model 1108 translates a zero position of a viewpoint determined by discriminator 1104 for an image into a zero position of a ground truth viewpoint for said image.

In at least one embodiment, linear model 1108 is utilized to calibrate or otherwise correct viewpoint 1106 to generate a corrected viewpoint 1110. In at least one embodiment, corrected viewpoint 1110 is viewpoint 1106 that has been translated to match a ground truth viewpoint. In at least one embodiment, linear model 1108 is utilized to calibrate or otherwise correct viewpoints determined/generated by discriminator 1104 for images of object image collection 1102 to match ground truth annotations of viewpoints of said images of object image collection 1102.

Figure 12:
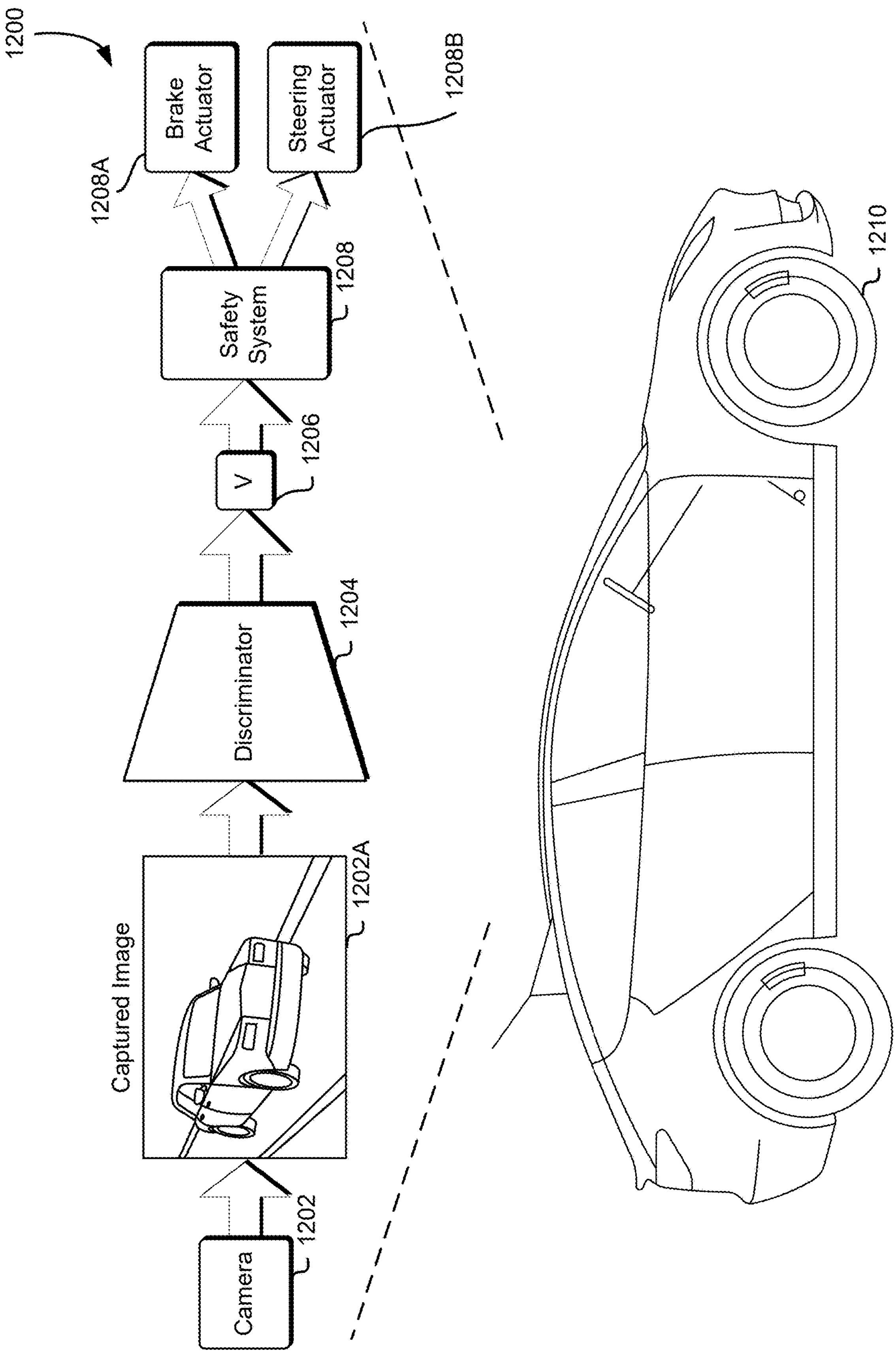
FIG. 12 illustrates a diagram that depicts inference, according to at least one embodiment.

FIG. 12 illustrates a diagram 1200 that depicts inference, according to at least one embodiment. In at least one embodiment, a discriminator is trained, as of part one or more systems associated with a safety system of a motor vehicle, to infer viewpoints of images of other motor vehicles captured from a camera associated with said motor vehicle such that said inferred viewpoints are utilized to perform one or more operations in connection said motor vehicle, such as braking said motor vehicle to avoid another motor vehicle, or steering said motor vehicle to avoid another motor vehicle. In at least one embodiment, a discriminator 1204 is trained to identify a viewpoint of an object within an image in a self-supervised manner on a collection of images such as those described elsewhere in this disclosure. In at least one embodiment, discriminator 1204 is trained to identify an orientation of an object within an image in a self-supervised manner by at least computing one or more loss functions as part of training that evaluate one or more characteristics of images of a training set. In at least one embodiment, discriminator 1204 is trained based at least in part on computing a generative consistency loss, a symmetry loss, a nearest neighbor and farthest neighbor loss, and a disentanglement loss which can be in accordance with those described in connection with FIGS. 4-10. In at least one embodiment, discriminator 1204 is trained on a collection of images of cars. In at least one embodiment, discriminator 1204 is trained to identify a viewpoint of a car within an image.

In at least one embodiment, discriminator 1204 is part of one or more systems of a motor vehicle 1210. In at least one embodiment, motor vehicle 1210 is an autonomous vehicle. In at least one embodiment, motor vehicle 1210 is a vehicle operated by an operator. In at least one embodiment, motor vehicle 1210 comprises one or more systems that implement discriminator 1204. In at least one embodiment, motor vehicle 1210 comprises one or more systems that are associated with discriminator 1204. In at least one embodiment, motor vehicle 1210 comprises one or more systems that enable motor vehicle 1210 to remotely access and utilize discriminator 1204, which can be implemented on various remote and/or local systems.

In at least one embodiment, motor vehicle 1210 comprises a plurality of cameras. In at least one embodiment, a camera 1202 is located onboard motor vehicle 1210. In at least one embodiment, camera 1202 is a camera that is remotely accessible to motor vehicle 1210. In at least one embodiment, camera 1202 captures or otherwise obtains an image 1202A. In at least one embodiment, motor vehicle 1210 is a vehicle that is operating in an environment comprising other motor vehicles that motor vehicle 1210 must perform one or more actions in connection with (e.g., allow a motor vehicle to pass, pass a motor vehicle, brake for an oncoming motor vehicle, steer to avoid an oncoming vehicle, and/or variations thereof). In at least one embodiment, image 1202A is an image of another motor vehicle that motor vehicle 1210 must interact with. In at least one embodiment, image 1202A is an image captured from an onboard camera of motor vehicle 1210 as motor vehicle 1210 is operating in an environment.

In at least one embodiment, image 1202A is input to discriminator 1204, which determines a viewpoint 1206 for image 1202A. In at least one embodiment, viewpoint 1206 is a viewpoint of a car depicted in image 1202A. In at least one embodiment, a safety system 1208 is part of motor vehicle 1210. In at least one embodiment, safety system 1208 comprises one or more systems configured to provide assistance to motor vehicle 1210. In at least one embodiment, safety system 1208 comprises one or more systems configured to operate one or more systems of motor vehicle 1210, such as a brake actuator 1208A and a steering actuator 1208B, which are components configured to operate brakes of motor vehicle 1210 and steering of motor vehicle 1210, respectively. In at least one embodiment, brake actuator 1208A and steering actuator 1208B are same as brake actuator 2148 and steering actuator 2156, respectively. In at least one embodiment, motor vehicle 1210 may be implemented in accordance with techniques described elsewhere, such as FIG. 21.

In at least one embodiment, safety system 1208 obtains viewpoint 1206. In at least one embodiment, safety system 1208 determines, based on viewpoint 1206, a direction of travel of a car depicted in image 1202A. In at least one embodiment, safety system 1208 determines, based on viewpoint 1206, whether to utilize brake actuator 1208A or steering actuator 1208B. In at least one embodiment, if safety system 1208 determines that a car depicted in image 1202A is traveling in a direction relative to motor vehicle 1210 that requires motor vehicle 1210 to brake, safety system 1208 activates brake actuator 1208A to brake motor vehicle 1210 such that motor vehicle 1210 avoids any potential safety issues resulting from said travelling of said car depicted in image 1202A. In at least one embodiment, if safety system 1208 determines that a car depicted in image 1202A is traveling in a direction relative to motor vehicle 1210 that requires motor vehicle 1210 to steer, safety system 1208 activates steering actuator 1208B to steer motor vehicle 1210 such that motor vehicle 1210 avoids any potential safety issues resulting from said travelling of said car depicted in image 1202A.

Figure 13:
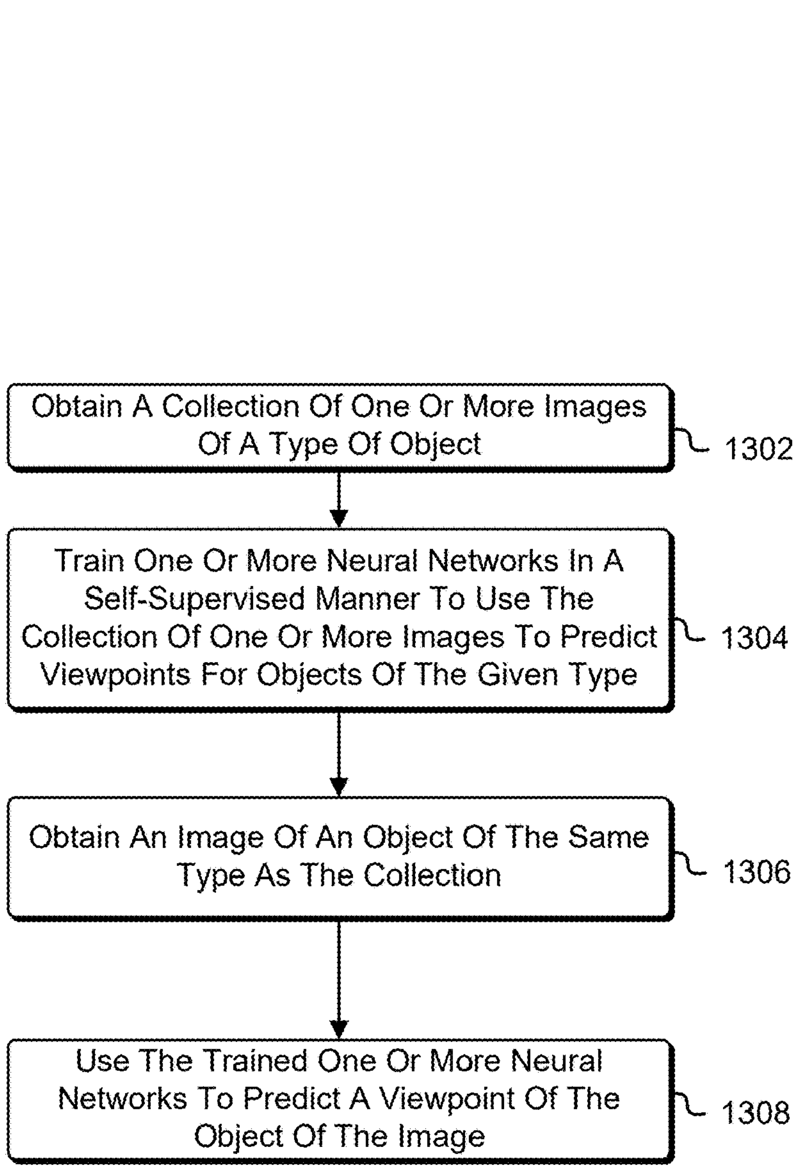
FIG. 13 shows an illustrative example of a process to train a neural network to predict a viewpoint of an object within an image, according to at least one embodiment.
Figure 14:
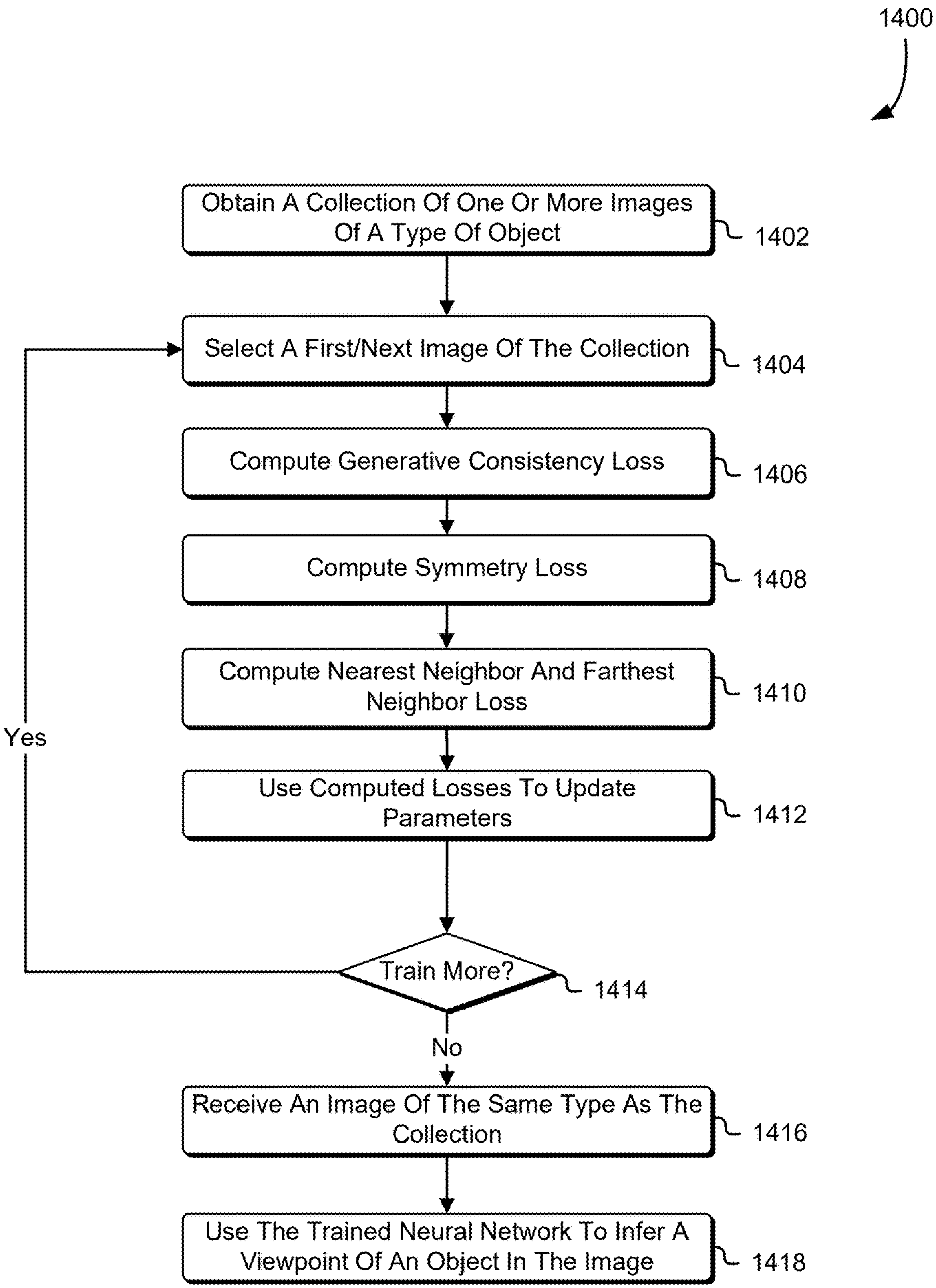
FIG. 14 shows an illustrative example of a process to train a neural network to predict a viewpoint of an object within an image, according to at least one embodiment.

FIG. 13 shows an illustrative example of a process 1300 to train a neural network to predict a viewpoint of an object within an image, in accordance with at least one embodiment. In at least one embodiment, some or all of process 1300 (or any other processes described herein, or variations and/or combinations thereof) is performed under control of one or more computer systems configured with computer-executable instructions and may be implemented as code (e.g., computer-executable instructions, one or more computer programs, or one or more applications) executing collectively on one or more processors, by hardware, software, or combinations thereof. Code, in at least one embodiment, is stored on a computer-readable storage medium in form of a computer program comprising a plurality of computer-readable instructions executable by one or more processors. A computer-readable storage medium, in at least one embodiment, is a non-transitory computer-readable medium. In at least one embodiment, at least some computer-readable instructions usable to perform process 1300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, process 1300 is performed at least in part on a computer system such as those described elsewhere in this disclosure. In at least one embodiment, a first computer system trains one or more neural networks and a second computer system inferences (e.g., predicts a viewpoint of an object within an image) using said one or more neural networks. In at least one embodiment, techniques described in connection with FIGS. 1, 12, and 14 are applicable to process 1300.

In at least one embodiment, a system performing at least a part of process 1300 includes executable code to obtain 1302 a collection of one or more images of a type of object. In at least one embodiment, a collection of one or more images is used to train one or more neural networks to identify orientations of objects within images. In at least one embodiment, a collection of images is categorized or labeled as each displaying a same type or category of object. In at least one embodiment, a collection of images is a collection of images of cars that can include different types of cars at different orientations, in different weather, under different lighting. In at least one embodiment, a collection of cars includes images of same car or same type of car at different orientations. In at least one embodiment, at least a portion of a collection of training images lacks ground truth annotations that specify orientation of objects within such training images. In at least one embodiment, all images of a collection of images lack ground truth annotations that specify azimuth, elevation, and tilt, of objects within images of collection. In at least one embodiment, a collection of images includes one or more synthetic images, such as an image created from a generative adversarial network (GAN). In at least one embodiment, all images of a collection of images are real images, as opposed to those synthesized or created from a generative model such as a variational autoencoder (VAE), differentiable renderer, generative adversarial network (GAN), or a renderer. In at least one embodiment, a collection of images is collected and aggregated from a website that sorts images by category.

In at least one embodiment, orientation of an object within an image refers to a three-dimensional orientation of an object captured within a two-dimensional image. In at least one embodiment, a camera is used to capture a two-dimensional image of a real-world car that is at a specific orientation relative to camera. In at least one embodiment, an object's orientation (e.g., viewpoint) is encoded on a set of parameters comprising an azimuth parameter, an elevation parameter, and a tilt parameter. In at least one embodiment, an object's orientation is encoded as a set of three vectors that define direction of object relative to an x, y, and z axis.

In at least one embodiment, a system performing at least a part of process 1300 includes executable code to train 1304 one or more neural networks to identify an orientation of an object within an image based, at least in part, on one or more characteristics of said object other than said object's orientation. In at least one embodiment, process 1300 is implemented on a processor comprising: one or more circuits to help train one or more neural networks to identify an orientation of an object within an image based, at least in part, on one or more characteristics of said object other than said object's orientation. In at least one embodiment, one or more neural networks are trained on a collection of images to infer orientations of other objects of same category captured within other images. In at least one embodiment, a neural network is trained on a collection of images of airplanes and, once trained, is used to infer orientations of other airplanes within other images.

In at least one embodiment, a neural network is trained to identify an orientation of an object within an image in a self-supervised manner on a collection of images such as those described elsewhere in this disclosure. In at least one embodiment, a neural network is trained to identify an orientation of an object within an image in a self-supervised manner by at least computing one or more loss functions as part of training that evaluate one or more characteristics of images of a training set (e.g., collection of images). In at least one embodiment, a neural network is trained based at least in part on computing a generative consistency loss, a symmetry loss, a nearest neighbor and farthest neighbor loss, and a disentanglement loss which can be in accordance with those described in connection with FIGS. 4-10. In at least one embodiment, a neural network is trained on a collection of images that lacks ground truth annotations or ground truth annotations are otherwise unavailable (e.g., such data is withheld from a neural network during training). In at least one embodiment, a neural network is trained to generate, from an object within a first image having a predicted orientation, a second image having a same orientation.

In at least one embodiment, a system implementing process 1300 comprises one or more processors to calculate parameters to help train one or more neural networks to identify an orientation of an object within an image based, at least in part, on one or more characteristics of said object other than said object's orientation; and one or more memories to store said parameters. In at least one embodiment, one or more neural networks are trained to identify an orientation of an object within an image using a collection of images of different objects of a same category as said object (e.g., a neural network to infer viewpoints of vehicles is trained on a collection of images labeled as vehicles).

In at least one embodiment, one or more neural networks is trained in a self-supervised manner on a collection of images of different objects of a same category as an object of an image to be inferred. In at least one embodiment, different objects of a same category may refer to different images which may be one or more images of a first car at one or more orientations, one or more images of a different second car at one or more orientations, and so on. In at least one embodiment, an image of an object to be inferred is included in a collection of images used to train one or more neural networks to inference orientations. In at least one embodiment, one or more neural networks are trained in a self-supervised manner by at least using a set of loss functions to evaluate one or more characteristics of objects within images. In at least one embodiment, one or more characteristics of objects refers to properties of objects that can be used to infer orientations. In at least one embodiment, a neural network is trained by computing one or more of: generative consistency loss; symmetry loss; nearest neighbor and farthest neighbor loss; and disentanglement loss. In at least one embodiment, a neural network trained in a self-supervised manner is trained to generate synthetic images of objects with a specific orientation, which may be a same orientation as a predicted orientation of an input image. In at least one embodiment, a synthetic image is created using a deep generative model such as a variational autoencoder (VAE), differentiable renderer, generative adversarial network (GAN), or a renderer. In at least one embodiment, an object whose orientation to be inferred can be a vehicle, airplane, drone, human being, face (e.g., of a human or animal), and more.

In at least one embodiment, a system performing at least a part of process 1300 includes executable code to obtain 1306 a second image. In at least one embodiment, a second object within a second image is of a same type as a collection of images that are used to train one or more neural networks. In at least one embodiment, a second image is provided to a neural network for inferencing to predict a second orientation. In at least one embodiment, images are obtained from a camera that captures still images and/or a video composing multiple frames captured at a variable or fixed rate. In at least one embodiment, a video comprises a number of frames (e.g., images). In at least one embodiment, a first system trains one or more neural networks and a second different system uses those one or more neural networks to perform inferencing to identify orientations of objects within images.

In at least one embodiment, a system performing at least a part of process 1300 includes executable code to use 1308 for one or more neural networks (e.g., trained as described in numeral 1304) to identify a second orientation, of said second object within said second image. In at least one embodiment, a system uses a discriminator trained in a self-supervised manner on a collection of images of objects of a specific category to infer orientations of other objects of said category. In at least one embodiment, one or more neural networks are trained on a collection of images of cars and is used to infer orientations of cars captured in real-time by a camera or other suitable video/image capture device attached to a vehicle.

In at least one embodiment, a first neural network is trained using self-supervised learning on a first collection of images of a first category to infer viewpoints of objects of that first category and a second neural network is trained using similar/same self-supervised learning techniques on a second collection of images of a second category. In at least one embodiment, an image is provided as an input to a first neural network to detect a first orientation of a first object of a first category and also provided as an input to a second neural network to detect a second orientation of a second object of a second category. In at least one embodiment, an input image is provided to a plurality of neural networks trained using self-supervised learning techniques described herein to identify orientations of different objects in said input image.

FIG. 14 shows an illustrative example of a process 1400 to train a neural network to predict a viewpoint of an object within an image, in accordance with at least one embodiment. In at least one embodiment, some or all of process 1400 (or any other processes described herein, or variations and/or combinations thereof) is performed under control of one or more computer systems configured with computer-executable instructions and may be implemented as code (e.g., computer-executable instructions, one or more computer programs, or one or more applications) executing collectively on one or more processors, by hardware, software, or combinations thereof. Code, in at least one embodiment, is stored on a computer-readable storage medium in form of a computer program comprising a plurality of computer-readable instructions executable by one or more processors. A computer-readable storage medium, in at least one embodiment, is a non-transitory computer-readable medium. In at least one embodiment, at least some computer-readable instructions usable to perform process 1300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, process 1400 is performed at least in part on a computer system such as those described elsewhere in this disclosure. In at least one embodiment, a first computer system trains one or more neural networks and a second computer system inferences (e.g., predicts a viewpoint of an object within an image) using said one or more neural networks. In at least one embodiment, techniques described in connection with FIGS. 1, 12, and 13 are applicable to process 1400.

In at least one embodiment, a system performing at least a part of process 1400 includes executable code to obtain 1402 a collection of one or more images of a type of object. In at least one embodiment, a type of image may mean that all images of a collection of images are images that include cars. In at least one embodiment, a system obtains a collection of one or more images in accordance with techniques described elsewhere in this disclosure, such as FIG. 13.

In at least one embodiment, a system performing at least a part of process 1400 includes executable code to select 1404 a first image of a collection of images. In at least one embodiment, images of a collection are selected in any suitable manner for learning, which may be randomly or pseudo-randomly sampled from a training set.

In at least one embodiment, a system performing at least a part of process 1400 includes executable code to compute 1406 a generative consistency loss based at least in part on comparing a selected image with an image generated by a deep generative model. In at least one embodiment, a generative consistency loss is computed using techniques described elsewhere in this disclosure, such as those discussed in connection with FIGS. 4-7. In at least one embodiment, a generative consistency loss includes at least two components: a viewpoint consistency loss and an image consistency loss. In at least one embodiment, generative consistency loss is computed in accordance with techniques described in connection with FIG. 15.

In at least one embodiment, an image consistency loss is computed based at least in part on a selected image (e.g., input image) which is provided to a discriminator which is used to disaggregate at least two properties from said image: a predicted viewpoint and set of appearance parameters. In at least one embodiment, predicted viewpoint and set of appearance parameters are provided to a generator to create a synthesized image. In at least one embodiment, a generative adversarial network (GAN) receives a viewpoint and set of appearance parameters and generates a synthetic (e.g., fake) image that is in accordance with whichever viewpoint and set of appearance parameters was provided. In at least one embodiment, a synthesized image and an input image are compared to determine image consistency loss. In at least one embodiment, a cosine distance between an input image and a synthesized image are compared to determine feature similarities wherein closer similarity corresponds to lower loss. In at least one embodiment, L1, L2, or cosine distances are used to determine image consistency loss between two images.

In at least one embodiment, a viewpoint (e.g., orientation) consistency loss is computed based at least in part on a viewpoint of an input image. In at least one embodiment, a viewpoint of an input image is inferred by a discriminator. In at least one embodiment, a viewpoint of an input image is determined based on ground truth annotations provided as part of training for at least a portion of a collection of training images. In at least one embodiment, a generator is used to create a synthetic image with same viewpoint as an input image. In at least one embodiment, a synthetic image generated from a viewpoint of an input image is provided to a discriminator that determines a second viewpoint, of said synthetic image. In at least one embodiment, a first viewpoint of an input image is compared against a second viewpoint of a synthetic image generated based at least in part on said input image. In at least one embodiment, a distance between first viewpoint of an input image and second viewpoint of a synthetic image is used to compute a viewpoint consistency loss, wherein closer viewpoints correspond to lower loss.

In at least one embodiment, a system performing at least a part of process 1400 includes executable code to compute 1408 a symmetry loss by at least comparing a selected image with a transformed version of that selected image. In at least one embodiment, symmetry loss is computed in accordance with techniques described in connection with FIG. 15. In at least one embodiment, an input image is selected from a collection of training images. In at least one embodiment, a transform is applied to an input image to generate a transformed image. In at least one embodiment, an input image is flipped horizontally to generate a flipped image. In at least one embodiment, one or more neural networks are used to predict a first orientation of an input image and a second orientation of a transformed image. In at least one embodiment, a first orientation is predicted for an input image and a second orientation is predicted for a horizontally flipped version of that input image. In at least one embodiment, loss is calculated based on whether certain properties hold true. In at least one embodiment, a transform or inverse thereof is applied to a predicted orientation of a transformed version of an input image. In at least one embodiment, if an input image is rotated by ($\phi$, $\theta$, $\psi$) angles to produced a transformed image, then an inferred orientation of that transformed image may be inversely rotated by ($-\phi$, $-\theta$, $-\psi$) angles. In at least one embodiment, loss is computed by comparing magnitudes of azimuth, elevation, and tilt of a first orientation of an input image with a second orientation of a transformed image, wherein zero loss results when magnitudes of each orientation parameters are equal. In at least one embodiment, zero loss results when appearance parameters predicted for an input image and a transformed version of that input image match. In at least one embodiment, symmetry loss is computed in accordance with techniques described elsewhere in this disclosure, such as those discussed in connection with FIG. 16.

In at least one embodiment, a system performing at least a part of process 1400 includes executable code to compute 1410 nearest neighbor and farthest neighbor loss by at least comparing a selected image to its nearest and farthest neighbors based at least in part on a viewpoint graph of a collection of images. In at least one embodiment, nearest neighbor and farthest neighbor loss are computed in accordance with technique described in connection with FIG. 17. In at least one embodiment, a collection of images is used to generate a viewpoint graph wherein nodes of such graph correspond to images and edges correspond to their viewpoint-equivariant distances. In at least one embodiment, viewpoint-equivariant distances are computed based on feature similarities of pairs of images using a convolutional neural network (CNN). In at least one embodiment, an anchor image is selected from a collection of training images. In at least one embodiment, an anchor image is located from a viewpoint graph and a nearest neighbor and farthest neighbor are selected based on edge weights. In at least one embodiment, a nearest neighbor has a shortest edge that is connected to an anchor image. In at least one embodiment, a farthest neighbor has a farthest edge that is connected to an anchor image. In at least one embodiment, a neural network predicts a first viewpoint for an anchor image and predicts a second viewpoint for a nearest neighbor image and loss is computed so that closer distance between those viewpoints correspond to less loss. In at least one embodiment, a neural network predicts a first viewpoint for an anchor image and predicts a third viewpoint for a farthest neighbor image and loss is computed so that longer distance between those viewpoints correspond to less loss.

In at least one embodiment, nearest and/or farthest neighbors are selected non-deterministically. In at least one embodiment, a probability is assigned to each edge to be selected as a nearest and/or farthest neighbor of an anchor image. In at least one embodiment, probabilities of a nearest neighbor is inversely proportional to edge weights (e.g., node that has lowest edge weight connected to an anchor image has highest probability of being selected). In at least one embodiment, probabilities of a farthest neighbor is directly proportional to edge weights (e.g., node that has highest edge weight connected to an anchor image has highest probability of being selected).

In at least one embodiment, a system performing at least a part of process 1400 includes executable code to use 1412 computed losses (e.g., from numerals 1406-1410) to update parameters of one or more neural networks being trained in a collection of images. In at least one embodiment, a generator is trained on symmetry loss, viewpoint consistency loss, real/fake classification loss, disentanglement loss, or any combination thereof. In at least one embodiment, techniques described in connection with FIGS. 4-7 are used to train networks in accordance with process 1400.

In at least one embodiment, a system performing at least a part of process 1400 includes executable code to determine whether 1414 to train more. In at least one embodiment, training is performed according to any suitable technique and may include selecting a second image and performing steps 1406-1412 using a second selected image to compute losses and refine parameters for one or more neural networks being trained to infer viewpoints. Once training is completed, a trained neural network may be made available (e.g., neural network or parameters thereof transferred to a different system) for inferencing.

In at least one embodiment, a system performing at least a part of process 1400 includes executable code to receive 1416 an image of a same type as a collection of images used to train one or more neural networks. In at least one embodiment, an image is received from a camera or other type of capture device that is capturing images of surroundings or environment of a system. In at least one embodiment, a system performing at least a part of process 1400 includes executable code to use 1418 a trained neural network to infer a viewpoint of an object in an image. In at least one embodiment, a vehicle includes a camera that captures an image and provides that image to a neural network trained on a collection of images of cars to determine whether captured image includes a car and/or orientations of any cars included in captured images.

Figure 15A:
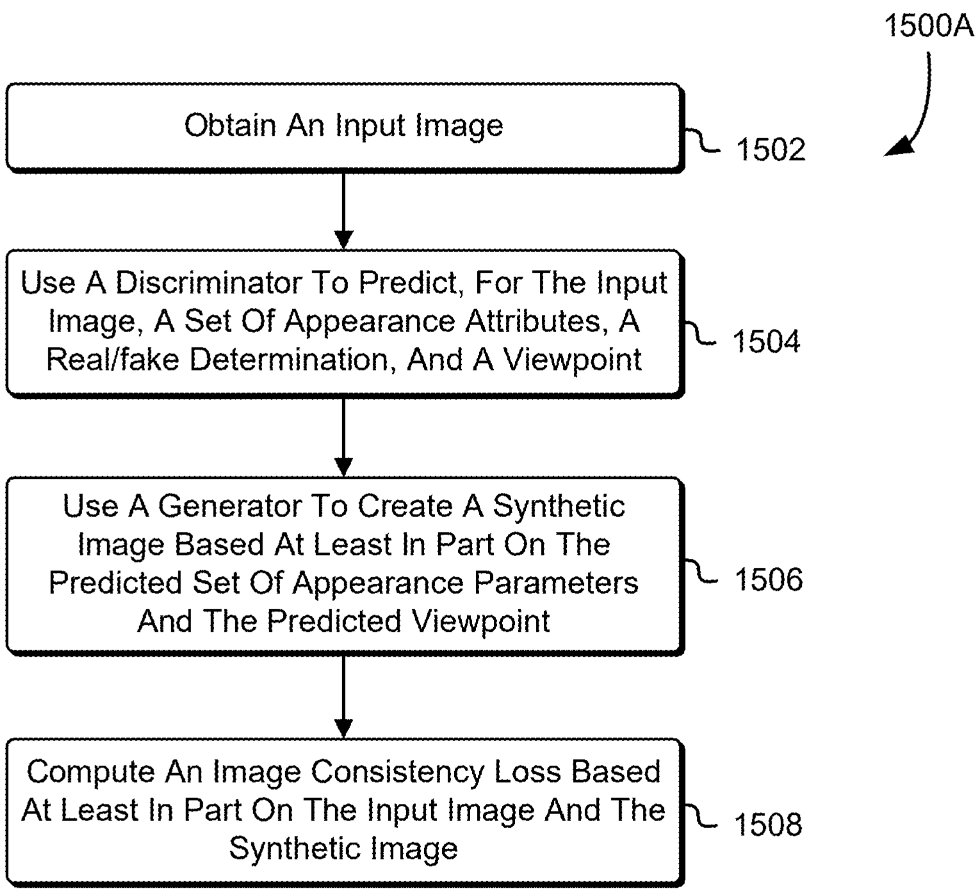
FIG. 15A shows an illustrative example of a process to compute generative consistency loss, according to at least one embodiment.

FIG. 15A shows an illustrative example of a process 1500A to compute image consistency loss, in accordance with at least one embodiment. In at least one embodiment, some or all of process 1500A (or any other processes described herein, or variations and/or combinations thereof) is performed under control of one or more computer systems configured with computer-executable instructions and may be implemented as code (e.g., computer-executable instructions, one or more computer programs, or one or more applications) executing collectively on one or more processors, by hardware, software, or combinations thereof. Code, in at least one embodiment, is stored on a computer-readable storage medium in form of a computer program comprising a plurality of computer-readable instructions executable by one or more processors. A computer-readable storage medium, in at least one embodiment, is a non-transitory computer-readable medium. In at least one embodiment, at least some computer-readable instructions usable to perform process 1500A are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, process 1500A is performed at least in part on a computer system such as those described elsewhere in this disclosure. In at least one embodiment, a first computer system computes generative consistency loss. In at least one embodiment, techniques described in connection with FIG. 4-7 are applicable to process 1500A. In at least one embodiment, process 1500A describes a process to compute one or more losses (e.g., image consistency loss) which can be used to update parameters of a discriminator as part of a training process.

In at least one embodiment, a system performing at least a part of process 1500A includes executable code to obtain 1502 an input image of a collection of one or more images of a type of object. In at least one embodiment, a type of object may mean that all images of a collection of images are images that include cars. In at least one embodiment, an input image depicts an object in a specific orientation comprising specific appearance characteristics (e.g., attributes). In at least one embodiment, an input image is a real image (e.g., as opposed to synthetic images) which is obtained in accordance with those described in connection with FIG. 4.

In at least one embodiment, a system performing at least a part of process 1500A includes executable code to use 1504 a discriminator to predict, for an input image, a set of appearance attributes, a determination of whether input image is real or fake, and a viewpoint. In at least one embodiment, a discriminator is associated with one or more neural networks that are trained to infer a viewpoint as well as other characteristics from an input image. In at least one embodiment, a viewpoint is a predicted viewpoint of an input image, and corresponds to a predicted specific orientation of an object depicted in said input image comprising specific values for a set of parameters comprising an azimuth parameter, an elevation parameter, and a tilt parameter. In at least one embodiment, a set of appearance attributes, or parameters, are a predicted set of appearance attributes of an input image, and define an appearance of an object depicted in said input image. In at least one embodiment, a determination as to whether input image is real or fake is a binary value (e.g., true or false) indicating whether discriminator predicted that input image was real or fake. In at least one embodiment, predicted determination of whether input image is real or fake is used to compute a real/fake classification loss, which may be in accordance with those described elsewhere in this disclosure, including but not limited to those discussed in connection with FIGS. 4 and/or 6.

In at least one embodiment, a system performing at least a part of process 1500A includes executable code to use 1506 a generator to create a synthetic image based at least in part on predicted set of appearance attributes and predicted viewpoint. In at least one embodiment a predicted set of appearance attributes and a predicted viewpoint are provided to a generator to generate a synthetic image. In at least one embodiment, a generator is part of a generative adversarial network. In at least one embodiment, a predicted set of appearance attributes and a predicted viewpoint are utilized to generate a synthetic image that is in accordance with said predicted set of appearance attributes and said predicted viewpoint. In at least one embodiment, a generator generates a synthetic image which comprises an object generated in accordance with a predicted set of appearance attributes, and oriented in accordance with a predicted first viewpoint.

In at least one embodiment, a system performing at least a part of process 1500A includes executable code to compute 1508 an image consistency loss based on an input image and a synthetic image. In at least one embodiment, an input image and a synthetic image are compared to determine an image consistency loss. In at least one embodiment, a cosine distance between an input image and a synthetic image is compared to determine feature similarities wherein closer similarity corresponds to lower loss. In at least one embodiment, L1, L2, or cosine distances are used to determine an image consistency loss between an input image and a synthetic image.

In at least one embodiment, a nearest and farthest neighbor loss is computed based at least in part on input image and synthetic image described in connection with process 1500A. In at least one embodiment, nearest and farthest neighbor loss is computed using techniques described in connection with FIGS. 4 and 9. In at least one embodiment, a symmetry loss is computed based at least in part on input image.

Figure 15B:
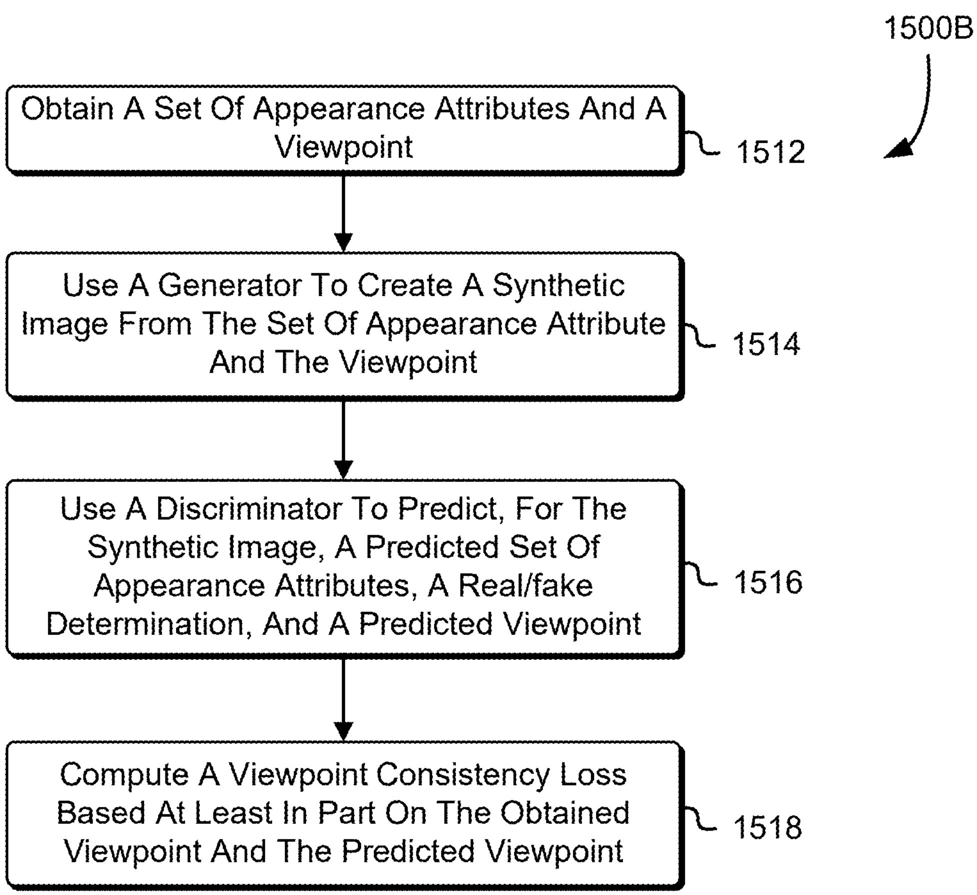
FIG. 15B shows an illustrative example of a process to compute viewpoint consistency loss, according to at least one embodiment.

In at least one embodiment, FIG. 15B illustrates a process 1500B to compute a viewpoint consistency loss. Process 1500B may be implemented by any suitable system, such as those described in connection with FIG. 5. In at least one embodiment, process 1500A and process 1500B are performed by a computer system as part of a training process that adjusts parameters of discriminators and generators used to predict viewpoints of objects. In at least one embodiment, a computer system performing process 1500B includes executable code that causes the computer system to obtain 1512 a viewpoint and a set of appearance parameters. In at least one embodiment, viewpoints and/or sets of appearance parameters are selected at random.

In at least one embodiment, a system performing at least a part of process 1500B includes executable code to use 1514 a generator to create a synthetic image from a viewpoint and a set of appearance parameters. In at least one embodiment, synthetic images are created according to techniques described above in connection with FIG. 2.

In at least one embodiment, a synthetic image is created and a system is configured to use 1516 a discriminator to predict a viewpoint, a determination of whether an input image is real or fake, and a set of appearance parameters. In at least one embodiment, a discriminator is implemented according to techniques described in connection with FIG. 2 to predict viewpoints and appearances.

In at least one embodiment, a system is configured to compute 1518 a viewpoint consistency loss based at least in part on a predicted viewpoint (e.g., obtain from discriminator predicting a viewpoint of a synthetic image) and an input viewpoint (e.g., viewpoint used by a generator to create a synthetic image). In at least one embodiment, viewpoint consistency loss is computed according to techniques described in connection with FIGS. 5 and/or 7.

Figure 16A:
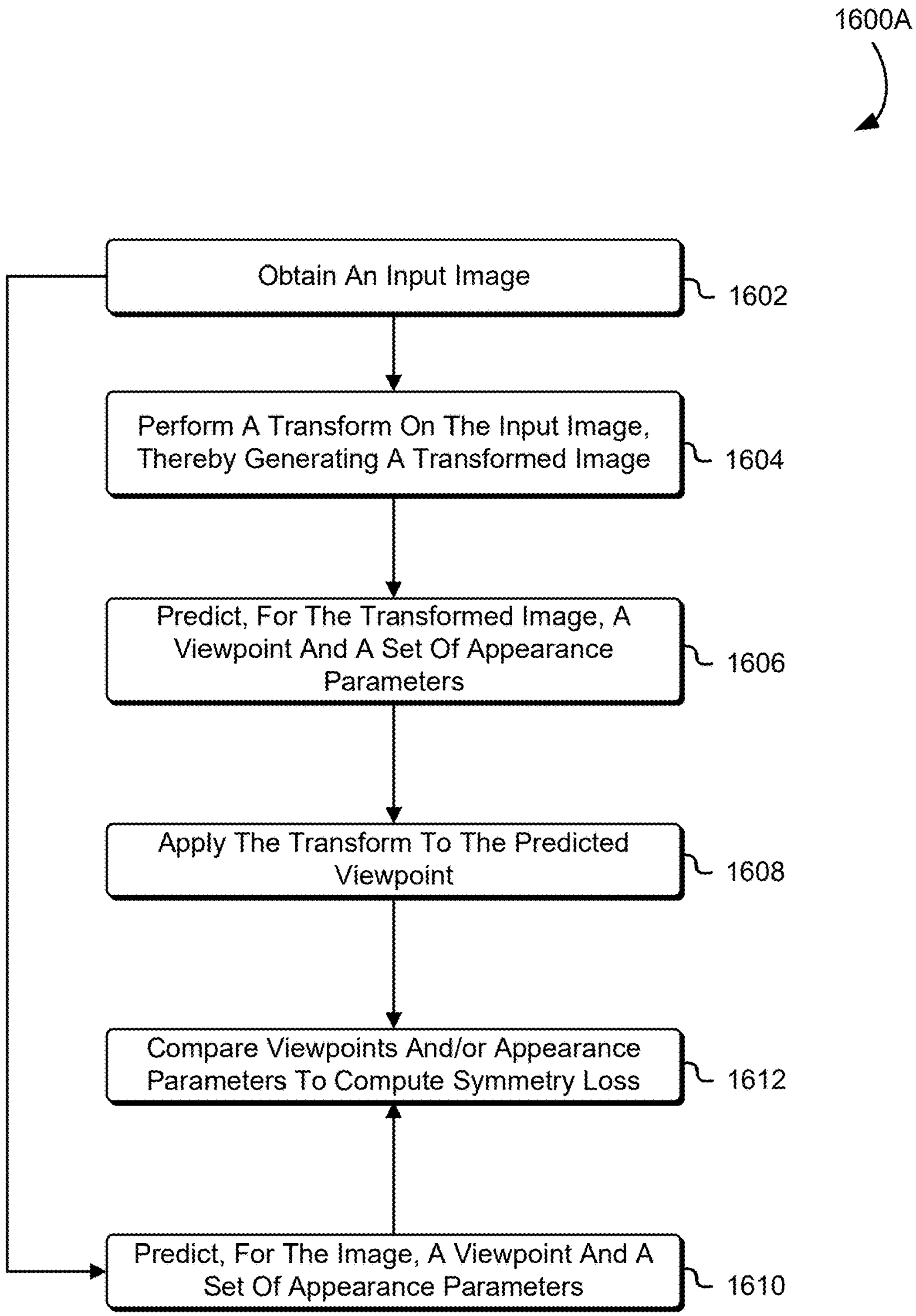
FIG. 16A shows an illustrative example of a process to compute symmetry loss, according to at least one embodiment.

FIG. 16A shows an illustrative example of a process 1600A to compute symmetry loss, in accordance with at least one embodiment. In at least one embodiment, some or all of process 1600A (or any other processes described herein, or variations and/or combinations thereof) is performed under control of one or more computer systems configured with computer-executable instructions and may be implemented as code (e.g., computer-executable instructions, one or more computer programs, or one or more applications) executing collectively on one or more processors, by hardware, software, or combinations thereof. Code, in at least one embodiment, is stored on a computer-readable storage medium in form of a computer program comprising a plurality of computer-readable instructions executable by one or more processors. A computer-readable storage medium, in at least one embodiment, is a non-transitory computer-readable medium. In at least one embodiment, at least some computer-readable instructions usable to perform process 1600A are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, process 1600A is performed at least in part on a computer system such as those described elsewhere in this disclosure. In at least one embodiment, a first computer system computes symmetry loss. In at least one embodiment, techniques described in connection with FIG. 8 are applicable to process 1600A.

In at least one embodiment, a system performing at least a part of process 1600A includes executable code to obtain 1602 an input image. In at least one embodiment, an input image is an image of a collection of one or more images of a type of object. In at least one embodiment, a type of object may mean that all images of a collection of images are images that include cars. In at least one embodiment, a system obtains an input image depicting an object in a specific orientation comprising specific appearance characteristics.

In at least one embodiment, a system performing at least a part of process 1600A includes executable code to perform 1604 a transform on an input image, thereby generating a transformed image. In at least one embodiment, a transform is applied to an input image in which said input image is flipped horizontally to generate a transformed image. In at least one embodiment, a transform is applied by one or more systems associated with a discriminator. In at least one embodiment, one or more image processing techniques are applied to an input image to generate a transformed image. In at least one embodiment, angles of azimuth and tilt of a viewpoint of an object within an input image are reversed when said input image is transformed to generate a transformed image, and angles of elevation remain same across said input image and said transformed image.

In at least one embodiment, a system performing at least a part of process 1600A includes executable code to predict 1606, for a transformed image at least a viewpoint. In at least one embodiment, a discriminator predicts, for a transformed image, a viewpoint, a set of appearance parameters, a real/fake classification, or any combination thereof. In at least one embodiment, a discriminator is associated with one or more neural networks that are trained to infer a viewpoint as well as other characteristics from an input image. In at least one embodiment, a discriminator receives a transformed image and predicts a viewpoint. In at least one embodiment, a viewpoint corresponds to a specific orientation of an object depicted in an image, and comprises specific values for a set of parameters comprising an azimuth parameter, an elevation parameter, and a tilt parameter.

In at least one embodiment, a system performing at least a part of process 1600A includes executable code to apply 1608 a transform to a predicted viewpoint. In at least one embodiment, a transform or inverse thereof is applied to a predicted viewpoint. In at least one embodiment, if an input image is rotated by ($\phi$, $\theta$, $\psi$) angles to produce a transformed image, then a predicted viewpoint generated based on said transformed image may be inversely rotated by ($-\phi$, $-\theta$, $-\psi$)) angles.

In at least one embodiment, a system performing at least a part of process 1600A includes executable code to predict 1610, for an input image, at least a viewpoint. In at least one embodiment, a discriminator predicts, for an input image, a viewpoint, a set of appearance parameters, a real/fake classification, or any combination thereof. In at least one embodiment, a discriminator receives an input image and predicts a viewpoint. In at least one embodiment, a viewpoint corresponds to a specific orientation of an object depicted in an image, and comprises specific values for a set of parameters comprising an azimuth parameter, an elevation parameter, and a tilt parameter.

In at least one embodiment, a system performing at least a part of process 1600A includes executable code to compare 1612 viewpoints to compute symmetry loss. In at least one embodiment, a system compares a predicted viewpoint for a transformed image, to a predicted viewpoint of an input image, wherein said transformed image was generated from said input image. In at least one embodiment, symmetry loss is computed by comparing magnitudes of azimuth, elevation, and tilt of a predicted viewpoint of an input image to magnitudes of azimuth, elevation, and tilt of a predicted viewpoint of a transformed image, wherein zero loss results when magnitudes of each viewpoint parameters are equal. In at least one embodiment, symmetry loss is computed based at least in part on how closely appearance parameters of an image (e.g., input image) and a transformed version of that image match each other.

Figure 16B:
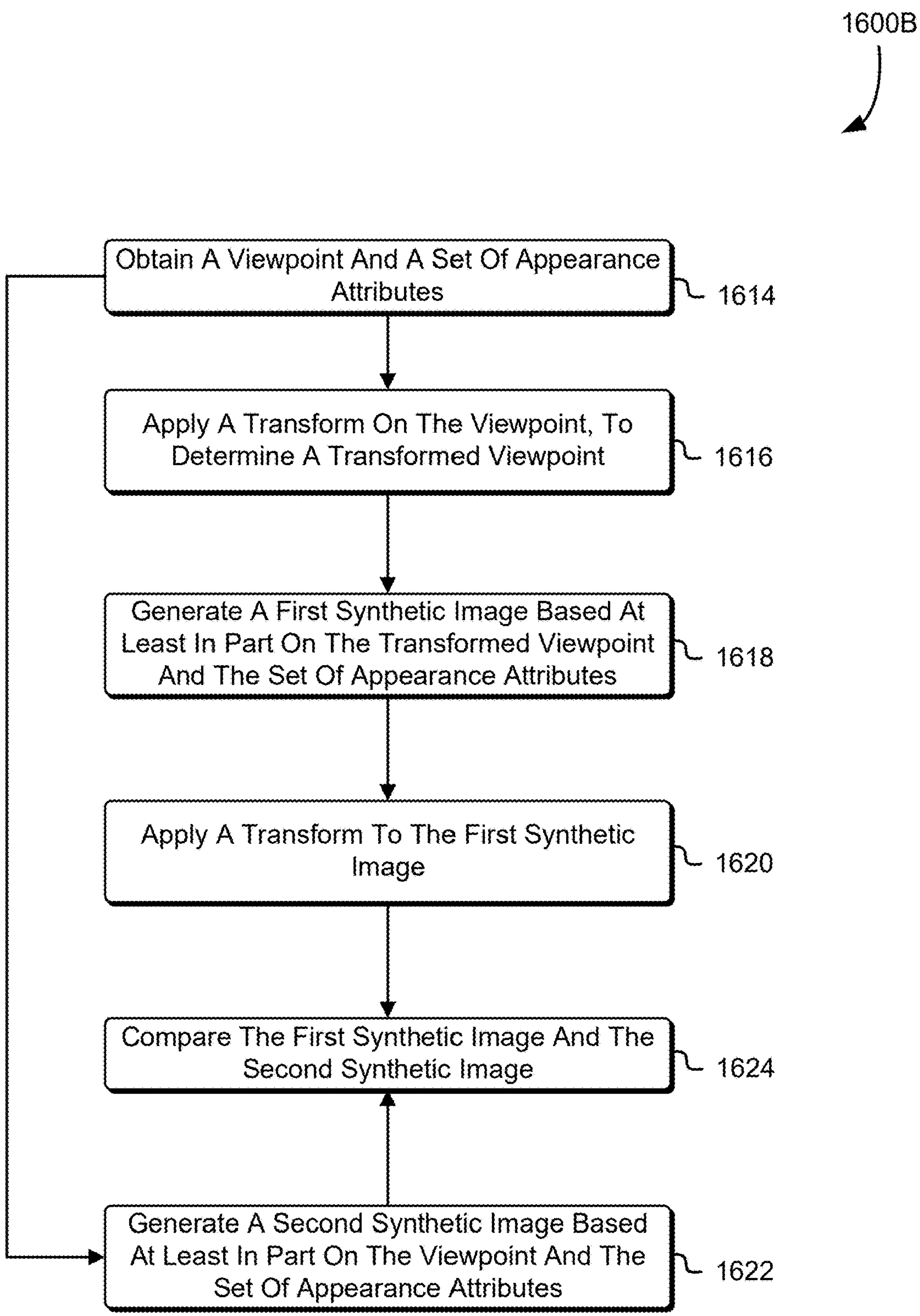
FIG. 16B shows an illustrative example of a process to compute symmetry loss, according to at least one embodiment.

FIG. 16B illustrates a process 1600B for computing symmetry loss, in accordance with at least one embodiment. In at least one embodiment, FIG. 16B is used to update parameters of a generator as part of training a neural network to predict viewpoints. In at least one embodiment, a system performing process 1600B includes executable code to obtain 1614 a viewpoint and a set of appearance attributes. In at least one embodiment, a system is configured to apply 1616 a transform on an obtained viewpoint to determine a transformed viewpoint. In at least some embodiments, a viewpoint is flipped to obtain a transformed viewpoint. In at least one embodiment, a transform function T( ) is applied to a set of parameters $x_1$, $y_1$, and $z_1$ to obtain a transformed set of parameters $x_2$, $y_2$, $z_2$, which may correspond to azimuth, tilt, and elevation parameters.

In at least one embodiment, a generator is used to generate 1618 a first synthetic image based at least in part on a transformed viewpoint and a set of appearance parameters, which may be calculated or otherwise determined using techniques described in connection with other steps of FIG. 16B. In at least one embodiment, a system is configured to apply 1620 a transform to a first synthetic image generated from a transformed viewpoint and a set of appearance attributes. In at least one embodiment, if transformed viewpoint is produced by performing a transform TO, then an inverse transform $T^{-1}(\ )$ is applied to a synthetic image wherein $T(T^{-1}(x,y,z))=(x,y,z)$. In at least one embodiment, if a transform flips an image horizontally, then an inverse flips an image horizontally back to its original orientation.

In at least one embodiment, a system includes executable instructions to generate 1622 a second synthetic image based at least in part on a viewpoint and a set of appearance parameters. In at least one embodiment, same generator is used to produce a first synthetic image based on a transformed viewpoint and a second synthetic image based on an original viewpoint. In at least one embodiment, a system is configured to compare 1624 a first synthetic image and a second synthetic image to compute a symmetry loss, wherein a cosine distance of zero between such images relates to zero loss.

Figure 17:
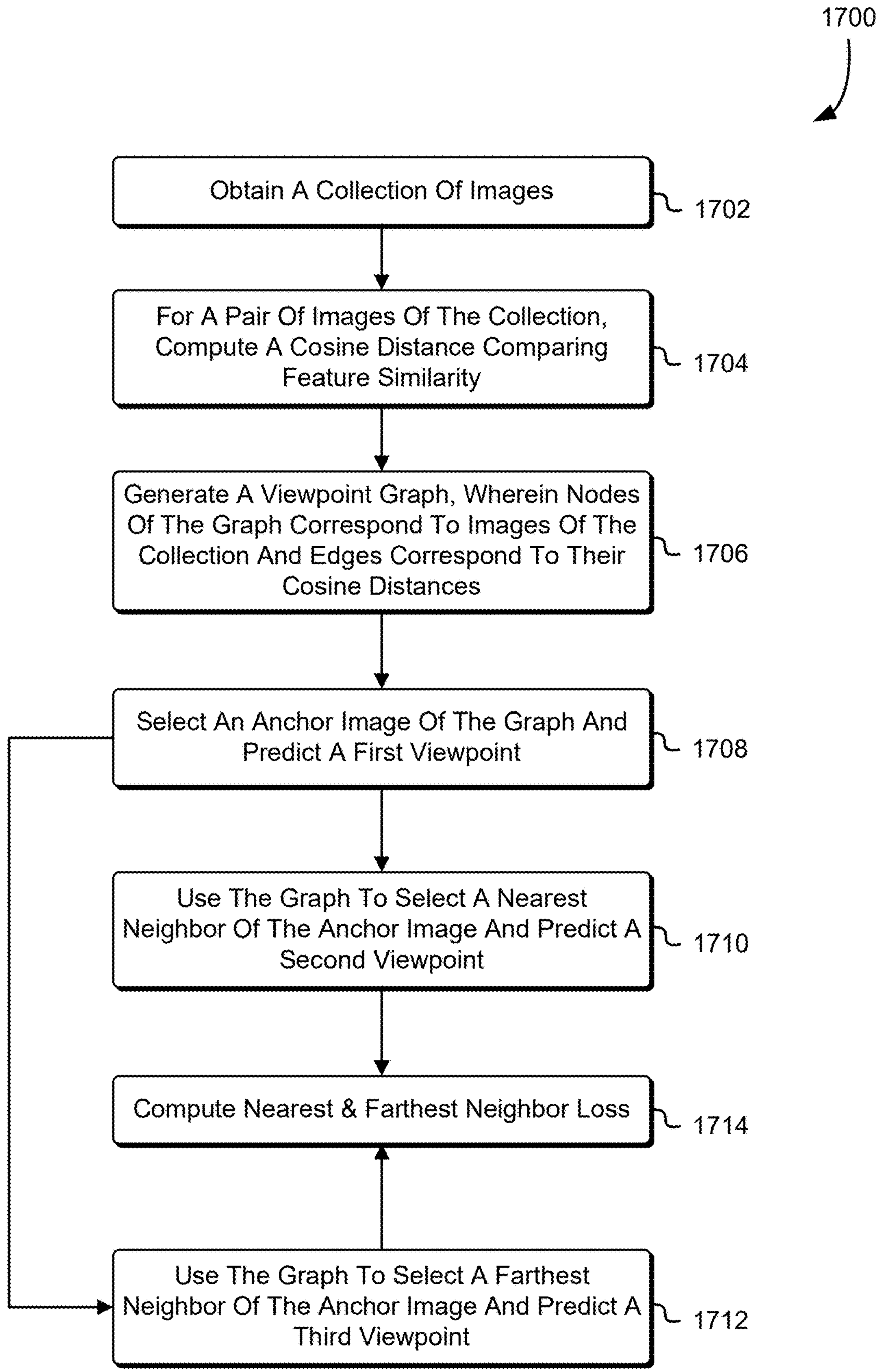
FIG. 17 shows an illustrative example of a process to compute nearest neighbor and farthest neighbor loss, according to at least one embodiment.

FIG. 17 shows an illustrative example of a process 1700 to compute nearest neighbor and farthest neighbor loss, in accordance with at least one embodiment. In at least one embodiment, some or all of process 1700 (or any other processes described herein, or variations and/or combinations thereof) is performed under control of one or more computer systems configured with computer-executable instructions and may be implemented as code (e.g., computer-executable instructions, one or more computer programs, or one or more applications) executing collectively on one or more processors, by hardware, software, or combinations thereof. Code, in at least one embodiment, is stored on a computer-readable storage medium in form of a computer program comprising a plurality of computer-readable instructions executable by one or more processors. A computer-readable storage medium, in at least one embodiment, is a non-transitory computer-readable medium. In at least one embodiment, at least some computer-readable instructions usable to perform process 1700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, process 1700 is performed at least in part on a computer system such as those described elsewhere in this disclosure. In at least one embodiment, a first computer system computes nearest and farthest neighbor loss. In at least one embodiment, techniques described in connection with FIG. 9 are applicable to process 1700.

In at least one embodiment, a system performing at least a part of process 1700 includes executable code to obtain 1702 a collection of images. In at least one embodiment, a collection of images comprises one or more images of a type of object. In at least one embodiment, a type of object may mean that all images of a collection of images are images that include cars. In at least one embodiment, a system obtains a collection of one or more images in accordance with techniques described elsewhere in this disclosure, such as FIG. 13.

In at least one embodiment, a system performing at least a part of process 1700 includes executable code to, for a pair of images of a collection, compute 1704 a cosine distance comparing feature similarity. In at least one embodiment, cosine distance is a mathematical complement of cosine similarity (e.g., cosine distance=1−cosine similarity). In at least one embodiment, cosine similarity is a measure of similarity between two vectors, which can represent images, text, data, and/or variations thereof, based on a cosine of an angle between them. In at least one embodiment, when two images comprise features corresponding to objects having similar viewpoints, a cosine distance calculated for said images is low. In at least one embodiment, when two images comprise features corresponding to objects having different viewpoints, a cosine distance calculated for said images is high. In at least one embodiment, a cosine distance is computed for each image of a collection of images relative to each other image of said collection.

In at least one embodiment, a system performing at least a part of process 1700 includes executable code to generate 1706 a viewpoint graph, wherein nodes of said graph correspond to images of a collection and edges correspond to their cosine distances. In at least one embodiment, cosine distances are computed based on feature similarities of pairs of images using a convolutional neural network. In at least one embodiment, edges of a viewpoint graph are weighted such that thicker edges between two images correspond to a higher degree of similarity between said two images, and thinner edges between two images correspond to a lower degree of similarity between said two images.

In at least one embodiment, a system performing at least a part of process 1700 includes executable code to select 1708 an anchor image of a graph and predict a first viewpoint. In at least one embodiment, an anchor image is selected from a collection of training images that are used to generate a viewpoint graph. In at least one embodiment, a discriminator is associated with one or more neural networks that are trained to infer a viewpoint as well as other characteristics from an input image. In at least one embodiment, a discriminator receives an anchor image and predicts a first viewpoint. In at least one embodiment, a first viewpoint corresponds to a predicted specific orientation of an object depicted in an anchor image, and comprises specific values for a set of parameters comprising azimuth parameters, elevation parameters, and tilt parameters corresponding to said orientation of said object.

In at least one embodiment, a system performing at least a part of process 1700 includes executable code to use 1710 a graph to select a nearest neighbor of an anchor image and predict a second viewpoint. In at least one embodiment, a nearest neighbor is determined based on edge weights of a viewpoint graph. In at least one embodiment, a nearest neighbor is an image which has a shortest edge that is connected to an anchor image of a viewpoint graph. In at least one embodiment, a nearest neighbor to an anchor image is an image that is most similar to said anchor image within a collection of images. In at least one embodiment, a discriminator receives a nearest neighbor image and predicts a second viewpoint. In at least one embodiment, a second viewpoint corresponds to a predicted specific orientation of an object depicted in a nearest neighbor image, and comprises specific values for a set of parameters comprising azimuth parameters, elevation parameters, and tilt parameters corresponding to said orientation of said object.

In at least one embodiment, a system performing at least a part of process 1700 includes executable code to use 1712 a graph to select a farthest neighbor of an anchor image and predict a third viewpoint. In at least one embodiment, a farthest neighbor is determined based on edge weights of a viewpoint graph. In at least one embodiment, a farthest neighbor is an image which has a longest edge that is connected to an anchor image of a viewpoint graph. In at least one embodiment, a farthest neighbor to an anchor image is an image that is most different to said anchor image within a collection of images. In at least one embodiment, a discriminator receives a farthest neighbor image and predicts a third viewpoint. In at least one embodiment, a third viewpoint corresponds to a predicted specific orientation of an object depicted in a farthest neighbor image, and comprises specific values for a set of parameters comprising azimuth parameters, elevation parameters, and tilt parameters corresponding to said orientation of said object.

In at least one embodiment, a system performing at least a part of process 1700 includes executable code to compute 1714 nearest and farthest neighbor loss. In at least one embodiment, a nearest neighbor loss is computed between a first viewpoint predicted from an anchor image and a second viewpoint predicted from a nearest neighbor image to said anchor image. In at least one embodiment, a nearest neighbor loss is computed such that higher similarity between a first viewpoint and a second viewpoint corresponds to less loss. In at least one embodiment, farthest neighbor loss is computed between a first viewpoint predicted from an anchor image and a third viewpoint predicted from a farthest neighbor image to said anchor image. In at least one embodiment, a farthest neighbor loss is computed such that lower similarity between a first viewpoint and a third viewpoint corresponds to less loss. In at least one embodiment, nearest and farthest neighbor loss is computed based on a combination of nearest neighbor loss and farthest neighbor loss.

Inference and Training Logic

Figure 18A:
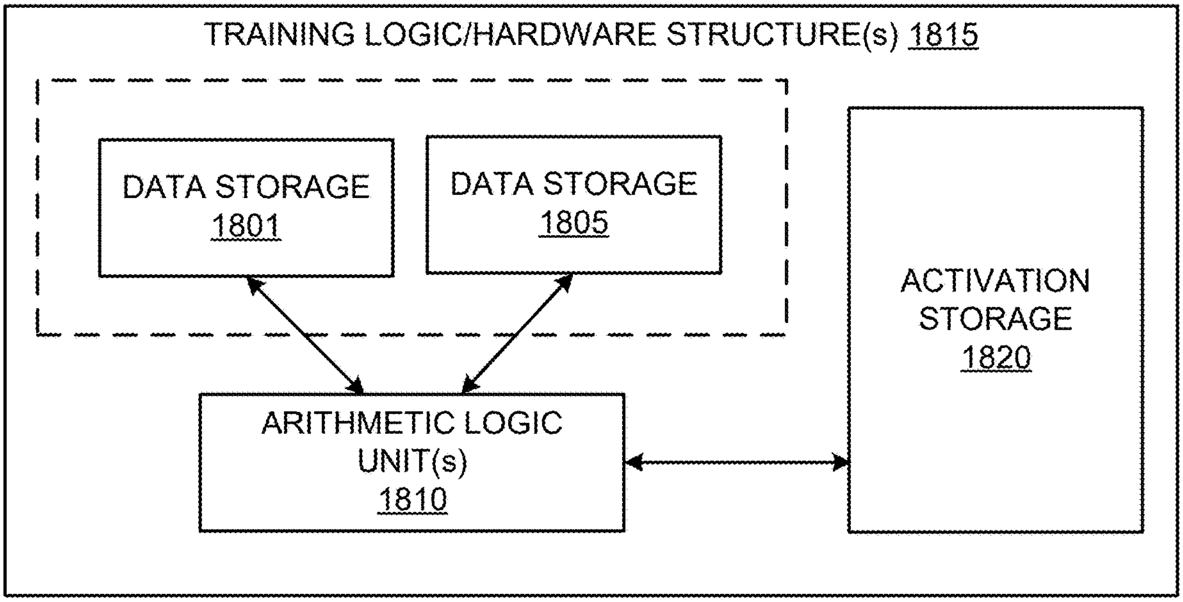
FIG. 18A illustrates inference and/or training logic, according to at least one embodiment.

FIG. 18A illustrates inference and/or training logic 1815 used to perform inferencing and/or training operations associated with one or more embodiments. Details regarding inference and/or training logic 1815 are provided below in conjunction with FIGS. 18A and/or 18B.

In at least one embodiment, inference and/or training logic 1815 may include, without limitation, code and/or data storage 1801 to store forward and/or output weight and/or input/output data, and/or other parameters to configure neurons or layers of a neural network trained and/or used for inferencing in aspects of one or more embodiments. In at least one embodiment, training logic 1815 may include, or be coupled to code and/or data storage 1801 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment code and/or data storage 1801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1801 may be included with other on-chip or off-chip data storage, including a processor's L1, L2, or L3 cache or system memory.

In at least one embodiment, any portion of code and/or data storage 1801 may be internal or external to one or more processors or other hardware logic devices or circuits. In at least one embodiment, code and/or code and/or data storage 1801 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1801 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1815 may include, without limitation, a code and/or data storage 1805 to store backward and/or output weight and/or input/output data corresponding to neurons or layers of a neural network trained and/or used for inferencing in aspects of one or more embodiments. In at least one embodiment, code and/or data storage 1805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1815 may include, or be coupled to code and/or data storage 1805 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1805 may be included with other on-chip or off-chip data storage, including a processor's L1, L2, or L3 cache or system memory. In at least one embodiment, any portion of code and/or data storage 1805 may be internal or external to on one or more processors or other hardware logic devices or circuits. In at least one embodiment, code and/or data storage 1805 may be cache memory, DRAM, SRAM, non-volatile memory (e.g., Flash memory), or other storage. In at least one embodiment, choice of whether code and/or data storage 1805 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1801 and code and/or data storage 1805 may be separate storage structures. In at least one embodiment, code and/or data storage 1801 and code and/or data storage 1805 may be same storage structure. In at least one embodiment, code and/or data storage 1801 and code and/or data storage 1805 may be partially same storage structure and partially separate storage structures. In at least one embodiment, any portion of code and/or data storage 1801 and code and/or data storage 1805 may be included with other on-chip or off-chip data storage, including a processor's L1, L2, or L3 cache or system memory.

In at least one embodiment, inference and/or training logic 1815 may include, without limitation, one or more arithmetic logic unit(s) ("ALU(s)") 1810, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1820 that are functions of input/output and/or weight parameter data stored in code and/or data storage 1801 and/or code and/or data storage 1805. In at least one embodiment, activations stored in activation storage 1820 are generated according to linear algebraic and or matrix-based mathematics performed by ALU(s) 1810 in response to performing instructions or other code, wherein weight values stored in code and/or data storage 1805 and/or data 1801 are used as operands along with other values, such as bias values, gradient information, momentum values, or other parameters or hyperparameters, any or all of which may be stored in code and/or data storage 1805 or code and/or data storage 1801 or another storage on or off-chip.

In at least one embodiment, ALU(s) 1810 are included within one or more processors or other hardware logic devices or circuits, whereas in another embodiment, ALU(s) 1810 may be external to a processor or other hardware logic device or circuit that uses them (e.g., a co-processor). In at least one embodiment, ALUs 1810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 1801, code and/or data storage 1805, and activation storage 1820 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1820 may be cache memory, DRAM, SRAM, non-volatile memory (e.g., Flash memory), or other storage. In at least one embodiment, activation storage 1820 may be completely or partially within or external to one or more processors or other logical circuits. In at least one embodiment, choice of whether activation storage 1820 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1815 illustrated in FIG. 18A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1815 illustrated in FIG. 18A may be used in conjunction with central processing unit ("CPU") hardware, graphics processing unit ("GPU") hardware or other hardware, such as field programmable gate arrays ("FPGAs").

Figure 18B:
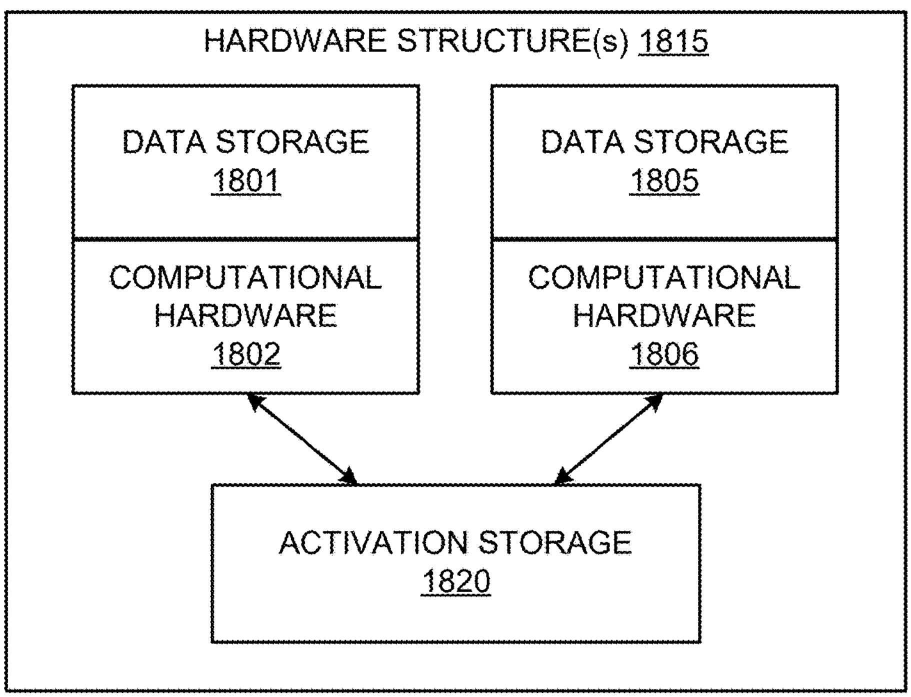
FIG. 18B illustrates inference and/or training logic, according to at least one embodiment.

FIG. 18B illustrates inference and/or training logic 1815, according to at least one embodiment various. In at least one embodiment, inference and/or training logic 1815 may include, without limitation, hardware logic in which computational resources are dedicated or otherwise exclusively used in conjunction with weight values or other information corresponding to one or more layers of neurons within a neural network. In at least one embodiment, inference and/or training logic 1815 illustrated in FIG. 18B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1815 illustrated in FIG. 18B may be used in conjunction with central processing unit (CPU) hardware, graphics processing unit (GPU) hardware or other hardware, such as field programmable gate arrays (FPGAs). In at least one embodiment, inference and/or training logic 1815 includes, without limitation, code and/or data storage 1801 and code and/or data storage 1805, which may be used to store code (e.g., graph code), weight values and/or other information, including bias values, gradient information, momentum values, and/or other parameter or hyperparameter information. In at least one embodiment illustrated in FIG. 18B, each of code and/or data storage 1801 and code and/or data storage 1805 is associated with a dedicated computational resource, such as computational hardware 1802 and computational hardware 1806, respectively. In at least one embodiment, each of computational hardware 1802 and computational hardware 1806 comprises one or more ALUs that perform mathematical functions, such as linear algebraic functions, only on information stored in code and/or data storage 1801 and code and/or data storage 1805, respectively, result of which is stored in activation storage 1820.

In at least one embodiment, each of code and/or data storage 1801 and 1805 and corresponding computational hardware 1802 and 1806, respectively, correspond to different layers of a neural network, such that resulting activation from one "storage/computational pair 1801/1802" of code and/or data storage 1801 and computational hardware 1802 is provided as an input to next "storage/computational pair 1805/1806" of code and/or data storage 1805 and computational hardware 1806, in order to mirror conceptual organization of a neural network. In at least one embodiment, each of storage/computational pairs 1801/1802 and 1805/1806 may correspond to more than one neural network layer. In at least one embodiment, additional storage/computation pairs (not shown) subsequent to or in parallel with storage computation pairs 1801/1802 and 1805/1806 may be included in inference and/or training logic 1815.

Neural Network Training and Deployment

Figure 19:
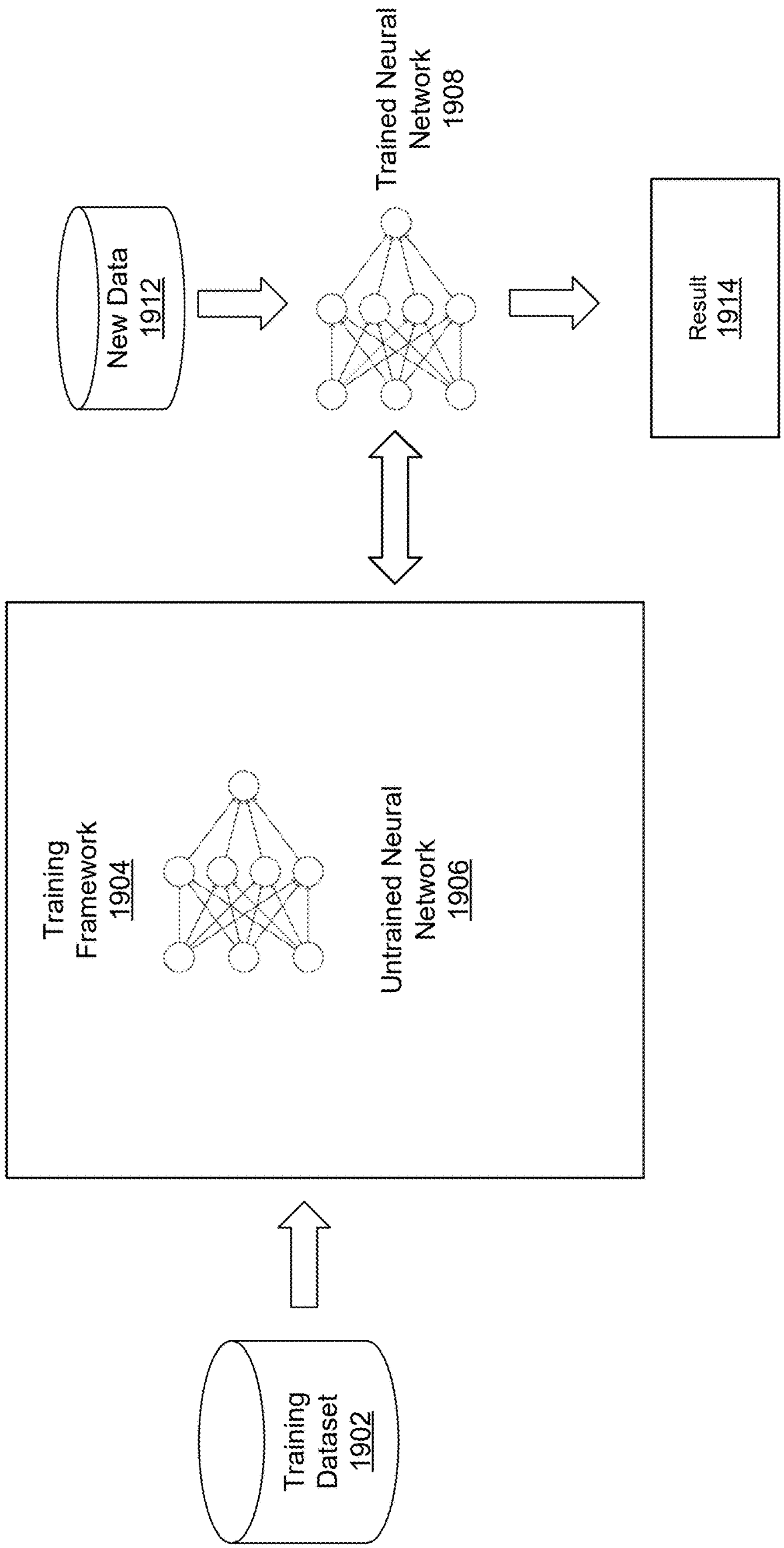
FIG. 19 illustrates training and deployment of a neural network, according to at least one embodiment.

FIG. 19 illustrates training and deployment of a deep neural network, according to at least one embodiment. In at least one embodiment, untrained neural network 1906 is trained using a training dataset 1902. In at least one embodiment, training framework 1904 is a PyTorch framework, whereas in other embodiments, training framework 1904 is a Tensorflow, Boost, Caffe, Microsoft Cognitive Toolkit/CNTK, MXNet, Chainer, Keras, Deeplearning4j, or other training framework. In at least one embodiment training framework 1904 trains an untrained neural network 1906 and enables it to be trained using processing resources described herein to generate a trained neural network 1908. In at least one embodiment, weights may be chosen randomly or by pre-training using a deep belief network. In at least one embodiment, training may be performed in either a supervised, partially supervised, or unsupervised manner.

In at least one embodiment, untrained neural network 1906 is trained using supervised learning, wherein training dataset 1902 includes an input paired with a desired output for an input, or where training dataset 1902 includes input having a known output and an output of neural network 1906 is manually graded. In at least one embodiment, untrained neural network 1906 is trained in a supervised manner processes inputs from training dataset 1902 and compares resulting outputs against a set of expected or desired outputs. In at least one embodiment, errors are then propagated back through untrained neural network 1906. In at least one embodiment, training framework 1904 adjusts weights that control untrained neural network 1906. In at least one embodiment, training framework 1904 includes tools to monitor how well untrained neural network 1906 is converging towards a model, such as trained neural network 1908, suitable to generating correct answers, such as in result 1914, based on known input data, such as new data 1912. In at least one embodiment, training framework 1904 trains untrained neural network 1906 repeatedly while adjust weights to refine an output of untrained neural network 1906 using a loss function and adjustment algorithm, such as stochastic gradient descent. In at least one embodiment, training framework 1904 trains untrained neural network 1906 until untrained neural network 1906 achieves a desired accuracy. In at least one embodiment, trained neural network 1908 can then be deployed to implement any number of machine learning operations.

In at least one embodiment, untrained neural network 1906 is trained using unsupervised learning, wherein untrained neural network 1906 attempts to train itself using unlabeled data. In at least one embodiment, unsupervised learning training dataset 1902 will include input data without any associated output data or "ground truth" data. In at least one embodiment, untrained neural network 1906 can learn groupings within training dataset 1902 and can determine how individual inputs are related to untrained dataset 1902. In at least one embodiment, unsupervised training can be used to generate a self-organizing map, which is a type of trained neural network 1908 capable of performing operations useful in reducing dimensionality of new data 1912. In at least one embodiment, unsupervised training can also be used to perform anomaly detection, which allows identification of data points in a new dataset 1912 that deviate from normal patterns of new dataset 1912.

In at least one embodiment, semi-supervised learning may be used, which is a technique in which in training dataset 1902 includes a mix of labeled and unlabeled data. In at least one embodiment, training framework 1904 may be used to perform incremental learning, such as through transferred learning techniques. In at least one embodiment, incremental learning enables trained neural network 1908 to adapt to new data 1912 without forgetting knowledge instilled within network during initial training.

Data Center

Figure 20:
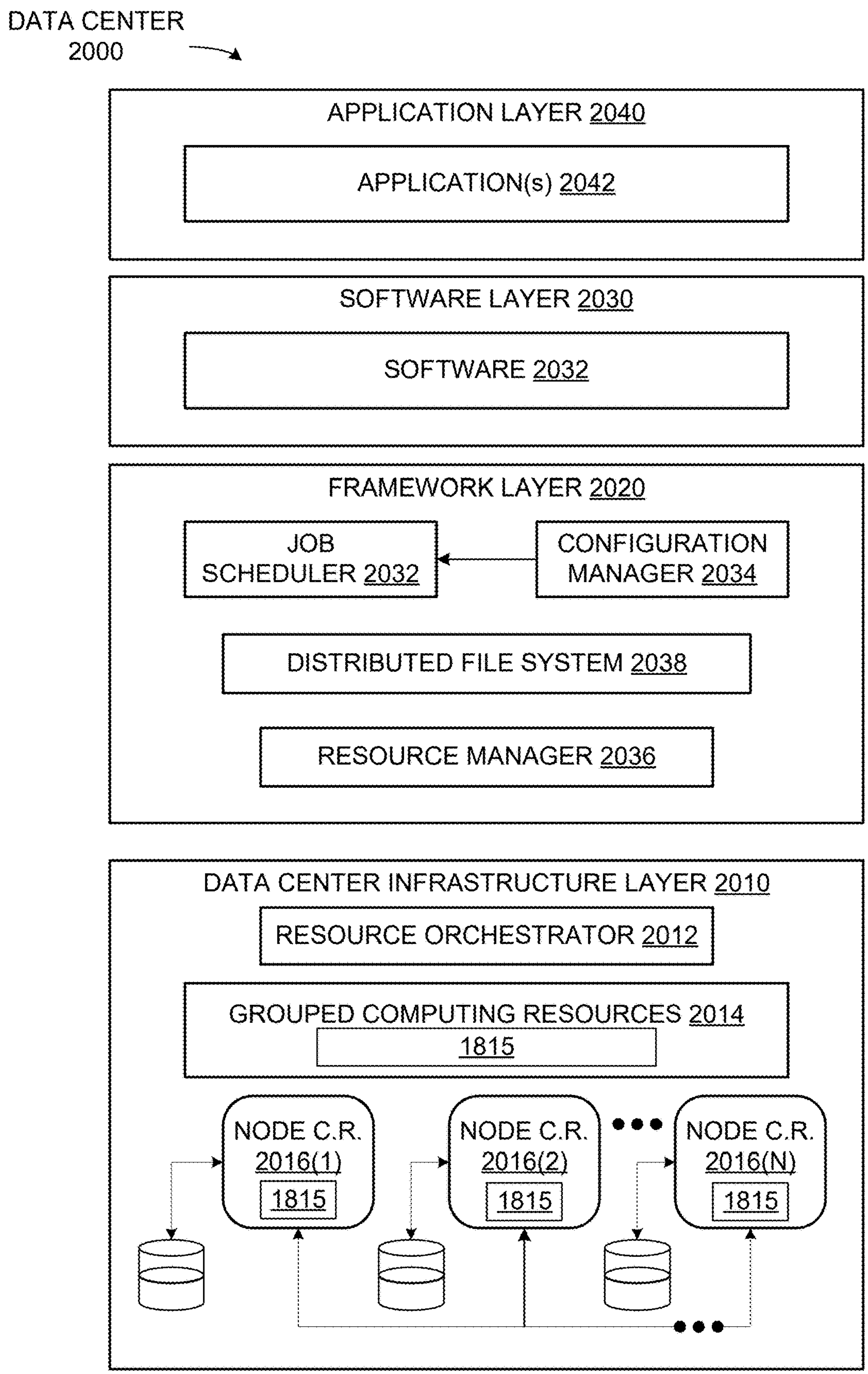
FIG. 20 illustrates an example data center system, according to at least one embodiment.

FIG. 20 illustrates an example data center 2000, in which at least one embodiment may be used. In at least one embodiment, data center 2000 includes a data center infrastructure layer 2010, a framework layer 2020, a software layer 2030 and an application layer 2040.

In at least one embodiment, as shown in FIG. 20, data center infrastructure layer 2010 may include a resource orchestrator 2012, grouped computing resources 2014, and node computing resources ("node C.R.s") 2016(1)-2016(N), where "N" represents any whole, positive integer. In at least one embodiment, node C.R.s 2016(1)-2016(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 2016(1)-2016(N) may be a server having one or more of above-mentioned computing resources.

In at least one embodiment, grouped computing resources 2014 may include separate groupings of node C.R.s housed within one or more racks (not shown), or many racks housed in data centers at various geographical locations (also not shown). Separate groupings of node C.R.s within grouped computing resources 2014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 2012 may configure or otherwise control one or more node C.R.s 2016(1)-2016(N) and/or grouped computing resources 2014. In at least one embodiment, resource orchestrator 2012 may include a software design infrastructure ("SDI") management entity for data center 2000. In at least one embodiment, resource orchestrator may include hardware, software or some combination thereof.

In at least one embodiment, as shown in FIG. 20, framework layer 2020 includes a job scheduler 2032, a configuration manager 2034, a resource manager 2036 and a distributed file system 2038. In at least one embodiment, framework layer 2020 may include a framework to support software 2032 of software layer 2030 and/or one or more application(s) 2042 of application layer 2040. In at least one embodiment, software 2032 or application(s) 2042 may respectively include web-based service software or applications, such as those provided by Amazon Web Services, Google Cloud and Microsoft Azure. In at least one embodiment, framework layer 2020 may be, but is not limited to, a type of free and open-source software web application framework such as Apache Spark™ (hereinafter "Spark") that may utilize distributed file system 2038 for large-scale data processing (e.g., "big data"). In at least one embodiment, job scheduler 2032 may include a Spark driver to facilitate scheduling of workloads supported by various layers of data center 2000. In at least one embodiment, configuration manager 2034 may be capable of configuring different layers such as software layer 2030 and framework layer 2020 including Spark and distributed file system 2038 for supporting large-scale data processing. In at least one embodiment, resource manager 2036 may be capable of managing clustered or grouped computing resources mapped to or allocated for support of distributed file system 2038 and job scheduler 2032. In at least one embodiment, clustered or grouped computing resources may include grouped computing resource 2014 at data center infrastructure layer 2010. In at least one embodiment, resource manager 2036 may coordinate with resource orchestrator 2012 to manage these mapped or allocated computing resources.

In at least one embodiment, software 2032 included in software layer 2030 may include software used by at least portions of node C.R.s 2016(1)-2016(N), grouped computing resources 2014, and/or distributed file system 2038 of framework layer 2020. One or more types of software may include, but are not limited to, Internet web page search software, e-mail virus scan software, database software, and streaming video content software.

In at least one embodiment, application(s) 2042 included in application layer 2040 may include one or more types of applications used by at least portions of node C.R.s 2016(1)-2016(N), grouped computing resources 2014, and/or distributed file system 2038 of framework layer 2020. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 2034, resource manager 2036, and resource orchestrator 2012 may implement any number and type of self-modifying actions based on any amount and type of data acquired in any technically feasible fashion. In at least one embodiment, self-modifying actions may relieve a data center operator of data center 2000 from making possibly bad configuration decisions and possibly avoiding underutilized and/or poor performing portions of a data center.

In at least one embodiment, data center 2000 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 2000. In at least one embodiment, trained machine learning models corresponding to one or more neural networks may be used to infer or predict information using resources described above with respect to data center 2000 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in a system of FIG. 20 for inferencing or predicting operations based, at least in part, on weight parameters calculated using neural network training operations, neural network functions and/or architectures, or neural network use cases described herein.

In at least one embodiment, a system of FIG. 20 is utilized to implement a discriminator that is trained to infer a viewpoint and a set of appearance attributes from an input image. In at least one embodiment, a system of FIG. 20 is utilized to implement a generator that is trained to generate an image based on an input viewpoint and an input set of appearance parameters. In at least one embodiment, a system of FIG. 20 is utilized to implement one or more neural networks comprising a discriminator and a generator, and a system of FIG. 20 is utilized in connection with one or more processes that train one or more neural networks to identify an orientation of an object within an image in a self-supervised manner by at least computing one or more loss functions as part of training that evaluate one or more characteristics of images of a training set.

Autonomous Vehicle

Figure 21A:
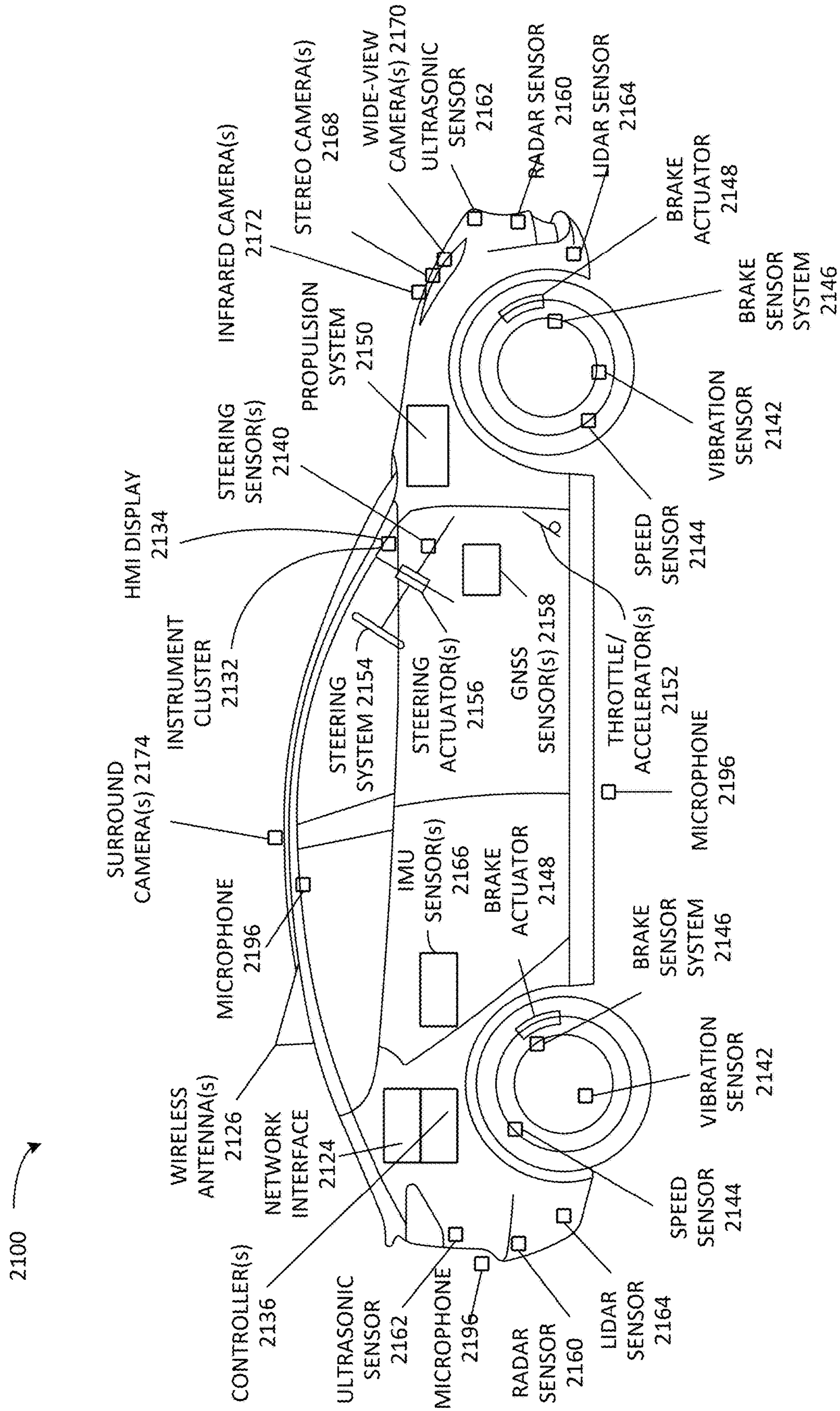
FIG. 21A illustrates an example of an autonomous vehicle, according to at least one embodiment.

FIG. 21A illustrates an example of an autonomous vehicle 2100, according to at least one embodiment. In at least one embodiment, autonomous vehicle 2100 (alternatively referred to herein as "vehicle 2100") may be, without limitation, a passenger vehicle, such as a car, a truck, a bus, and/or another type of vehicle that accommodates one or more passengers. In at least one embodiment, vehicle 2100 may be a semi-tractor-trailer truck used for hauling cargo. In at least one embodiment, vehicle 2100 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 2100 may be capable of functionality in accordance with one or more of level 1-level 5 of autonomous driving levels. For example, in at least one embodiment, vehicle 2100 may be capable of conditional automation (Level 3), high automation (Level 4), and/or full automation (Level 5), depending on embodiment.

In at least one embodiment, vehicle 2100 may include, without limitation, components such as a chassis, a vehicle body, wheels (e.g., 2, 4, 6, 8, 18, etc.), tires, axles, and other components of a vehicle. In at least one embodiment, vehicle 2100 may include, without limitation, a propulsion system 2150, such as an internal combustion engine, hybrid electric power plant, an all-electric engine, and/or another propulsion system type. In at least one embodiment, propulsion system 2150 may be connected to a drive train of vehicle 2100, which may include, without limitation, a transmission, to enable propulsion of vehicle 2100. In at least one embodiment, propulsion system 2150 may be controlled in response to receiving signals from a throttle/accelerator(s) 2152.

In at least one embodiment, a steering system 2154, which may include, without limitation, a steering wheel, is used to steer a vehicle 2100 (e.g., along a desired path or route) when a propulsion system 2150 is operating (e.g., when vehicle is in motion). In at least one embodiment, a steering system 2154 may receive signals from steering actuator(s) 2156. Steering wheel may be optional for full automation (Level 5) functionality. In at least one embodiment, a brake sensor system 2146 may be used to operate vehicle brakes in response to receiving signals from brake actuator(s) 2148 and/or brake sensors.

In at least one embodiment, controller(s) 2136, which may include, without limitation, one or more system on chips ("SoCs") (not shown in FIG. 21A) and/or graphics processing unit(s) ("GPU(s)"), provide signals (e.g., representative of commands) to one or more components and/or systems of vehicle 2100. For instance, in at least one embodiment, controller(s) 2136 may send signals to operate vehicle brakes via brake actuators 2148, to operate steering system 2154 via steering actuator(s) 2156, to operate propulsion system 2150 via throttle/accelerator(s) 2152. Controller(s) 2136 may include one or more onboard (e.g., integrated) computing devices (e.g., supercomputers) that process sensor signals, and output operation commands (e.g., signals representing commands) to enable autonomous driving and/or to assist a human driver in driving vehicle 2100. In at least one embodiment, controller(s) 2136 may include a first controller 2136 for autonomous driving functions, a second controller 2136 for functional safety functions, a third controller 2136 for artificial intelligence functionality (e.g., computer vision), a fourth controller 2136 for infotainment functionality, a fifth controller 2136 for redundancy in emergency conditions, and/or other controllers. In at least one embodiment, a single controller 2136 may handle two or more of above functionalities, two or more controllers 2136 may handle a single functionality, and/or any combination thereof.

In at least one embodiment, controller(s) 2136 provide signals for controlling one or more components and/or systems of vehicle 2100 in response to sensor data received from one or more sensors (e.g., sensor inputs). In at least one embodiment, sensor data may be received from, for example and without limitation, global navigation satellite systems ("GNSS") sensor(s) 2158 (e.g., Global Positioning System sensor(s)), RADAR sensor(s) 2160, ultrasonic sensor(s) 2162, LIDAR sensor(s) 2164, inertial measurement unit ("IMU") sensor(s) 2166 (e.g., accelerometer(s), gyroscope(s), magnetic compass(es), magnetometer(s), etc.), microphone(s) 2196, stereo camera(s) 2168, wide-view camera(s) 2170 (e.g., fisheye cameras), infrared camera(s) 2172, surround camera(s) 2174 (e.g., 360 degree cameras), long-range cameras (not shown in FIG. 21A), mid-range camera(s) (not shown in FIG. 21A), speed sensor(s) 2144 (e.g., for measuring speed of vehicle 2100), vibration sensor(s) 2142, steering sensor(s) 2140, brake sensor(s) (e.g., as part of brake sensor system 2146), and/or other sensor types.

In at least one embodiment, one or more of controller(s) 2136 may receive inputs (e.g., represented by input data) from an instrument cluster 2132 of vehicle 2100 and provide outputs (e.g., represented by output data, display data, etc.) via a human-machine interface ("HMI") display 2134, an audible annunciator, a loudspeaker, and/or via other components of vehicle 2100. In at least one embodiment, outputs may include information such as vehicle velocity, speed, time, map data (e.g., a High Definition map (not shown in FIG. 21A), location data (e.g., vehicle's 2100 location, such as on a map), direction, location of other vehicles (e.g., an occupancy grid), information about objects and status of objects as perceived by controller(s) 2136, etc. For example, in at least one embodiment, HMI display 2134 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 2100 further includes a network interface 2124 which may use wireless antenna(s) 2126 and/or modem(s) to communicate over one or more networks. For example, in at least one embodiment, network interface 2124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 2126 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in a system of FIG. 21A for inferencing or predicting operations based, at least in part, on weight parameters calculated using neural network training operations, neural network functions and/or architectures, or neural network use cases described herein.

In at least one embodiment, a system of FIG. 21A is utilized to implement a discriminator that is trained to infer a viewpoint and a set of appearance attributes from an input image. In at least one embodiment, a system of FIG. 21A is utilized to implement a generator that is trained to generate an image based on an input viewpoint and an input set of appearance parameters. In at least one embodiment, a system of FIG. 21A is utilized to implement one or more neural networks comprising a discriminator and a generator, and a system of FIG. 21A is utilized in connection with one or more processes that train one or more neural networks to identify an orientation of an object within an image in a self-supervised manner by at least computing one or more loss functions as part of training that evaluate one or more characteristics of images of a training set.

Figure 21B:
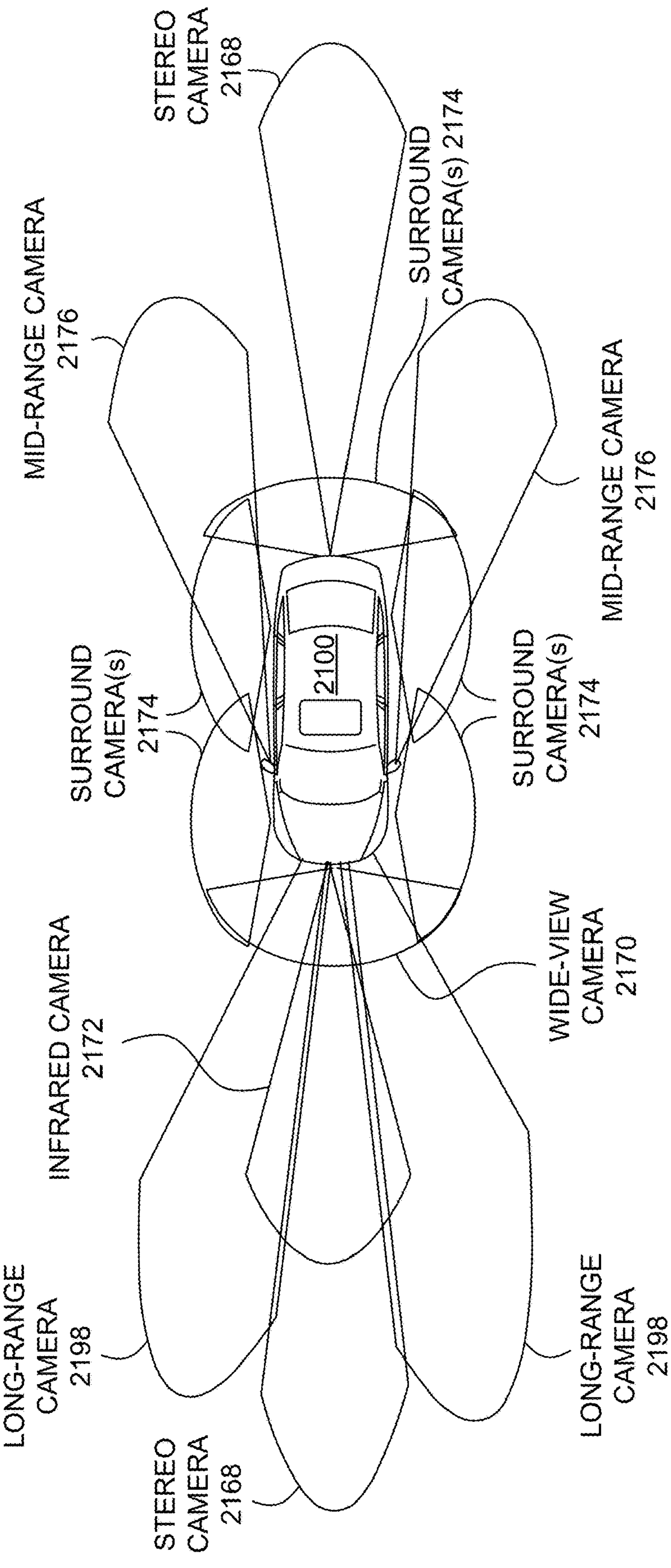
FIG. 21B illustrates an example of camera locations and fields of view for the autonomous vehicle of FIG. 21A, according to at least one embodiment.

FIG. 21B illustrates an example of camera locations and fields of view for autonomous vehicle 2100 of FIG. 21A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 2100.

In at least one embodiment, camera types for cameras may include, but are not limited to, digital cameras that may be adapted for use with components and/or systems of vehicle 2100. Camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cabin at least one embodiment.

In at least one embodiment, cameras with a field of view that include portions of environment in front of vehicle 2100 (e.g., front-facing cameras) may be used for surround view, to help identify forward facing paths and obstacles, as well as aid in, with help of one or more of controllers 2136 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 2170 may be used to perceive objects coming into view from periphery (e.g., pedestrians, crossing traffic or bicycles). Although only one wide-view camera 2170 is illustrated in FIG. 21B, in other embodiments, there may be any number (including zero) of wide-view camera(s) 2170 on vehicle 2100. In at least one embodiment, any number of long-range camera(s) 2198 (e.g., a long-view stereo camera pair) may be used for depth-based object detection, especially for objects for which a neural network has not yet been trained. In at least one embodiment, long-range camera(s) 2198 may also be used for object detection and classification, as well as basic object tracking.

In at least one embodiment, any number of stereo camera(s) 2168 may also be included in a front-facing configuration. In at least one embodiment, one or more of stereo camera(s) 2168 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 2100, including a distance estimate for all points in image. In at least one embodiment, one or more of stereo camera(s) 2168 may include, without limitation, compact stereo vision sensor(s) that may include, without limitation, two camera lenses (one each on left and right) and an image processing chip that may measure distance from vehicle 2100 to target object and use generated information (e.g., metadata) to activate autonomous emergency braking and lane departure warning functions. In at least one embodiment, other types of stereo camera(s) 2168 may be used in addition to, or alternatively from, those described herein.

In at least one embodiment, cameras with a field of view that include portions of environment to side of vehicle 2100 (e.g., side-view cameras) may be used for surround view, providing information used to create and update occupancy grid, as well as to generate side impact collision warnings. For example, in at least one embodiment, surround camera(s) 2174 (e.g., four surround cameras 2174 as illustrated in FIG. 21B) could be positioned on vehicle 2100. Surround camera(s) 2174 may include, without limitation, any number and combination of wide-view camera(s) 2170, fisheye camera(s), 360 degree camera(s), and/or like. For instance, in at least one embodiment, four fisheye cameras may be positioned on front, rear, and sides of vehicle 2100. In at least one embodiment, vehicle 2100 may use three surround camera(s) 2174 (e.g., left, right, and rear), and may leverage one or more other camera(s) (e.g., a forward-facing camera) as a fourth surround-view camera.

In at least one embodiment, cameras with a field of view that include portions of environment to rear of vehicle 2100 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 2198 and/or mid-range camera(s) 2176, stereo camera(s) 2168, infrared camera(s) 2172, etc.), as described herein.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in a system of FIG. 21B for inferencing or predicting operations based, at least in part, on weight parameters calculated using neural network training operations, neural network functions and/or architectures, or neural network use cases described herein.

In at least one embodiment, a system of FIG. 21B is utilized to implement a discriminator that is trained to infer a viewpoint and a set of appearance attributes from an input image. In at least one embodiment, a system of FIG. 21B is utilized to implement a generator that is trained to generate an image based on an input viewpoint and an input set of appearance parameters. In at least one embodiment, a system of FIG. 21B is utilized to implement one or more neural networks comprising a discriminator and a generator, and a system of FIG. 21B is utilized in connection with one or more processes that train one or more neural networks to identify an orientation of an object within an image in a self-supervised manner by at least computing one or more loss functions as part of training that evaluate one or more characteristics of images of a training set.

Figure 21C:
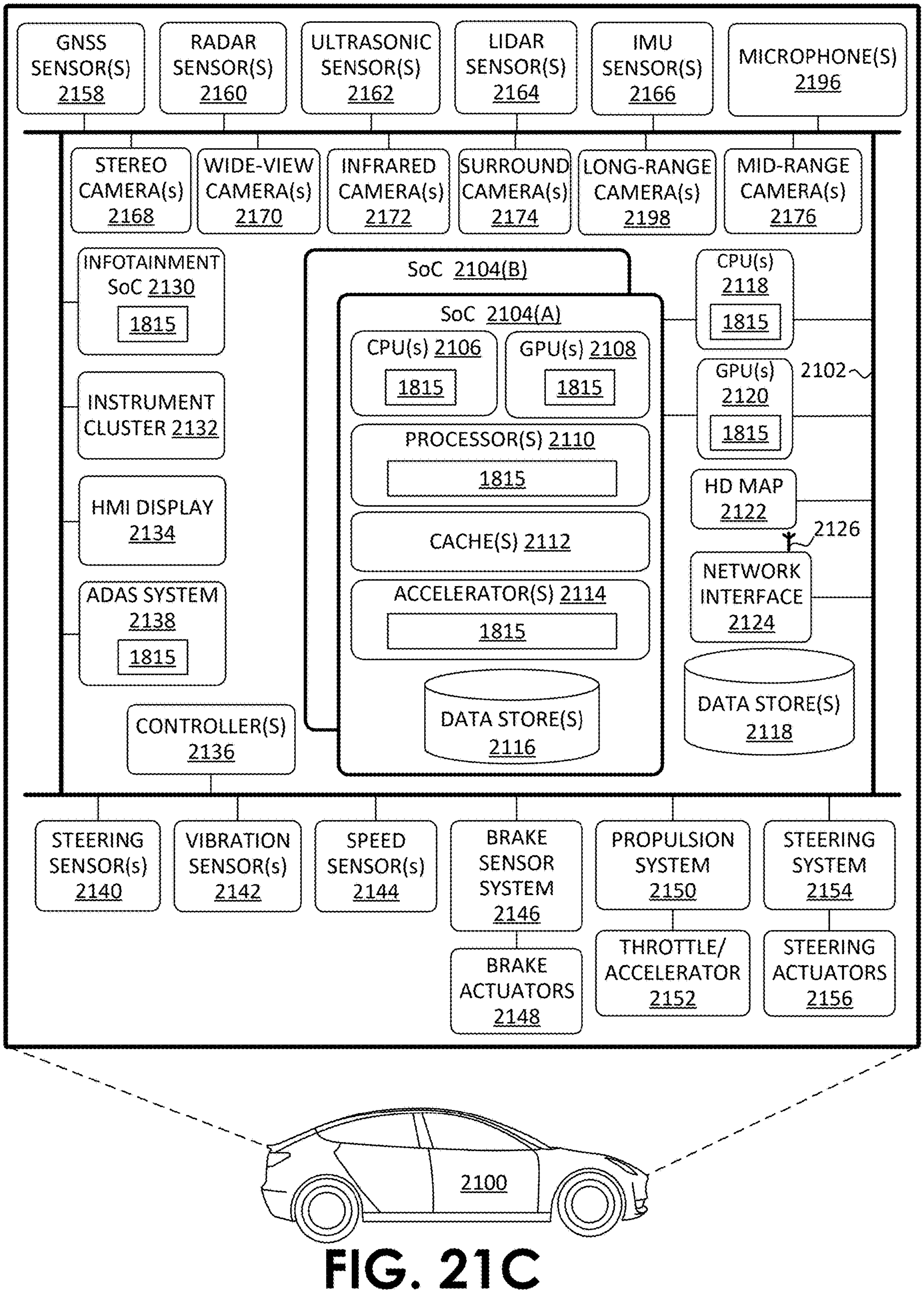
FIG. 21C is a block diagram illustrating an example system architecture for the autonomous vehicle of FIG. 21A, according to at least one embodiment.

FIG. 21C is a block diagram illustrating an example system architecture for autonomous vehicle 2100 of FIG.

21A, according to at least one embodiment. In at least one embodiment, each of components, features, and systems of vehicle 2100 in FIG. 21C are illustrated as being connected via a bus 2102. In at least one embodiment, bus 2102 may include, without limitation, a CAN data interface (alternatively referred to herein as a "CAN bus"). In at least one embodiment, a CAN may be a network inside vehicle 2100 used to aid in control of various features and functionality of vehicle 2100, such as actuation of brakes, acceleration, braking, steering, windshield wipers, etc. In at least one embodiment, bus 2102 may be configured to have dozens or even hundreds of nodes, each with its own unique identifier (e.g., a CAN ID). In at least one embodiment, bus 2102 may be read to find steering wheel angle, ground speed, engine revolutions per minute ("RPMs"), button positions, and/or other vehicle status indicators. In at least one embodiment, bus 2102 may be a CAN bus that is ASIL B compliant.

In at least one embodiment, in addition to, or alternatively from CAN, FlexRay and/or Ethernet may be used. In at least one embodiment, there may be any number of busses 2102, which may include, without limitation, zero or more CAN busses, zero or more FlexRay busses, zero or more Ethernet busses, and/or zero or more other types of busses using a different protocol. In at least one embodiment, two or more busses 2102 may be used to perform different functions, and/or may be used for redundancy. For example, a first bus 2102 may be used for collision avoidance functionality and a second bus 2102 may be used for actuation control. In at least one embodiment, each bus 2102 may communicate with any of components of vehicle 2100, and two or more busses 2102 may communicate with same components. In at least one embodiment, each of any number of system(s) on chip(s) ("SoC(s)") 2104 (e.g., SoC 2104(A), SoC 2104(B), etc.), each of controller(s) 2136, and/or each computer within vehicle may have access to same input data (e.g., inputs from sensors of vehicle 2100), and may be connected to a common bus, such CAN bus.

In at least one embodiment, vehicle 2100 may include one or more controller(s) 2136, such as those described herein with respect to FIG. 21A. Controller(s) 2136 may be used for a variety of functions. In at least one embodiment, controller(s) 2136 may be coupled to any of various other components and systems of vehicle 2100, and may be used for control of vehicle 2100, artificial intelligence of vehicle 2100, infotainment for vehicle 2100, and/or like.

In at least one embodiment, vehicle 2100 may include any number of SoCs 2104. Each of SoCs 2104 may include, without limitation, central processing units ("CPU(s)") 2106, graphics processing units ("GPU(s)") 2108, processor(s) 2110, cache(s) 2112, accelerator(s) 2114, data store(s) 2116, and/or other components and features not illustrated. In at least one embodiment, SoC(s) 2104 may be used to control vehicle 2100 in a variety of platforms and systems. For example, in at least one embodiment, SoC(s) 2104 may be combined in a system (e.g., system of vehicle 2100) with a High Definition ("HD") map 2122 which may obtain map refreshes and/or updates via network interface 2124 from one or more servers (not shown in FIG. 21C).

In at least one embodiment, CPU(s) 2106 may include a CPU cluster or CPU complex (alternatively referred to herein as a "CCPLEX"). In at least one embodiment, CPU(s) 2106 may include multiple cores and/or level two ("L2") caches. For instance, in at least one embodiment, CPU(s) 2106 may include eight cores in a coherent multi-processor configuration. In at least one embodiment, CPU(s) 2106 may include four dual-core clusters where each cluster has a dedicated L2 cache (e.g., a 2 MB L2 cache). In at least one embodiment, CPU(s) 2106 (e.g., CCPLEX) may be configured to support simultaneous cluster operation enabling any combination of clusters of CPU(s) 2106 to be active at any given time.

In at least one embodiment, one or more of CPU(s) 2106 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 2106 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 2108 may include an integrated GPU (alternatively referred to herein as an "iGPU"). In at least one embodiment, GPU(s) 2108 may be programmable and may be efficient for parallel workloads. In at least one embodiment, GPU(s) 2108, in at least one embodiment, may use an enhanced tensor instruction set. In on embodiment, GPU(s) 2108 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 2108 may include at least eight streaming microprocessors. In at least one embodiment, GPU(s) 2108 may use compute application programming interface(s) (API(s)). In at least one embodiment, GPU(s) 2108 may use one or more parallel computing platforms and/or programming models (e.g., NVIDIA's CUDA).

In at least one embodiment, one or more of GPU(s) 2108 may be power-optimized for best performance in automotive and embedded use cases. For example, in on embodiment, GPU(s) 2108 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 2108 may include a high bandwidth memory ("HBM) and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 2108 may include unified memory technology. In at least one embodiment, address translation services ("ATS") support may be used to allow GPU(s) 2108 to access CPU(s) 2106 page tables directly. In at least one embodiment, embodiment, when GPU(s) 2108 memory management unit ("MMU") experiences a miss, an address translation request may be transmitted to CPU(s) 2106. In response, CPU(s) 2106 may look in its page tables for virtual-to-physical mapping for address and transmits translation back to GPU(s) 2108, in at least one embodiment. In at least one embodiment, unified memory technology may allow a single unified virtual address space for memory of both CPU(s) 2106 and GPU(s) 2108, thereby simplifying GPU(s) 2108 programming and porting of applications to GPU(s) 2108.

In at least one embodiment, GPU(s) 2108 may include any number of access counters that may keep track of frequency of access of GPU(s) 2108 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 2104 may include any number of cache(s) 2112, including those described herein. For example, in at least one embodiment, cache(s) 2112 could include a level three ("L3") cache that is available to both CPU(s) 2106 and GPU(s) 2108 (e.g., that is connected both CPU(s) 2106 and GPU(s) 2108). In at least one embodiment, cache(s) 2112 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 2104 may include one or more accelerator(s) 2114 (e.g., hardware accelerators, software accelerators, or a combination thereof). In at least one embodiment, SoC(s) 2104 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 2108 and to off-load some of tasks of GPU(s) 2108 (e.g., to free up more cycles of GPU(s) 2108 for performing other tasks). In at least one embodiment, accelerator(s) 2114 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 2114 (e.g., hardware acceleration cluster) may include a deep learning accelerator(s) ("DLA"). DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 2196; a CNN for facial recognition and vehicle owner identification using data from camera sensors; and/or a CNN for security and/or safety related events.

In at least one embodiment, DLA(s) may perform any function of GPU(s) 2108, and by using an inference accelerator, for example, a designer may target either DLA(s) or GPU(s) 2108 for any function. For example, in at least one embodiment, designer may focus processing of CNNs and floating point operations on DLA(s) and leave other functions to GPU(s) 2108 and/or other accelerator(s) 2114.

In at least one embodiment, accelerator(s) 2114 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 2138, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 2106. In at least one embodiment, DMA may support any number of features used to provide optimization to PVA including, but not limited to, supporting multidimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 2114 (e.g., hardware acceleration cluster) may include a computer vision network on-chip and static random-access memory ("SRAM"), for providing a high-bandwidth, low latency SRAM for accelerator(s) 2114. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 2104 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 2114 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 2100, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 2166 that correlates with vehicle 2100 orientation, distance, 3D location estimates of object obtained from neural network and/or other sensors (e.g., LIDAR sensor(s) 2164 or RADAR sensor(s) 2160), among others.

In at least one embodiment, one or more of SoC(s) 2104 may include data store(s) 2116 (e.g., memory). In at least one embodiment, data store(s) 2116 may be on-chip memory of SoC(s) 2104, which may store neural networks to be executed on GPU(s) 2108 and/or DLA. In at least one embodiment, data store(s) 2116 may be large enough in capacity to store multiple instances of neural networks for redundancy and safety. In at least one embodiment, data store(s) 2112 may comprise L2 or L3 cache(s).

In at least one embodiment, one or more of SoC(s) 2104 may include any number of processor(s) 2110 (e.g., embedded processors). Processor(s) 2110 may include a boot and power management processor that may be a dedicated processor and subsystem to handle boot power and management functions and related security enforcement. In at least one embodiment, boot and power management processor may be a part of SoC(s) 2104 boot sequence and may provide runtime power management services. In at least one embodiment, boot power and management processor may provide clock and voltage programming, assistance in system low power state transitions, management of SoC(s) 2104 thermals and temperature sensors, and/or management of SoC(s) 2104 power states. In at least one embodiment, each temperature sensor may be implemented as a ring-oscillator whose output frequency is proportional to temperature, and SoC(s) 2104 may use ring-oscillators to detect temperatures of CPU(s) 2106, GPU(s) 2108, and/or accelerator(s) 2114. In at least one embodiment, if temperatures are determined to exceed a threshold, then boot and power management processor may enter a temperature fault routine and put SoC(s) 2104 into a lower power state and/or put vehicle 2100 into a chauffeur to safe stop mode (e.g., bring vehicle 2100 to a safe stop).

In at least one embodiment, processor(s) 2110 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 2110 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 2110 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 2110 may further include a real-time camera engine that may include, without limitation, a dedicated processor subsystem for handling real-time camera management. In at least one embodiment, processor(s) 2110 may further include a high-dynamic range signal processor that may include, without limitation, an image signal processor that is a hardware engine that is part of camera processing pipeline.

In at least one embodiment, processor(s) 2110 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 2170, surround camera(s) 2174, and/or on in-cabin monitoring camera sensor(s). In at least one embodiment, in-cabin monitoring camera sensor(s) are preferably monitored by a neural network running on another instance of SoC 2104, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 2108 are not required to continuously render new surfaces. In at least one embodiment, when GPU(s) 2108 are powered on and active doing 3D rendering, video image compositor may be used to offload GPU(s) 2108 to improve performance and responsiveness.

In at least one embodiment, one or more of SoC(s) 2104 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 2104 may further include an input/output controller(s) that may be controlled by software and may be used for receiving I/O signals that are uncommitted to a specific role.

In at least one embodiment, one or more of SoC(s) 2104 may further include a broad range of peripheral interfaces to enable communication with peripherals, audio encoders/ decoders ("codecs"), power management, and/or other devices. SoC(s) 2104 may be used to process data from cameras (e.g., connected over Gigabit Multimedia Serial Link and Ethernet), sensors (e.g., LIDAR sensor(s) 2164, RADAR sensor(s) 2160, etc. that may be connected over Ethernet), data from bus 2102 (e.g., speed of vehicle 2100, steering wheel position, etc.), data from GNSS sensor(s) 2158 (e.g., connected over Ethernet or CAN bus), etc. In at least one embodiment, one or more of SoC(s) 2104 may further include dedicated high-performance mass storage controllers that may include their own DMA engines, and that may be used to free CPU(s) 2106 from routine data management tasks.

In at least one embodiment, SoC(s) 2104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 2104 may be faster, more reliable, and even more energy-efficient and space-efficient than conventional systems. For example, in at least one embodiment, accelerator(s) 2114, when combined with CPU(s) 2106, GPU(s) 2108, and data store(s) 2116, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 2120) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 2108.

In at least one embodiment, a CNN for facial recognition and vehicle owner identification may use data from camera sensors to identify presence of an authorized driver and/or owner of vehicle 2100. In at least one embodiment, an always on sensor processing engine may be used to unlock vehicle when owner approaches driver door and turn on lights, and, in security mode, to disable vehicle when owner leaves vehicle. In this way, SoC(s) 2104 provide for security against theft and/or carjacking.

In at least one embodiment, a CNN for emergency vehicle detection and identification may use data from microphones 2196 to detect and identify emergency vehicle sirens. In at least one embodiment, SoC(s) 2104 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 2158. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 2162, until emergency vehicle(s) passes.

In at least one embodiment, vehicle 2100 may include CPU(s) 2118 (e.g., discrete CPU(s), or dCPU(s)), that may be coupled to SoC(s) 2104 via a high-speed interconnect (e.g., PCIe). In at least one embodiment, CPU(s) 2118 may include an X86 processor, for example. CPU(s) 2118 may be used to perform any of a variety of functions, including arbitrating potentially inconsistent results between ADAS sensors and SoC(s) 2104, and/or monitoring status and health of controller(s) 2136 and/or an infotainment system on a chip ("infotainment SoC") 2130, for example.

In at least one embodiment, vehicle 2100 may include GPU(s) 2120 (e.g., discrete GPU(s), or dGPU(s)), that may be coupled to SoC(s) 2104 via a high-speed interconnect (e.g., NVIDIA's NVLINK). In at least one embodiment, GPU(s) 2120 may provide additional artificial intelligence functionality, such as by executing redundant and/or different neural networks, and may be used to train and/or update neural networks based at least in part on input (e.g., sensor data) from sensors of vehicle 2100.

In at least one embodiment, vehicle 2100 may further include network interface 2124 which may include, without limitation, wireless antenna(s) 2126 (e.g., one or more wireless antennas 2126 for different communication protocols, such as a cellular antenna, a Bluetooth antenna, etc.). In at least one embodiment, network interface 2124 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 210 and other vehicle and/or an indirect link may be established (e.g., across networks and over Internet). In at least one embodiment, direct links may be provided using a vehicle-to-vehicle communication link.

Vehicle-to-vehicle communication link may provide vehicle 2100 information about vehicles in proximity to vehicle 2100 (e.g., vehicles in front of, on side of, and/or behind vehicle 2100). In at least one embodiment, aforementioned functionality may be part of a cooperative adaptive cruise control functionality of vehicle 2100.

In at least one embodiment, network interface 2124 may include an SoC that provides modulation and demodulation functionality and enables controller(s) 2136 to communicate over wireless networks. In at least one embodiment, network interface 2124 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 2100 may further include data store(s) 2128 which may include, without limitation, off-chip (e.g., off SoC(s) 2104) storage. In at least one embodiment, data store(s) 2128 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 2100 may further include GNSS sensor(s) 2158 (e.g., GPS and/or assisted GPS sensors), to assist in mapping, perception, occupancy grid generation, and/or path planning functions. In at least one embodiment, any number of GNSS sensor(s) 2158 may be used, including, for example and without limitation, a GPS using a USB connector with an Ethernet to Serial (e.g., RS-232) bridge.

In at least one embodiment, vehicle 2100 may further include RADAR sensor(s) 2160. RADAR sensor(s) 2160 may be used by vehicle 2100 for long-range vehicle detection, even in darkness and/or severe weather conditions. In at least one embodiment, RADAR functional safety levels may be ASIL B. RADAR sensor(s) 2160 may use CAN and/or bus 2102 (e.g., to transmit data generated by RADAR sensor(s) 2160) for control and to access object tracking data, with access to Ethernet to access raw data in some examples. In at least one embodiment, wide variety of RADAR sensor types may be used. For example, and without limitation, RADAR sensor(s) 2160 may be suitable for front, rear, and side RADAR use. In at least one embodiment, one or more of RADAR sensors(s) 2160 are Pulse Doppler RADAR sensor(s).

In at least one embodiment, RADAR sensor(s) 2160 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 2160 may help in distinguishing between static and moving objects, and may be used by ADAS system 2138 for emergency brake assist and forward collision warning. Sensors 2160(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 2100 surroundings at higher speeds with minimal interference from traffic in adjacent lanes. In at least one embodiment, other two antennae may expand field of view, making it possible to quickly detect vehicles entering or leaving vehicle's 2100 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 2160 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 2138 for blind spot detection and/or lane change assist.

In at least one embodiment, vehicle 2100 may further include ultrasonic sensor(s) 2162. Ultrasonic sensor(s) 2162, which may be positioned at front, back, and/or sides of vehicle 2100, may be used for park assist and/or to create and update an occupancy grid. In at least one embodiment, a wide variety of ultrasonic sensor(s) 2162 may be used, and different ultrasonic sensor(s) 2162 may be used for different ranges of detection (e.g., 2.5 m, 4 m). In at least one embodiment, ultrasonic sensor(s) 2162 may operate at functional safety levels of ASIL B.

In at least one embodiment, vehicle 2100 may include LIDAR sensor(s) 2164. LIDAR sensor(s) 2164 may be used for object and pedestrian detection, emergency braking, collision avoidance, and/or other functions. In at least one embodiment, LIDAR sensor(s) 2164 may be functional safety level ASIL B. In at least one embodiment, vehicle 2100 may include multiple LIDAR sensors 2164 (e.g., two, four, six, etc.) that may use Ethernet (e.g., to provide data to a Gigabit Ethernet switch).

In at least one embodiment, LIDAR sensor(s) 2164 may be capable of providing a list of objects and their distances for a 360-degree field of view. In at least one embodiment, commercially available LIDAR sensor(s) 2164 may have an advertised range of approximately 100 m, with an accuracy of 2 cm-3 cm, and with support for a 100 Mbps Ethernet connection, for example. In at least one embodiment, one or more non-protruding LIDAR sensors 2164 may be used. In such an embodiment, LIDAR sensor(s) 2164 may be implemented as a small device that may be embedded into front, rear, sides, and/or corners of vehicle 2100. In at least one embodiment, LIDAR sensor(s) 2164, in such an embodiment, may provide up to a 120-degree horizontal and 35-degree vertical field-of-view, with a 200 m range even for low-reflectivity objects. In at least one embodiment, front-mounted LIDAR sensor(s) 2164 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 2100 up to approximately 200 m. In at least one embodiment, a flash LIDAR unit includes, without limitation, a receptor, which records laser pulse transit time and reflected light on each pixel, which in turn corresponds to range from vehicle 2100 to objects. In at least one embodiment, flash LIDAR may allow for highly accurate and distortion-free images of surroundings to be generated with every laser flash. In at least one embodiment, four flash LIDAR sensors may be deployed, one at each side of vehicle 2100. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 2166. In at least one embodiment, IMU sensor(s) 2166 may be located at a center of rear axle of vehicle 2100, in at least one embodiment. In at least one embodiment, IMU sensor(s) 2166 may include, for example and without limitation, accelerometer(s), magnetometer(s), gyroscope(s), magnetic compass(es), and/or other sensor types. In at least one embodiment, such as in six-axis applications, IMU sensor(s) 2166 may include, without limitation, accelerometers and gyroscopes. In at least one embodiment, such as in nine-axis applications, IMU sensor(s) 2166 may include, without limitation, accelerometers, gyroscopes, and magnetometers.

In at least one embodiment, IMU sensor(s) 2166 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 2166 may enable vehicle 2100 to estimate heading without requiring input from a magnetic sensor by directly observing and correlating changes in velocity from GPS to IMU sensor(s) 2166. In at least one embodiment, IMU sensor(s) 2166 and GNSS sensor(s) 2158 may be combined in a single integrated unit.

In at least one embodiment, vehicle 2100 may include microphone(s) 2196 placed in and/or around vehicle 2100. In at least one embodiment, microphone(s) 2196 may be used for emergency vehicle detection and identification, among other things.

In at least one embodiment, vehicle 2100 may further include any number of camera types, including stereo camera(s) 2168, wide-view camera(s) 2170, infrared camera(s) 2172, surround camera(s) 2174, long-range camera(s) 2198, mid-range camera(s) 2176, and/or other camera types. In at least one embodiment, cameras may be used to capture image data around an entire periphery of vehicle 2100. In at least one embodiment, types of cameras used depends vehicle 2100. In at least one embodiment, any combination of camera types may be used to provide necessary coverage around vehicle 2100. In at least one embodiment, number of cameras may differ depending on embodiment. For example, in at least one embodiment, vehicle 2100 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 21A and FIG. 21B.

In at least one embodiment, vehicle 2100 may further include vibration sensor(s) 2142. Vibration sensor(s) 2142 may measure vibrations of components of vehicle 2100, such as axle(s). For example, in at least one embodiment, changes in vibrations may indicate a change in road surfaces. In at least one embodiment, when two or more vibration sensors 2142 are used, differences between vibrations may be used to determine friction or slippage of road surface (e.g., when difference in vibration is between a power-driven axle and a freely rotating axle).

In at least one embodiment, vehicle 2100 may include ADAS system 2138. ADAS system 2138 may include, without limitation, an SoC, in some examples. In at least one embodiment, ADAS system 2138 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 2160, LIDAR sensor(s) 2164, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 2100 and automatically adjust speed of vehicle 2100 to maintain a safe distance from vehicles ahead. In at least one embodiment, lateral ACC system performs distance keeping, and advises vehicle 2100 to change lanes when necessary. In at least one embodiment, lateral ACC is related to other ADAS applications such as LC and CW.

In at least one embodiment, CACC system uses information from other vehicles that may be received via network interface 2124 and/or wireless antenna(s) 2126 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 2100), while I2V communication concept provides information about traffic further ahead. In at least one embodiment, CACC system may include either or both I2V and V2V information sources. In at least one embodiment, given information of vehicles ahead of vehicle 2100, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 2160, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 2160, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 2100 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 2100 if vehicle 2100 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 2160, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 2100 is backing up. In at least one embodiment, RCTW system includes AEB system to ensure that vehicle brakes are applied to avoid a crash. In at least one embodiment, RCTW system may use one or more rear-facing RADAR sensor(s) 2160, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 2100 itself decides, in case of conflicting results, whether to heed result from a primary computer or a secondary computer (e.g., first controller 2136 or second controller 2136). For example, in at least one embodiment, ADAS system 2138 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 2138 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 2104.

In at least one embodiment, ADAS system 2138 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 2138 may be fed into primary computer's perception block and/or primary computer's dynamic driving task block. For example, in at least one embodiment, if ADAS system 2138 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 2100 may further include infotainment SoC 2130 (e.g., an in-vehicle infotainment system (M)). Although illustrated and described as an SoC, infotainment system 2130, in at least one embodiment, may not be an SoC, and may include, without limitation, two or more discrete components. In at least one embodiment, infotainment SoC 2130 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 2100. For example, infotainment SoC 2130 could include radios, disk players, navigation systems, video players, USB and Bluetooth connectivity, carputers, in-car entertainment, WiFi, steering wheel audio controls, hands free voice control, a heads-up display ("HUD"), HMI display 2134, a telematics device, a control panel (e.g., for controlling and/or interacting with various components, features, and/or systems), and/or other components. In at least one embodiment, infotainment SoC 2130 may further be used to provide information (e.g., visual and/or audible) to user(s) of vehicle, such as information from ADAS system 2138, autonomous driving information such as planned vehicle maneuvers, trajectories, surrounding environment information (e.g., intersection information, vehicle information, road information, etc.), and/or other information.

In at least one embodiment, infotainment SoC 2130 may include any amount and type of GPU functionality. In at least one embodiment, infotainment SoC 2130 may communicate over bus 2102 (e.g., CAN bus, Ethernet, etc.) with other devices, systems, and/or components of vehicle 2100. In at least one embodiment, infotainment SoC 2130 may be coupled to a supervisory MCU such that GPU of infotainment system may perform some self-driving functions in event that primary controller(s) 2136 (e.g., primary and/or backup computers of vehicle 2100) fail. In at least one embodiment, infotainment SoC 2130 may put vehicle 2100 into a chauffeur to safe stop mode, as described herein.

In at least one embodiment, vehicle 2100 may further include instrument cluster 2132 (e.g., a digital dash, an electronic instrument cluster, a digital instrument panel, etc.). Instrument cluster 2132 may include, without limitation, a controller and/or supercomputer (e.g., a discrete controller or supercomputer). In at least one embodiment, instrument cluster 2132 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 2130 and instrument cluster 2132. In at least one embodiment, instrument cluster 2132 may be included as part of infotainment SoC 2130, or vice versa.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in a system of FIG. 21C for inferencing or predicting operations based, at least in part, on weight parameters calculated using neural network training operations, neural network functions and/or architectures, or neural network use cases described herein.

In at least one embodiment, a system of FIG. 21C is utilized to implement a discriminator that is trained to infer a viewpoint and a set of appearance attributes from an input image. In at least one embodiment, a system of FIG. 21C is utilized to implement a generator that is trained to generate an image based on an input viewpoint and an input set of appearance parameters. In at least one embodiment, a system of FIG. 21C is utilized to implement one or more neural networks comprising a discriminator and a generator, and a system of FIG. 21C is utilized in connection with one or more processes that train one or more neural networks to identify an orientation of an object within an image in a self-supervised manner by at least computing one or more loss functions as part of training that evaluate one or more characteristics of images of a training set.

Figure 21D:
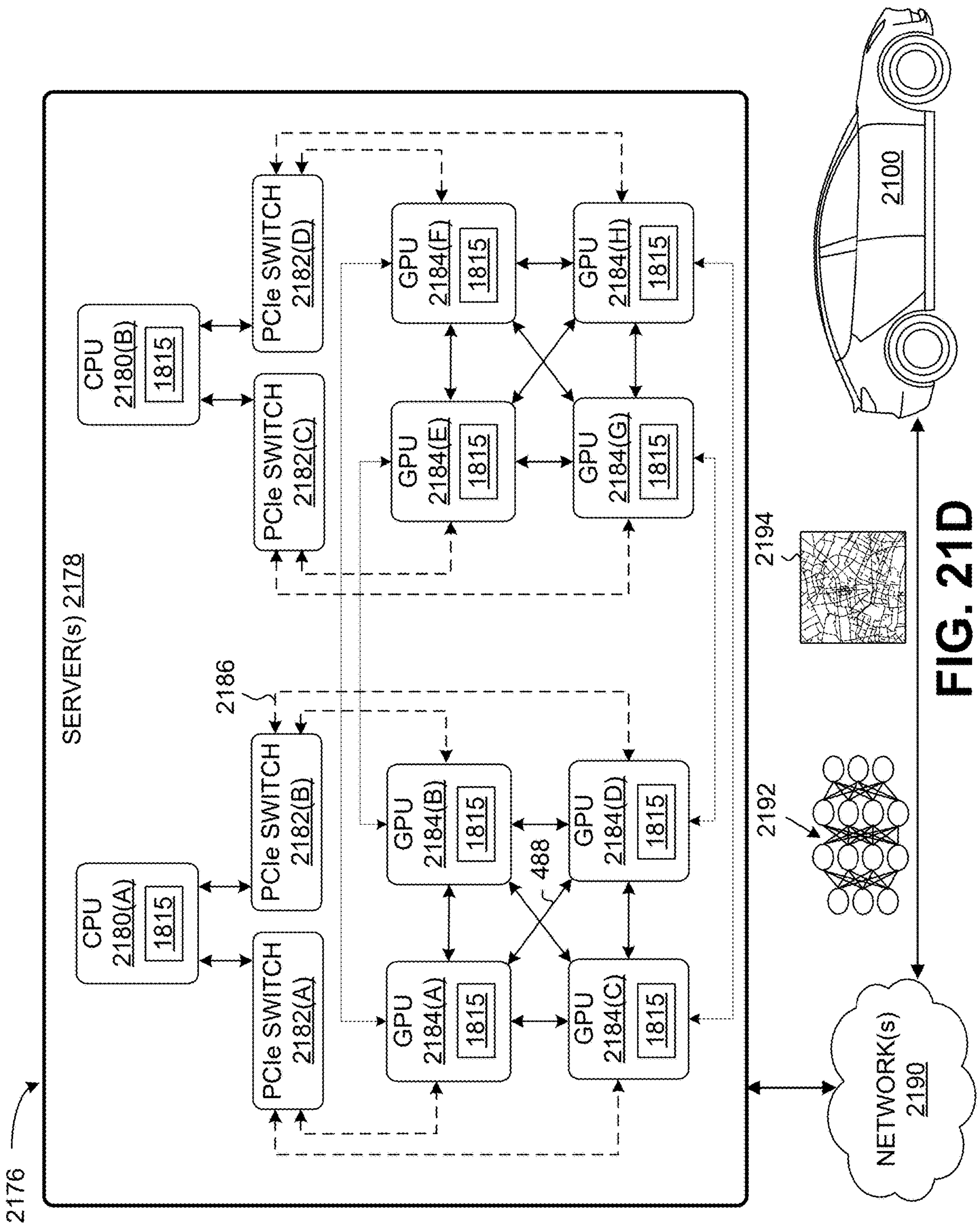
FIG. 21D is a diagram illustrating a system for communication between cloud-based server(s) and the autonomous vehicle of FIG. 21A, according to at least one embodiment.

FIG. 21D is a diagram of a system 2176 for communication between cloud-based server(s) and autonomous vehicle 2100 of FIG. 21A, according to at least one embodiment. In at least one embodiment, system 2176 may include, without limitation, server(s) 2178, network(s) 2190, and any number and type of vehicles, including vehicle 2100. Server(s) 2178 may include, without limitation, a plurality of GPUs 2184(A)-2184(H) (collectively referred to herein as GPUs 2184), PCIe switches 2182(A)-2182(H) (collectively referred to herein as PCIe switches 2182), and/or CPUs 2180(A)-2180(B) (collectively referred to herein as CPUs 2180). GPUs 2184, CPUs 2180, and PCIe switches 2182 may be interconnected with high-speed interconnects such as, for example and without limitation, NVLink interfaces 2188 developed by NVIDIA and/or PCIe connections 2186. In at least one embodiment, GPUs 2184 are connected via an NVLink and/or NVSwitch SoC and GPUs 2184 and PCIe switches 2182 are connected via PCIe interconnects. In at least one embodiment, although eight GPUs 2184, two CPUs 2180, and four PCIe switches 2182 are illustrated, this is not intended to be limiting. In at least one embodiment, each of server(s) 2178 may include, without limitation, any number of GPUs 2184, CPUs 2180, and/or PCIe switches 2182, in any combination. For example, in at least one embodiment, server(s) 2178 could each include eight, sixteen, thirty-two, and/or more GPUs 2184.

In at least one embodiment, server(s) 2178 may receive, over network(s) 2190 and from vehicles, image data representative of images showing unexpected or changed road conditions, such as recently commenced road-work. In at least one embodiment, server(s) 2178 may transmit, over network(s) 2190 and to vehicles, neural networks 2192, updated neural networks 2192, and/or map information 2194, including, without limitation, information regarding traffic and road conditions. In at least one embodiment, updates to map information 2194 may include, without limitation, updates for HD map 2122, such as information regarding construction sites, potholes, detours, flooding, and/or other obstructions. In at least one embodiment, neural networks 2192, updated neural networks 2192, and/or map information 2194 may have resulted from new training and/or experiences represented in data received from any number of vehicles in environment, and/or based at least in part on training performed at a data center (e.g., using server(s) 2178 and/or other servers).

In at least one embodiment, server(s) 2178 may be used to train machine learning models (e.g., neural networks) based at least in part on training data. Training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 2190, and/or machine learning models may be used by server(s) 2178 to remotely monitor vehicles.

In at least one embodiment, server(s) 2178 may receive data from vehicles and apply data to up-to-date real-time neural networks for real-time intelligent inferencing. In at least one embodiment, server(s) 2178 may include deep-learning supercomputers and/or dedicated AI computers powered by GPU(s) 2184, such as a DGX and DGX Station machines developed by NVIDIA. However, in at least one embodiment, server(s) 2178 may include deep learning infrastructure that use CPU-powered data centers.

In at least one embodiment, deep-learning infrastructure of server(s) 2178 may be capable of fast, real-time inferencing, and may use that capability to evaluate and verify health of processors, software, and/or associated hardware in vehicle 2100. For example, in at least one embodiment, deep-learning infrastructure may receive periodic updates from vehicle 2100, such as a sequence of images and/or objects that vehicle 2100 has located in that sequence of images (e.g., via computer vision and/or other machine learning object classification techniques). In at least one embodiment, deep-learning infrastructure may run its own neural network to identify objects and compare them with objects identified by vehicle 2100 and, if results do not match and deep-learning infrastructure concludes that AI in vehicle 2100 is malfunctioning, then server(s) 2178 may transmit a signal to vehicle 2100 instructing a fail-safe computer of vehicle 2100 to assume control, notify passengers, and complete a safe parking maneuver.

In at least one embodiment, server(s) 2178 may include GPU(s) 2184 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1815 are used to perform one or more embodiments. Details regarding hardware structure(s) 1815 are provided herein in conjunction with FIGS. 18A and/or 18B.

Computer Systems

Figure 22:
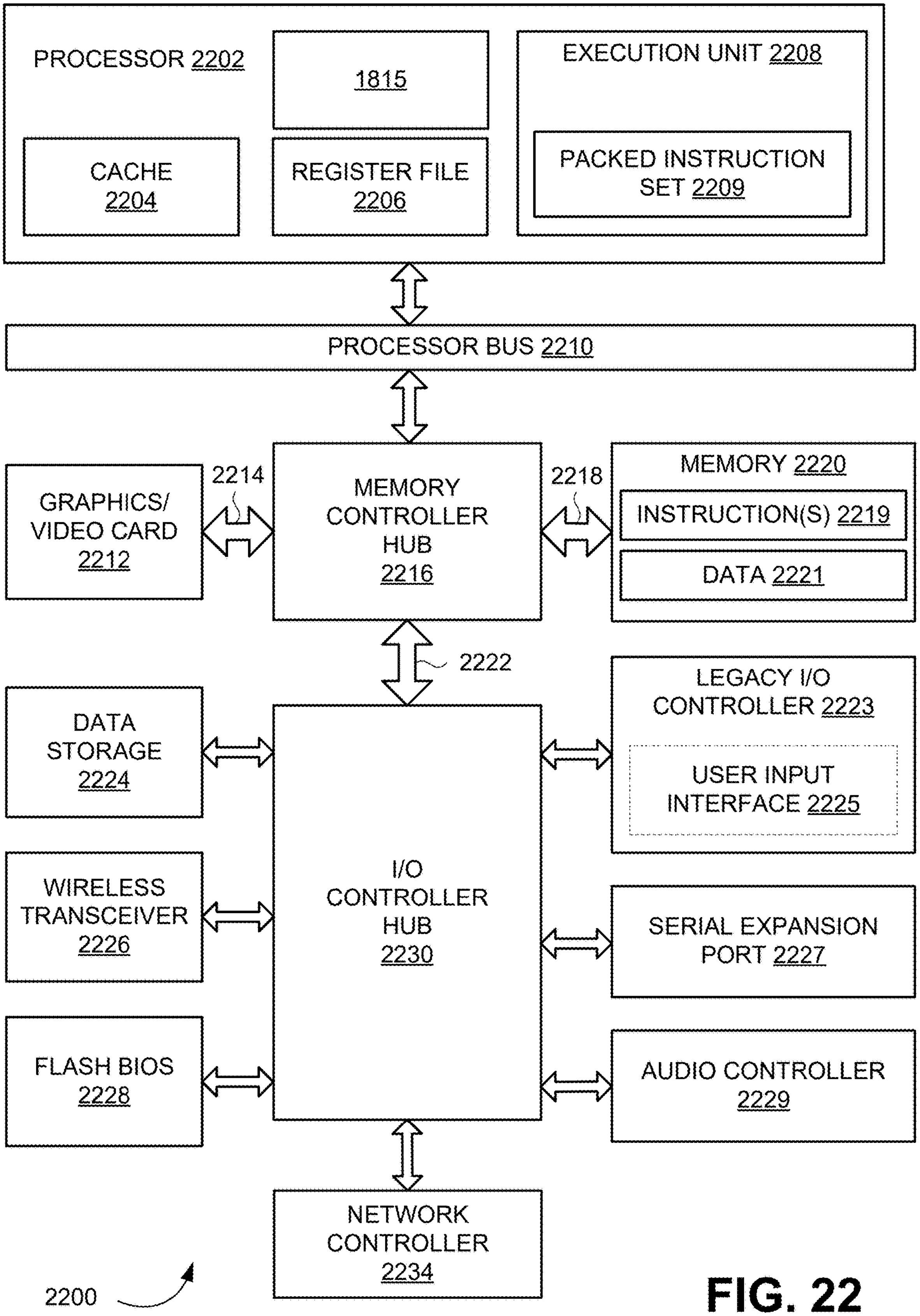
FIG. 22 is a block diagram illustrating a computer system, according to at least one embodiment.

FIG. 22 is a block diagram illustrating an exemplary computer system, which may be a system with interconnected devices and components, a system-on-a-chip (SOC) or some combination thereof 2200 formed with a processor that may include execution units to execute an instruction, according to at least one embodiment. In at least one embodiment, computer system 2200 may include, without limitation, a component, such as a processor 2202 to employ execution units including logic to perform algorithms for process data, in accordance with present disclosure, such as in embodiment described herein. In at least one embodiment, computer system 2200 may include processors, such as PENTIUM® Processor family, Xeon', Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 2200 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 2200 may include, without limitation, processor 2202 that may include, without limitation, one or more execution units 2208 to perform machine learning model training and/or inferencing according to techniques described herein. In at least one embodiment, system 22 is a single processor desktop or server system, but in another embodiment system 22 may be a multiprocessor system. In at least one embodiment, processor 2202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 2202 may be coupled to a processor bus 2210 that may transmit data signals between processor 2202 and other components in computer system 2200.

In at least one embodiment, processor 2202 may include, without limitation, a Level 1 ("L1") internal cache memory ("cache") 2204. In at least one embodiment, processor 2202 may have a single internal cache or multiple levels of internal cache. In at least one embodiment, cache memory may reside external to processor 2202. Other embodiments may also include a combination of both internal and external caches depending on particular implementation and needs. In at least one embodiment, register file 2206 may store different types of data in various registers including, without limitation, integer registers, floating point registers, status registers, and instruction pointer register.

In at least one embodiment, execution unit 2208, including, without limitation, logic to perform integer and floating point operations, also resides in processor 2202. Processor 2202 may also include a microcode ("ucode") read only memory ("ROM") that stores microcode for certain macro instructions. In at least one embodiment, execution unit 2208 may include logic to handle a packed instruction set 2209. In at least one embodiment, by including packed instruction set 2209 in instruction set of a general-purpose processor 2202, along with associated circuitry to execute instructions, operations used by many multimedia applications may be performed using packed data in a general-purpose processor 2202. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 2208 may also be used in microcontrollers, embedded processors, graphics devices, DSPs, and other types of logic circuits. In at least one embodiment, computer system 2200 may include, without limitation, a memory 2220. In at least one embodiment, memory 2220 may be implemented as a Dynamic Random Access Memory ("DRAM") device, a Static Random Access Memory ("SRAM") device, flash memory device, or other memory device. Memory 2220 may store instruction(s) 2219 and/or data 2221 represented by data signals that may be executed by processor 2202.

In at least one embodiment, system logic chip may be coupled to processor bus 2210 and memory 2220. In at least one embodiment, system logic chip may include, without limitation, a memory controller hub ("MCH") 2216, and processor 2202 may communicate with MCH 2216 via processor bus 2210. In at least one embodiment, MCH 2216 may provide a high bandwidth memory path 2218 to memory 2220 for instruction and data storage and for storage of graphics commands, data and textures. In at least one embodiment, MCH 2216 may direct data signals between processor 2202, memory 2220, and other components in computer system 2200 and to bridge data signals between processor bus 2210, memory 2220, and a system I/O 2222. In at least one embodiment, system logic chip may provide a graphics port for coupling to a graphics controller. In at least one embodiment, MCH 2216 may be coupled to memory 2220 through a high bandwidth memory path 2218 and graphics/video card 2212 may be coupled to MCH 2216 through an Accelerated Graphics Port ("AGP") interconnect 2214.

In at least one embodiment, computer system 2200 may use system I/O 2222 that is a proprietary hub interface bus to couple MCH 2216 to I/O controller hub ("ICH") 2230. In at least one embodiment, ICH 2230 may provide direct connections to some I/O devices via a local I/O bus. In at least one embodiment, local I/O bus may include, without limitation, a high-speed I/O bus for connecting peripherals to memory 2220, chipset, and processor 2202. Examples may include, without limitation, an audio controller 2229, a firmware hub ("flash BIOS") 2228, a wireless transceiver 2226, a data storage 2224, a legacy I/O controller 2223 containing user input and keyboard interfaces (e.g., 2225), a serial expansion port 2227, such as Universal Serial Bus ("USB"), and a network controller 2234. Data storage 2224 may comprise a hard disk drive, a floppy disk drive, a CD-ROM device, a flash memory device, or other mass storage device.

In at least one embodiment, FIG. 22 illustrates a system, which includes interconnected hardware devices or "chips", whereas in other embodiments, FIG. 22 may illustrate an exemplary System on a Chip ("SoC"). In at least one embodiment, devices illustrated in FIG. 22 may be interconnected with proprietary interconnects, standardized interconnects (e.g., PCIe) or some combination thereof. In at least one embodiment, one or more components of system 2200 are interconnected using compute express link (CXL) interconnects.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in a system of FIG. 22 for inferencing or predicting operations based, at least in part, on weight parameters calculated using neural network training operations, neural network functions and/or architectures, or neural network use cases described herein.

In at least one embodiment, a system of FIG. 22 is utilized to implement a discriminator that is trained to infer a viewpoint and a set of appearance attributes from an input image. In at least one embodiment, a system of FIG. 22 is utilized to implement a generator that is trained to generate an image based on an input viewpoint and an input set of appearance parameters. In at least one embodiment, a system of FIG. 22 is utilized to implement one or more neural networks comprising a discriminator and a generator, and a system of FIG. 22 is utilized in connection with one or more processes that train one or more neural networks to identify an orientation of an object within an image in a self-supervised manner by at least computing one or more loss functions as part of training that evaluate one or more characteristics of images of a training set.

Figure 23:
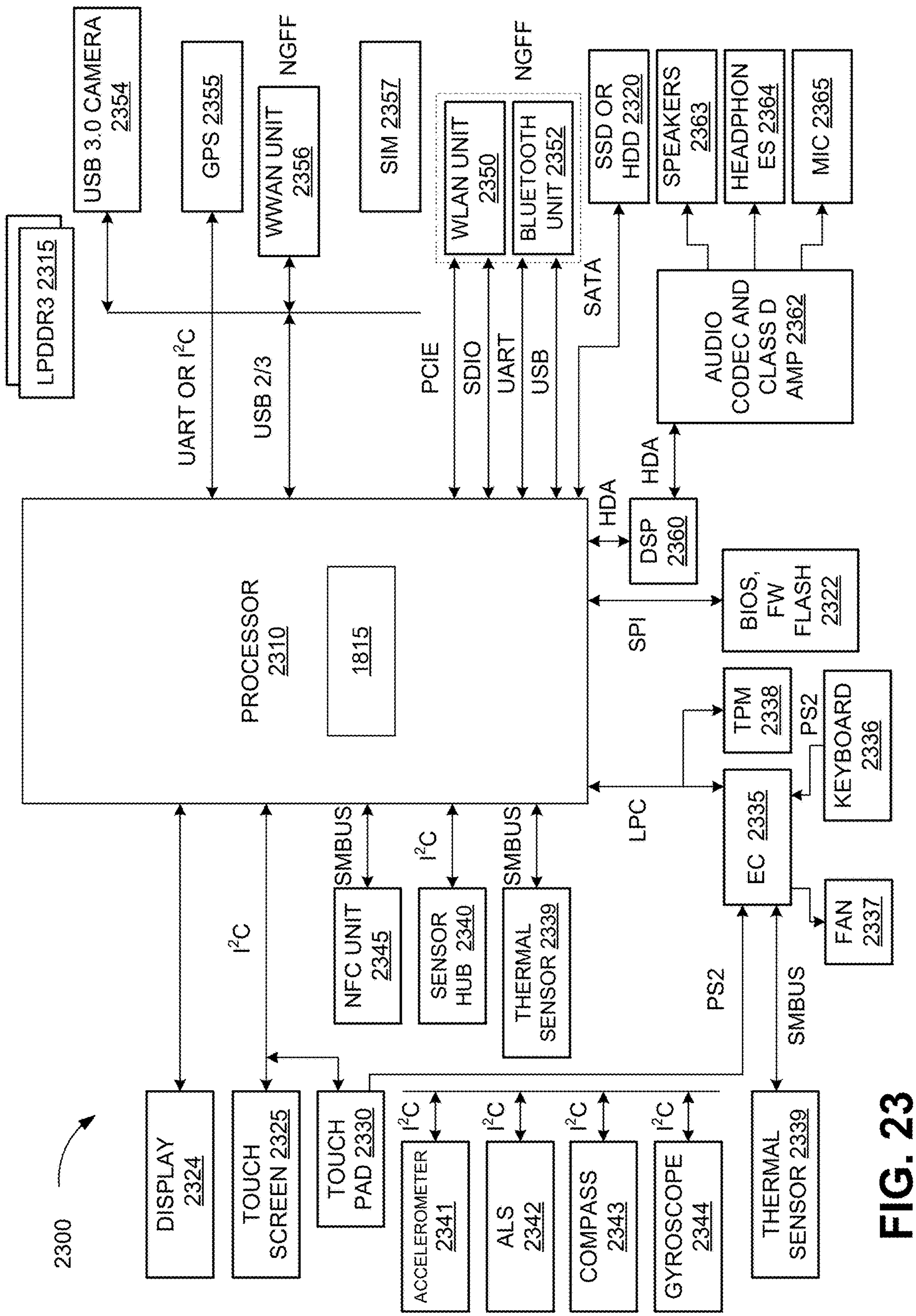
FIG. 23 is a block diagram illustrating computer system, according to at least one embodiment.

FIG. 23 is a block diagram illustrating an electronic device 2300 for utilizing a processor 2310, according to at least one embodiment. In at least one embodiment, electronic device 2300 may be, for example and without limitation, a notebook, a tower server, a rack server, a blade server, a laptop, a desktop, a tablet, a mobile device, a phone, an embedded computer, or any other suitable electronic device.

In at least one embodiment, system 2300 may include, without limitation, processor 2310 communicatively coupled to any suitable number or kind of components, peripherals, modules, or devices. In at least one embodiment, processor 2310 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 23 illustrates a system, which includes interconnected hardware devices or "chips", whereas in other embodiments, FIG. 23 may illustrate an exemplary System on a Chip ("SoC"). In at least one embodiment, devices illustrated in FIG. 23 may be interconnected with proprietary interconnects, standardized interconnects (e.g., PCIe) or some combination thereof. In at least one embodiment, one or more components of FIG. 23 are interconnected using compute express link (CXL) interconnects.

In at least one embodiment, FIG. 23 may include a display 2324, a touch screen 2325, a touch pad 2330, a Near Field Communications unit ("NFC") 2345, a sensor hub 2340, a thermal sensor 2346, an Express Chipset ("EC") 2335, a Trusted Platform Module ("TPM") 2338, BIOS/firmware/flash memory ("BIOS, FW Flash") 2322, a DSP 2360, a drive "SSD or HDD") 2320 such as a Solid State Disk ("SSD") or a Hard Disk Drive ("HDD"), a wireless local area network unit ("WLAN") 2350, a Bluetooth unit 2352, a Wireless Wide Area Network unit ("WWAN") 2356, a Global Positioning System (GPS) 2355, a camera ("USB 3.0 camera") 2354 such as a USB 3.0 camera, or a Low Power Double Data Rate ("LPDDR") memory unit ("LPDDR3") 2315 implemented in, for example, LPDDR3 standard. These components may each be implemented in any suitable manner.

In at least one embodiment, other components may be communicatively coupled to processor 2310 through components discussed above. In at least one embodiment, an accelerometer 2341, Ambient Light Sensor ("ALS") 2342, compass 2343, and a gyroscope 2344 may be communicatively coupled to sensor hub 2340. In at least one embodiment, thermal sensor 2339, a fan 2337, a keyboard 2346, and a touch pad 2330 may be communicatively coupled to EC 2335. In at least one embodiment, speaker 2363, a head-phones 2364, and a microphone ("mic") 2365 may be communicatively coupled to an audio unit ("audio codec and class d amp") 2364, which may in turn be communicatively coupled to DSP 2360. In at least one embodiment, audio unit 2364 may include, for example and without limitation, an audio coder/decoder ("codec") and a class D amplifier. In at least one embodiment, SIM card ("SIM") 2357 may be communicatively coupled to WWAN unit 2356. In at least one embodiment, components such as WLAN unit 2350 and Bluetooth unit 2352, as well as WWAN unit 2356 may be implemented in a Next Generation Form Factor ("NGFF").

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in a system of FIG. 23 for inferencing or predicting operations based, at least in part, on weight parameters calculated using neural network training operations, neural network functions and/or architectures, or neural network use cases described herein.

In at least one embodiment, a system of FIG. 23 is utilized to implement a discriminator that is trained to infer a viewpoint and a set of appearance attributes from an input image. In at least one embodiment, a system of FIG. 23 is utilized to implement a generator that is trained to generate an image based on an input viewpoint and an input set of appearance parameters. In at least one embodiment, a system of FIG. 23 is utilized to implement one or more neural networks comprising a discriminator and a generator, and a system of FIG. 23 is utilized in connection with one or more processes that train one or more neural networks to identify an orientation of an object within an image in a self-supervised manner by at least computing one or more loss functions as part of training that evaluate one or more characteristics of images of a training set.

Figure 24:
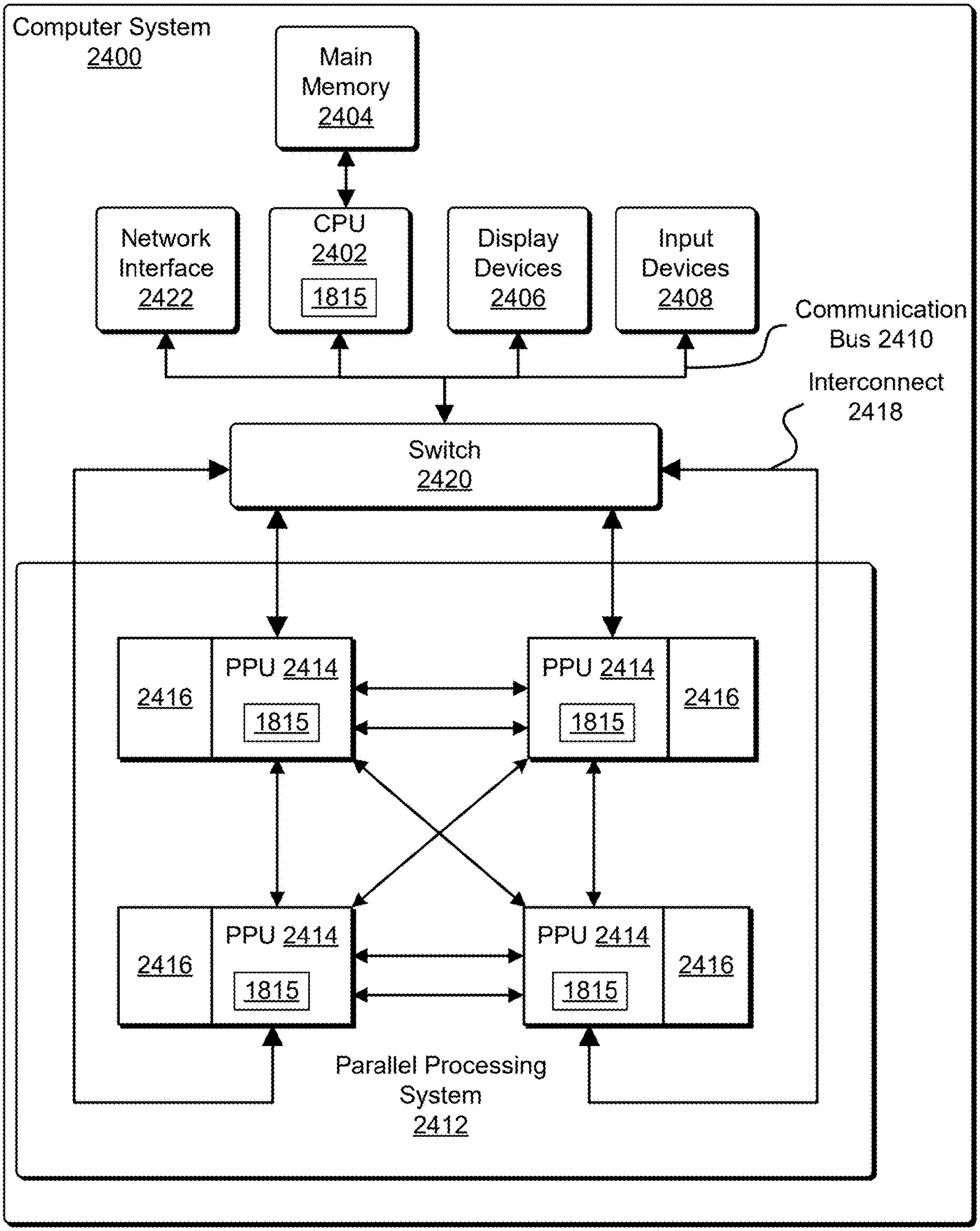
FIG. 24 illustrates a computer system, according to at least one embodiment.

FIG. 24 illustrates a computer system 2400, according to at least one embodiment. In at least one embodiment, computer system 2400 is configured to implement various processes and methods described throughout this disclosure.

In at least one embodiment, computer system 2400 comprises, without limitation, at least one central processing unit ("CPU") 2402 that is connected to a communication bus 2410 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 2400 includes, without limitation, a main memory 2404 and control logic (e.g., implemented as hardware, software, or a combination thereof) and data are stored in main memory 2404 which may take form of random access memory ("RAM"). In at least one embodiment, a network interface subsystem ("network interface") 2422 provides an interface to other computing devices and networks for receiving data from and transmitting data to other systems from computer system 2400.

In at least one embodiment, computer system 2400, in at least one embodiment, includes, without limitation, input devices 2408, parallel processing system 2412, and display devices 2406 which can be implemented using a conventional cathode ray tube ("CRT"), liquid crystal display ("LCD"), light emitting diode ("LED"), plasma display, or other suitable display technologies. In at least one embodiment, user input is received from input devices 2408 such as keyboard, mouse, touchpad, microphone, and more. In at least one embodiment, each of foregoing modules can be situated on a single semiconductor platform to form a processing system.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in a system of FIG. 24 for inferencing or predicting operations based, at least in part, on weight parameters calculated using neural network training operations, neural network functions and/or architectures, or neural network use cases described herein.

In at least one embodiment, a system of FIG. 24 is utilized to implement a discriminator that is trained to infer a viewpoint and a set of appearance attributes from an input image. In at least one embodiment, a system of FIG. 24 is utilized to implement a generator that is trained to generate an image based on an input viewpoint and an input set of appearance parameters. In at least one embodiment, a system of FIG. 24 is utilized to implement one or more neural networks comprising a discriminator and a generator, and a system of FIG. 24 is utilized in connection with one or more processes that train one or more neural networks to identify an orientation of an object within an image in a self-supervised manner by at least computing one or more loss functions as part of training that evaluate one or more characteristics of images of a training set.

Figure 25:
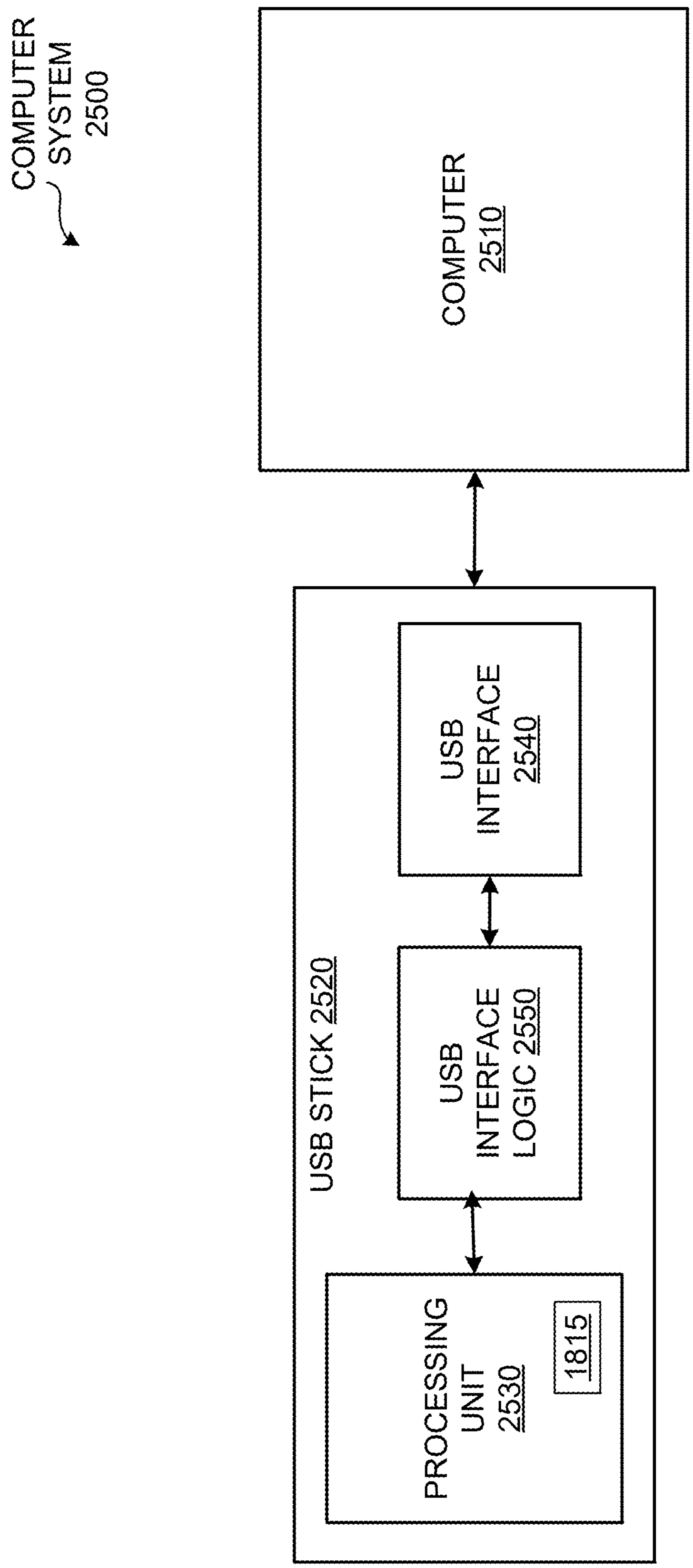
FIG. 25 illustrates a computer system, according at least one embodiment.

FIG. 25 illustrates a computer system 2500, according to at least one embodiment. In at least one embodiment, computer system 2500 includes, without limitation, a computer 2510 and a USB stick 2520. In at least one embodiment, computer 2510 may include, without limitation, any number and type of processor(s) (not shown) and a memory (not shown). In at least one embodiment, computer 2510 includes, without limitation, a server, a cloud instance, a laptop, and a desktop computer.

In at least one embodiment, USB stick 2520 includes, without limitation, a processing unit 2530, a USB interface 2540, and USB interface logic 2550. In at least one embodiment, processing unit 2530 may be any instruction execution system, apparatus, or device capable of executing instructions. In at least one embodiment, processing unit 2530 may include, without limitation, any number and type of processing cores (not shown). In at least one embodiment, processing core 2530 comprises an application specific integrated circuit ("ASIC") that is optimized to perform any amount and type of operations associated with machine learning. For instance, in at least one embodiment, processing core 2530 is a tensor processing unit ("TPC") that is optimized to perform machine learning inference operations. In at least one embodiment, processing core 2530 is a vision processing unit ("VPU") that is optimized to perform machine vision and machine learning inference operations.

In at least one embodiment, USB interface 2540 may be any type of USB connector or USB socket. For instance, in at least one embodiment, USB interface 2540 is a USB 3.0 Type-C socket for data and power. In at least one embodiment, USB interface 2540 is a USB 3.0 Type-A connector. In at least one embodiment, USB interface logic 2550 may include any amount and type of logic that enables processing unit 2530 to interface with or devices (e.g., computer 2510) via USB connector 2540.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in system FIG. 25 for inferencing or predicting operations based, at least in part, on weight parameters calculated using neural network training operations, neural network functions and/or architectures, or neural network use cases described herein.

In at least one embodiment, system FIG. 25 is utilized to implement a discriminator that is trained to infer a viewpoint and a set of appearance attributes from an input image. In at least one embodiment, system FIG. 25 is utilized to implement a generator that is trained to generate an image based on an input viewpoint and an input set of appearance parameters. In at least one embodiment, system FIG. 25 is utilized to implement one or more neural networks comprising a discriminator and a generator, and system FIG. 25 is utilized in connection with one or more processes that train one or more neural networks to identify an orientation of an object within an image in a self-supervised manner by at least computing one or more loss functions as part of training that evaluate one or more characteristics of images of a training set.

Figure 26A:
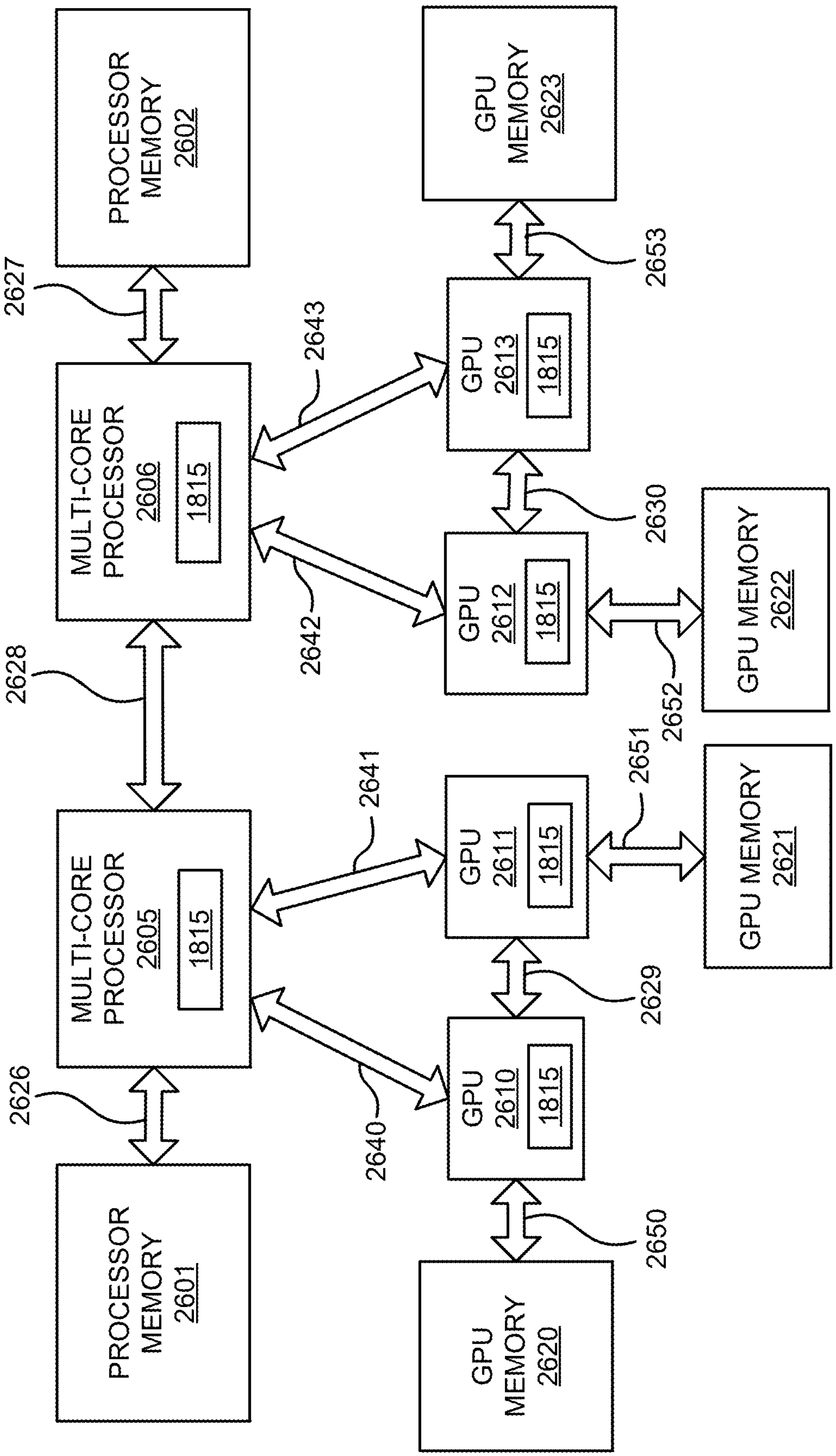
FIG. 26A illustrates a computer system, according to at least one embodiment.

FIG. 26A illustrates an exemplary architecture in which a plurality of GPUs 2610-2613 is communicatively coupled to a plurality of multi-core processors 2605-2606 over high-speed links 2640-2643 (e.g., buses, point-to-point interconnects, etc.). In one embodiment, high-speed links 2640-2643 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 2610-2613 are interconnected over high-speed links 2629-2630, which may be implemented using same or different protocols/links than those used for high-speed links 2640-2643. Similarly, two or more of multi-core processors 2605-2606 may be connected over high speed link 2628 which may be symmetric multi-processor (SMP) buses operating at 20 GB/s, 30 GB/s, 120 GB/s or higher. Alternatively, all communication between various system components shown in FIG. 26A may be accomplished using same protocols/links (e.g., over a common interconnection fabric).

In one embodiment, each multi-core processor 2605-2606 is communicatively coupled to a processor memory 2601-2602, via memory interconnects 2626-2627, respectively, and each GPU 2610-2613 is communicatively coupled to GPU memory 2620-2623 over GPU memory interconnects 2650-2653, respectively. Memory interconnects 2626-2627 and 2650-2653 may utilize same or different memory access technologies. By way of example, and not limitation, processor memories 2601-2602 and GPU memories 2620-2623 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 2601-2602 may be volatile memory and another portion may be non-volatile memory (e.g., using a two-level memory (2LM) hierarchy).

As described herein, although various processors 2605-2606 and GPUs 2610-2613 may be physically coupled to a particular memory 2601-2602, 2620-2623, respectively, a unified memory architecture may be implemented in which a same virtual system address space (also referred to as "effective address" space) is distributed among various physical memories. For example, processor memories 2601-2602 may each comprise 64 GB of system memory address space and GPU memories 2620-2623 may each comprise 32 GB of system memory address space (resulting in a total of 256 GB addressable memory in this example).

Figure 26B:
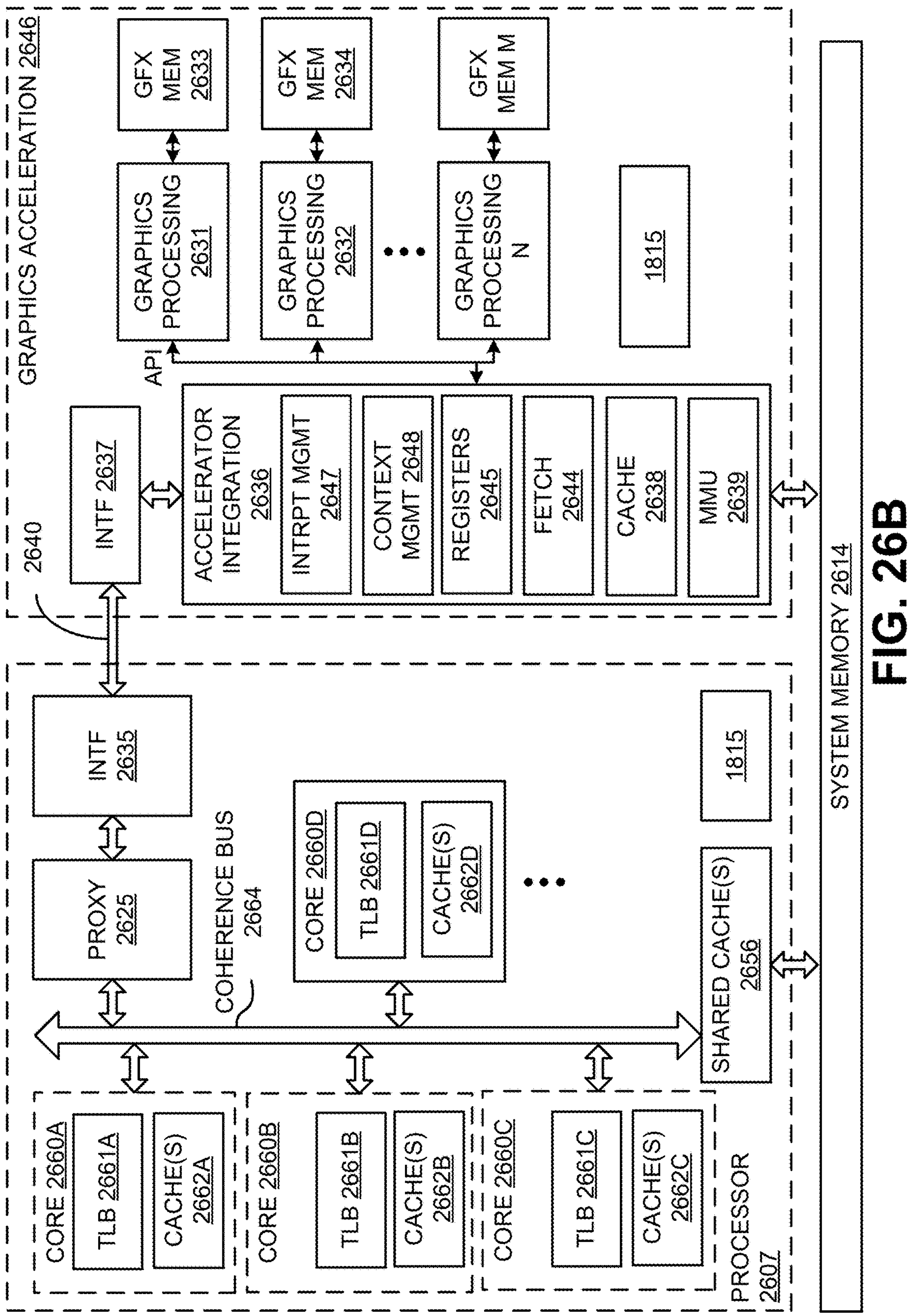
FIG. 26B illustrates a computer system, according to at least one embodiment.

FIG. 26B illustrates additional details for an interconnection between a multi-core processor 2607 and a graphics acceleration module 2646 in accordance with one exemplary embodiment. Graphics acceleration module 2646 may include one or more GPU chips integrated on a line card which is coupled to processor 2607 via high-speed link 2640. Alternatively, graphics acceleration module 2646 may be integrated on a same package or chip as processor 2607.

In at least one embodiment, illustrated processor 2607 includes a plurality of cores 2660A-2660D, each with a translation lookaside buffer 2661A-2661D and one or more caches 2662A-2662D. In at least one embodiment, cores 2660A-2660D may include various other components for executing instructions and processing data which are not illustrated. Caches 2662A-2662D may comprise level 1 (L1) and level 2 (L2) caches. In addition, one or more shared caches 2656 may be included in caches 2662A-2662D and shared by sets of cores 2660A-2660D. For example, one embodiment of processor 2607 includes 24 cores, each with its own L1 cache, twelve shared L2 caches, and twelve shared L3 caches. In this embodiment, one or more L2 and L3 caches are shared by two adjacent cores. Processor 2607 and graphics acceleration module 2646 connect with system memory 2614, which may include processor memories 2601-2602 of FIG. 26A.

Coherency is maintained for data and instructions stored in various caches 2662A-2662D, 2656 and system memory 2614 via inter-core communication over a coherence bus 2664. For example, each cache may have cache coherency logic/circuitry associated therewith to communicate to over coherence bus 2664 in response to detected reads or writes to particular cache lines. In one implementation, a cache snooping protocol is implemented over coherence bus 2664 to snoop cache accesses.

In one embodiment, a proxy circuit 2625 communicatively couples graphics acceleration module 2646 to coherence bus 2664, allowing graphics acceleration module 2646 to participate in a cache coherence protocol as a peer of cores 2660A-2660D. In particular, an interface 2635 provides connectivity to proxy circuit 2625 over high-speed link 2640 (e.g., a PCIe bus, NVLink, etc.) and an interface 2637 connects graphics acceleration module 2646 to link 2640.

In one implementation, an accelerator integration circuit 2636 provides cache management, memory access, context management, and interrupt management services on behalf of a plurality of graphics processing engines 2631, 2632, N of graphics acceleration module 2646. Graphics processing engines 2631, 2632, N may each comprise a separate graphics processing unit (GPU). Alternatively, graphics processing engines 2631, 2632, N may comprise different types of graphics processing engines within a GPU such as graphics execution units, media processing engines (e.g., video encoders/decoders), samplers, and blit engines. In at least one embodiment, graphics acceleration module 2646 may be a GPU with a plurality of graphics processing engines 2631-2632, N or graphics processing engines 2631-2632, N may be individual GPUs integrated on a common package, line card, or chip.

In one embodiment, accelerator integration circuit 2636 includes a memory management unit (MMU) 2639 for performing various memory management functions such as virtual-to-physical memory translations (also referred to as effective-to-real memory translations) and memory access protocols for accessing system memory 2614. MMU 2639 may also include a translation lookaside buffer (TLB) (not shown) for caching virtual/effective to physical/real address translations. In one implementation, a cache 2638 stores commands and data for efficient access by graphics processing engines 2631-2632, N. In one embodiment, data stored in cache 2638 and graphics memories 2633-2634, M is kept coherent with core caches 2662A-2662D, 2656 and system memory 2614. As mentioned, this may be accomplished via proxy circuit 2625 on behalf of cache 2638 and memories 2633-2634, M (e.g., sending updates to cache 2638 related to modifications/accesses of cache lines on processor caches 2662A-2662D, 2656 and receiving updates from cache 2638).

A set of registers 2645 store context data for threads executed by graphics processing engines 2631-2632, N and a context management circuit 2648 manages thread contexts. For example, context management circuit 2648 may perform save and restore operations to save and restore contexts of various threads during contexts switches (e.g., where a first thread is saved and a second thread is stored so that a second thread can be execute by a graphics processing engine). For example, on a context switch, context management circuit 2648 may store current register values to a designated region in memory (e.g., identified by a context pointer). It may then restore register values when returning to a context. In one embodiment, an interrupt management circuit 2647 receives and processes interrupts received from system devices.

In one implementation, virtual/effective addresses from a graphics processing engine 2631 are translated to real/physical addresses in system memory 2614 by MMU 2639. One embodiment of accelerator integration circuit 2636 supports multiple (e.g., 4, 8, 16) graphics accelerator modules 2646 and/or other accelerator devices. Graphics accelerator module 2646 may be dedicated to a single application executed on processor 2607 or may be shared between multiple applications. In one embodiment, a virtualized graphics execution environment is presented in which resources of graphics processing engines 2631-2632, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2636 performs as a bridge to a system for graphics acceleration module 2646 and provides address translation and system memory cache services. In at least one embodiment, accelerator integration circuit 2636 includes fetch 2644. In addition, accelerator integration circuit 2636 may provide virtualization facilities for a host processor to manage virtualization of graphics processing engines 2631-2632, interrupts, and memory management.

Because hardware resources of graphics processing engines 2631-2632, N are mapped explicitly to a real address space seen by host processor 2607, any host processor can address these resources directly using an effective address value. One function of accelerator integration circuit 2636, in one embodiment, is physical separation of graphics processing engines 2631-2632, N so that they appear to a system as independent units.

In at least one embodiment, one or more graphics memories 2633-2634, M are coupled to each of graphics processing engines 2631-2632, N, respectively. Graphics memories 2633-2634, M store instructions and data being processed by each of graphics processing engines 2631-2632, N. Graphics memories 2633-2634, M may be volatile memories such as DRAMs (including stacked DRAMs), GDDR memory (e.g., GDDR5, GDDR6), or HBM, and/or may be non-volatile memories such as 3D)(Point or Nano-Ram.

In one embodiment, to reduce data traffic over link 2640, biasing techniques are used to ensure that data stored in graphics memories 2633-2634, M is data which will be used most frequently by graphics processing engines 2631-2632, N and preferably not used by cores 2660A-2660D (at least not frequently). Similarly, a biasing mechanism attempts to keep data needed by cores (and preferably not graphics processing engines 2631-2632, N) within caches 2662A-2662D, 2656 of cores and system memory 2614.

Figure 26C:
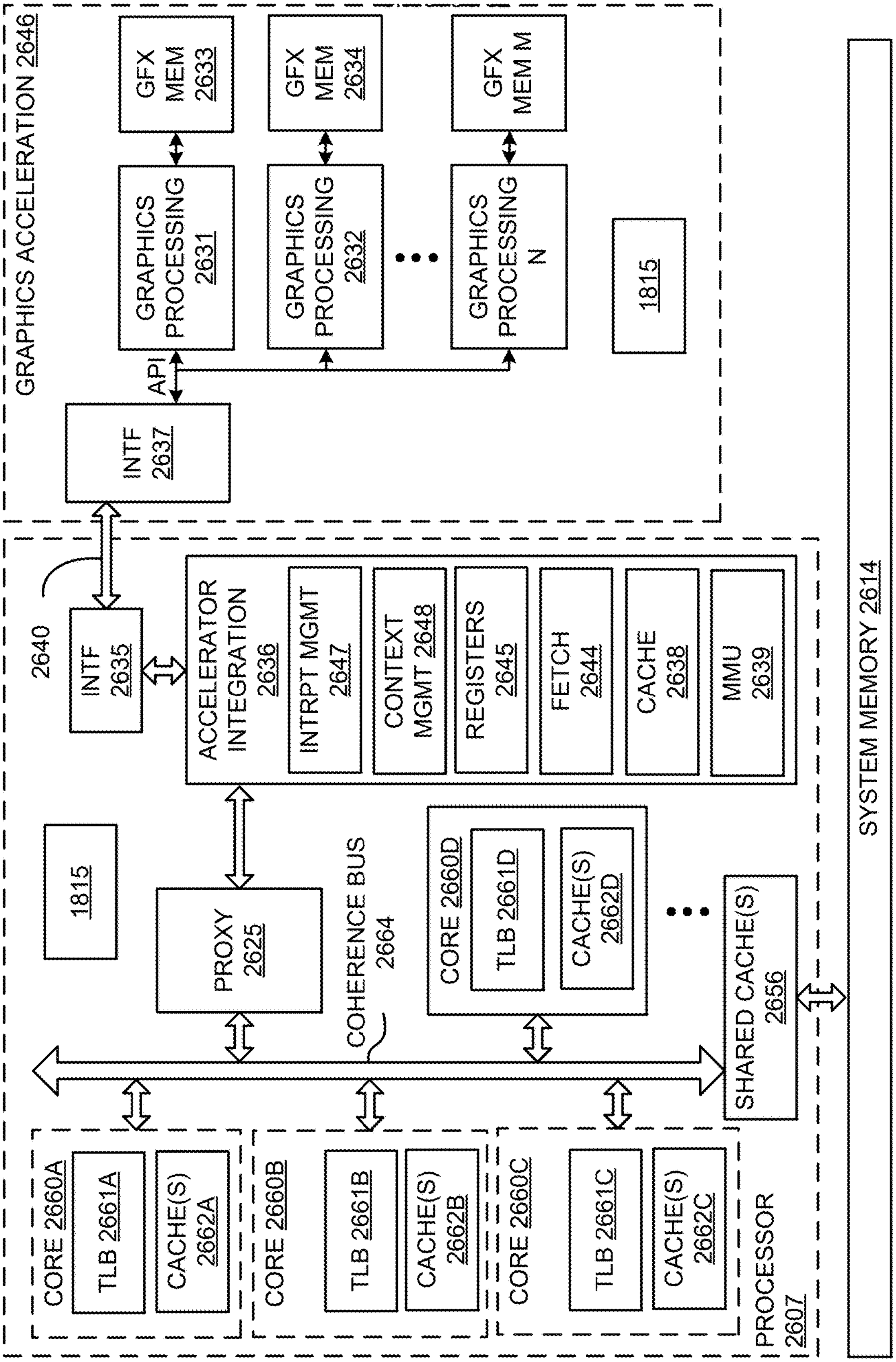
FIG. 26C illustrates a computer system, according to at least one embodiment.

FIG. 26C illustrates another exemplary embodiment in which accelerator integration circuit 2636 is integrated within processor 2607. In this embodiment, graphics processing engines 2631-2632, N communicate directly over high-speed link 2640 to accelerator integration circuit 2636 via interface 2637 and interface 2635 (which, again, may be utilize any form of bus or interface protocol). Accelerator integration circuit 2636 may perform same operations as those described with respect to FIG. 26B, but potentially at a higher throughput given its close proximity to coherence bus 2664 and caches 2662A-2662D, 2656. One embodiment supports different programming models including a dedicated-process programming model (no graphics acceleration module virtualization) and shared programming models (with virtualization), which may include programming models which are controlled by accelerator integration circuit 2636 and programming models which are controlled by graphics acceleration module 2646.

In at least one embodiment, graphics processing engines 2631-2632, N are dedicated to a single application or process under a single operating system. In at least one embodiment, a single application can funnel other application requests to graphics processing engines 2631-2632, N, providing virtualization within a VM/partition.

In at least one embodiment, graphics processing engines 2631-2632, N, may be shared by multiple VM/application partitions. In at least one embodiment, shared models may use a system hypervisor to virtualize graphics processing engines 2631-2632, N to allow access by each operating system. For single-partition systems without a hypervisor, graphics processing engines 2631-2632, N are owned by an operating system. In at least one embodiment, an operating system can virtualize graphics processing engines 2631-2632, N to provide access to each process or application.

In at least one embodiment, graphics acceleration module 2646 or an individual graphics processing engine 2631-2632, N selects a process element using a process handle. In one embodiment, process elements are stored in system memory 2614 and are addressable using an effective address to real address translation techniques described herein. In at least one embodiment, a process handle may be an implementation-specific value provided to a host process when registering its context with graphics processing engine 2631-2632, N (that is, calling system software to add a process element to a process element linked list). In at least one embodiment, a lower 16-bits of a process handle may be an offset of the process element within a process element linked list.

Figure 26D:
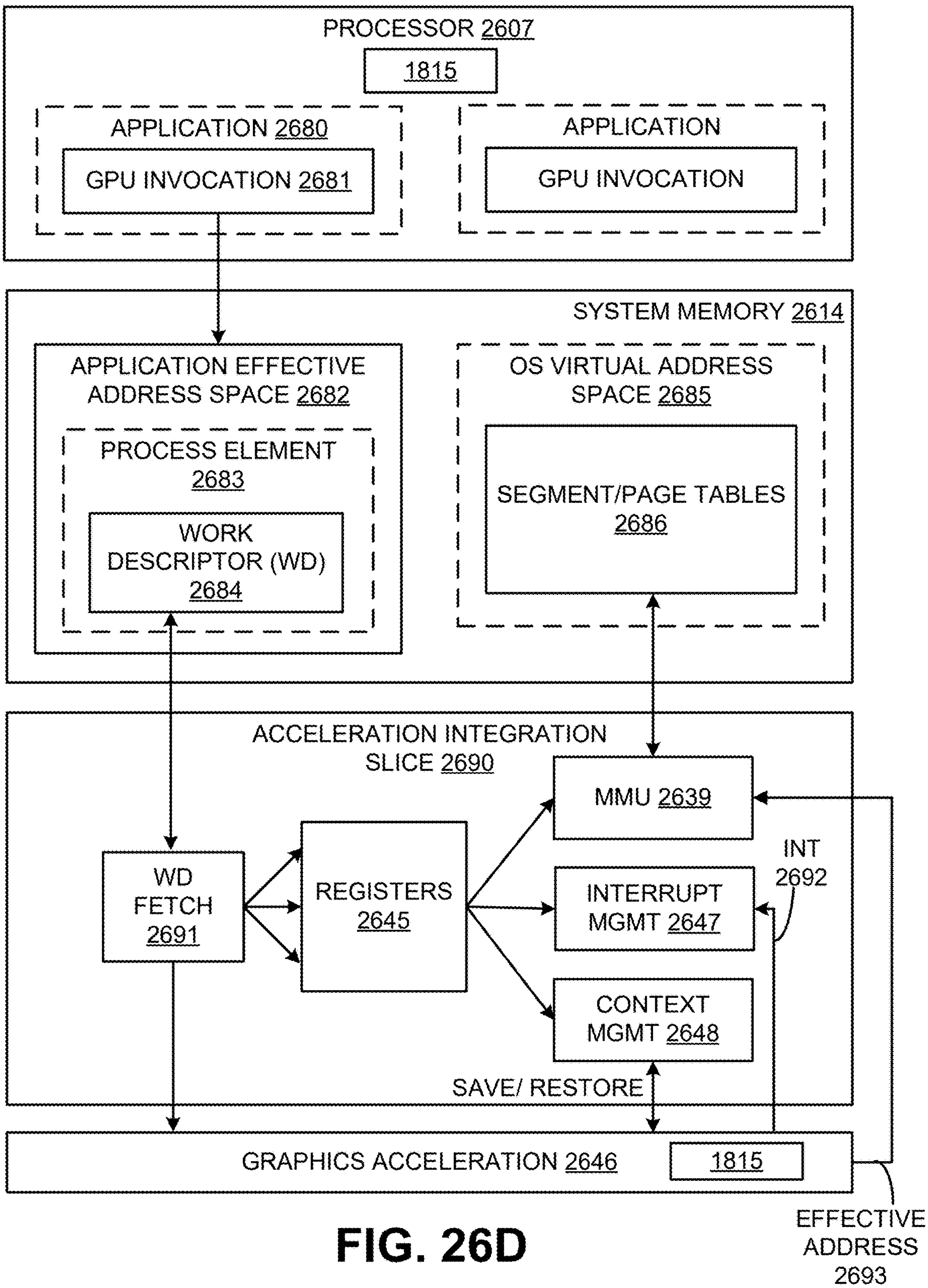
FIG. 26D illustrates a computer system, according to at least one embodiment.

FIG. 26D illustrates an exemplary accelerator integration slice 2690. As used herein, a "slice" comprises a specified portion of processing resources of accelerator integration circuit 2636. Application effective address space 2682 within system memory 2614 stores process elements 2683. In one embodiment, process elements 2683 are stored in response to GPU invocations 2681 from applications 2680 executed on processor 2607. A process element 2683 contains process state for corresponding application 2680. A work descriptor (WD) 2684 contained in process element 2683 can be a single job requested by an application or may contain a pointer to a queue of jobs. In at least one embodiment, WD 2684 is a pointer to a job request queue in an application's address space 2682.

Graphics acceleration module 2646 and/or individual graphics processing engines 2631-2632, N can be shared by all or a subset of processes in a system. In at least one embodiment, an infrastructure for setting up process state and sending a WD 2684 to a graphics acceleration module 2646 to start a job in a virtualized environment may be included.

In at least one embodiment, a dedicated-process programming model is implementation-specific. In this model, a single process owns graphics acceleration module 2646 or an individual graphics processing engine 2631. Because graphics acceleration module 2646 is owned by a single process, a hypervisor initializes accelerator integration circuit 2636 for an owning partition and an operating system initializes accelerator integration circuit 2636 for an owning process when graphics acceleration module 2646 is assigned.

In operation, a WD fetch unit 2691 in accelerator integration slice 2690 fetches next WD 2684 which includes an indication of work to be done by one or more graphics processing engines of graphics acceleration module 2646. Data from WD 2684 may be stored in registers 2645 and used by MMU 2639, interrupt management circuit 2647 and/or context management circuit 2648 as illustrated. For example, one embodiment of MMU 2639 includes segment/page walk circuitry for accessing segment/page tables 2686 within OS virtual address space 2685. Interrupt management circuit 2647 may process interrupt events 2692 received from graphics acceleration module 2646. When performing graphics operations, an effective address 2693 generated by a graphics processing engine 2631-2632, N is translated to a real address by MMU 2639.

In one embodiment, a same set of registers 2645 are duplicated for each graphics processing engine 2631-2632, N and/or graphics acceleration module 2646 and may be initialized by a hypervisor or operating system. Each of these duplicated registers may be included in an accelerator integration slice 2690. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2684 is specific to a particular graphics acceleration module 2646 and/or graphics processing engines 2631-2632, N. It contains all information required by a graphics processing engine 2631-2632, N to do work or it can be a pointer to a memory location where an application has set up a command queue of work to be completed.

Figure 26E:
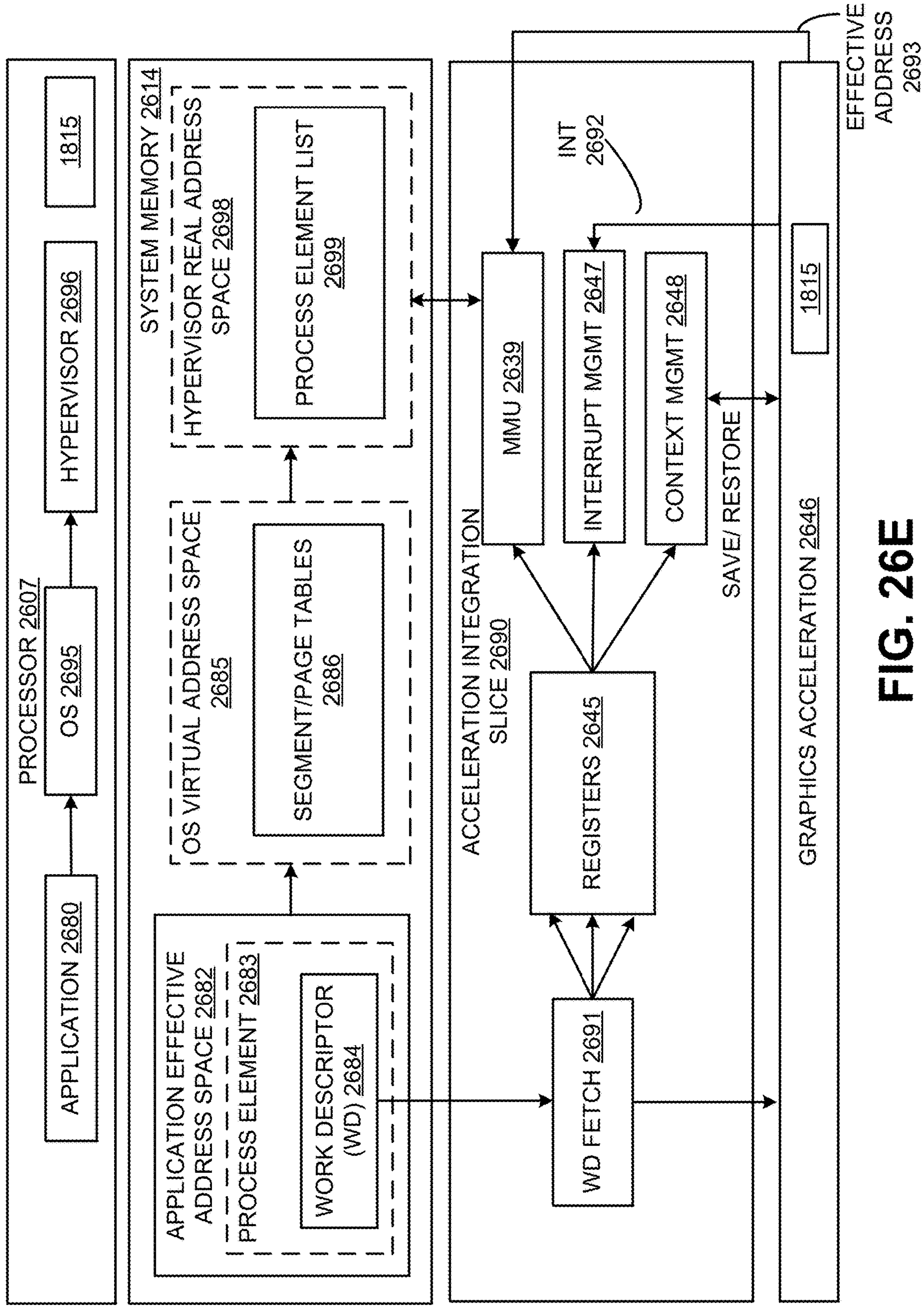
FIGS. 26E and 26F illustrate a shared programming model, according to at least one embodiment.

FIG. 26E illustrates additional details for one exemplary embodiment of a shared model. This embodiment includes a hypervisor real address space 2698 in which a process element list 2699 is stored. Hypervisor real address space 2698 is accessible via a hypervisor 2696 which virtualizes graphics acceleration module engines for operating system 2695.

In at least one embodiment, shared programming models allow for all or a subset of processes from all or a subset of partitions in a system to use a graphics acceleration module 2646. There are two programming models where graphics acceleration module 2646 is shared by multiple processes and partitions: time-sliced shared and graphics directed shared.

In this model, system hypervisor 2696 owns graphics acceleration module 2646 and makes its function available to all operating systems 2695. For a graphics acceleration module 2646 to support virtualization by system hypervisor 2696, graphics acceleration module 2646 may adhere to the following: 1) An application's job request must be autonomous (that is, state does not need to be maintained between jobs), or graphics acceleration module 2646 must provide a context save and restore mechanism. 2) An application's job request is guaranteed by graphics acceleration module 2646 to complete in a specified amount of time, including any translation faults, or graphics acceleration module 2646 provides an ability to preempt processing of a job. 3) Graphics acceleration module 2646 must be guaranteed fairness between processes when operating in a directed shared programming model.

In at least one embodiment, application 2680 is required to make an operating system 2695 system call with a graphics acceleration module 2646 type, a work descriptor (WD), an authority mask register (AMR) value, and a context save/restore area pointer (CSRP). In at least one embodiment, graphics acceleration module 2646 type describes a targeted acceleration function for a system call. In at least one embodiment, graphics acceleration module 2646 type may be a system-specific value. In at least one embodiment, WD is formatted specifically for graphics acceleration module 2646 and can be in a form of a graphics acceleration module 2646 command, an effective address pointer to a user-defined structure, an effective address pointer to a queue of commands, or any other data structure to describe work to be done by graphics acceleration module 2646. In one embodiment, an AMR value is an AMR state to use for a current process. In at least one embodiment, a value passed to an operating system is similar to an application setting an AMR. If accelerator integration circuit 2636 and graphics acceleration module 2646 implementations do not support a User Authority Mask Override Register (UAMOR), an operating system may apply a current UAMOR value to an AMR value before passing an AMR in a hypervisor call. Hypervisor 2696 may optionally apply a current Authority Mask Override Register (AMOR) value before placing an AMR into process element 2683. In at least one embodiment, CSRP is one of registers 2645 containing an effective address of an area in an application's address space 2682 for graphics acceleration module 2646 to save and restore context state. This pointer is optional if no state is required to be saved between jobs or when a job is preempted. In at least one embodiment, context save/restore area may be pinned system memory.

Upon receiving a system call, operating system 2695 may verify that application 2680 has registered and been given authority to use graphics acceleration module 2646. Operating system 2695 then calls hypervisor 2696 with information shown in Table 3.

TABLE 3

| | OS to Hypervisor Call Parameters |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

Upon receiving a hypervisor call, hypervisor 2696 verifies that operating system 2695 has registered and been given authority to use graphics acceleration module 2646. Hypervisor 2696 then puts process element 2683 into a process element linked list for a corresponding graphics acceleration module 2646 type. A process element may include information shown in Table 4.

TABLE 4

| | Process Element Information |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 2690 registers 2645.

Figure 26F:
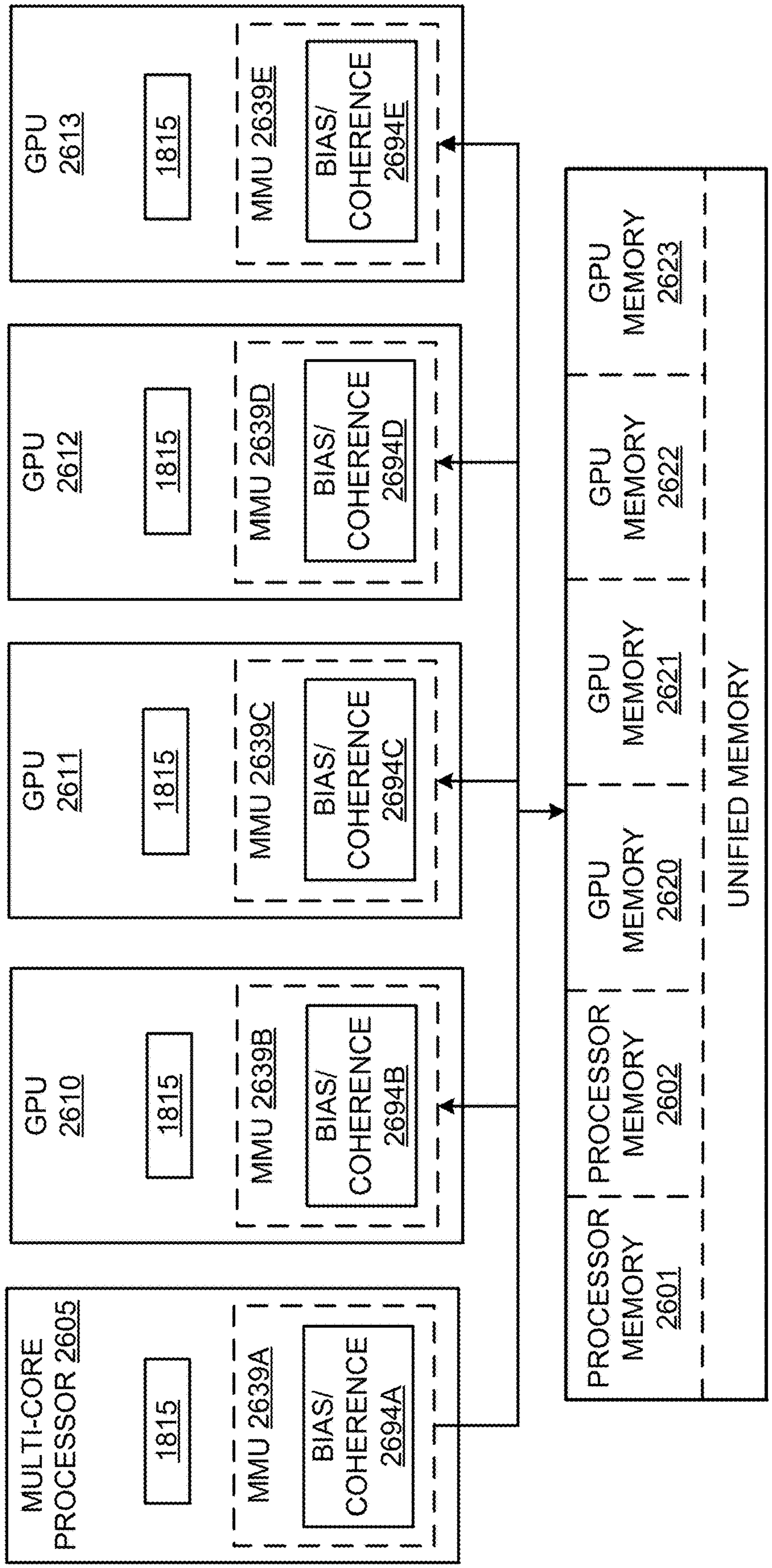

As illustrated in FIG. 26F, in at least one embodiment, a unified memory is used, addressable via a common virtual memory address space used to access physical processor memories 2601-2602 and GPU memories 2620-2623. In this implementation, operations executed on GPUs 2610-2613 utilize a same virtual/effective memory address space to access processor memories 2601-2602 and vice versa, thereby simplifying programmability. In one embodiment, a first portion of a virtual/effective address space is allocated to processor memory 2601, a second portion to second processor memory 2602, a third portion to GPU memory 2620, and so on. In at least one embodiment, an entire virtual/effective memory space (sometimes referred to as an effective address space) is thereby distributed across each of processor memories 2601-2602 and GPU memories 2620-2623, allowing any processor or GPU to access any physical memory with a virtual address mapped to that memory.

In one embodiment, bias/coherence management circuitry 2694A-2694E within one or more of MMUs 2639A-2639E ensures cache coherence between caches of one or more host processors (e.g., 2605) and GPUs 2610-2613 and implements biasing techniques indicating physical memories in which certain types of data should be stored. While multiple instances of bias/coherence management circuitry 2694A-2694E are illustrated in FIG. 26F, bias/coherence circuitry may be implemented within an MMU of one or more host processors 2605 and/or within accelerator integration circuit 2636.

One embodiment allows GPU-attached memory 2620-2623 to be mapped as part of system memory, and accessed using shared virtual memory (SVM) technology, but without suffering performance drawbacks associated with full system cache coherence. In at least one embodiment, an ability for GPU-attached memory 2620-2623 to be accessed as system memory without onerous cache coherence overhead provides a beneficial operating environment for GPU offload. This arrangement allows host processor 2605 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 2620-2623 without cache coherence overheads can be critical to execution time of an offloaded computation. In cases with substantial streaming write memory traffic, for example, cache coherence overhead can significantly reduce an effective write bandwidth seen by a GPU 2610-2613. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 2620-2623, with or without a bias cache in GPU 2610-2613 (e.g., to cache frequently/recently used entries of a bias table). Alternatively, an entire bias table may be maintained within a GPU.

In at least one embodiment, a bias table entry associated with each access to GPU-attached memory 2620-2623 is accessed prior to actual access to a GPU memory, causing the following operations. First, local requests from GPU 2610-2613 that find their page in GPU bias are forwarded directly to a corresponding GPU memory 2620-2623. Local requests from a GPU that find their page in host bias are forwarded to processor 2605 (e.g., over a high-speed link as discussed above). In one embodiment, requests from processor 2605 that find a requested page in host processor bias complete a request like a normal memory read. Alternatively, requests directed to a GPU-biased page may be forwarded to GPU 2610-2613. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g. OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 2605 bias to GPU bias, but is not for an opposite transition.

In one embodiment, cache coherency is maintained by temporarily rendering GPU-biased pages uncacheable by host processor 2605. To access these pages, processor 2605 may request access from GPU 2610 which may or may not grant access right away. Thus, to reduce communication between processor 2605 and GPU 2610 it is beneficial to ensure that GPU-biased pages are those which are required by a GPU but not host processor 2605 and vice versa.

Hardware structure(s) 1815 are used to perform one or more embodiments. Details regarding the hardware structure(s) 1815 are provided herein in conjunction with FIGS. 18A and/or 18B.

Figure 27:
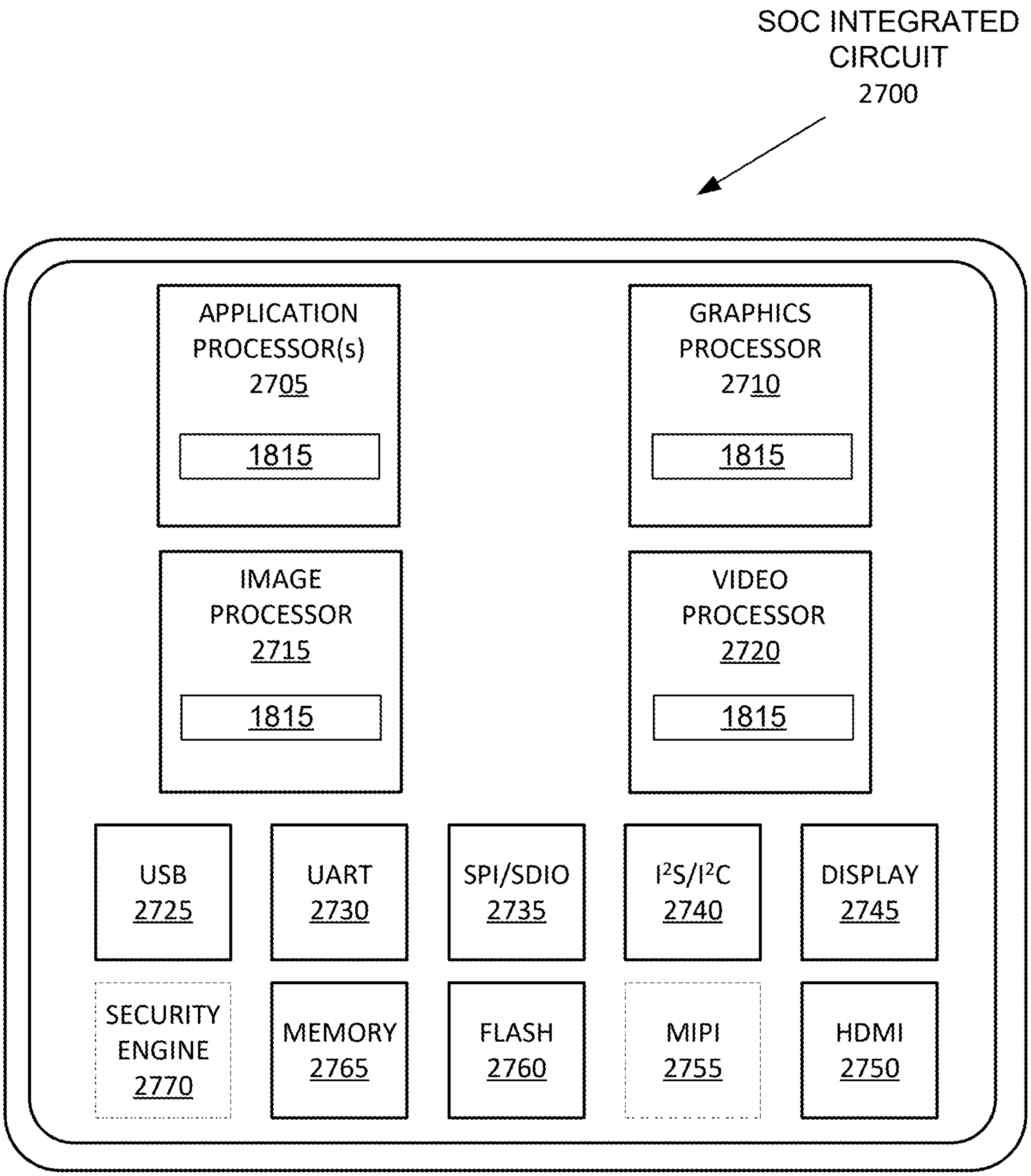
FIG. 27 illustrates exemplary integrated circuits and associated graphics processors, according to at least one embodiment.

FIG. 27 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 27 is a block diagram illustrating an exemplary system on a chip integrated circuit 2700 that may be fabricated using one or more IP cores, according to at least one embodiment. In at least one embodiment, integrated circuit 2700 includes one or more application processor(s) 2705 (e.g., CPUs), at least one graphics processor 2710, and may additionally include an image processor 2715 and/or a video processor 2720, any of which may be a modular IP core. In at least one embodiment, integrated circuit 2700 includes peripheral or bus logic including a USB controller 2725, UART controller 2730, an SPI/SDIO controller 2735, and an $I^2S/I^2C$ controller 2740. In at least one embodiment, integrated circuit 2700 can include a display device 2745 coupled to one or more of a high-definition multimedia interface (HDMI) controller 2750 and a mobile industry processor interface (MIPI) display interface 2755. In at least one embodiment, storage may be provided by a flash memory subsystem 2760 including flash memory and a flash memory controller. In at least one embodiment, memory interface may be provided via a memory controller 2765 for access to SDRAM or SRAM memory devices. In at least one embodiment, some integrated circuits additionally include an embedded security engine 2770.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in integrated circuit 2700 for inferencing or predicting operations based, at least in part, on weight parameters calculated using neural network training operations, neural network functions and/or architectures, or neural network use cases described herein.

In at least one embodiment, integrated circuit 2700 is utilized to implement a discriminator that is trained to infer a viewpoint and a set of appearance attributes from an input image. In at least one embodiment, integrated circuit 2700 is utilized to implement a generator that is trained to generate an image based on an input viewpoint and an input set of appearance parameters. In at least one embodiment, integrated circuit 2700 is utilized to implement one or more neural networks comprising a discriminator and a generator, and integrated circuit 2700 is utilized in connection with one or more processes that train one or more neural networks to identify an orientation of an object within an image in a self-supervised manner by at least computing one or more loss functions as part of training that evaluate one or more characteristics of images of a training set.

Figure 28A:
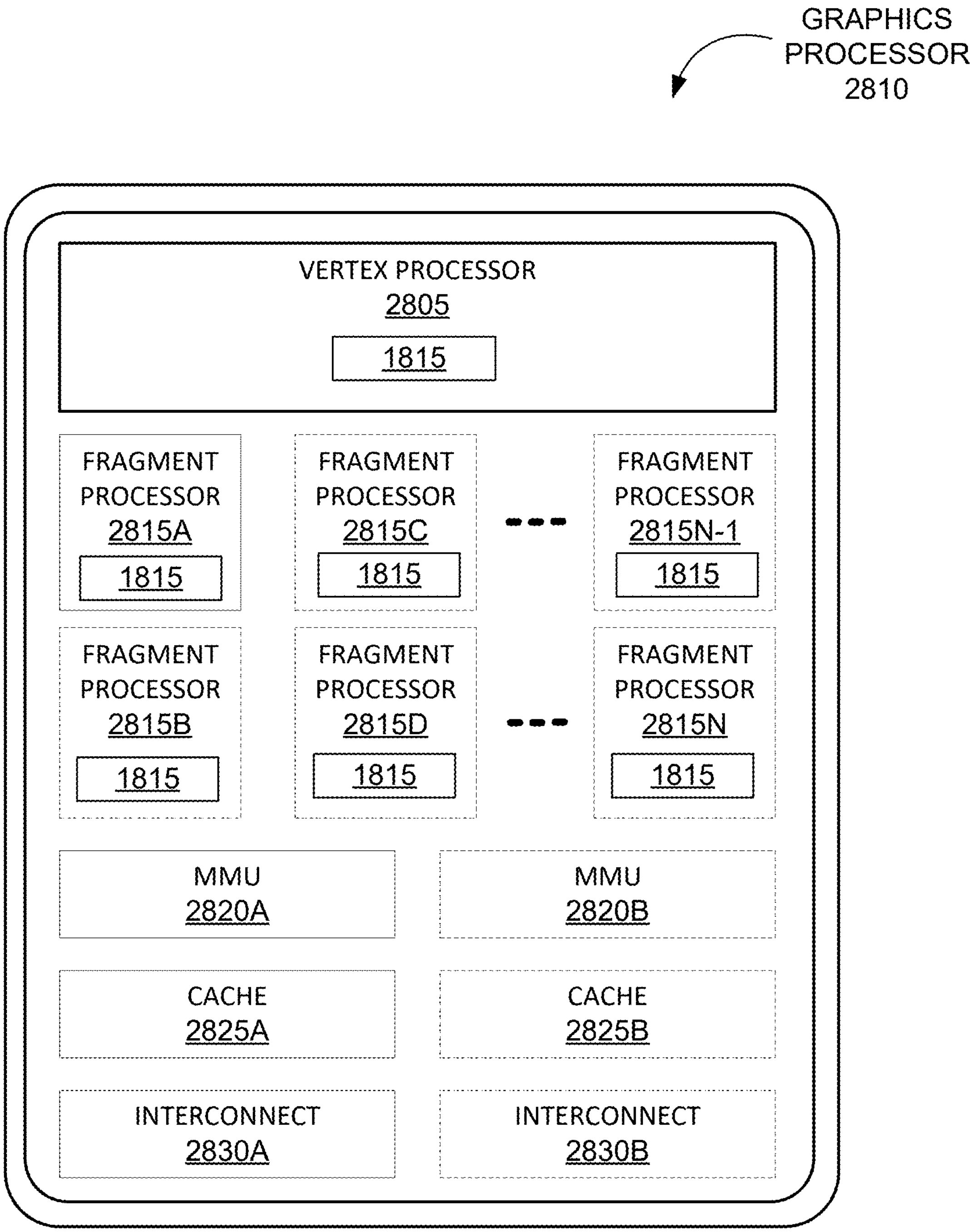
FIGS. 28A and 28B illustrate exemplary integrated circuits and associated graphics processors, according to at least one embodiment.
Figure 28B:
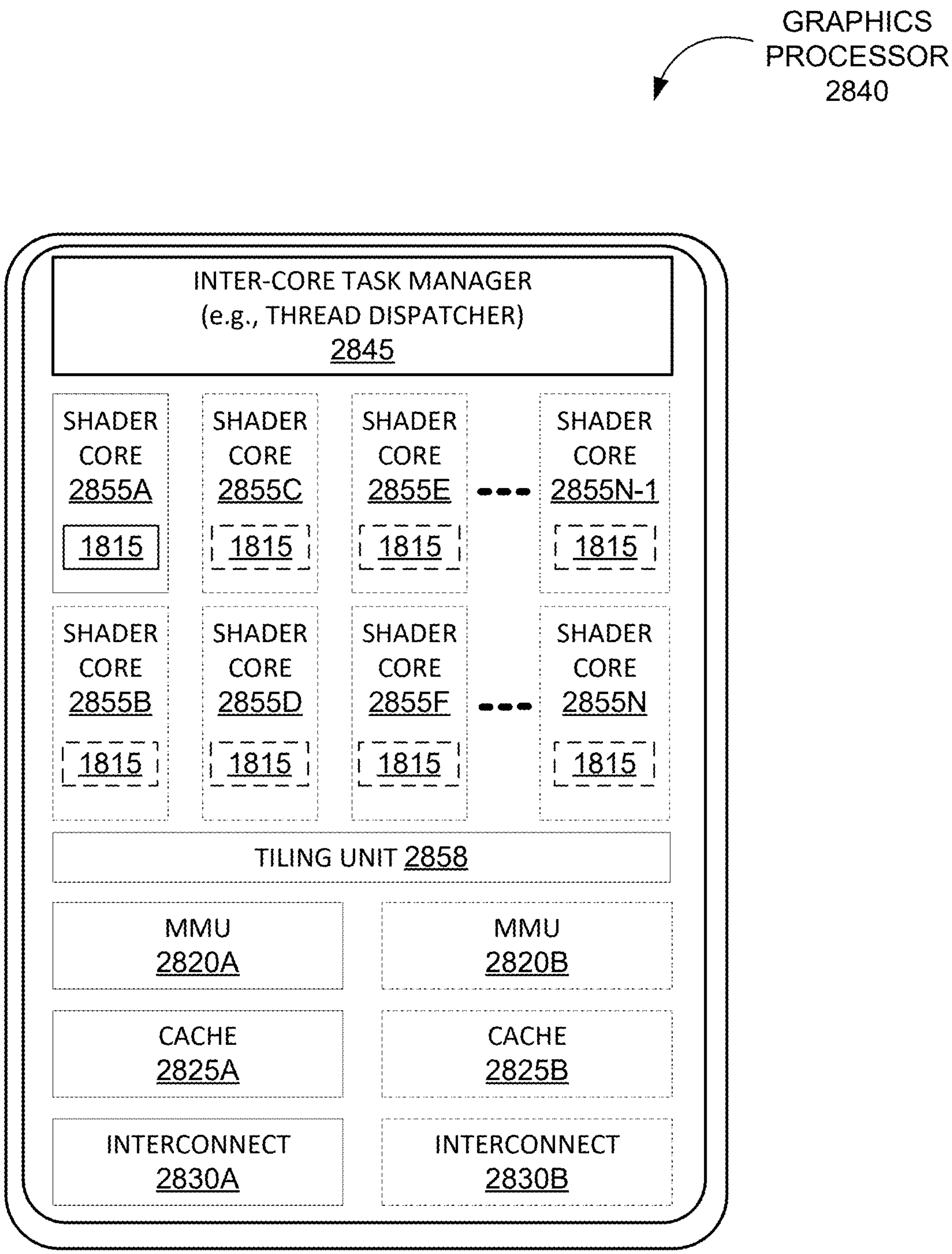

FIGS. 28A and 28B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 28A and 28B are block diagrams illustrating exemplary graphics processors for use within an SoC, according to embodiments described herein. FIG. 28A illustrates an exemplary graphics processor 2810 of a system on a chip integrated circuit that may be fabricated using one or more IP cores, according to at least one embodiment. FIG. 28B illustrates an additional exemplary graphics processor 2840 of a system on a chip integrated circuit that may be fabricated using one or more IP cores, according to at least one embodiment. In at least one embodiment, graphics processor 2810 of FIG. 28A is a low power graphics processor core. In at least one embodiment, graphics processor 2840 of FIG. 28B is a higher performance graphics processor core. In at least one embodiment, each of graphics processors 2810, 2840 can be variants of graphics processor 2710 of FIG. 27.

In at least one embodiment, graphics processor 2810 includes a vertex processor 2805 and one or more fragment processor(s) 2815A-2815N (e.g., 2815A, 2815B, 2815C, 2815D, through 2815N−1, and 2815N). In at least one embodiment, graphics processor 2810 can execute different shader programs via separate logic, such that vertex processor 2805 is optimized to execute operations for vertex shader programs, while one or more fragment processor(s) 2815A-2815N execute fragment (e.g., pixel) shading operations for fragment or pixel shader programs. In at least one embodiment, vertex processor 2805 performs a vertex processing stage of a 3D graphics pipeline and generates primitives and vertex data. In at least one embodiment, fragment processor(s) 2815A-2815N use primitive and vertex data generated by vertex processor 2805 to produce a framebuffer that is displayed on a display device. In at least one embodiment, fragment processor(s) 2815A-2815N are optimized to execute fragment shader programs as provided for in an OpenGL API, which may be used to perform similar operations as a pixel shader program as provided for in a Direct 3D API.

In at least one embodiment, graphics processor 2810 additionally includes one or more memory management units (MMUs) 2820A-2820B, cache(s) 2825A-2825B, and circuit interconnect(s) 2830A-2830B. In at least one embodiment, one or more MMU(s) 2820A-2820B provide for virtual to physical address mapping for graphics processor 2810, including for vertex processor 2805 and/or fragment processor(s) 2815A-2815N, which may reference vertex or image/texture data stored in memory, in addition to vertex or image/texture data stored in one or more cache(s) 2825A-2825B. In at least one embodiment, one or more MMU(s) 2820A-2820B may be synchronized with other MMUs within system, including one or more MMUs associated with one or more application processor(s) 2705, image processors 2715, and/or video processors 2720 of FIG. 27, such that each processor 2705-2720 can participate in a shared or unified virtual memory system. In at least one embodiment, one or more circuit interconnect(s) 2830A-2830B enable graphics processor 2810 to interface with other IP cores within SoC, either via an internal bus of SoC or via a direct connection.

In at least one embodiment, graphics processor 2840 includes one or more MMU(s) 2820A-2820B, caches 2825A-2825B, and circuit interconnects 2830A-2830B of graphics processor 2810 of FIG. 28A. In at least one embodiment, graphics processor 2840 includes one or more shader core(s) 2855A-2855N (e.g., 2855A, 2855B, 2855C, 2855D, 2855E, 2855F, through 2855N−1, and 2855N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2840 includes an inter-core task manager 2845, which acts as a thread dispatcher to dispatch execution threads to one or more shader cores 2855A-2855N and a tiling unit 2858 to accelerate tiling operations for tile-based rendering, in which rendering operations for a scene are subdivided in image space, for example to exploit local spatial coherence within a scene or to optimize use of internal caches.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in an integrated circuit of FIGS. 28A and/or 28B for inferencing or predicting operations based, at least in part, on weight parameters calculated using neural network training operations, neural network functions and/or architectures, or neural network use cases described herein.

In at least one embodiment, an integrated circuit of FIGS. 28A and/or 28B is utilized to implement a discriminator that is trained to infer a viewpoint and a set of appearance attributes from an input image. In at least one embodiment, an integrated circuit of FIGS. 28A and/or 28B is utilized to implement a generator that is trained to generate an image based on an input viewpoint and an input set of appearance parameters. In at least one embodiment, n integrated circuit of FIGS. 28A and/or 28B is utilized to implement one or more neural networks comprising a discriminator and a generator, and an integrated circuit of FIGS. 28A and/or 28B is utilized in connection with one or more processes that train one or more neural networks to identify an orientation of an object within an image in a self-supervised manner by at least computing one or more loss functions as part of training that evaluate one or more characteristics of images of a training set.

Figure 29A:
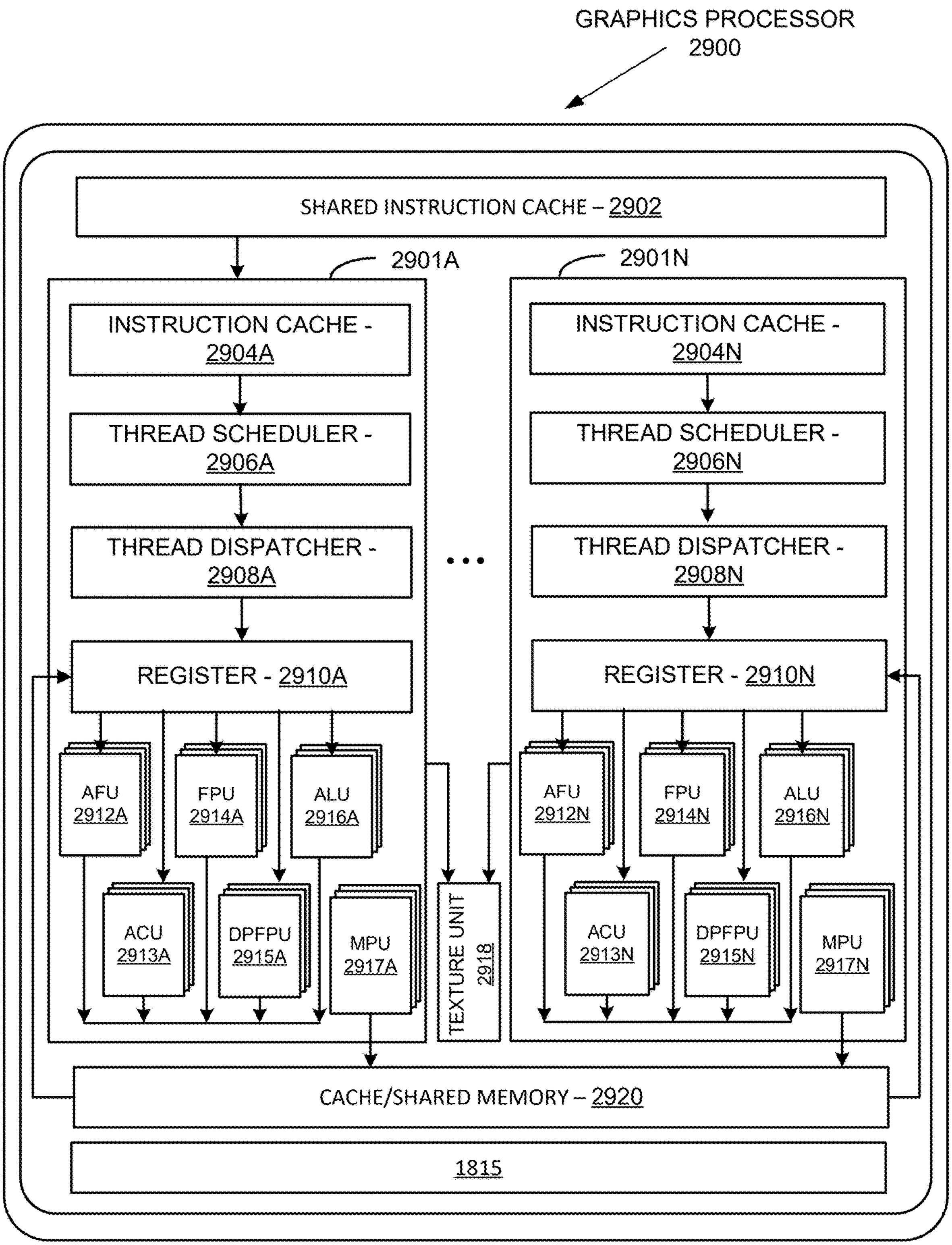
FIGS. 29A and 29B illustrate additional exemplary graphics processor logic according to at least one embodiment.
Figure 29B:
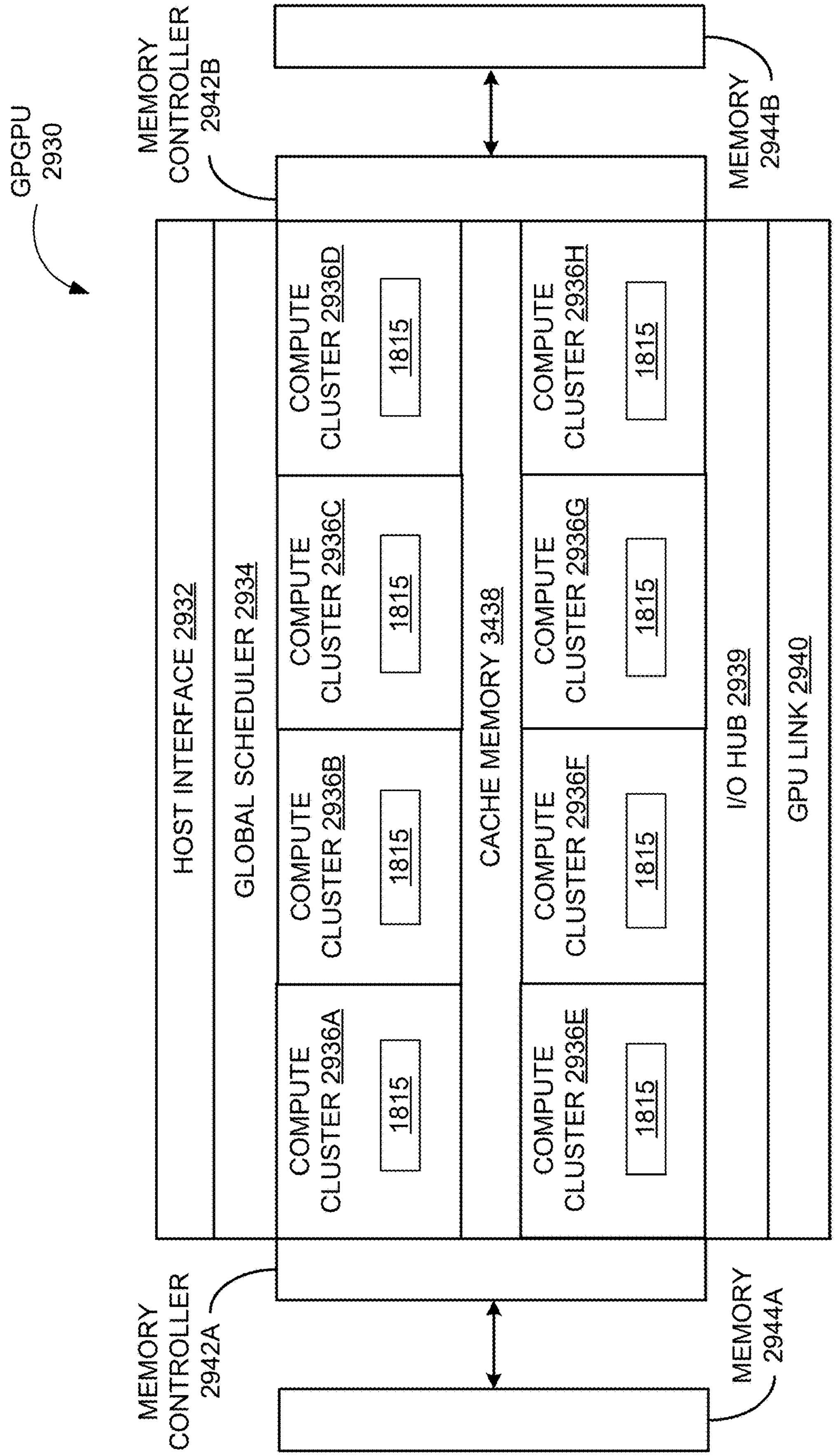

FIGS. 29A and 29B illustrate additional exemplary graphics processor logic according to embodiments described herein. FIG. 29A illustrates a graphics core 2900 that may be included within graphics processor 2710 of FIG. 27, in at least one embodiment, and may be a unified shader core 2855A-2855N as in FIG. 28B in at least one embodiment. FIG. 29B illustrates a highly-parallel general-purpose graphics processing unit 2930 suitable for deployment on a multi-chip module in at least one embodiment.

In at least one embodiment, graphics core 2900 includes a shared instruction cache 2902, a texture unit 2918, and a cache/shared memory 2920 that are common to execution resources within graphics core 2900. In at least one embodiment, graphics core 2900 can include multiple slices 2901A-2901N or partition for each core, and a graphics processor can include multiple instances of graphics core 2900. Slices 2901A-2901N can include support logic including a local instruction cache 2904A-2904N, a thread scheduler 2906A-2906N, a thread dispatcher 2908A-2908N, and a set of registers 2910A-2910N. In at least one embodiment, slices 2901A-2901N can include a set of additional function units (AFUs 2912A-2912N), floating-point units (FPU 2914A-2914N), integer arithmetic logic units (ALUs 2916-2916N), address computational units (ACU 2913A-2913N), double-precision floating-point units (DPFPU 2915A-2915N), and matrix processing units (MPU 2917A-2917N).

In at least one embodiment, FPUs 2914A-2914N can perform single-precision (32-bit) and half-precision (16-bit) floating point operations, while DPFPUs 2915A-2915N perform double precision (64-bit) floating point operations. In at least one embodiment, ALUs 2916A-2916N can perform variable precision integer operations at 8-bit, 16-bit, and 32-bit precision, and can be configured for mixed precision operations. In at least one embodiment, MPUs 2917A-2917N can also be configured for mixed precision matrix operations, including half-precision floating point and 8-bit integer operations. In at least one embodiment, MPUs 2917-2917N can perform a variety of matrix operations to accelerate machine learning application frameworks, including enabling support for accelerated general matrix to matrix multiplication (GEMM). In at least one embodiment, AFUs 2912A-2912N can perform additional logic operations not supported by floating-point or integer units, including trigonometric operations (e.g., Sine, Cosine, etc.).

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in graphics core 2900 for inferencing or predicting operations based, at least in part, on weight parameters calculated using neural network training operations, neural network functions and/or architectures, or neural network use cases described herein.

In at least one embodiment, graphics core 2900 is utilized to implement a discriminator that is trained to infer a viewpoint and a set of appearance attributes from an input image. In at least one embodiment, graphics core 2900 is utilized to implement a generator that is trained to generate an image based on an input viewpoint and an input set of appearance parameters. In at least one embodiment, graphics core 2900 is utilized to implement one or more neural networks comprising a discriminator and a generator, and graphics core 2900 is utilized in connection with one or more processes that train one or more neural networks to identify an orientation of an object within an image in a self-supervised manner by at least computing one or more loss functions as part of training that evaluate one or more characteristics of images of a training set.

FIG. 29B illustrates a general-purpose processing unit (GPGPU) 2930 that can be configured to enable highly-parallel compute operations to be performed by an array of graphics processing units, in at least one embodiment. In at least one embodiment, GPGPU 2930 can be linked directly to other instances of GPGPU 2930 to create a multi-GPU cluster to improve training speed for deep neural networks. In at least one embodiment, GPGPU 2930 includes a host interface 2932 to enable a connection with a host processor. In at least one embodiment, host interface 2932 is a PCI Express interface. In at least one embodiment, host interface 2932 can be a vendor specific communications interface or communications fabric. In at least one embodiment, GPGPU 2930 receives commands from a host processor and uses a global scheduler 2934 to distribute execution threads associated with those commands to a set of compute clusters 2936A-2936H. In at least one embodiment, compute clusters 2936A-2936H share a cache memory 2938. In at least one embodiment, cache memory 2938 can serve as a higher-level cache for cache memories within compute clusters 2936A-2936H.

In at least one embodiment, GPGPU 2930 includes memory 2944A-2944B coupled with compute clusters 2936A-2936H via a set of memory controllers 2942A-2942B. In at least one embodiment, memory 2944A-2944B can include various types of memory devices including dynamic random access memory (DRAM) or graphics random access memory, such as synchronous graphics random access memory (SGRAM), including graphics double data rate (GDDR) memory.

In at least one embodiment, compute clusters 2936A-2936H each include a set of graphics cores, such as graphics core 2900 of FIG. 29A, which can include multiple types of integer and floating point logic units that can perform computational operations at a range of precisions including suited for machine learning computations. For example, in at least one embodiment, at least a subset of floating point units in each of compute clusters 2936A-2936H can be configured to perform 16-bit or 32-bit floating point operations, while a different subset of floating point units can be configured to perform 64-bit floating point operations.

In at least one embodiment, multiple instances of GPGPU 2930 can be configured to operate as a compute cluster. In at least one embodiment, communication used by compute clusters 2936A-2936H for synchronization and data exchange varies across embodiments. In at least one embodiment, multiple instances of GPGPU 2930 communicate over host interface 2932. In at least one embodiment, GPGPU 2930 includes an I/O hub 2939 that couples GPGPU 2930 with a GPU link 2940 that enables a direct connection to other instances of GPGPU 2930. In at least one embodiment, GPU link 2940 is coupled to a dedicated GPU-to-GPU bridge that enables communication and synchronization between multiple instances of GPGPU 2930. In at least one embodiment GPU link 2940 couples with a high speed interconnect to transmit and receive data to other GPGPUs or parallel processors. In at least one embodiment, multiple instances of GPGPU 2930 are located in separate data processing systems and communicate via a network device that is accessible via host interface 2932. In at least one embodiment GPU link 2940 can be configured to enable a connection to a host processor in addition to or as an alternative to host interface 2932.

In at least one embodiment, GPGPU 2930 can be configured to train neural networks. In at least one embodiment, GPGPU 2930 can be used within an inferencing platform. In at least one embodiment, in which GPGPU 2930 is used for inferencing, GPGPU may include fewer compute clusters 2936A-2936H relative to when GPGPU is used for training a neural network. In at least one embodiment, memory technology associated with memory 2944A-2944B may differ between inferencing and training configurations, with higher bandwidth memory technologies devoted to training configurations. In at least one embodiment, inferencing configuration of GPGPU 2930 can support inferencing specific instructions. For example, in at least one embodiment, an inferencing configuration can provide support for one or more 8-bit integer dot product instructions, which may be used during inferencing operations for deployed neural networks.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in GPGPU 2930 for inferencing or predicting operations based, at least in part, on weight parameters calculated using neural network training operations, neural network functions and/or architectures, or neural network use cases described herein.

In at least one embodiment, GPGPU 2930 is utilized to implement a discriminator that is trained to infer a viewpoint and a set of appearance attributes from an input image. In at least one embodiment, GPGPU 2930 is utilized to implement a generator that is trained to generate an image based on an input viewpoint and an input set of appearance parameters. In at least one embodiment, GPGPU 2930 is utilized to implement one or more neural networks comprising a discriminator and a generator, and GPGPU 2930 is utilized in connection with one or more processes that train one or more neural networks to identify an orientation of an object within an image in a self-supervised manner by at least computing one or more loss functions as part of training that evaluate one or more characteristics of images of a training set.

Figure 30:
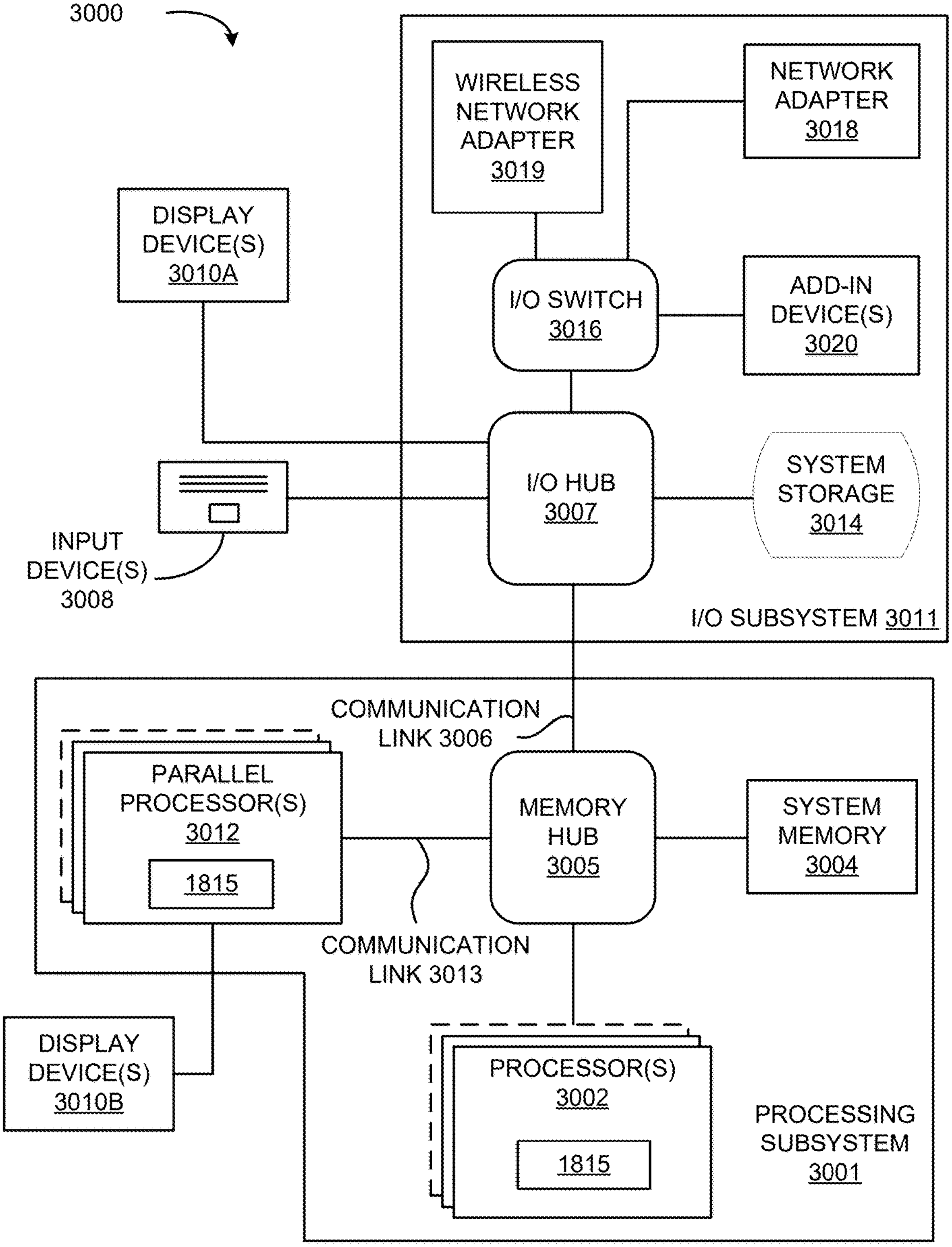
FIG. 30 illustrates a computer system, according to at least one embodiment.

FIG. 30 is a block diagram illustrating a computing system 3000 according to at least one embodiment. In at least one embodiment, computing system 3000 includes a processing subsystem 3001 having one or more processor(s) 3002 and a system memory 3004 communicating via an interconnection path that may include a memory hub 3005. In at least one embodiment, memory hub 3005 may be a separate component within a chipset component or may be integrated within one or more processor(s) 3002. In at least one embodiment, memory hub 3005 couples with an I/O subsystem 3011 via a communication link 3006. In at least one embodiment, I/O subsystem 3011 includes an I/O hub 3007 that can enable computing system 3000 to receive input from one or more input device(s) 3008. In at least one embodiment, I/O hub 3007 can enable a display controller, which may be included in one or more processor(s) 3002, to provide outputs to one or more display device(s) 3010A. In at least one embodiment, one or more display device(s) 3010A coupled with I/O hub 3007 can include a local, internal, or embedded display device.

In at least one embodiment, processing subsystem 3001 includes one or more parallel processor(s) 3012 coupled to memory hub 3005 via a bus or other communication link 3013. In at least one embodiment, communication link 3013 may be one of any number of standards based communication link technologies or protocols, such as, but not limited to PCI Express, or may be a vendor specific communications interface or communications fabric. In at least one embodiment, one or more parallel processor(s) 3012 form a computationally focused parallel or vector processing system that can include a large number of processing cores and/or processing clusters, such as a many integrated core (MIC)

processor. In at least one embodiment, one or more parallel processor(s) 3012 form a graphics processing subsystem that can output pixels to one of one or more display device(s) 3010A coupled via I/O Hub 3007. In at least one embodiment, one or more parallel processor(s) 3012 can also include a display controller and display interface (not shown) to enable a direct connection to one or more display device(s) 3010B.

In at least one embodiment, a system storage unit 3014 can connect to I/O hub 3007 to provide a storage mechanism for computing system 3000. In at least one embodiment, an I/O switch 3016 can be used to provide an interface mechanism to enable connections between I/O hub 3007 and other components, such as a network adapter 3018 and/or wireless network adapter 3019 that may be integrated into platform, and various other devices that can be added via one or more add-in device(s) 3020. In at least one embodiment, network adapter 3018 can be an Ethernet adapter or another wired network adapter. In at least one embodiment, wireless network adapter 3019 can include one or more of a Wi-Fi, Bluetooth, near field communication (NFC), or other network device that includes one or more wireless radios.

In at least one embodiment, computing system 3000 can include other components not explicitly shown, including USB or other port connections, optical storage drives, video capture devices, and like, may also be connected to I/O hub 3007. In at least one embodiment, communication paths interconnecting various components in FIG. 30 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 3012 incorporate circuitry optimized for graphics and video processing, including, for example, video output circuitry, and constitutes a graphics processing unit (GPU). In at least one embodiment, one or more parallel processor(s) 3012 incorporate circuitry optimized for general purpose processing. In at least embodiment, components of computing system 3000 may be integrated with one or more other system elements on a single integrated circuit. For example, in at least one embodiment, one or more parallel processor(s) 3012, memory hub 3005, processor(s) 3002, and I/O hub 3007 can be integrated into a system on chip (SoC) integrated circuit. In at least one embodiment, components of computing system 3000 can be integrated into a single package to form a system in package (SIP) configuration. In at least one embodiment, at least a portion of components of computing system 3000 can be integrated into a multi-chip module (MCM), which can be interconnected with other multi-chip modules into a modular computing system.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in system 3000 for inferencing or predicting operations based, at least in part, on weight parameters calculated using neural network training operations, neural network functions and/or architectures, or neural network use cases described herein.

In at least one embodiment, system 3000 is utilized to implement a discriminator that is trained to infer a viewpoint and a set of appearance attributes from an input image. In at least one embodiment, system 3000 is utilized to implement a generator that is trained to generate an image based on an input viewpoint and an input set of appearance parameters. In at least one embodiment, system 3000 is utilized to implement one or more neural networks comprising a discriminator and a generator, and system 3000 is utilized in connection with one or more processes that train one or more neural networks to identify an orientation of an object within an image in a self-supervised manner by at least computing one or more loss functions as part of training that evaluate one or more characteristics of images of a training set.

Processors

Figure 31A:
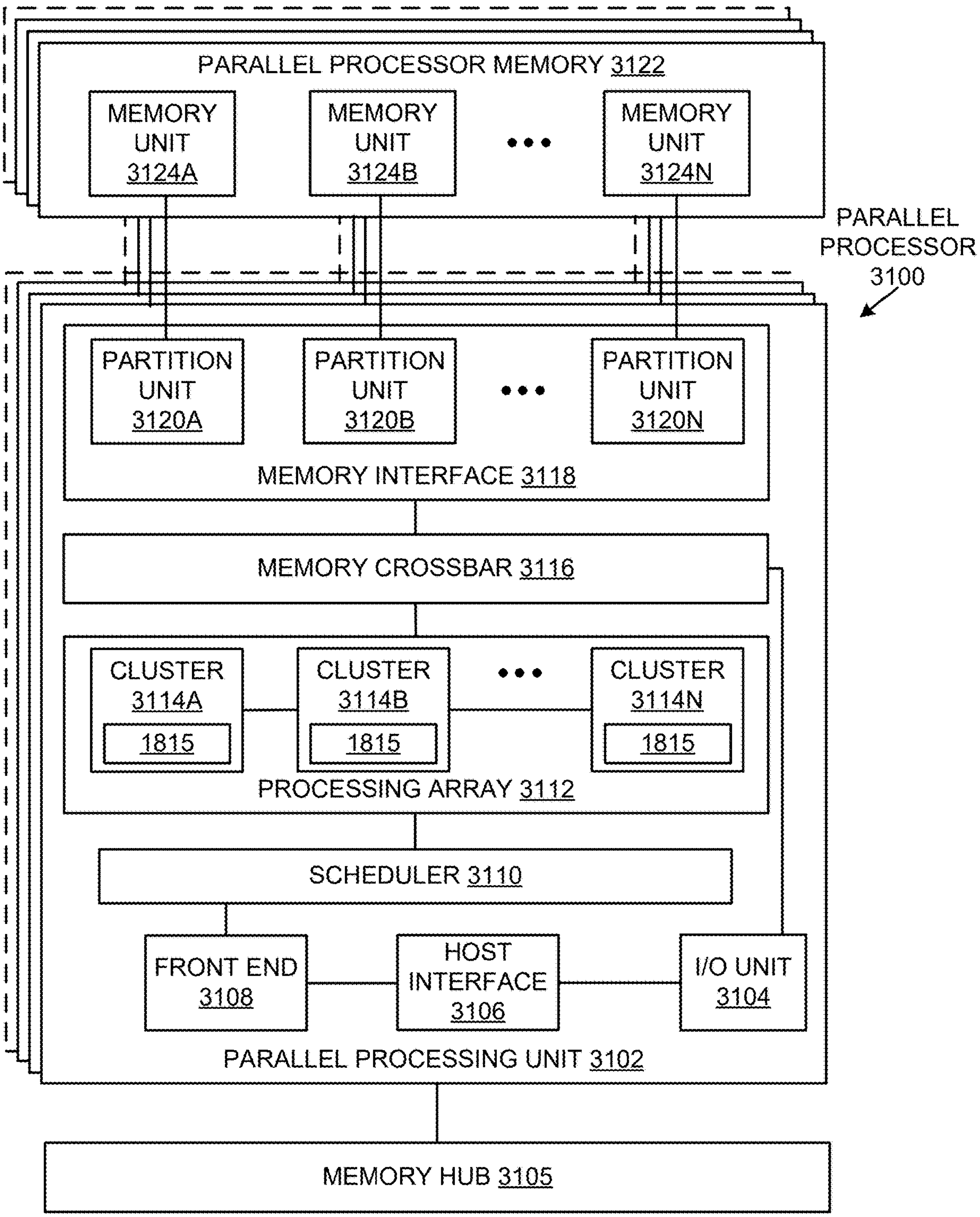
FIG. 31A illustrates a parallel processor, according to at least one embodiment.

FIG. 31A illustrates a parallel processor 3100 according to at least on embodiment. In at least one embodiment, various components of parallel processor 3100 may be implemented using one or more integrated circuit devices, such as programmable processors, application specific integrated circuits (ASICs), or field programmable gate arrays (FPGA). In at least one embodiment, illustrated parallel processor 3100 is a variant of one or more parallel processor(s) 3012 shown in FIG. 30 according to an exemplary embodiment.

In at least one embodiment, parallel processor 3100 includes a parallel processing unit 3102. In at least one embodiment, parallel processing unit 3102 includes an I/O unit 3104 that enables communication with other devices, including other instances of parallel processing unit 3102. In at least one embodiment, I/O unit 3104 may be directly connected to other devices. In at least one embodiment, I/O unit 3104 connects with other devices via use of a hub or switch interface, such as memory hub 3105. In at least one embodiment, connections between memory hub 3105 and I/O unit 3104 form a communication link 3013. In at least one embodiment, I/O unit 3104 connects with a host interface 3106 and a memory crossbar 3116, where host interface 3106 receives commands directed to performing processing operations and memory crossbar 3116 receives commands directed to performing memory operations.

In at least one embodiment, when host interface 3106 receives a command buffer via I/O unit 3104, host interface 3106 can direct work operations to perform those commands to a front end 3108. In at least one embodiment, front end 3108 couples with a scheduler 3110, which is configured to distribute commands or other work items to a processing cluster array 3112. In at least one embodiment, scheduler 3110 ensures that processing cluster array 3112 is properly configured and in a valid state before tasks are distributed to processing cluster array 3112 of processing cluster array 3112. In at least one embodiment, scheduler 3110 is implemented via firmware logic executing on a microcontroller. In at least one embodiment, microcontroller implemented scheduler 3110 is configurable to perform complex scheduling and work distribution operations at coarse and fine granularity, enabling rapid preemption and context switching of threads executing on processing array 3112. In at least one embodiment, host software can prove workloads for scheduling on processing array 3112 via one of multiple graphics processing doorbells. In at least one embodiment, workloads can then be automatically distributed across processing array 3112 by scheduler 3110 logic within a microcontroller including scheduler 3110.

In at least one embodiment, processing cluster array 3112 can include up to "N" processing clusters (e.g., cluster 3114A, cluster 3114B, through cluster 3114N). In at least one embodiment, each cluster 3114A-3114N of processing cluster array 3112 can execute a large number of concurrent threads. In at least one embodiment, scheduler 3110 can allocate work to clusters 3114A-3114N of processing cluster array 3112 using various scheduling and/or work distribution algorithms, which may vary depending on workload arising for each type of program or computation. In at least one embodiment, scheduling can be handled dynamically by scheduler 3110, or can be assisted in part by compiler logic during compilation of program logic configured for execution by processing cluster array 3112. In at least one embodiment, different clusters 3114A-3114N of processing cluster array 3112 can be allocated for processing different types of programs or for performing different types of computations.

In at least one embodiment, processing cluster array 3112 can be configured to perform various types of parallel processing operations. In at least one embodiment, processing cluster array 3112 is configured to perform general-purpose parallel compute operations. For example, in at least one embodiment, processing cluster array 3112 can include logic to execute processing tasks including filtering of video and/or audio data, performing modeling operations, including physics operations, and performing data transformations.

In at least one embodiment, processing cluster array 3112 is configured to perform parallel graphics processing operations. In at least one embodiment, processing cluster array 3112 can include additional logic to support execution of such graphics processing operations, including, but not limited to texture sampling logic to perform texture operations, as well as tessellation logic and other vertex processing logic. In at least one embodiment, processing cluster array 3112 can be configured to execute graphics processing related shader programs such as, but not limited to vertex shaders, tessellation shaders, geometry shaders, and pixel shaders. In at least one embodiment, parallel processing unit 3102 can transfer data from system memory via I/O unit 3104 for processing. In at least one embodiment, during processing, transferred data can be stored to on-chip memory (e.g., parallel processor memory 3122) during processing, then written back to system memory.

In at least one embodiment, when parallel processing unit 3102 is used to perform graphics processing, scheduler 3110 can be configured to divide a processing workload into approximately equal sized tasks, to better enable distribution of graphics processing operations to multiple clusters 3114A-3114N of processing cluster array 3112. In at least one embodiment, portions of processing cluster array 3112 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3114A-3114N may be stored in buffers to allow intermediate data to be transmitted between clusters 3114A-3114N for further processing.

In at least one embodiment, processing cluster array 3112 can receive processing tasks to be executed via scheduler 3110, which receives commands defining processing tasks from front end 3108. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3110 may be configured to fetch indices corresponding to tasks or may receive indices from front end 3108. In at least one embodiment, front end 3108 can be configured to ensure processing cluster array 3112 is configured to a valid state before a workload specified by incoming command buffers (e.g., batch-buffers, push buffers, etc.) is initiated.

In at least one embodiment, each of one or more instances of parallel processing unit 3102 can couple with parallel processor memory 3122. In at least one embodiment, parallel processor memory 3122 can be accessed via memory crossbar 3116, which can receive memory requests from processing cluster array 3112 as well as I/O unit 3104. In at least one embodiment, memory crossbar 3116 can access parallel processor memory 3122 via a memory interface 3118. In at least one embodiment, memory interface 3118 can include multiple partition units (e.g., partition unit 3120A, partition unit 3120B, through partition unit 3120N) that can each couple to a portion (e.g., memory unit) of parallel processor memory 3122. In at least one embodiment, a number of partition units 3120A-3120N is configured to be equal to a number of memory units, such that a first partition unit 3120A has a corresponding first memory unit 3124A, a second partition unit 3120B has a corresponding memory unit 3124B, and an Nth partition unit 3120N has a corresponding Nth memory unit 3124N. In at least one embodiment, a number of partition units 3120A-3120N may not be equal to a number of memory devices.

In at least one embodiment, memory units 3124A-3124N can include various types of memory devices, including dynamic random access memory (DRAM) or graphics random access memory, such as synchronous graphics random access memory (SGRAM), including graphics double data rate (GDDR) memory. In at least one embodiment, memory units 3124A-3124N may also include 3D stacked memory, including but not limited to high bandwidth memory (HBM). In at least one embodiment, render targets, such as frame buffers or texture maps may be stored across memory units 3124A-3124N, allowing partition units 3120A-3120N to write portions of each render target in parallel to efficiently use available bandwidth of parallel processor memory 3122. In at least one embodiment, a local instance of parallel processor memory 3122 may be excluded in favor of a unified memory design that utilizes system memory in conjunction with local cache memory.

In at least one embodiment, any one of clusters 3114A-3114N of processing cluster array 3112 can process data that will be written to any of memory units 3124A-3124N within parallel processor memory 3122. In at least one embodiment, memory crossbar 3116 can be configured to transfer an output of each cluster 3114A-3114N to any partition unit 3120A-3120N or to another cluster 3114A-3114N, which can perform additional processing operations on an output. In at least one embodiment, each cluster 3114A-3114N can communicate with memory interface 3118 through memory crossbar 3116 to read from or write to various external memory devices. In at least one embodiment, memory crossbar 3116 has a connection to memory interface 3118 to communicate with I/O unit 3104, as well as a connection to a local instance of parallel processor memory 3122, enabling processing units within different processing clusters 3114A-3114N to communicate with system memory or other memory that is not local to parallel processing unit 3102. In at least one embodiment, memory crossbar 3116 can use virtual channels to separate traffic streams between clusters 3114A-3114N and partition units 3120A-3120N.

In at least one embodiment, multiple instances of parallel processing unit 3102 can be provided on a single add-in card, or multiple add-in cards can be interconnected. In at least one embodiment, different instances of parallel processing unit 3102 can be configured to inter-operate even if different instances have different numbers of processing cores, different amounts of local parallel processor memory, and/or other configuration differences. For example, in at least one embodiment, some instances of parallel processing unit 3102 can include higher precision floating point units relative to other instances. In at least one embodiment, systems incorporating one or more instances of parallel processing unit 3102 or parallel processor 3100 can be implemented in a variety of configurations and form factors, including but not limited to desktop, laptop, or handheld personal computers, servers, workstations, game consoles, and/or embedded systems.

Figure 31B:
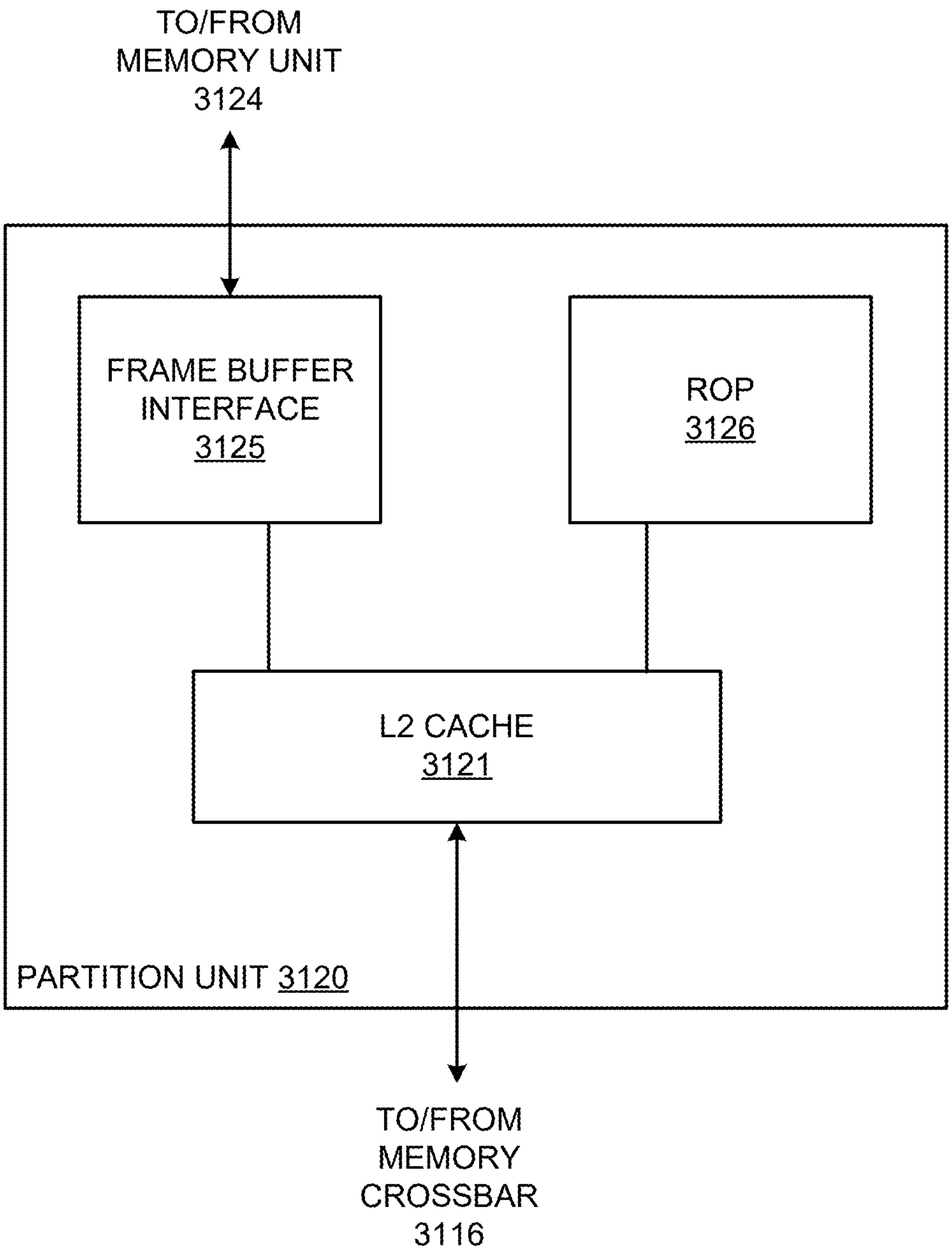
FIG. 31B illustrates a partition unit, according to at least one embodiment.

FIG. 31B is a block diagram of a partition unit 3120 according to at least one embodiment. In at least one embodiment, partition unit 3120 is an instance of one of partition units 3120A-3120N of FIG. 31A. In at least one embodiment, partition unit 3120 includes an L2 cache 3121, a frame buffer interface 3125, and a ROP 3126 (raster operations unit). L2 cache 3121 is a read/write cache that is configured to perform load and store operations received from memory crossbar 3116 and ROP 3126. In at least one embodiment, read misses and urgent write-back requests are output by L2 cache 3121 to frame buffer interface 3125 for processing. In at least one embodiment, updates can also be sent to a frame buffer via frame buffer interface 3125 for processing. In at least one embodiment, frame buffer interface 3125 interfaces with one of memory units in parallel processor memory, such as memory units 3124A-3124N of FIG. 31 (e.g., within parallel processor memory 3122).

In at least one embodiment, ROP 3126 is a processing unit that performs raster operations such as stencil, z test, blending, and like. In at least one embodiment, ROP 3126 then outputs processed graphics data that is stored in graphics memory. In at least one embodiment, ROP 3126 includes compression logic to compress depth or color data that is written to memory and decompress depth or color data that is read from memory. In at least one embodiment, compression logic can be lossless compression logic that makes use of one or more of multiple compression algorithms. In at least one embodiment, type of compression that is performed by ROP 3126 can vary based on statistical characteristics of data to be compressed. For example, in at least one embodiment, delta color compression is performed on depth and color data on a per-tile basis.

In In at least one embodiment, ROP 3126 is included within each processing cluster (e.g., cluster 3114A-3114N of FIG. 31) instead of within partition unit 3120. In at least one embodiment, read and write requests for pixel data are transmitted over memory crossbar 3116 instead of pixel fragment data. In at least one embodiment, processed graphics data may be displayed on a display device, such as one of one or more display device(s) 3010 of FIG. 30, routed for further processing by processor(s) 3002, or routed for further processing by one of processing entities within parallel processor 3100 of FIG. 31A.

Figure 31C:
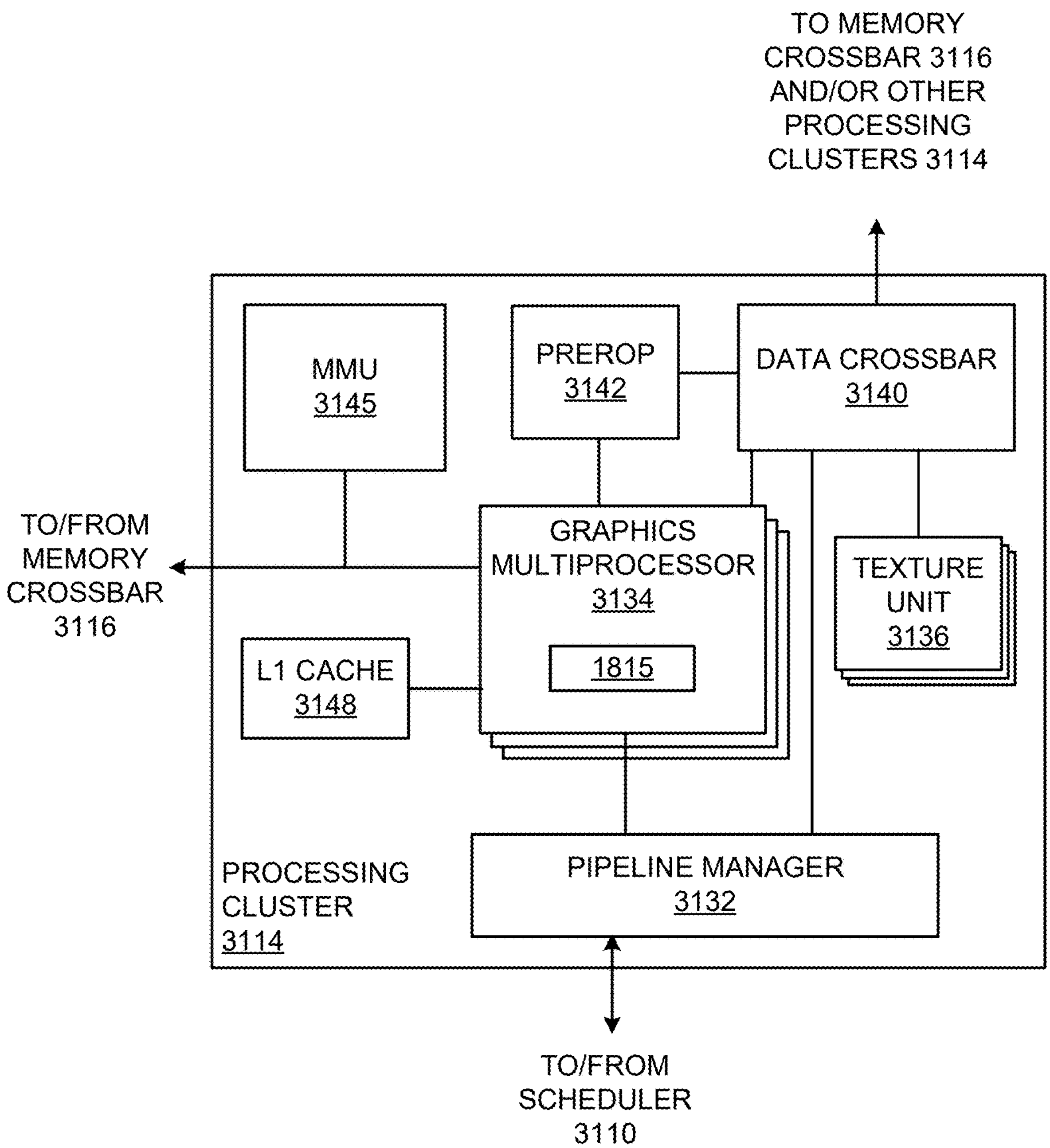
FIG. 31C illustrates a processing cluster, according to at least one embodiment.

FIG. 31C is a block diagram of a processing cluster 3114 within a parallel processing unit according to at least one embodiment. In at least one embodiment, a processing cluster is an instance of one of processing clusters 3114A-3114N of FIG. 31. In at least one embodiment, processing cluster 3114 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 3114 can be controlled via a pipeline manager 3132 that distributes processing tasks to SIMT parallel processors. In at least one embodiment, pipeline manager 3132 receives instructions from scheduler 3110 of FIG. 31 and manages execution of those instructions via a graphics multiprocessor 3134 and/or a texture unit 3136. In at least one embodiment, graphics multiprocessor 3134 is an exemplary instance of a SIMT parallel processor. However, in at least one embodiment, various types of SIMT parallel processors of differing architectures may be included within processing cluster 3114. In at least one embodiment, one or more instances of graphics multiprocessor 3134 can be included within a processing cluster 3114. In at least one embodiment, graphics multiprocessor 3134 can process data and a data crossbar 3140 can be used to distribute processed data to one of multiple possible destinations, including other shader units. In at least one embodiment, pipeline manager 3132 can facilitate distribution of processed data by specifying destinations for processed data to be distributed via data crossbar 3140.

In at least one embodiment, each graphics multiprocessor 3134 within processing cluster 3114 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3114 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 3134. In at least one embodiment, a thread group may include fewer threads than a number of processing engines within graphics multiprocessor 3134. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 3134. In at least one embodiment, when a thread group includes more threads than number of processing engines within graphics multiprocessor 3134, processing can be performed over consecutive clock cycles. In at least one embodiment, multiple thread groups can be executed concurrently on a graphics multiprocessor 3134.

In at least one embodiment, graphics multiprocessor 3134 includes an internal cache memory to perform load and store operations. In at least one embodiment, graphics multiprocessor 3134 can forego an internal cache and use a cache memory (e.g., L1 cache 3148) within processing cluster 3114. In at least one embodiment, each graphics multiprocessor 3134 also has access to L2 caches within partition units (e.g., partition units 3120A-3120N of FIG. 31) that are shared among all processing clusters 3114 and may be used to transfer data between threads. In at least one embodiment, graphics multiprocessor 3134 may also access off-chip global memory, which can include one or more of local parallel processor memory and/or system memory. In at least one embodiment, any memory external to parallel processing unit 3102 may be used as global memory. In at least one embodiment, processing cluster 3114 includes multiple instances of graphics multiprocessor 3134 can share common instructions and data, which may be stored in L1 cache 3148.

In at least one embodiment, each processing cluster 3114 may include an MMU 3145 (memory management unit) that is configured to map virtual addresses into physical addresses. In at least one embodiment, one or more instances of MMU 3145 may reside within memory interface 3118 of FIG. 31. In at least one embodiment, MMU 3145 includes a set of page table entries (PTEs) used to map a virtual address to a physical address of a tile and optionally a cache line index. In at least one embodiment, MMU 3145 may include address translation lookaside buffers (TLB) or caches that may reside within graphics multiprocessor 3134 or L1 cache or processing cluster 3114. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 3114 may be configured such that each graphics multiprocessor 3134 is coupled to a texture unit 3136 for performing texture mapping operations, e.g., determining texture sample positions, reading texture data, and filtering texture data. In at least one embodiment, texture data is read from an internal texture L1 cache (not shown) or from an L1 cache within graphics multiprocessor 3134 and is fetched from an L2 cache, local parallel processor memory, or system memory, as needed. In at least one embodiment, each graphics multiprocessor 3134 outputs processed tasks to data crossbar 3140 to provide processed task to another processing cluster 3114 for further processing or to store processed task in an L2 cache, local parallel processor memory, or system memory via memory crossbar 3116. In at least one embodiment, preROP 3142 (pre-raster operations unit) is configured to receive data from graphics multiprocessor 3134, direct data to ROP units, which may be located with partition units as described herein (e.g., partition units 3120A-3120N of FIG. 31). In at least one embodiment, PreROP 3142 unit can perform optimizations for color blending, organize pixel color data, and perform address translations.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in graphics processing cluster 3114 for inferencing or predicting operations based, at least in part, on weight parameters calculated using neural network training operations, neural network functions and/or architectures, or neural network use cases described herein.

In at least one embodiment, graphics processing cluster 3114 is utilized to implement a discriminator that is trained to infer a viewpoint and a set of appearance attributes from an input image. In at least one embodiment, graphics processing cluster 3114 is utilized to implement a generator that is trained to generate an image based on an input viewpoint and an input set of appearance parameters. In at least one embodiment, graphics processing cluster 3114 is utilized to implement one or more neural networks comprising a discriminator and a generator, and graphics processing cluster 3114 is utilized in connection with one or more processes that train one or more neural networks to identify an orientation of an object within an image in a self-supervised manner by at least computing one or more loss functions as part of training that evaluate one or more characteristics of images of a training set.

Figure 31D:
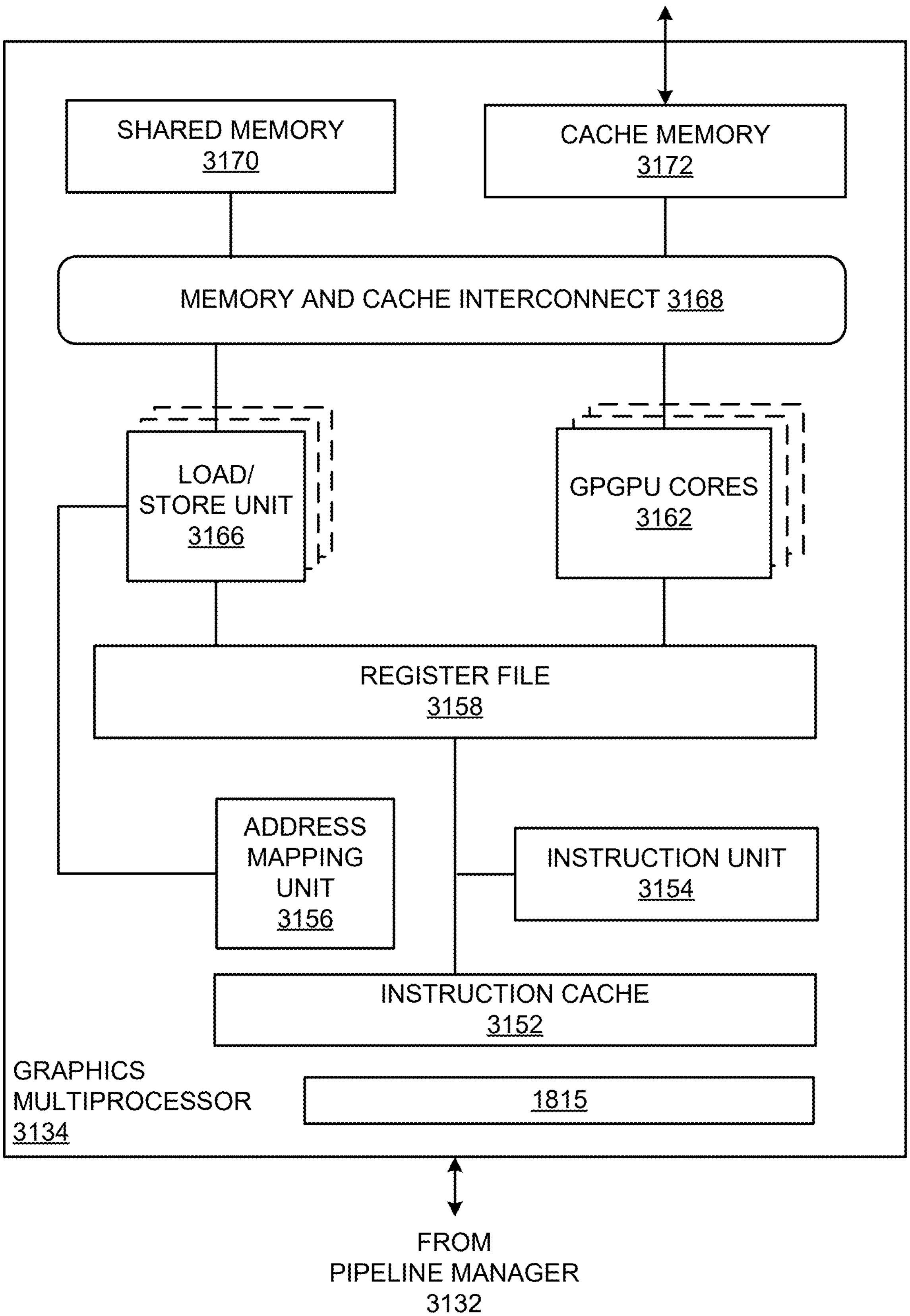
FIG. 31D illustrates a graphics multiprocessor, according to at least one embodiment.

FIG. 31D shows a graphics multiprocessor 3134 according to at least one embodiment. In at least one embodiment, graphics multiprocessor 3134 couples with pipeline manager 3132 of processing cluster 3114. In at least one embodiment, graphics multiprocessor 3134 has an execution pipeline including but not limited to an instruction cache 3152, an instruction unit 3154, an address mapping unit 3156, a register file 3158, one or more general purpose graphics processing unit (GPGPU) cores 3162, and one or more load/store units 3166. GPGPU cores 3162 and load/store units 3166 are coupled with cache memory 3172 and shared memory 3170 via a memory and cache interconnect 3168.

In at least one embodiment, instruction cache 3152 receives a stream of instructions to execute from pipeline manager 3132. In at least one embodiment, instructions are cached in instruction cache 3152 and dispatched for execution by instruction unit 3154. In at least one embodiment, instruction unit 3154 can dispatch instructions as thread groups (e.g., warps), with each thread of thread group assigned to a different execution unit within GPGPU core 3162. In at least one embodiment, an instruction can access any of a local, shared, or global address space by specifying an address within a unified address space. In at least one embodiment, address mapping unit 3156 can be used to translate addresses in a unified address space into a distinct memory address that can be accessed by load/store units 3166.

In at least one embodiment, register file 3158 provides a set of registers for functional units of graphics multiprocessor 3134. In at least one embodiment, register file 3158 provides temporary storage for operands connected to data paths of functional units (e.g., GPGPU cores 3162, load/store units 3166) of graphics multiprocessor 3134. In at least one embodiment, register file 3158 is divided between each of functional units such that each functional unit is allocated a dedicated portion of register file 3158. In at least one embodiment, register file 3158 is divided between different warps being executed by graphics multiprocessor 3134.

In at least one embodiment, GPGPU cores 3162 can each include floating point units (FPUs) and/or integer arithmetic logic units (ALUs) that are used to execute instructions of graphics multiprocessor 3134. GPGPU cores 3162 can be similar in architecture or can differ in architecture. In at least one embodiment, a first portion of GPGPU cores 3162 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 3134 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 3162 include SIMD logic capable of performing a single instruction on multiple sets of data. In at least one embodiment GPGPU cores 3162 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 3168 is an interconnect network that connects each functional unit of graphics multiprocessor 3134 to register file 3158 and to shared memory 3170. In at least one embodiment, memory and cache interconnect 3168 is a crossbar interconnect that allows load/store unit 3166 to implement load and store operations between shared memory 3170 and register file 3158. In at least one embodiment, register file 3158 can operate at a same frequency as GPGPU cores 3162, thus data transfer between GPGPU cores 3162 and register file 3158 is very low latency. In at least one embodiment, shared memory 3170 can be used to enable communication between threads that execute on functional units within graphics multiprocessor 3134. In at least one embodiment, cache memory 3172 can be used as a data cache for example, to cache texture data communicated between functional units and texture unit 3136. In at least one embodiment, shared memory 3170 can also be used as a program managed cached. In at least one embodiment, threads executing on GPGPU cores 3162 can programmatically store data within shared memory in addition to automatically cached data that is stored within cache memory 3172.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in graphics multiprocessor 3134 for inferencing or predicting operations based, at least in part, on weight parameters calculated using neural network training operations, neural network functions and/or architectures, or neural network use cases described herein.

In at least one embodiment, graphics multiprocessor 3134 is utilized to implement a discriminator that is trained to infer a viewpoint and a set of appearance attributes from an input image. In at least one embodiment, graphics multiprocessor 3134 is utilized to implement a generator that is trained to generate an image based on an input viewpoint and an input set of appearance parameters. In at least one embodiment, graphics multiprocessor 3134 is utilized to implement one or more neural networks comprising a discriminator and a generator, and graphics multiprocessor 3134 is utilized in connection with one or more processes that train one or more neural networks to identify an orientation of an object within an image in a self-supervised manner by at least computing one or more loss functions as part of training that evaluate one or more characteristics of images of a training set.

Figure 32:
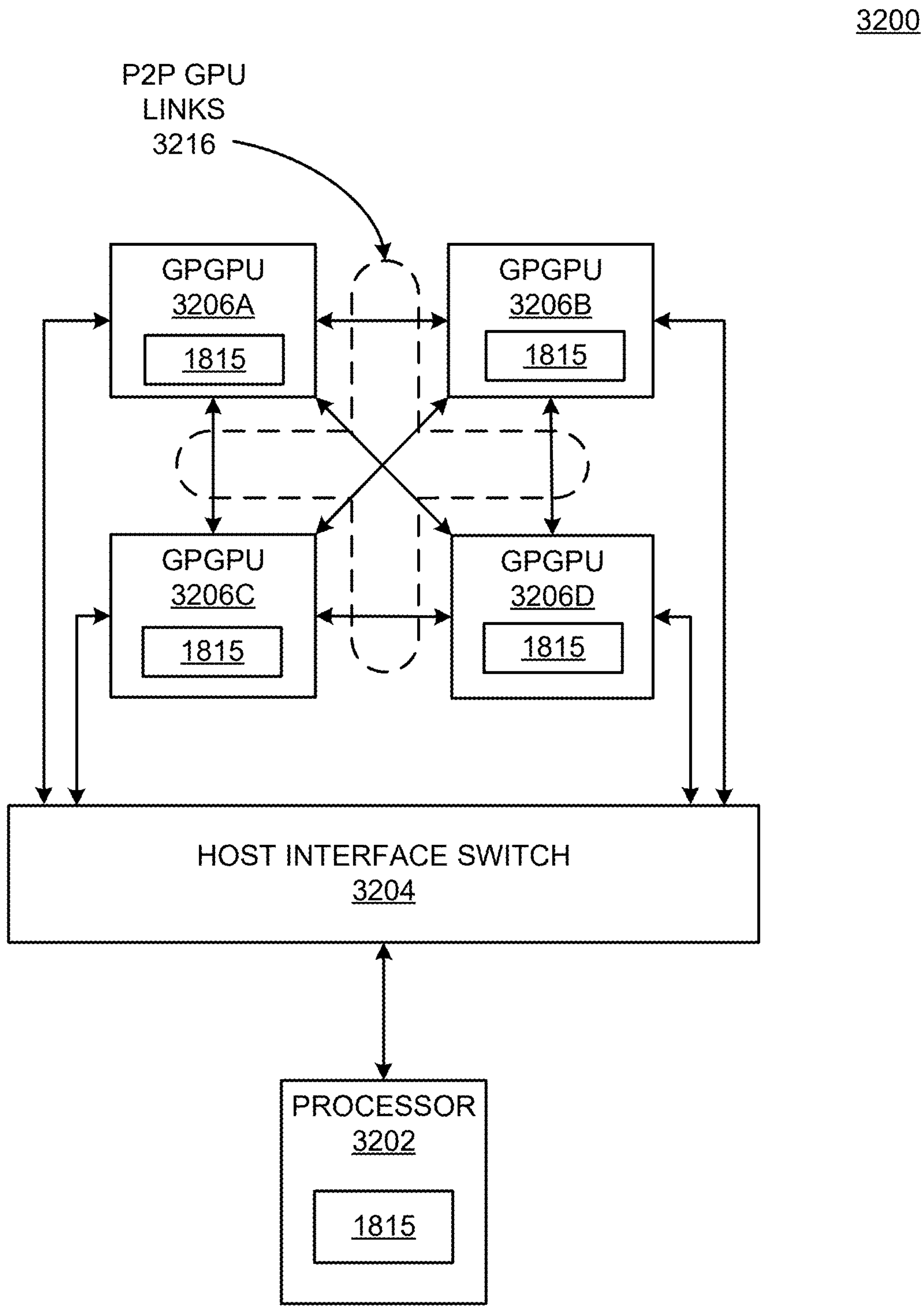
FIG. 32 illustrates a multi-graphics processing unit (GPU) system, according to at least one embodiment.

FIG. 32 illustrates a multi-GPU computing system 3200, according to at least one embodiment. In at least one embodiment, multi-GPU computing system 3200 can include a processor 3202 coupled to multiple general purpose graphics processing units (GPGPUs) 3206A-3206D via a host interface switch 3204. In at least one embodiment, host interface switch 3204 is a PCI express switch device that couples processor 3202 to a PCI express bus over which processor 3202 can communicate with GPGPUs 3206A-3206D. GPGPUs 3206A-3206D can interconnect via a set of high-speed point to point GPU to GPU links 3216. In at least one embodiment, GPU to GPU links 3216 connect to each of GPGPUs 3206A-3206D via a dedicated GPU link. In at least one embodiment, P2P GPU links 3216 enable direct communication between each of GPGPUs 3206A-3206D without requiring communication over host interface bus 3204 to which processor 3202 is connected. In at least one embodiment, with GPU-to-GPU traffic directed to P2P GPU links 3216, host interface bus 3204 remains available for system memory access or to communicate with other instances of multi-GPU computing system 3200, for example, via one or more network devices. While in at least one embodiment GPGPUs 3206A-3206D connect to processor 3202 via host interface switch 3204, in at least one embodiment processor 3202 includes direct support for P2P GPU links 3216 and can connect directly to GPGPUs 3206A-3206D.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in multi-GPU computing system 3200 for inferencing or predicting operations based, at least in part, on weight parameters calculated using neural network training operations, neural network functions and/or architectures, or neural network use cases described herein.

In at least one embodiment, multi-GPU computing system 3200 is utilized to implement a discriminator that is trained to infer a viewpoint and a set of appearance attributes from an input image. In at least one embodiment, multi-GPU computing system 3200 is utilized to implement a generator that is trained to generate an image based on an input viewpoint and an input set of appearance parameters. In at least one embodiment, multi-GPU computing system 3200 is utilized to implement one or more neural networks comprising a discriminator and a generator, and multi-GPU computing system 3200 is utilized in connection with one or more processes that train one or more neural networks to identify an orientation of an object within an image in a self-supervised manner by at least computing one or more loss functions as part of training that evaluate one or more characteristics of images of a training set.

Figure 33:
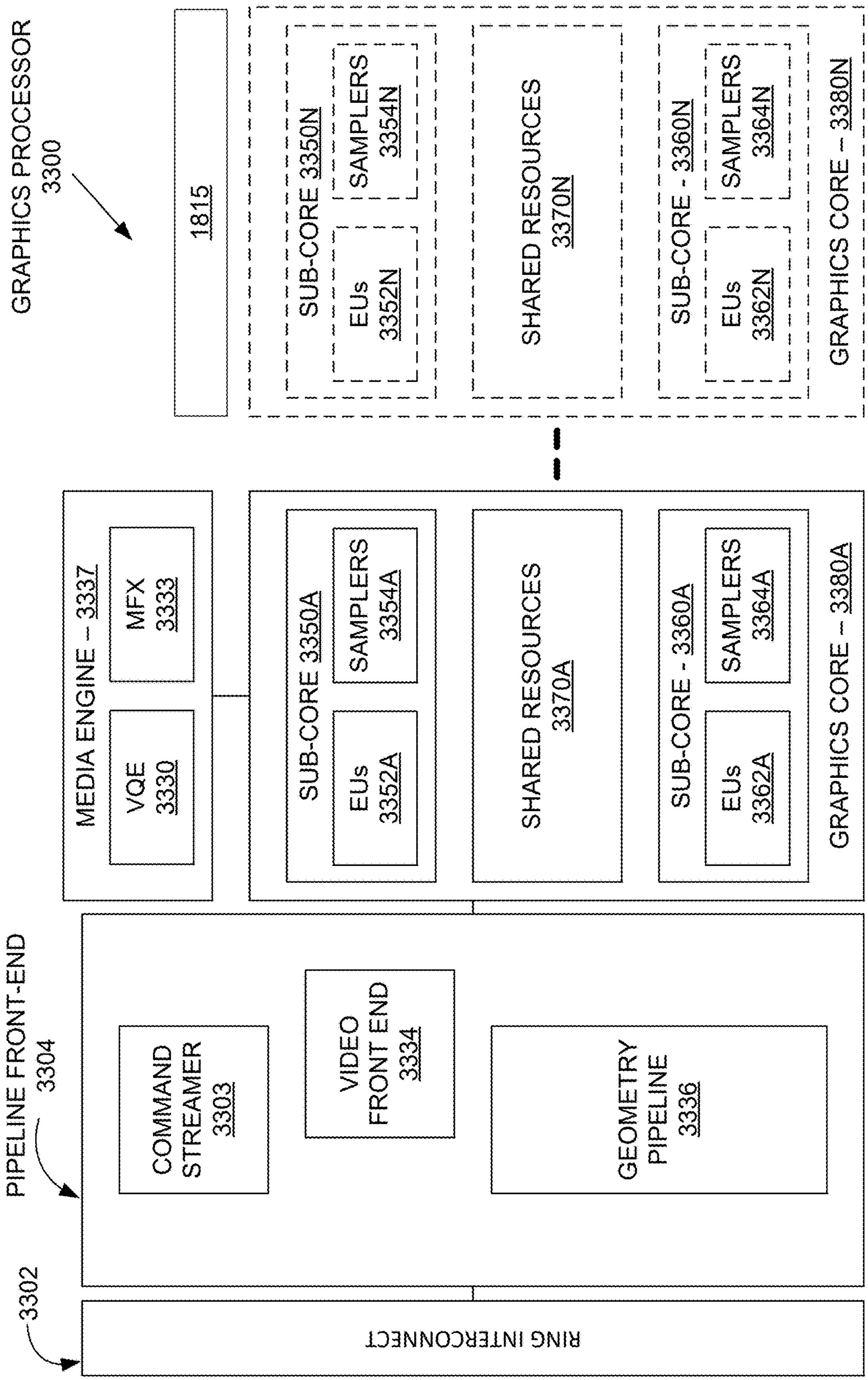
FIG. 33 illustrates a graphics processor, according to at least one embodiment.

FIG. 33 is a block diagram of a graphics processor 3300, according to at least one embodiment. In at least one embodiment, graphics processor 3300 includes a ring interconnect 3302, a pipeline front-end 3304, a media engine 3337, and graphics cores 3380A-3380N. In at least one embodiment, ring interconnect 3302 couples graphics processor 3300 to other processing units, including other graphics processors or one or more general-purpose processor cores. In at least one embodiment, graphics processor 3300 is one of many processors integrated within a multi-core processing system.

In at least one embodiment, graphics processor 3300 receives batches of commands via ring interconnect 3302. In at least one embodiment, incoming commands are interpreted by a command streamer 3303 in pipeline front-end 3304. In at least one embodiment, graphics processor 3300 includes scalable execution logic to perform 3D geometry processing and media processing via graphics core(s) 3380A-3380N. In at least one embodiment, for 3D geometry processing commands, command streamer 3303 supplies commands to geometry pipeline 3336. In at least one embodiment, for at least some media processing commands, command streamer 3303 supplies commands to a video front end 3334, which couples with a media engine 3337. In at least one embodiment, media engine 3337 includes a Video Quality Engine (VQE) 3330 for video and image post-processing and a multi-format encode/decode (MFX) 3333 engine to provide hardware-accelerated media data encode and decode. In at least one embodiment, geometry pipeline 3336 and media engine 3337 each generate execution threads for thread execution resources provided by at least one graphics core 3380A.

In at least one embodiment, graphics processor 3300 includes scalable thread execution resources featuring modular cores 3380A-3380N (sometimes referred to as core slices), each having multiple sub-cores 3350A-550N, 3360A-3360N (sometimes referred to as core sub-slices). In at least one embodiment, graphics processor 3300 can have any number of graphics cores 3380A through 3380N. In at least one embodiment, graphics processor 3300 includes a graphics core 3380A having at least a first sub-core 3350A and a second sub-core 3360A. In at least one embodiment, graphics processor 3300 is a low power processor with a single sub-core (e.g., 3350A). In at least one embodiment, graphics processor 3300 includes multiple graphics cores 3380A-3380N, each including a set of first sub-cores 3350A-3350N and a set of second sub-cores 3360A-3360N. In at least one embodiment, each sub-core in first sub-cores 3350A-3350N includes at least a first set of execution units 3352A-3352N and media/texture samplers 3354A-3354N. In at least one embodiment, each sub-core in second sub-cores 3360A-3360N includes at least a second set of execution units 3362A-3362N and samplers 3364A-3364N. In at least one embodiment, each sub-core 3350A-3350N, 3360A-3360N shares a set of shared resources 3370A-3370N. In at least one embodiment, shared resources include shared cache memory and pixel operation logic.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, inference and/or training logic 1815 may be used in graphics processor 3300 for inferencing or predicting operations based, at least in part, on weight parameters calculated using neural network training operations, neural network functions and/or architectures, or neural network use cases described herein.

In at least one embodiment, graphics processor 3300 is utilized to implement a discriminator that is trained to infer a viewpoint and a set of appearance attributes from an input image. In at least one embodiment, graphics processor 3300 is utilized to implement a generator that is trained to generate an image based on an input viewpoint and an input set of appearance parameters. In at least one embodiment, graphics processor 3300 is utilized to implement one or more neural networks comprising a discriminator and a generator, and graphics processor 3300 is utilized in connection with one or more processes that train one or more neural networks to identify an orientation of an object within an image in a self-supervised manner by at least computing one or more loss functions as part of training that evaluate one or more characteristics of images of a training set.

Figure 34:
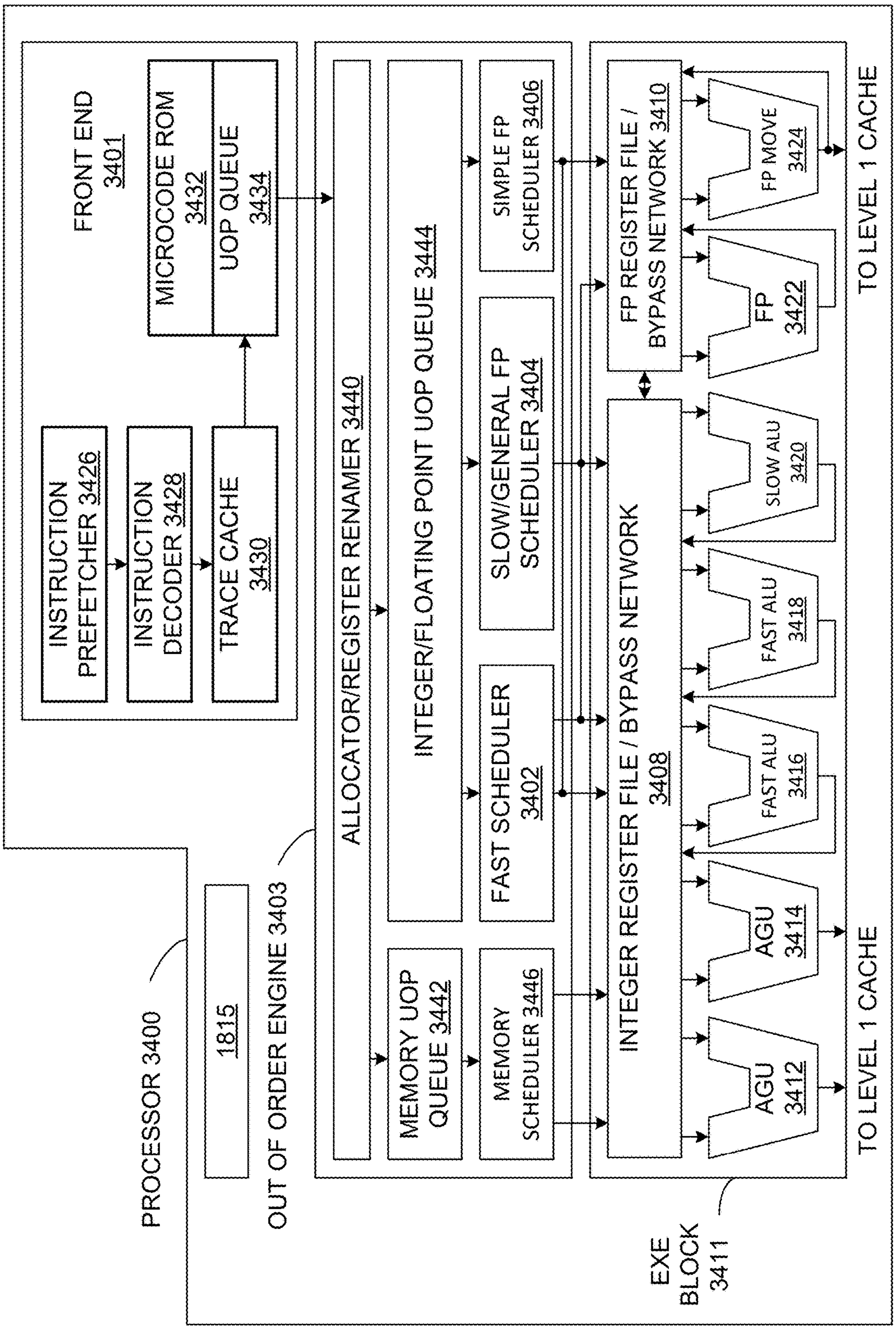
FIG. 34 is a block diagram illustrating a processor micro-architecture for a processor, according to at least one embodiment.

FIG. 34 is a block diagram illustrating micro-architecture for a processor 3400 that may include logic circuits to perform instructions, according to at least one embodiment. In at least one embodiment, processor 3400 may perform instructions, including x86 instructions, ARM instructions, specialized instructions for application-specific integrated circuits (ASICs), etc. In at least one embodiment, processor 3410 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 3410 may perform instructions to accelerate machine learning or deep learning algorithms, training, or inferencing.

In at least one embodiment, processor 3400 includes an in-order front end ("front end") 3401 to fetch instructions to be executed and prepare instructions to be used later in processor pipeline. In at least one embodiment, front end 3401 may include several units. In at least one embodiment, an instruction prefetcher 3426 fetches instructions from memory and feeds instructions to an instruction decoder 3428 which in turn decodes or interprets instructions. For example, in at least one embodiment, instruction decoder 3428 decodes a received instruction into one or more operations called "micro-instructions" or "micro-operations" (also called "micro ops" or "uops") that machine may execute. In at least one embodiment, instruction decoder 3428 parses instruction into an opcode and corresponding data and control fields that may be used by micro-architecture to perform operations in accordance with at least one embodiment. In at least one embodiment, a trace cache 3430 may assemble decoded uops into program ordered sequences or traces in a uop queue 3434 for execution. In at least one embodiment, when trace cache 3430 encounters a complex instruction, a microcode ROM 3432 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 3428 may access microcode ROM 3432 to perform instruction. In at least one embodiment, an instruction may be decoded into a small number of micro-ops for processing at instruction decoder 3428. In at least one embodiment, an instruction may be stored within microcode ROM 3432 should a number of micro-ops be needed to accomplish operation. In at least one embodiment, trace cache 3430 refers to an entry point programmable logic array ("PLA") to determine a correct micro-instruction pointer for reading microcode sequences to complete one or more instructions from microcode ROM 3432 in accordance with at least one embodiment. In at least one embodiment, after microcode ROM 3432 finishes sequencing micro-ops for an instruction, front end 3401 of machine may resume fetching micro-ops from trace cache 3430.

In at least one embodiment, out-of-order execution engine ("out of order engine") 3403 may prepare instructions for execution. In at least one embodiment, out-of-order execution logic has a number of buffers to smooth out and re-order flow of instructions to optimize performance as they go down pipeline and get scheduled for execution. out-of-order execution engine 3403 includes, without limitation, an allocator/register renamer 3440, a memory uop queue 3442, an integer/floating point uop queue 3444, a memory scheduler 3446, a fast scheduler 3402, a slow/general floating point scheduler ("slow/general FP scheduler") 3404, and a simple floating point scheduler ("simple FP scheduler") 3406. In at least one embodiment, fast schedule 3402, slow/general floating point scheduler 3404, and simple floating point scheduler 3406 are also collectively referred to herein as "uop schedulers 3402, 3404, 3406." Allocator/register renamer 3440 allocates machine buffers and resources that each uop needs in order to execute. In at least one embodiment, allocator/register renamer 3440 renames logic registers onto entries in a register file. In at least one embodiment, allocator/register renamer 3440 also allocates an entry for each uop in one of two uop queues, memory uop queue 3442 for memory operations and integer/floating point uop queue 3444 for non-memory operations, in front of memory scheduler 3446 and uop schedulers 3402, 3404, 3406. In at least one embodiment, uop schedulers 3402, 3404, 3406, determine when a uop is ready to execute based on readiness of their dependent input register operand sources and availability of execution resources uops need to complete their operation. In at least one embodiment, fast scheduler 3402 of at least one embodiment may schedule on each half of main clock cycle while slow/general floating point scheduler 3404 and simple floating point scheduler 3406 may schedule once per main processor clock cycle. In at least one embodiment, uop schedulers 3402, 3404, 3406 arbitrate for dispatch ports to schedule uops for execution.

In at least one embodiment, execution block 3411 includes, without limitation, an integer register file/bypass network 3408, a floating point register file/bypass network ("FP register file/bypass network") 3410, address generation units ("AGUs") 3412 and 3414, fast Arithmetic Logic Units (ALUs) ("fast ALUs") 3416 and 3418, a slow Arithmetic Logic Unit ("slow ALU") 3420, a floating point ALU ("FP") 3422, and a floating point move unit ("FP move") 3424. In at least one embodiment, integer register file/bypass network 3408 and floating point register file/bypass network 3410 are also referred to herein as "register files 3408, 3410." In at least one embodiment, AGUSs 3412 and 3414, fast ALUs 3416 and 3418, slow ALU 3420, floating point ALU 3422, and floating point move unit 3424 are also referred to herein as "execution units 3412, 3414, 3416, 3418, 3420, 3422, and 3424." In at least one embodiment, execution block 3411 may include, without limitation, any number (including zero) and type of register files, bypass networks, address generation units, and execution units, in any combination.

In at least one embodiment, register files 3408, 3410 may be arranged between uop schedulers 3402, 3404, 3406, and execution units 3412, 3414, 3416, 3418, 3420, 3422, and 3424. In at least one embodiment, integer register file/bypass network 3408 performs integer operations. In at least one embodiment, floating point register file/bypass network 3410 performs floating point operations. In at least one embodiment, each of register files 3408, 3410 may include, without limitation, a bypass network that may bypass or forward just completed results that have not yet been written into register file to new dependent uops. In at least one embodiment, register files 3408, 3410 may communicate data with each other. In at least one embodiment, integer register file/bypass network 3408 may include, without limitation, two separate register files, one register file for low-order thirty-two bits of data and a second register file for high order thirty-two bits of data. In at least one embodiment, floating point register file/bypass network 3410 may include, without limitation, 128-bit wide entries because floating point instructions typically have operands from 64 to 128 bits in width.

In at least one embodiment, execution units 3412, 3414, 3416, 3418, 3420, 3422, 3424 may execute instructions. In at least one embodiment, register files 3408, 3410 store integer and floating point data operand values that micro-instructions need to execute. In at least one embodiment, processor 3400 may include, without limitation, any number and combination of execution units 3412, 3414, 3416, 3418, 3420, 3422, 3424. In at least one embodiment, floating point ALU 3422 and floating point move unit 3424, may execute floating point, MMX, SIMD, AVX and SSE, or other operations, including specialized machine learning instructions. In at least one embodiment, floating point ALU 3422 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3416, 3418. In at least one embodiment, fast ALUS 3416, 3418 may execute fast operations with an effective latency of half a clock cycle. In at least one embodiment, most complex integer operations go to slow ALU 3420 as slow ALU 3420 may include, without limitation, integer execution hardware for long-latency type of operations, such as a multiplier, shifts, flag logic, and branch processing. In at least one embodiment, memory load/store operations may be executed by AGUS 3412, 3414. In at least one embodiment, fast ALU 3416, fast ALU 3418, and slow ALU 3420 may perform integer operations on 64-bit data operands. In at least one embodiment, fast ALU 3416, fast ALU 3418, and slow ALU 3420 may be implemented to support a variety of data bit sizes including sixteen, thirty-two, 128, 256, etc. In at least one embodiment, floating point ALU 3422 and floating point move unit 3424 may be implemented to support a range of operands having bits of various widths. In at least one embodiment, floating point ALU 3422 and floating point move unit 3424 may operate on 128-bit wide packed data operands in conjunction with SIMD and multimedia instructions.

In at least one embodiment, uop schedulers 3402, 3404, 3406, dispatch dependent operations before parent load has finished executing. In at least one embodiment, as uops may be speculatively scheduled and executed in processor 3400, processor 3400 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment portions or all of inference and/or training logic 1815 may be incorporated into EXE Block 3411 and other memory or registers shown or not shown. For example, in at least one embodiment, training and/or inferencing techniques described herein may use one or more of ALUs illustrated in EXE Block 3411. Moreover, weight parameters may be stored in on-chip or off-chip memory and/or registers (shown or not shown) that configure ALUs of EXE Block 3411 to perform one or more machine learning algorithms, neural network architectures, use cases, or training techniques described herein.

In at least one embodiment, ALUs of EXE Block 3411 are utilized to implement a discriminator that is trained to infer a viewpoint and a set of appearance attributes from an input image. In at least one embodiment, ALUs of EXE Block 3411 are utilized to implement a generator that is trained to generate an image based on an input viewpoint and an input set of appearance parameters. In at least one embodiment, ALUs of EXE Block 3411 are utilized to implement one or more neural networks comprising a discriminator and a generator, and ALUs of EXE Block 3411 is utilized in connection with one or more processes that train one or more neural networks to identify an orientation of an object within an image in a self-supervised manner by at least computing one or more loss functions as part of training that evaluate one or more characteristics of images of a training set.

Figure 35:
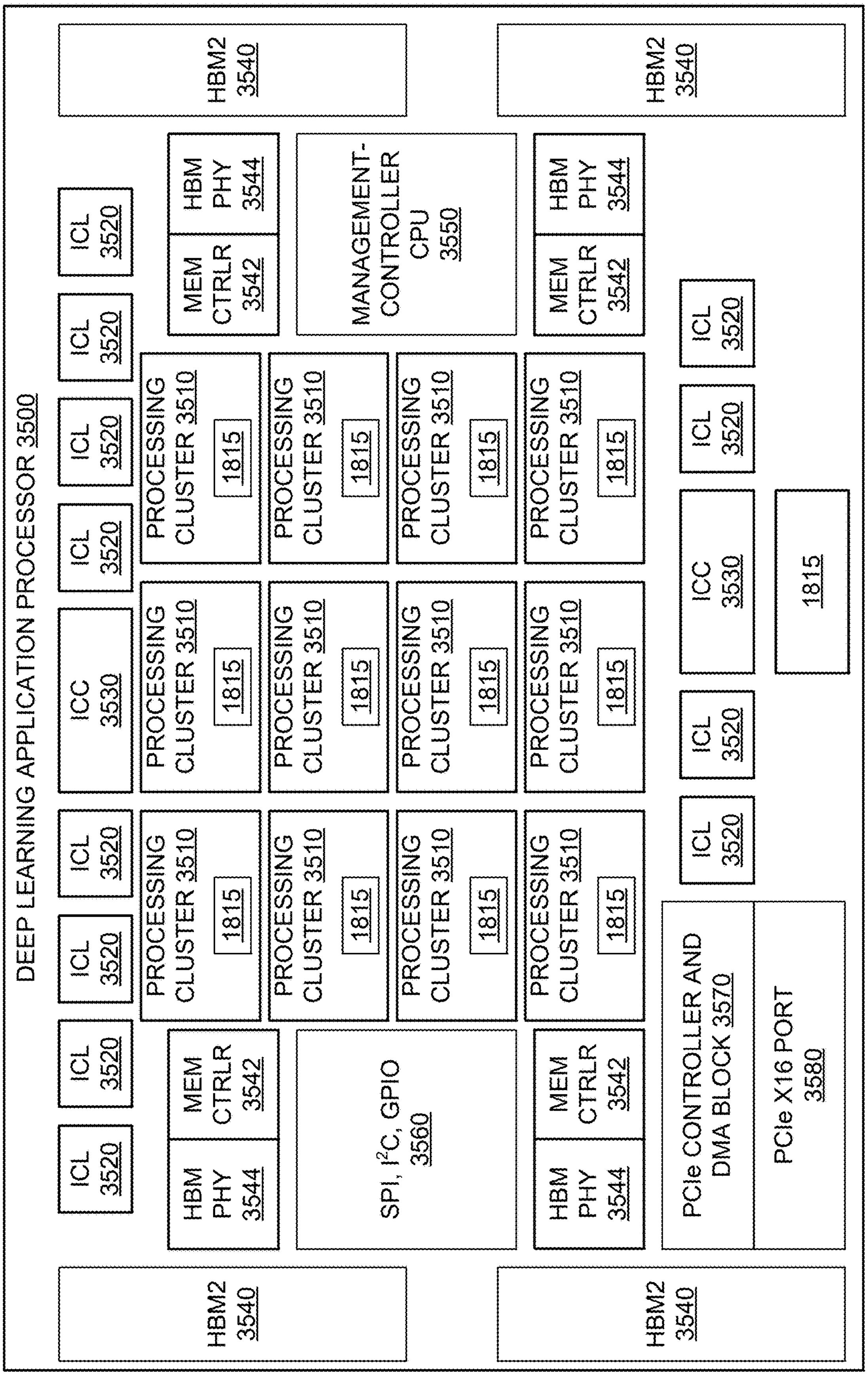
FIG. 35 illustrates a deep learning application processor, according to at least one embodiment.

FIG. 35 illustrates a deep learning application processor 3500, according to at least one embodiment. In at least one embodiment, deep learning application processor 3500 uses instructions that, if executed by deep learning application processor 3500, cause deep learning application processor 3500 to perform some or all of processes and techniques described throughout this disclosure. In at least one embodiment, deep learning application processor 3500 is an application-specific integrated circuit (ASIC). In at least one embodiment, application processor 3500 performs matrix multiply operations either "hard-wired" into hardware as a result of performing one or more instructions or both. In at least one embodiment, deep learning application processor 3500 includes, without limitation, processing clusters 3510(1)-3510(12), Inter-Chip Links ("ICLs") 3520(1)-3520(12), Inter-Chip Controllers ("ICCs") 3530(1)-3530(2), high bandwidth memory second generation ("HBM2") 3540(1)-3540(4), memory controllers ("Mem Ctrlrs") 3542(1)-3542(4), high bandwidth memory physical layer ("HBM PHY") 3544(1)-3544(4), a management-controller central processing unit ("management-controller CPU") 3550, a Serial Peripheral Interface, Inter-Integrated Circuit, and General Purpose Input/Output block ("SPI, I2C, GPIO") 3560, a peripheral component interconnect express controller and direct memory access block ("PCIe Controller and DMA") 3570, and a sixteen-lane peripheral component interconnect express port ("PCI Express x 16") 3580.

In at least one embodiment, processing clusters 3510 may perform deep learning operations, including inference or prediction operations based on weight parameters calculated one or more training techniques, including those described herein. In at least one embodiment, each processing cluster 3510 may include, without limitation, any number and type of processors. In at least one embodiment, deep learning application processor 3500 may include any number and type of processing clusters 3500. In at least one embodiment, Inter-Chip Links 3520 are bi-directional. In at least one embodiment, Inter-Chip Links 3520 and Inter-Chip Controllers 3530 enable multiple deep learning application processors 3500 to exchange information, including activation information resulting from performing one or more machine learning algorithms embodied in one or more neural networks. In at least one embodiment, deep learning application processor 3500 may include any number (including zero) and type of ICLs 3520 and ICCs 3530.

In at least one embodiment, HBM2s 3540 provide a total of 32 Gigabytes (GB) of memory. HBM2 3540(*i*) is associated with both memory controller 3542(*i*) and HBM PHY 3544(*i*). In at least one embodiment, any number of HBM2s 3540 may provide any type and total amount of high bandwidth memory and may be associated with any number (including zero) and type of memory controllers 3542 and HBM PHYs 3544. In at least one embodiment, SPI, I2C, GPIO 3560, PCIe Controller and DMA 3570, and/or PCIe 3580 may be replaced with any number and type of blocks that enable any number and type of communication standards in any technically feasible fashion.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, deep learning application processor is used to train a machine learning model, such as a neural network, to predict or infer information provided to deep learning application processor 3500. In at least one embodiment, deep learning application processor 3500 is used to infer or predict information based on a trained machine learning model (e.g., neural network) that has been trained by another processor or system or by deep learning application processor 3500. In at least one embodiment, processor 3500 may be used to perform one or more neural network use cases described herein.

In at least one embodiment, processor 3500 is utilized to implement a discriminator that is trained to infer a viewpoint and a set of appearance attributes from an input image. In at least one embodiment, processor 3500 is utilized to implement a generator that is trained to generate an image based on an input viewpoint and an input set of appearance parameters. In at least one embodiment, processor 3500 is utilized to implement one or more neural networks comprising a discriminator and a generator, and processor 3500 is utilized in connection with one or more processes that train one or more neural networks to identify an orientation of an object within an image in a self-supervised manner by at least computing one or more loss functions as part of training that evaluate one or more characteristics of images of a training set.

Figure 36:
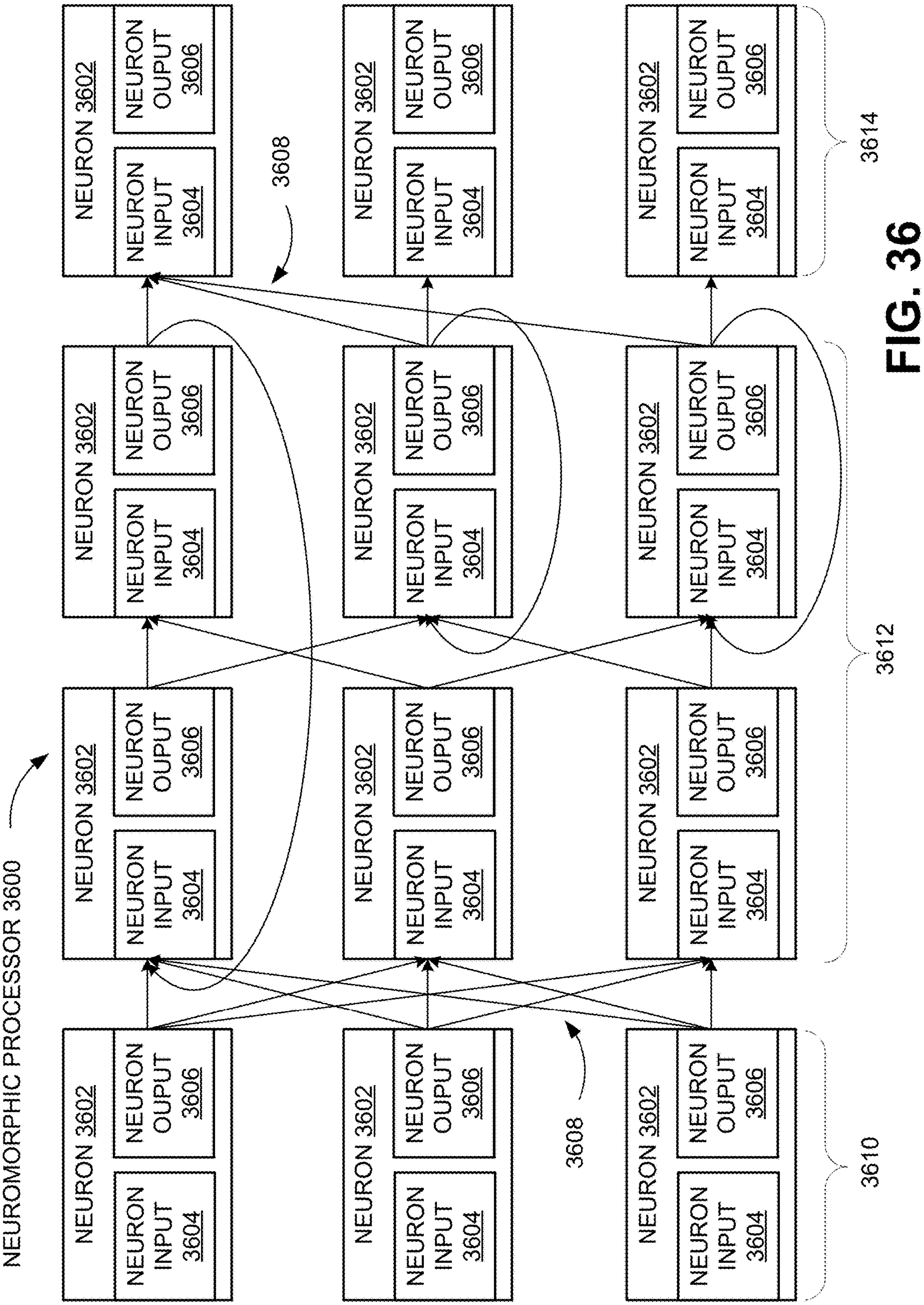
FIG. 36 is a block diagram illustrating an example neuromorphic processor, according to at least one embodiment.

FIG. 36 is a block diagram of a neuromorphic processor 3600, according to at least one embodiment. In at least one embodiment, neuromorphic processor 3600 may receive one or more inputs from sources external to neuromorphic processor 3600. In at least one embodiment, these inputs may be transmitted to one or more neurons 3602 within neuromorphic processor 3600. In at least one embodiment, neurons 3602 and components thereof may be implemented using circuitry or logic, including one or more arithmetic logic units (ALUs). In at least one embodiment, neuromorphic processor 3600 may include, without limitation, thousands or millions of instances of neurons 3602, but any suitable number of neurons 3602 may be used. In at least one embodiment, each instance of neuron 3602 may include a neuron input 3604 and a neuron output 3606. In at least one embodiment, neurons 3602 may generate outputs that may be transmitted to inputs of other instances of neurons 3602. For example, in at least one embodiment, neuron inputs 3604 and neuron outputs 3606 may be interconnected via synapses 3608.

In at least one embodiment, neurons 3602 and synapses 3608 may be interconnected such that neuromorphic processor 3600 operates to process or analyze information received by neuromorphic processor 3600. In at least one embodiment, neurons 3602 may transmit an output pulse (or "fire" or "spike") when inputs received through neuron input 3604 exceed a threshold. In at least one embodiment, neurons 3602 may sum or integrate signals received at neuron inputs 3604. For example, in at least one embodiment, neurons 3602 may be implemented as leaky integrate-and-fire neurons, wherein if a sum (referred to as a "membrane potential") exceeds a threshold value, neuron 3602 may generate an output (or "fire") using a transfer function such as a sigmoid or threshold function. In at least one embodiment, a leaky integrate-and-fire neuron may sum signals received at neuron inputs 3604 into a membrane potential and may also apply a decay factor (or leak) to reduce a membrane potential. In at least one embodiment, a leaky integrate-and-fire neuron may fire if multiple input signals are received at neuron inputs 3604 rapidly enough to exceed a threshold value (i.e., before a membrane potential decays too low to fire). In at least one embodiment, neurons 3602 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3602 may include, without limitation, comparator circuits or logic that generate an output spike at neuron output 3606 when result of applying a transfer function to neuron input 3604 exceeds a threshold. In at least one embodiment, once neuron 3602 fires, it may disregard previously received input information by, for example, resetting a membrane potential to 0 or another suitable default value. In at least one embodiment, once membrane potential is reset to 0, neuron 3602 may resume normal operation after a suitable period of time (or refractory period).

In at least one embodiment, neurons 3602 may be interconnected through synapses 3608. In at least one embodiment, synapses 3608 may operate to transmit signals from an output of a first neuron 3602 to an input of a second neuron 3602. In at least one embodiment, neurons 3602 may transmit information over more than one instance of synapse 3608. In at least one embodiment, one or more instances of neuron output 3606 may be connected, via an instance of synapse 3608, to an instance of neuron input 3604 in same neuron 3602. In at least one embodiment, an instance of neuron 3602 generating an output to be transmitted over an instance of synapse 3608 may be referred to as a "pre-synaptic neuron" with respect to that instance of synapse 3608. In at least one embodiment, an instance of neuron 3602 receiving an input transmitted over an instance of synapse 3608 may be referred to as a "post-synaptic neuron" with respect to that instance of synapse 3608. Because an instance of neuron 3602 may receive inputs from one or more instances of synapse 3608, and may also transmit outputs over one or more instances of synapse 3608, a single instance of neuron 3602 may therefore be both a "pre-synaptic neuron" and "post-synaptic neuron," with respect to various instances of synapses 3608, in at least one embodiment.

In at least one embodiment, neurons 3602 may be organized into one or more layers. Each instance of neuron 3602 may have one neuron output 3606 that may fan out through one or more synapses 3608 to one or more neuron inputs 3604. In at least one embodiment, neuron outputs 3606 of neurons 3602 in a first layer 3610 may be connected to neuron inputs 3604 of neurons 3602 in a second layer 3612. In at least one embodiment, layer 3610 may be referred to as a "feed-forward layer." In at least one embodiment, each instance of neuron 3602 in an instance of first layer 3610 may fan out to each instance of neuron 3602 in second layer 3612. In at least one embodiment, first layer 3610 may be referred to as a "fully connected feed-forward layer." In at least one embodiment, each instance of neuron 3602 in an instance of second layer 3612 may fan out to fewer than all instances of neuron 3602 in a third layer 3614. In at least one embodiment, second layer 3612 may be referred to as a "sparsely connected feed-forward layer." In at least one embodiment, neurons 3602 in second layer 3612 may fan out to neurons 3602 in multiple other layers, including to neurons 3602 in (same) second layer 3612. In at least one embodiment, second layer 3612 may be referred to as a "recurrent layer." Neuromorphic processor 3600 may include, without limitation, any suitable combination of recurrent layers and feed-forward layers, including, without limitation, both sparsely connected feed-forward layers and fully connected feed-forward layers.

In at least one embodiment, neuromorphic processor 3600 may include, without limitation, a reconfigurable interconnect architecture or dedicated hard wired interconnects to connect synapse 3608 to neurons 3602. In at least one embodiment, neuromorphic processor 3600 may include, without limitation, circuitry or logic that allows synapses to be allocated to different neurons 3602 as needed based on neural network topology and neuron fan-in/out. For example, in at least one embodiment, synapses 3608 may be connected to neurons 3602 using an interconnect fabric, such as network-on-chip, or with dedicated connections. In at least one embodiment, synapse interconnections and components thereof may be implemented using circuitry or logic.

In at least one embodiment, neuromorphic processor 3600 is utilized to implement a discriminator that is trained to infer a viewpoint and a set of appearance attributes from an input image. In at least one embodiment, neuromorphic processor 3600 is utilized to implement a generator that is trained to generate an image based on an input viewpoint and an input set of appearance parameters. In at least one embodiment, neuromorphic processor 3600 is utilized to implement one or more neural networks comprising a discriminator and a generator, and neuromorphic processor 3600 is utilized in connection with one or more processes that train one or more neural networks to identify an orientation of an object within an image in a self-supervised manner by at least computing one or more loss functions as part of training that evaluate one or more characteristics of images of a training set.

Figure 37:
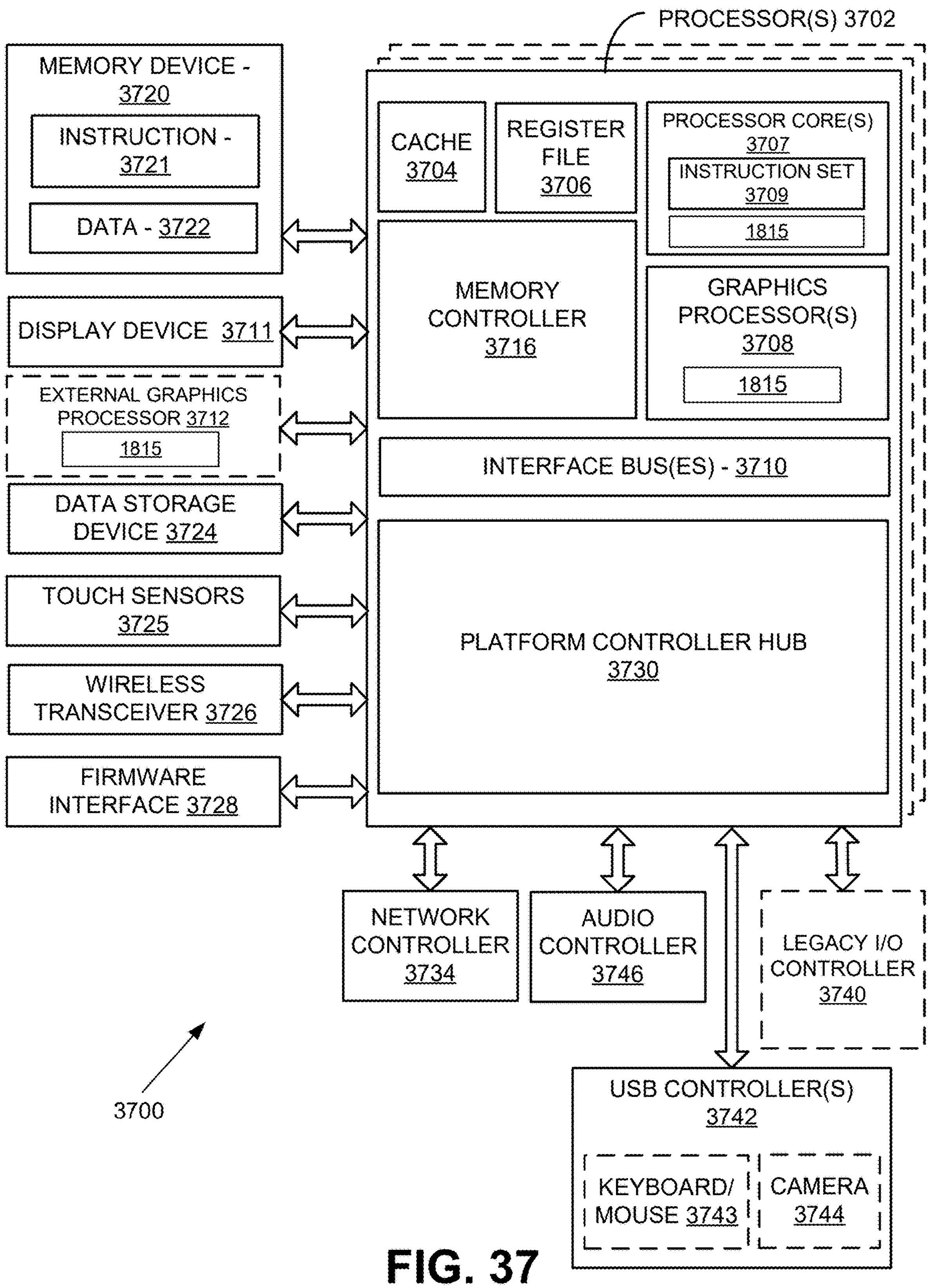
FIG. 37 illustrates at least portions of a graphics processor, according to one or more embodiments.

FIG. 37 is a block diagram of a processing system, according to at least one embodiment. In at least one embodiment, system 3700 includes one or more processors 3702 and one or more graphics processors 3708, and may be a single processor desktop system, a multiprocessor workstation system, or a server system having a large number of processors 3702 or processor cores 3707. In at least one embodiment, system 3700 is a processing platform incorporated within a system-on-a-chip (SoC) integrated circuit for use in mobile, handheld, or embedded devices.

In at least one embodiment, system 3700 can include, or be incorporated within a server-based gaming platform, a game console, including a game and media console, a mobile gaming console, a handheld game console, or an online game console. In at least one embodiment, system 3700 is a mobile phone, smart phone, tablet computing device or mobile Internet device. In at least one embodiment, processing system 3700 can also include, couple with, or be integrated within a wearable device, such as a smart watch wearable device, smart eyewear device, augmented reality device, or virtual reality device. In at least one embodiment, processing system 3700 is a television or set top box device having one or more processors 3702 and a graphical interface generated by one or more graphics processors 3708.

In at least one embodiment, one or more processors 3702 each include one or more processor cores 3707 to process instructions which, when executed, perform operations for system and user software. In at least one embodiment, each of one or more processor cores 3707 is configured to process a specific instruction set 3709. In at least one embodiment, instruction set 3709 may facilitate Complex Instruction Set Computing (CISC), Reduced Instruction Set Computing (RISC), or computing via a Very Long Instruction Word (VLIW). In at least one embodiment, processor cores 3707 may each process a different instruction set 3709, which may include instructions to facilitate emulation of other instruction sets. In at least one embodiment, processor core 3707 may also include other processing devices, such a Digital Signal Processor (DSP).

In at least one embodiment, processor 3702 includes cache memory 3704. In at least one embodiment, processor 3702 can have a single internal cache or multiple levels of internal cache. In at least one embodiment, cache memory is shared among various components of processor 3702. In at least one embodiment, processor 3702 also uses an external cache (e.g., a Level-3 (L3) cache or Last Level Cache (LLC)) (not shown), which may be shared among processor cores 3707 using known cache coherency techniques. In at least one embodiment, register file 3706 is additionally included in processor 3702 which may include different types of registers for storing different types of data (e.g., integer registers, floating point registers, status registers, and an instruction pointer register). In at least one embodiment, register file 3706 may include general-purpose registers or other registers.

In at least one embodiment, one or more processor(s) 3702 are coupled with one or more interface bus(es) 3710 to transmit communication signals such as address, data, or control signals between processor 3702 and other components in system 3700. In at least one embodiment interface bus 3710, in one embodiment, can be a processor bus, such as a version of a Direct Media Interface (DMI) bus. In at least one embodiment, interface 3710 is not limited to a DMI bus, and may include one or more Peripheral Component Interconnect buses (e.g., PCI, PCI Express), memory busses, or other types of interface busses. In at least one embodiment processor(s) 3702 include an integrated memory controller 3716 and a platform controller hub 3730. In at least one embodiment, memory controller 3716 facilitates communication between a memory device and other components of system 3700, while platform controller hub (PCH) 3730 provides connections to I/O devices via a local I/O bus.

In at least one embodiment, memory device 3720 can be a dynamic random access memory (DRAM) device, a static random access memory (SRAM) device, flash memory device, phase-change memory device, or some other memory device having suitable performance to serve as process memory. In at least one embodiment memory device 3720 can operate as system memory for system 3700, to store data 3722 and instructions 3721 for use when one or more processors 3702 executes an application or process. In at least one embodiment, memory controller 3716 also couples with an optional external graphics processor 3712, which may communicate with one or more graphics processors 3708 in processors 3702 to perform graphics and media operations. In at least one embodiment, a display device 3711 can connect to processor(s) 3702. In at least one embodiment display device 3711 can include one or more of an internal display device, as in a mobile electronic device or a laptop device or an external display device attached via a display interface (e.g., DisplayPort, etc.). In at least one embodiment, display device 3711 can include a head mounted display (HMD) such as a stereoscopic display device for use in virtual reality (VR) applications or augmented reality (AR) applications.

In at least one embodiment, platform controller hub 3730 enables peripherals to connect to memory device 3720 and processor 3702 via a high-speed I/O bus. In at least one embodiment, I/O peripherals include, but are not limited to, an audio controller 3746, a network controller 3734, a firmware interface 3728, a wireless transceiver 3726, touch sensors 3725, a data storage device 3724 (e.g., hard disk drive, flash memory, etc.). In at least one embodiment, data storage device 3724 can connect via a storage interface (e.g., SATA) or via a peripheral bus, such as a Peripheral Component Interconnect bus (e.g., PCI, PCI Express). In at least one embodiment, touch sensors 3725 can include touch screen sensors, pressure sensors, or fingerprint sensors. In at least one embodiment, wireless transceiver 3726 can be a Wi-Fi transceiver, a Bluetooth transceiver, or a mobile network transceiver such as a 3G, 4G, or Long Term Evolution (LTE) transceiver. In at least one embodiment, firmware interface 3728 enables communication with system firmware, and can be, for example, a unified extensible firmware interface (UEFI). In at least one embodiment, network controller 3734 can enable a network connection to a wired network. In at least one embodiment, a high-performance network controller (not shown) couples with interface bus 3710. In at least one embodiment, audio controller 3746 is a multi-channel high definition audio controller. In at least one embodiment, system 3700 includes an optional legacy I/O controller 3740 for coupling legacy (e.g., Personal System 2 (PS/2)) devices to system. In at least one embodiment, platform controller hub 3730 can also connect to one or more Universal Serial Bus (USB) controllers 3742 connect input devices, such as keyboard and mouse 3743 combinations, a camera 3744, or other USB input devices.

In at least one embodiment, an instance of memory controller 3716 and platform controller hub 3730 may be integrated into a discreet external graphics processor, such as external graphics processor 3712. In at least one embodiment, platform controller hub 3730 and/or memory controller 3716 may be external to one or more processor(s) 3702. For example, in at least one embodiment, system 3700 can include an external memory controller 3716 and platform controller hub 3730, which may be configured as a memory controller hub and peripheral controller hub within a system chipset that is in communication with processor(s) 3702.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment portions or all of inference and/or training logic 1815 may be incorporated into graphics processor 3700. For example, in at least one embodiment, training and/or inferencing techniques described herein may use one or more of ALUs embodied in 3D pipeline 3712. Moreover, in at least one embodiment, inferencing and/or training operations described herein may be done using logic other than logic illustrated in FIG. 18A or 18B. In at least one embodiment, weight parameters may be stored in on-chip or off-chip memory and/or registers (shown or not shown) that configure ALUs of graphics processor 3700 to perform one or more machine learning algorithms, neural network architectures, use cases, or training techniques described herein.

In at least one embodiment, graphics processor 3700 is utilized to implement a discriminator that is trained to infer a viewpoint and a set of appearance attributes from an input image. In at least one embodiment, graphics processor 3700 is utilized to implement a generator that is trained to generate an image based on an input viewpoint and an input set of appearance parameters. In at least one embodiment, graphics processor 3700 is utilized to implement one or more neural networks comprising a discriminator and a generator, and graphics processor 3700 is utilized in connection with one or more processes that train one or more neural networks to identify an orientation of an object within an image in a self-supervised manner by at least computing one or more loss functions as part of training that evaluate one or more characteristics of images of a training set.

Figure 38:
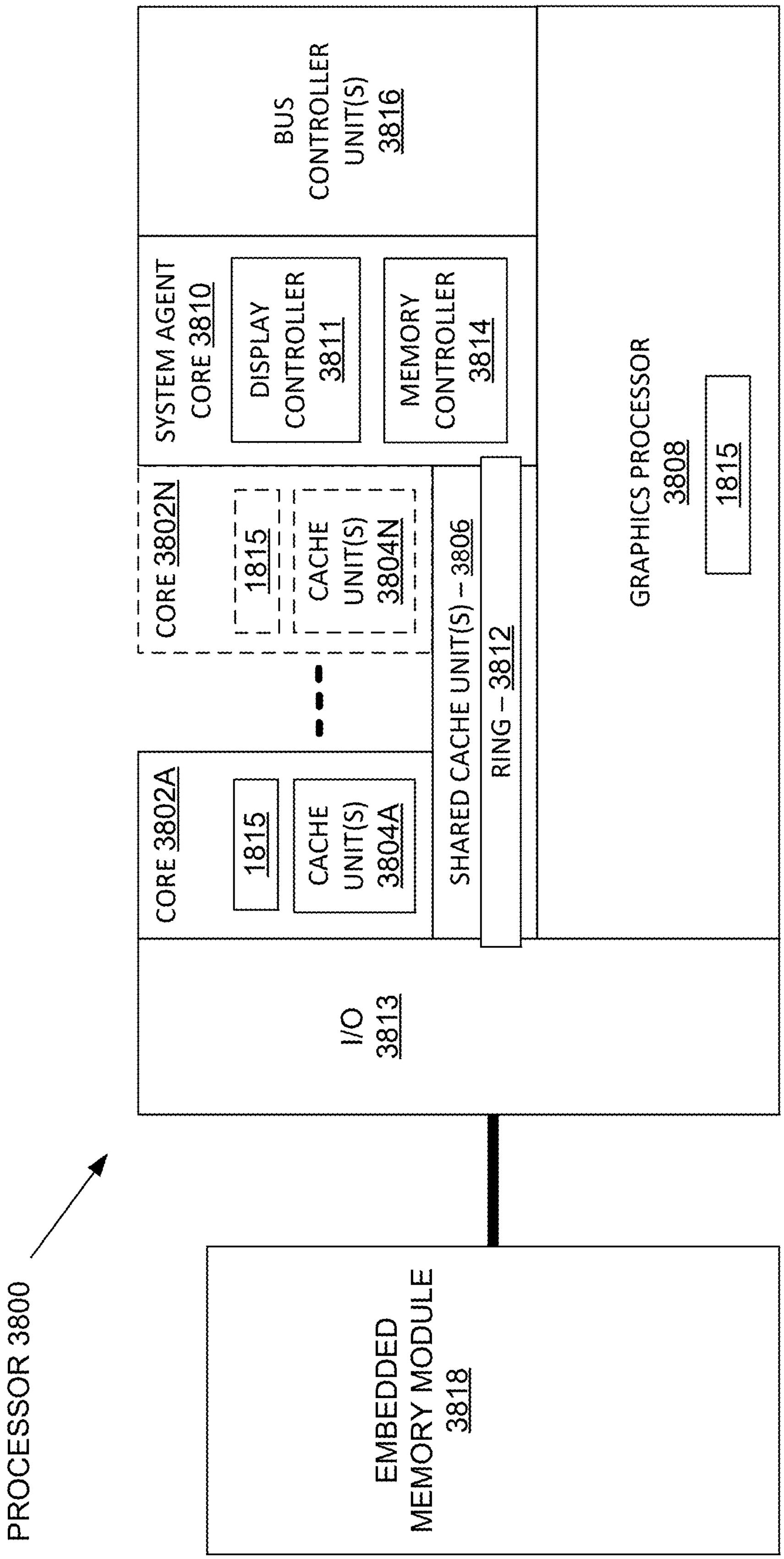
FIG. 38 illustrates at least portions of a graphics processor, according to one or more embodiments.

FIG. 38 is a block diagram of a processor 3800 having one or more processor cores 3802A-3802N, an integrated memory controller 3814, and an integrated graphics processor 3808, according to at least one embodiment. In at least one embodiment, processor 3800 can include additional cores up to and including additional core 3802N represented by dashed lined boxes. In at least one embodiment, each of processor cores 3802A-3802N includes one or more internal cache units 3804A-3804N. In at least one embodiment, each processor core also has access to one or more shared cached units 3806.

In at least one embodiment, internal cache units 3804A-3804N and shared cache units 3806 represent a cache memory hierarchy within processor 3800. In at least one embodiment, cache memory units 3804A-3804N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3806 and 3804A-3804N.

In at least one embodiment, processor 3800 may also include a set of one or more bus controller units 3816 and a system agent core 3810. In at least one embodiment, one or more bus controller units 3816 manage a set of peripheral buses, such as one or more PCI or PCI express busses. In at least one embodiment, system agent core 3810 provides management functionality for various processor components. In at least one embodiment, system agent core 3810 includes one or more integrated memory controllers 3814 to manage access to various external memory devices (not shown).

In at least one embodiment, one or more of processor cores 3802A-3802N include support for simultaneous multi-threading. In at least one embodiment, system agent core 3810 includes components for coordinating and operating cores 3802A-3802N during multi-threaded processing. In at least one embodiment, system agent core 3810 may additionally include a power control unit (PCU), which includes logic and components to regulate one or more power states of processor cores 3802A-3802N and graphics processor 3808.

In at least one embodiment, processor 3800 additionally includes graphics processor 3808 to execute graphics processing operations. In at least one embodiment, graphics processor 3808 couples with shared cache units 3806, and system agent core 3810, including one or more integrated memory controllers 3814. In at least one embodiment, system agent core 3810 also includes a display controller 3811 to drive graphics processor output to one or more coupled displays. In at least one embodiment, display controller 3811 may also be a separate module coupled with graphics processor 3808 via at least one interconnect, or may be integrated within graphics processor 3808.

In at least one embodiment, a ring based interconnect unit 3812 is used to couple internal components of processor 3800. In at least one embodiment, an alternative interconnect unit may be used, such as a point-to-point interconnect, a switched interconnect, or other techniques. In at least one embodiment, graphics processor 3808 couples with ring interconnect 3812 via an I/O link 3813.

In at least one embodiment, I/O link 3813 represents at least one of multiple varieties of I/O interconnects, including an on package I/O interconnect which facilitates communication between various processor components and a high-performance embedded memory module 3818, such as an eDRAM module. In at least one embodiment, each of processor cores 3802A-3802N and graphics processor 3808 use embedded memory modules 3818 as a shared Last Level Cache.

In at least one embodiment, processor cores 3802A-3802N are homogenous cores executing a common instruction set architecture. In at least one embodiment, processor cores 3802A-3802N are heterogeneous in terms of instruction set architecture (ISA), where one or more of processor cores 3802A-3802N execute a common instruction set, while one or more other cores of processor cores 3802A-3802N executes a subset of a common instruction set or a different instruction set. In at least one embodiment, processor cores 3802A-3802N are heterogeneous in terms of microarchitecture, where one or more cores having a relatively higher power consumption couple with one or more power cores having a lower power consumption. In at least one embodiment, processor 3800 can be implemented on one or more chips or as an SoC integrated circuit.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment portions or all of inference and/or training logic 1815 may be incorporated into graphics processor 3810. For example, in at least one embodiment, training and/or inferencing techniques described herein may use one or more of ALUs embodied in 3D pipeline 3712, graphics core(s) 3815A, shared function logic 3816, graphics core(s) 3815B, shared function logic 3820, or other logic in FIG. 38. Moreover, in at least one embodiment, inferencing and/or training operations described herein may be done using logic other than logic illustrated in FIG. 18A or 18B. In at least one embodiment, weight parameters may be stored in on-chip or off-chip memory and/or registers (shown or not shown) that configure ALUs of graphics processor 3810 to perform one or more machine learning algorithms, neural network architectures, use cases, or training techniques described herein.

In at least one embodiment, graphics processor 3810 is utilized to implement a discriminator that is trained to infer a viewpoint and a set of appearance attributes from an input image. In at least one embodiment, graphics processor 3810 is utilized to implement a generator that is trained to generate an image based on an input viewpoint and an input set of appearance parameters. In at least one embodiment, graphics processor 3810 is utilized to implement one or more neural networks comprising a discriminator and a generator, and graphics processor 3810 is utilized in connection with one or more processes that train one or more neural networks to identify an orientation of an object within an image in a self-supervised manner by at least computing one or more loss functions as part of training that evaluate one or more characteristics of images of a training set.

Figure 39:
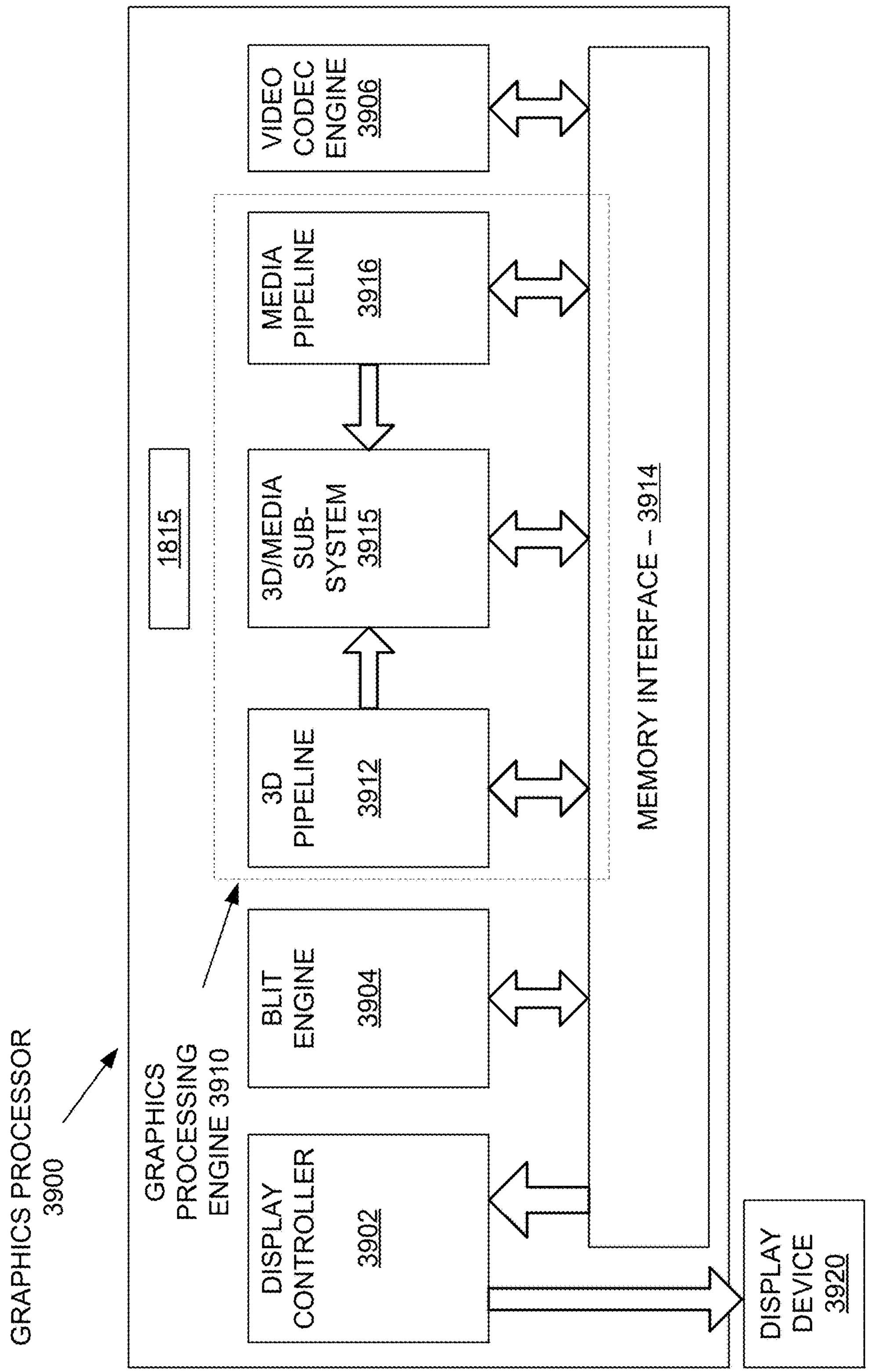
FIG. 39 illustrates at least portions of a graphics processor, according to one or more embodiments.

FIG. 39 is a block diagram of a graphics processor 3900, which may be a discrete graphics processing unit, or may be a graphics processor integrated with a plurality of processing cores. In at least one embodiment, graphics processor 3900 communicates via a memory mapped I/O interface to registers on graphics processor 3900 and with commands placed into memory. In at least one embodiment, graphics processor 3900 includes a memory interface 3914 to access memory. In at least one embodiment, memory interface 3914 is an interface to local memory, one or more internal caches, one or more shared external caches, and/or to system memory.

In at least one embodiment, graphics processor 3900 also includes a display controller 3902 to drive display output data to a display device 3920. In at least one embodiment, display controller 3902 includes hardware for one or more overlay planes for display device 3920 and composition of multiple layers of video or user interface elements. In at least one embodiment, display device 3920 can be an internal or external display device. In at least one embodiment, display device 3920 is a head mounted display device, such as a virtual reality (VR) display device or an augmented reality (AR) display device. In at least one embodiment, graphics processor 3900 includes a video codec engine 3906 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3900 includes a block image transfer (BLIT) engine 3904 to perform two-dimensional (2D) rasterizer operations including, for example, bit-boundary block transfers. However, in at least one embodiment, 2D graphics operations are performed using one or more components of graphics processing engine (GPE) 3910. In at least one embodiment, GPE 3910 is a compute engine for performing graphics operations, including three-dimensional (3D) graphics operations and media operations.

In at least one embodiment, GPE 3910 includes a 3D pipeline 3912 for performing 3D operations, such as rendering three-dimensional images and scenes using processing functions that act upon 3D primitive shapes (e.g., rectangle, triangle, etc.). 3D pipeline 3912 includes programmable and fixed function elements that perform various tasks and/or spawn execution threads to a 3D/Media sub-system 3915. While 3D pipeline 3912 can be used to perform media operations, in at least one embodiment, GPE 3910 also includes a media pipeline 3916 that is used to perform media operations, such as video post-processing and image enhancement.

In at least one embodiment, media pipeline 3916 includes fixed function or programmable logic units to perform one or more specialized media operations, such as video decode acceleration, video de-interlacing, and video encode acceleration in place of, or on behalf of video codec engine 3906. In at least one embodiment, media pipeline 3916 additionally includes a thread spawning unit to spawn threads for execution on 3D/Media sub-system 3915. In at least one embodiment, spawned threads perform computations for media operations on one or more graphics execution units included in 3D/Media sub-system 3915.

In at least one embodiment, 3D/Media subsystem 3915 includes logic for executing threads spawned by 3D pipeline 3912 and media pipeline 3916. In at least one embodiment, 3D pipeline 3912 and media pipeline 3916 send thread execution requests to 3D/Media subsystem 3915, which includes thread dispatch logic for arbitrating and dispatching various requests to available thread execution resources. In at least one embodiment, execution resources include an array of graphics execution units to process 3D and media threads. In at least one embodiment, 3D/Media subsystem 3915 includes one or more internal caches for thread instructions and data. In at least one embodiment, subsystem 3915 also includes shared memory, including registers and addressable memory, to share data between threads and to store output data.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment portions or all of inference and/or training logic 1815 may be incorporated into graphics processor 3900. For example, in at least one embodiment, training and/or inferencing techniques described herein may use one or more of ALUs embodied in 3D pipeline 3912. Moreover, in at least one embodiment, inferencing and/or training operations described herein may be done using logic other than logic illustrated in FIG. 18A or 18B. In at least one embodiment, weight parameters may be stored in on-chip or off-chip memory and/or registers (shown or not shown) that configure ALUs of graphics processor 3900 to perform one or more machine learning algorithms, neural network architectures, use cases, or training techniques described herein.

In at least one embodiment, graphics processor 3910 is utilized to implement a discriminator that is trained to infer a viewpoint and a set of appearance attributes from an input image. In at least one embodiment, graphics processor 3910 is utilized to implement a generator that is trained to generate an image based on an input viewpoint and an input set of appearance parameters. In at least one embodiment, graphics processor 3910 is utilized to implement one or more neural networks comprising a discriminator and a generator, and graphics processor 3910 is utilized in connection with one or more processes that train one or more neural networks to identify an orientation of an object within an image in a self-supervised manner by at least computing one or more loss functions as part of training that evaluate one or more characteristics of images of a training set.

Figure 40:
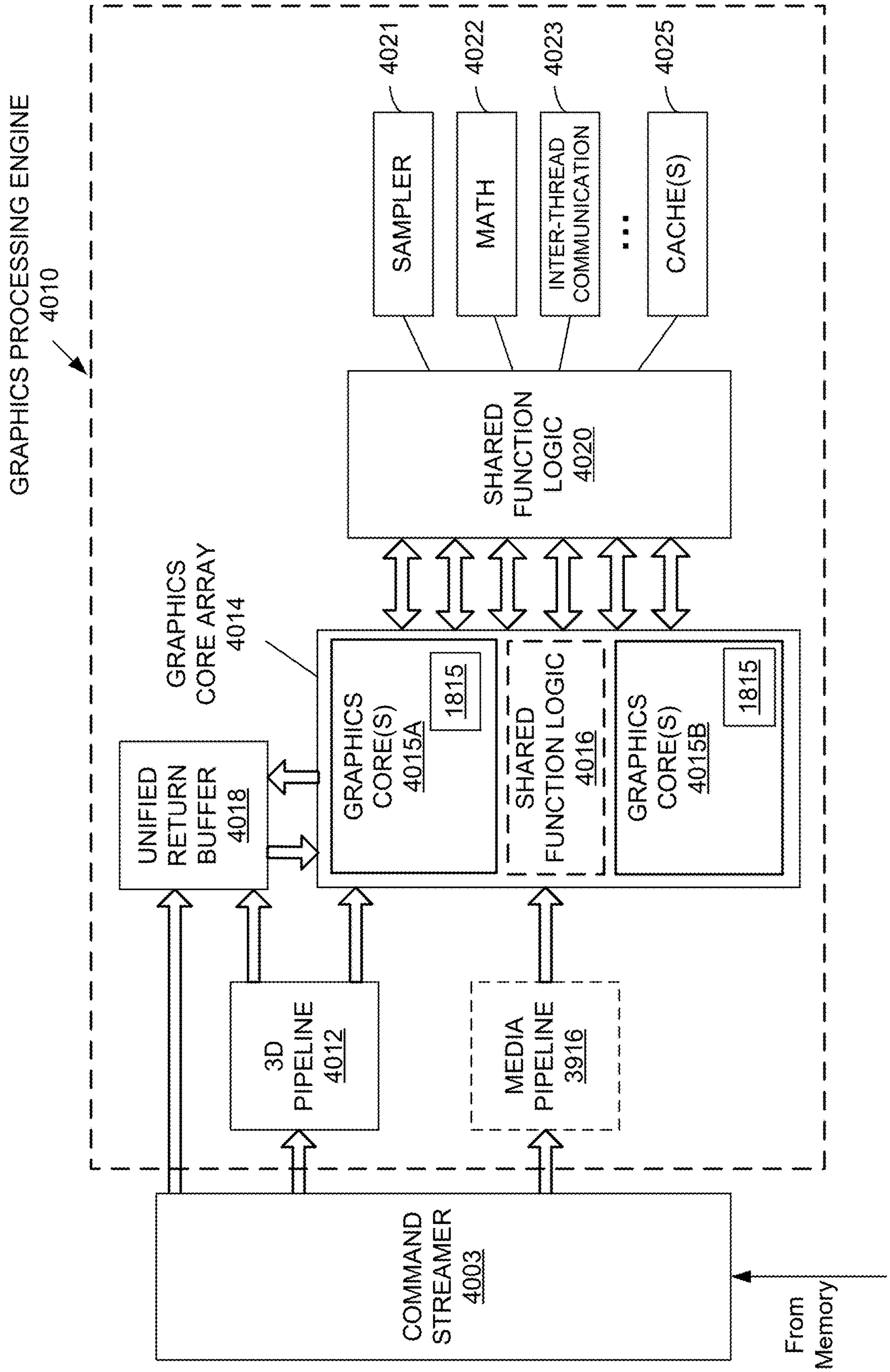
FIG. 40 is a block diagram of a graphics processing engine 4010 of a graphics processor in accordance with at least one embodiment.

FIG. 40 is a block diagram of a graphics processing engine 4010 of a graphics processor in accordance with at least one embodiment. In at least one embodiment, graphics processing engine (GPE) 4010 is a version of GPE 3910 shown in FIG. 39. In at least one embodiment, media pipeline 3916 is optional and may not be explicitly included within GPE 4010. In at least one embodiment, a separate media and/or image processor is coupled to GPE 4010.

In at least one embodiment, GPE 4010 is coupled to or includes a command streamer 4003, which provides a command stream to 3D pipeline 4012 and/or media pipelines 3916. In at least one embodiment, command streamer 4003 is coupled to memory, which can be system memory, or one or more of internal cache memory and shared cache memory. In at least one embodiment, command streamer 4003 receives commands from memory and sends commands to 3D pipeline 4012 and/or media pipeline 3916. In at least one embodiment, commands are instructions, primitives, or micro-operations fetched from a ring buffer, which stores commands for 3D pipeline 4012 and media pipeline 3916. In at least one embodiment, a ring buffer can additionally include batch command buffers storing batches of multiple commands. In at least one embodiment, commands for 3D pipeline 4012 can also include references to data stored in memory, such as but not limited to vertex and geometry data for 3D pipeline 4012 and/or image data and memory objects for media pipeline 3916. In at least one embodiment, 3D pipeline 4012 and media pipeline 3916 process commands and data by performing operations or by dispatching one or more execution threads to a graphics core array 4014. In at least one embodiment graphics core array 4014 includes one or more blocks of graphics cores (e.g., graphics core(s) 4015A, graphics core(s) 4015B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1815 in FIG. 18A and FIG. 18B.

In at least one embodiment, 3D pipeline 4012 includes fixed function and programmable logic to process one or more shader programs, such as vertex shaders, geometry shaders, pixel shaders, fragment shaders, compute shaders, or other shader programs, by processing instructions and dispatching execution threads to graphics core array 4014. In at least one embodiment, graphics core array 4014 provides a unified block of execution resources for use in processing shader programs. In at least one embodiment, multi-purpose execution logic (e.g., execution units) within graphics core(s) 4015A-4015B of graphic core array 4014 includes support for various 3D API shader languages and can execute multiple simultaneous execution threads associated with multiple shaders.

In at least one embodiment, graphics core array 4014 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 4014 can output data to memory in a unified return buffer (URB) 4018. URB 4018 can store data for multiple threads. In at least one embodiment, URB 4018 may be used to send data between different threads executing on graphics core array 4014. In at least one embodiment, URB 4018 may additionally be used for synchronization between threads on graphics core array 4014 and fixed function logic within shared function logic 4020.

In at least one embodiment, graphics core array 4014 is scalable, such that graphics core array 4014 includes a variable number of graphics cores, each having a variable number of execution units based on a target power and performance level of GPE 4010. In at least one embodiment, execution resources are dynamically scalable, such that execution resources may be enabled or disabled as needed.

In at least one embodiment, graphics core array 4014 is coupled to shared function logic 4020 that includes multiple resources that are shared between graphics cores in graphics core array 4014. In at least one embodiment, shared functions performed by shared function logic 4020 are embodied in hardware logic units that provide specialized supplemental functionality to graphics core array 4014. In at least one embodiment, shared function logic 4020 includes but is not limited to sampler 4021, math 4022, and inter-thread communication (ITC) 4023 logic. In at least one embodiment, one or more cache(s) 4025 are in included in or couple to shared function logic 4020.

In at least one embodiment, a shared function is used if demand for a specialized function is insufficient for inclusion within graphics core array 4014. In at least one embodiment, a single instantiation of a specialized function is used in shared function logic 4020 and shared among other execution resources within graphics core array 4014. In at least one embodiment, specific shared functions within shared function logic 4020 that are used extensively by graphics core array 4014 may be included within shared function logic 4016 within graphics core array 4014. In at least one embodiment, shared function logic 4016 within graphics core array 4014 can include some or all logic within shared function logic 4020. In at least one embodiment, all logic elements within shared function logic 4020 may be duplicated within shared function logic 4016 of graphics core array 4014. In at least one embodiment, shared function logic 4020 is excluded in favor of shared function logic 4016 within graphics core array 4014.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment portions or all of inference and/or training logic 1815 may be incorporated into graphics processor 4010. For example, in at least one embodiment, training and/or inferencing techniques described herein may use one or more of ALUs embodied in 3D pipeline 4012, graphics core(s) 4015A, shared function logic 4016, graphics core(s) 4015B, shared function logic 4020, or other logic in FIG. 40. Moreover, in at least one embodiment, inferencing and/or training operations described herein may be done using logic other than logic illustrated in FIG. 18A or 18B. In at least one embodiment, weight parameters may be stored in on-chip or off-chip memory and/or registers (shown or not shown) that configure ALUs of graphics processor 4010 to perform one or more machine learning algorithms, neural network architectures, use cases, or training techniques described herein.

In at least one embodiment, graphics processor 4010 is utilized to implement a discriminator that is trained to infer a viewpoint and a set of appearance attributes from an input image. In at least one embodiment, graphics processor 4010 is utilized to implement a generator that is trained to generate an image based on an input viewpoint and an input set of appearance parameters. In at least one embodiment, graphics processor 4010 is utilized to implement one or more neural networks comprising a discriminator and a generator, and graphics processor 4010 is utilized in connection with one or more processes that train one or more neural networks to identify an orientation of an object within an image in a self-supervised manner by at least computing one or more loss functions as part of training that evaluate one or more characteristics of images of a training set.

Figure 41:
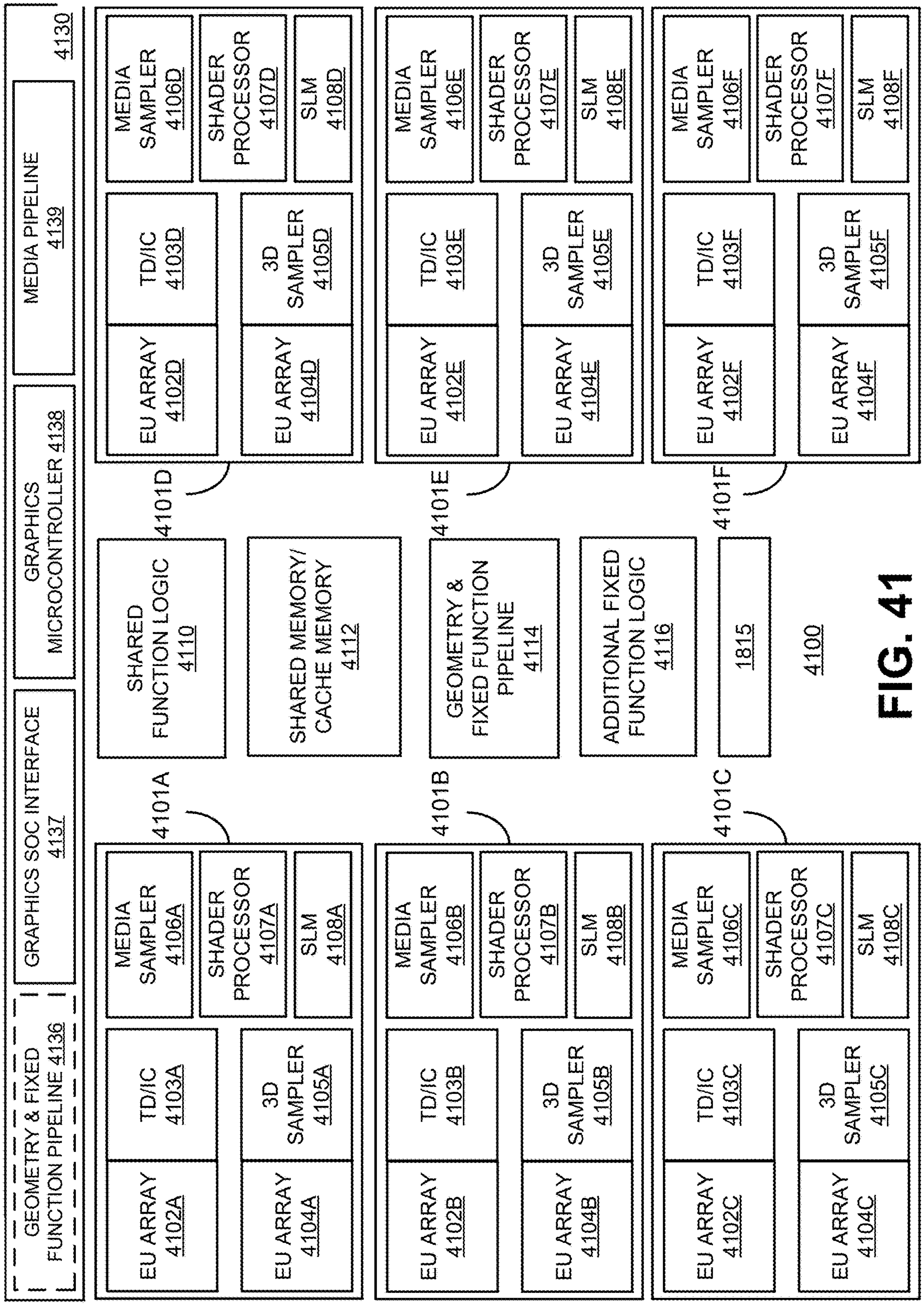
FIG. 41 is a block diagram of at least portions of a graphics processor core, according to at least one embodiment.

FIG. 41 is a block diagram of hardware logic of a graphics processor core 4100, according to at least one embodiment described herein. In at least one embodiment, graphics processor core 4100 is included within a graphics core array. In at least one embodiment, graphics processor core 4100, sometimes referred to as a core slice, can be one or multiple graphics cores within a modular graphics processor. In at least one embodiment, graphics processor core 4100 is exemplary of one graphics core slice, and a graphics processor as described herein may include multiple graphics core slices based on target power and performance envelopes. In at least one embodiment, each graphics core 4100 can include a fixed function block 4130 coupled with multiple sub-cores 4101A-4101F, also referred to as sub-slices, that include modular blocks of general-purpose and fixed function logic.

In at least one embodiment, fixed function block 4130 includes a geometry/fixed function pipeline 4136 that can be shared by all sub-cores in graphics processor 4100, for example, in lower performance and/or lower power graphics processor implementations. In at least one embodiment, geometry/fixed function pipeline 4136 includes a 3D fixed function pipeline, a video front-end unit, a thread spawner and thread dispatcher, and a unified return buffer manager, which manages unified return buffers.

In at least one embodiment fixed function block 4130 also includes a graphics SoC interface 4137, a graphics microcontroller 4138, and a media pipeline 4139. Graphics SoC interface 4137 provides an interface between graphics core 4100 and other processor cores within a system on a chip integrated circuit. In at least one embodiment, graphics microcontroller 4138 is a programmable sub-processor that is configurable to manage various functions of graphics processor 4100, including thread dispatch, scheduling, and pre-emption. In at least one embodiment, media pipeline 4139 includes logic to facilitate decoding, encoding, preprocessing, and/or post-processing of multimedia data, including image and video data. In at least one embodiment, media pipeline 4139 implement media operations via requests to compute or sampling logic within sub-cores 4101-4101F.

In at least one embodiment, SoC interface 4137 enables graphics core 4100 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 4137 can also enable communication with fixed function devices within an SoC, such as camera imaging pipelines, and enables use of and/or implements global memory atomics that may be shared between graphics core 4100 and CPUs within an SoC. In at least one embodiment, SoC interface 4137 can also implement power management controls for graphics core 4100 and enable an interface between a clock domain of graphic core 4100 and other clock domains within an SoC. In at least one embodiment, SoC interface 4137 enables receipt of command buffers from a command streamer and global thread dispatcher that are configured to provide commands and instructions to each of one or more graphics cores within a graphics processor. In at least one embodiment, commands and instructions can be dispatched to media pipeline 4139, when media operations are to be performed, or a geometry and fixed function pipeline (e.g., geometry and fixed function pipeline 4136, geometry and fixed function pipeline 4114) when graphics processing operations are to be performed.

In at least one embodiment, graphics microcontroller 4138 can be configured to perform various scheduling and management tasks for graphics core 4100. In at least one embodiment, graphics microcontroller 4138 can perform graphics and/or compute workload scheduling on various graphics parallel engines within execution unit (EU) arrays 4102A-4102F, 4104A-4104F within sub-cores 4101A-4101F. In at least one embodiment, host software executing on a CPU core of an SoC including graphics core 4100 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 4138 can also facilitate low-power or idle states for graphics core 4100, providing graphics core 4100 with an ability to save and restore registers within graphics core 4100 across low-power state transitions independently from an operating system and/or graphics driver software on a system.

In at least one embodiment, graphics core 4100 may have greater than or fewer than illustrated sub-cores 4101A-4101F, up to N modular sub-cores. For each set of N sub-cores, in at least one embodiment, graphics core 4100 can also include shared function logic 4110, shared and/or cache memory 4112, a geometry/fixed function pipeline 4114, as well as additional fixed function logic 4116 to accelerate various graphics and compute processing operations. In at least one embodiment, shared function logic 4110 can include logic units (e.g., sampler, math, and/or inter-thread communication logic) that can be shared by each N sub-cores within graphics core 4100. Shared and/or cache memory 4112 can be a last-level cache for N sub-cores 4101A-4101F within graphics core 4100 and can also serve as shared memory that is accessible by multiple sub-cores. In at least one embodiment, geometry/fixed function pipeline 4114 can be included instead of geometry/fixed function pipeline 4136 within fixed function block 4130 and can include same or similar logic units.

In at least one embodiment, graphics core 4100 includes additional fixed function logic 4116 that can include various fixed function acceleration logic for use by graphics core 4100. In at least one embodiment, additional fixed function logic 4116 includes an additional geometry pipeline for use in position only shading. In position-only shading, at least two geometry pipelines exist, whereas in a full geometry pipeline within geometry/fixed function pipeline 4116, 4136, and a cull pipeline, which is an additional geometry pipeline which may be included within additional fixed function logic 4116. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 4116 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 4116 can also include machine-learning acceleration logic, such as fixed function matrix multiplication logic, for implementations including optimizations for machine learning training or inferencing.

In at least one embodiment, within each graphics sub-core 4101A-4101F includes a set of execution resources that may be used to perform graphics, media, and compute operations in response to requests by graphics pipeline, media pipeline, or shader programs. In at least one embodiment, graphics sub-cores 4101A-4101F include multiple EU arrays 4102A-4102F, 4104A-4104F, thread dispatch and inter-thread communication (TD/IC) logic 4103A-4103F, a 3D (e.g., texture) sampler 4105A-4105F, a media sampler 4106A-4106F, a shader processor 4107A-4107F, and shared local memory (SLM) 4108A-4108F. EU arrays 4102A-4102F, 4104A-4104F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 4103A-4103F performs local thread dispatch and thread control operations for execution units within a sub-core and facilitate communication between threads executing on execution units of a sub-core. In at least one embodiment, 3D sampler 4105A-4105F can read texture or other 3D graphics related data into memory. In at least one embodiment, 3D sampler can read texture data differently based on a configured sample state and texture format associated with a given texture. In at least one embodiment, media sampler 4106A-4106F can perform similar read operations based on a type and format associated with media data. In at least one embodiment, each graphics sub-core 4101A-4101F can alternately include a unified 3D and media sampler. In at least one embodiment, threads executing on execution units within each of sub-cores 4101A-4101F can make use of shared local memory 4108A-4108F within each sub-core, to enable threads executing within a thread group to execute using a common pool of on-chip memory.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, portions or all of inference and/or training logic 1815 may be incorporated into graphics processor 4110. For example, in at least one embodiment, training and/or inferencing techniques described herein may use one or more of ALUs embodied in 3D pipeline 4110, graphics microcontroller 4138, geometry & fixed function pipeline 4114 and 4136, or other logic in FIG. 38. Moreover, in at least one embodiment, inferencing and/or training operations described herein may be done using logic other than logic illustrated in FIG. 18A or 18B. In at least one embodiment, weight parameters may be stored in on-chip or off-chip memory and/or registers (shown or not shown) that configure ALUs of graphics processor 4100 to perform one or more machine learning algorithms, neural network architectures, use cases, or training techniques described herein.

In at least one embodiment, graphics processor 4110 is utilized to implement a discriminator that is trained to infer a viewpoint and a set of appearance attributes from an input image. In at least one embodiment, graphics processor 4110 is utilized to implement a generator that is trained to generate an image based on an input viewpoint and an input set of appearance parameters. In at least one embodiment, graphics processor 4110 is utilized to implement one or more neural networks comprising a discriminator and a generator, and graphics processor 4110 is utilized in connection with one or more processes that train one or more neural networks to identify an orientation of an object within an image in a self-supervised manner by at least computing one or more loss functions as part of training that evaluate one or more characteristics of images of a training set.

Figure 42A:
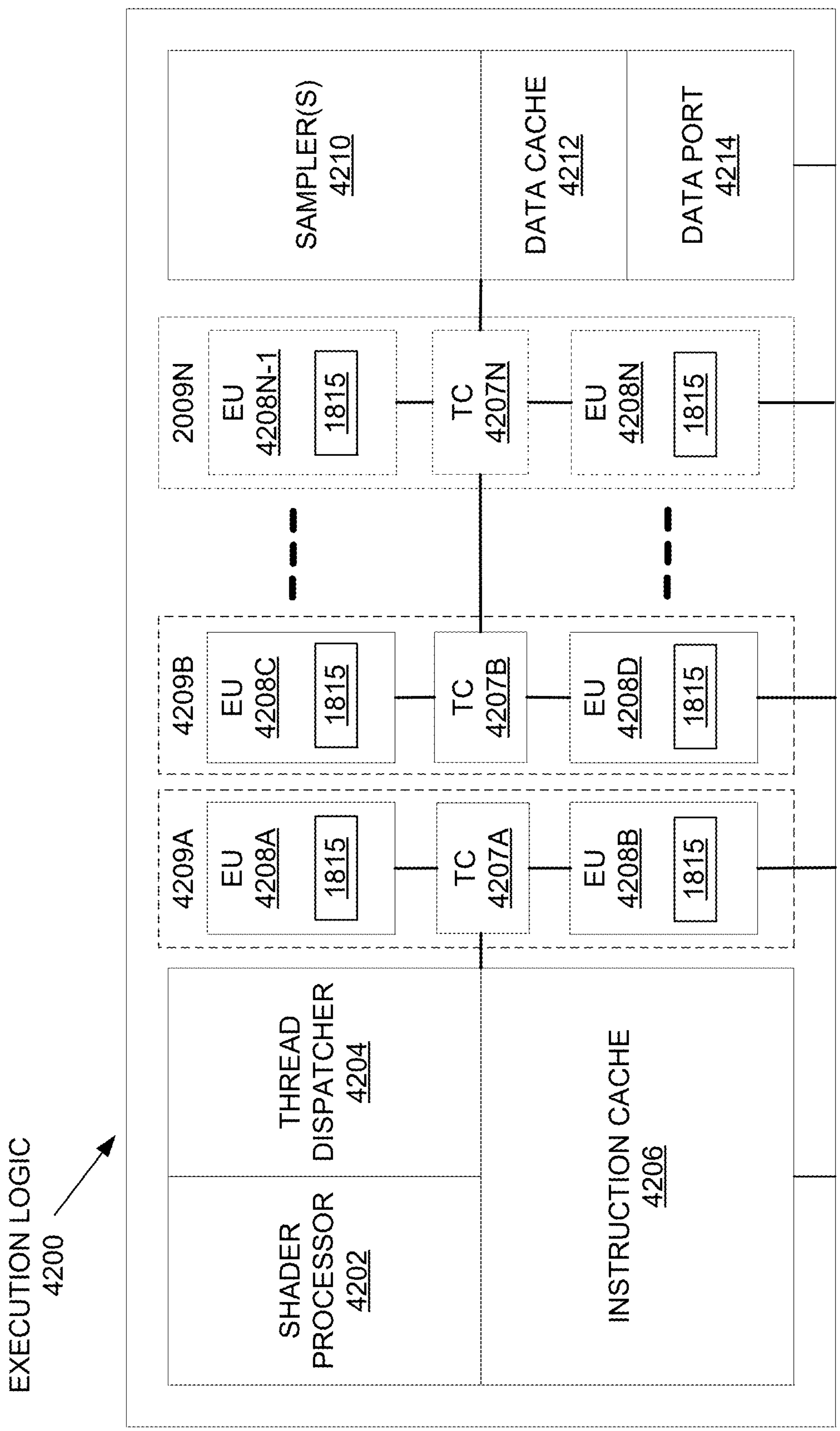
FIGS. 42A and 42B illustrate thread execution logic 4200 including an array of processing elements of a graphics processor core according to at least one embodiment
Figure 42B:
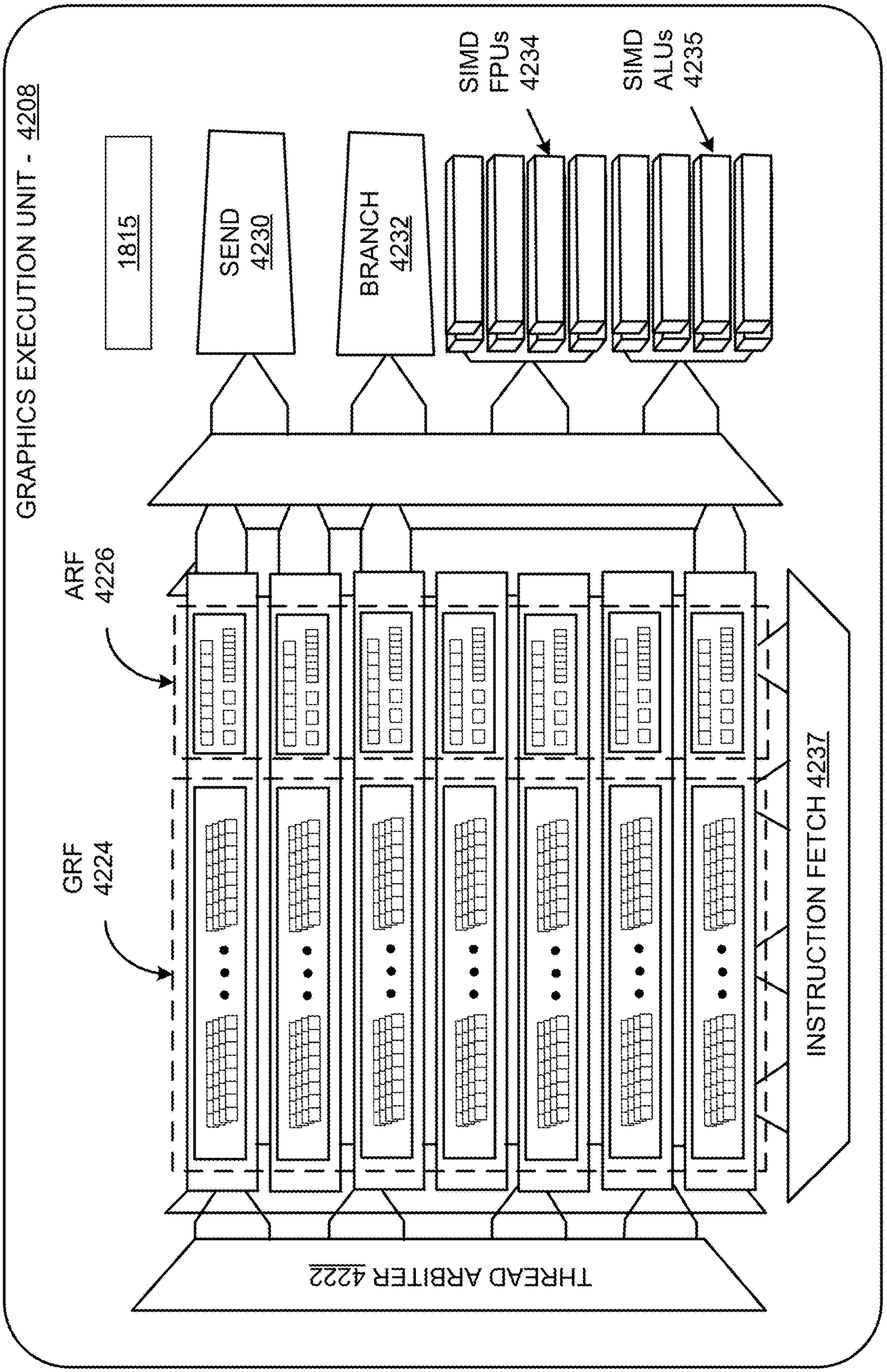

FIGS. 42A and 42B illustrate thread execution logic 4200 including an array of processing elements of a graphics processor core according to at least one embodiment. FIG. 42A illustrates at least one embodiment, in which thread execution logic 4200 is used. FIG. 42B illustrates exemplary internal details of an execution unit, according to at least one embodiment.

As illustrated in FIG. 42A, in at least one embodiment, thread execution logic 4200 includes a shader processor 4202, a thread dispatcher 4204, instruction cache 4206, a scalable execution unit array including a plurality of execution units 4208A-4208N, a sampler 4210, a data cache 4212, and a data port 4214. In at least one embodiment a scalable execution unit array can dynamically scale by enabling or disabling one or more execution units (e.g., any of execution unit 4208A, 4208B, 4208C, 4208D, through 4208N−1 and

4208N) based on computational requirements of a workload, for example. In at least one embodiment, scalable execution units are interconnected via an interconnect fabric that links to each of execution unit. In at least one embodiment, thread execution logic 4200 includes one or more connections to memory, such as system memory or cache memory, through one or more of instruction cache 4206, data port 4214, sampler 4210, and execution units 4208A-4208N. In at least one embodiment, each execution unit (e.g., 4208A) is a stand-alone programmable general-purpose computational unit that is capable of executing multiple simultaneous hardware threads while processing multiple data elements in parallel for each thread. In at least one embodiment, array of execution units 4208A-4208N is scalable to include any number individual execution units.

In at least one embodiment, execution units 4208A-4208N are primarily used to execute shader programs. In at least one embodiment, shader processor 4202 can process various shader programs and dispatch execution threads associated with shader programs via a thread dispatcher 4204. In at least one embodiment, thread dispatcher 4204 includes logic to arbitrate thread initiation requests from graphics and media pipelines and instantiate requested threads on one or more execution units in execution units 4208A-4208N. For example, in at least one embodiment, a geometry pipeline can dispatch vertex, tessellation, or geometry shaders to thread execution logic for processing. In at least one embodiment, thread dispatcher 4204 can also process runtime thread spawning requests from executing shader programs.

In at least one embodiment, execution units 4208A-4208N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 4208A-4208N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 4208A-4208N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 4208A-4208N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 4208A-4208N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 4209A-4209N having thread control logic (4207A-4207N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 4209A-4209N includes at least two execution units. For example, in at least one embodiment, fused execution unit 4209A includes a first EU 4208A, second EU 4208B, and thread control logic 4207A that is common to first EU 4208A and second EU 4208B. In at least one embodiment, thread control logic 4207A controls threads executed on fused graphics execution unit 4209A, allowing each EU within fused execution units 4209A-4209N to execute using a common instruction pointer register.

In at least one embodiment, one or more internal instruction caches (e.g., 4206) are included in thread execution logic 4200 to cache thread instructions for execution units. In at least one embodiment, one or more data caches (e.g., 4212) are included to cache thread data during thread execution. In at least one embodiment, a sampler 4210 is included to provide texture sampling for 3D operations and media sampling for media operations. In at least one embodiment, sampler 4210 includes specialized texture or media sampling functionality to process texture or media data during sampling process before providing sampled data to an execution unit.

During execution, in at least one embodiment, graphics and media pipelines send thread initiation requests to thread execution logic 4200 via thread spawning and dispatch logic. In at least one embodiment, once a group of geometric objects has been processed and rasterized into pixel data, pixel processor logic (e.g., pixel shader logic, fragment shader logic, etc.) within shader processor 4202 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 4202 then executes an application programming interface (API)-supplied pixel or fragment shader program. In at least one embodiment, to execute a shader program, shader processor 4202 dispatches threads to an execution unit (e.g., 4208A) via thread dispatcher 4204. In at least one embodiment, shader processor 4202 uses texture sampling logic in sampler 4210 to access texture data in texture maps stored in memory. In at least one embodiment, arithmetic operations on texture data and input geometry data compute pixel color data for each geometric fragment, or discards one or more pixels from further processing.

In at least one embodiment, data port 4214 provides a memory access mechanism for thread execution logic 4200 to output processed data to memory for further processing on a graphics processor output pipeline. In at least one embodiment, data port 4214 includes or couples to one or more cache memories (e.g., data cache 4212) to cache data for memory access via a data port.

As illustrated in FIG. 42B, in at least one embodiment, a graphics execution unit 4208 can include an instruction fetch unit 4237, a general register file array (GRF) 4224, an architectural register file array (ARF) 4226, a thread arbiter 4222, a send unit 4230, a branch unit 4232, a set of SIMD floating point units (FPUs) 4234, and In at least one embodiment a set of dedicated integer SIMD ALUs 4235. In at least one embodiment, GRF 4224 and ARF 4226 includes a set of general register files and architecture register files associated with each simultaneous hardware thread that may be active in graphics execution unit 4208. In at least one embodiment, per thread architectural state is maintained in ARF 4226, while data used during thread execution is stored in GRF 4224. In at least one embodiment, execution state of each thread, including instruction pointers for each thread, can be held in thread-specific registers in ARF 4226.

In at least one embodiment, graphics execution unit 4208 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 4208 can co-issue multiple instructions, which may each be different instructions. In at least one embodiment, thread arbiter 4222 of graphics execution unit thread 4208 can dispatch instructions to one of send unit 4230, branch unit 4242, or SIMD FPU(s) 4234 for execution. In at least one embodiment, each execution thread can access 128 general-purpose registers within GRF 4224, where each register can store 32 bytes, accessible as a SIMD 8-element vector of 32-bit data elements. In at least one embodiment, each execution unit thread has access to 4 Kbytes within GRF 4224, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 4224 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 4230. In at least one embodiment, branch instructions are dispatched to a dedicated branch unit 4232 to facilitate SIMD divergence and eventual convergence.

In at least one embodiment graphics execution unit 4208 includes one or more SIMD floating point units (FPU(s)) 4234 to perform floating-point operations. In at least one embodiment, FPU(s) 4234 also support integer computation. In at least one embodiment FPU(s) 4234 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 4235 are also present, and may be specifically optimized to perform operations associated with machine learning computations.

In at least one embodiment, arrays of multiple instances of graphics execution unit 4208 can be instantiated in a graphics sub-core grouping (e.g., a sub-slice). In at least one embodiment execution unit 4208 can execute instructions across a plurality of execution channels. In at least one embodiment, each thread executed on graphics execution unit 4208 is executed on a different channel.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, portions or all of inference and/or training logic 1815 may be incorporated into execution logic 4200. Moreover, in at least one embodiment, inferencing and/or training operations described herein may be done using logic other than logic illustrated in FIG. 18A or 18B. In at least one embodiment, weight parameters may be stored in on-chip or off-chip memory and/or registers (shown or not shown) that configure ALUs of execution logic 4200 to perform one or more machine learning algorithms, neural network architectures, use cases, or training techniques described herein.

In at least one embodiment, execution logic 4200 is utilized to implement a discriminator that is trained to infer a viewpoint and a set of appearance attributes from an input image. In at least one embodiment, execution logic 4200 is utilized to implement a generator that is trained to generate an image based on an input viewpoint and an input set of appearance parameters. In at least one embodiment, execution logic 4200 is utilized to implement one or more neural networks comprising a discriminator and a generator, and execution logic 4200 is utilized in connection with one or more processes that train one or more neural networks to identify an orientation of an object within an image in a self-supervised manner by at least computing one or more loss functions as part of training that evaluate one or more characteristics of images of a training set.

Figure 43:
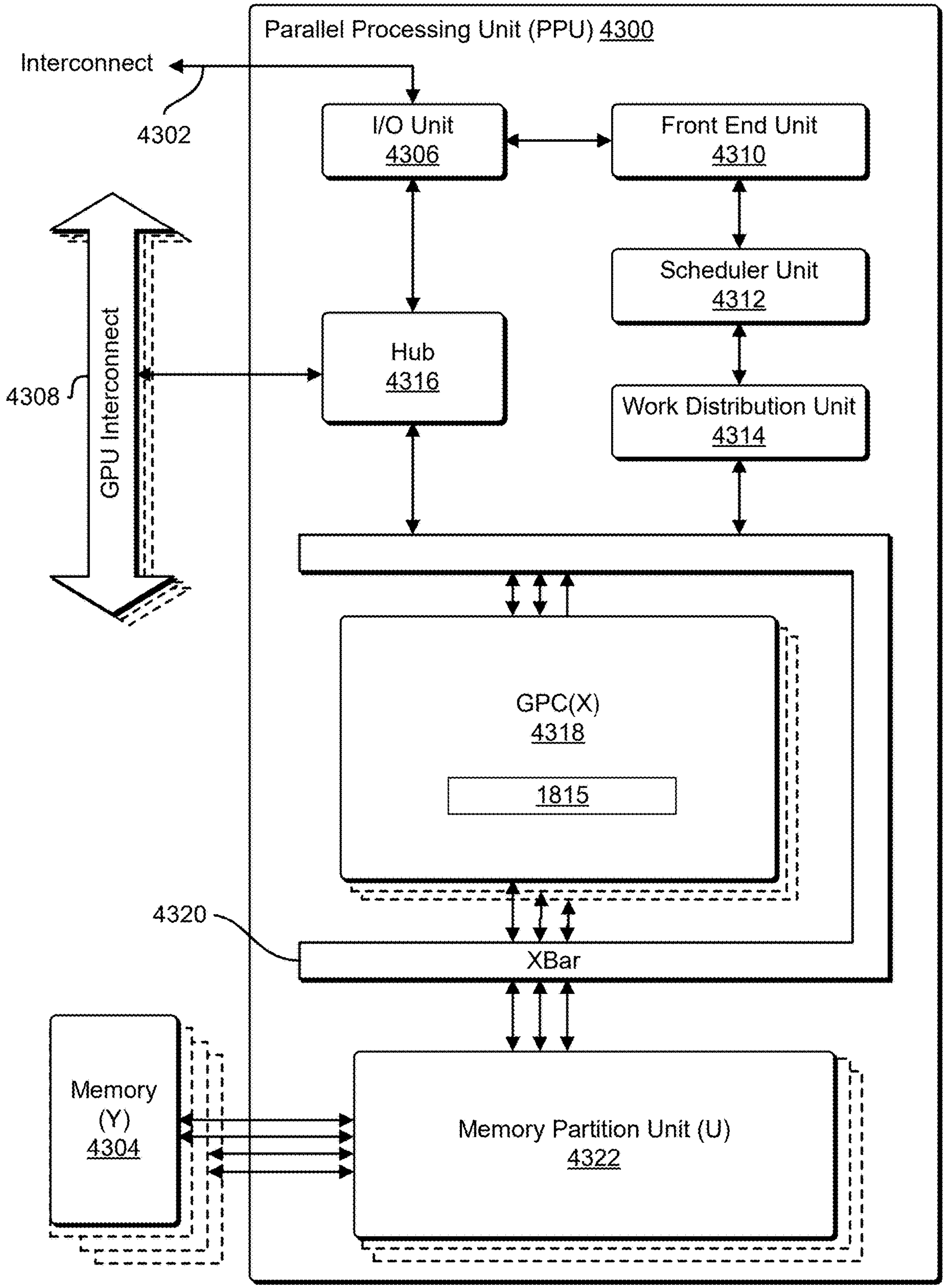
FIG. 43 illustrates a parallel processing unit ("PPU"), according to at least one embodiment.

FIG. 43 illustrates a parallel processing unit ("PPU") 4300, according to at least one embodiment. In at least one embodiment, PPU 4300 is configured with machine-readable code that, if executed by PPU 4300, causes PPU 4300 to perform some or all of processes and techniques described throughout this disclosure. In at least one embodiment, PPU 4300 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4300. In at least one embodiment, PPU 4300 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 4300 is utilized to perform computations such as linear algebra operations and machine-learning operations. FIG. 43 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 4300 are configured to accelerate High Performance Computing ("HPC"), data center, and machine learning applications. In at least one embodiment, PPU 4300 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 4300 includes, without limitation, an Input/Output ("I/O") unit 4306, a front-end unit 4310, a scheduler unit 4312, a work distribution unit 4314, a hub 4316, a crossbar ("Xbar") 4320, one or more general processing clusters ("GPCs") 4318, and one or more partition units ("memory partition units") 4322. In at least one embodiment, PPU 4300 is connected to a host processor or other PPUs 4300 via one or more high-speed GPU interconnects ("GPU interconnects") 4308. In at least one embodiment, PPU 4300 is connected to a host processor or other peripheral devices via an interconnect 4302. In at least one embodiment, PPU 4300 is connected to a local memory comprising one or more memory devices ("memory") 4304. In at least one embodiment, memory devices 4304 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4308 may refer to a wire-based multi-lane communications link that is used by systems to scale and include one or more PPUs 4300 combined with one or more central processing units ("CPUs"), supports cache coherence between PPUs 4300 and CPUs, and CPU mastering. In at least one embodiment, data and/or commands are transmitted by high-speed GPU interconnect 4308 through hub 4316 to/from other units of PPU 4300 such as one or more copy engines, video encoders, video decoders, power management units, and other components which may not be explicitly illustrated in FIG. 43.

In at least one embodiment, I/O unit 4306 is configured to transmit and receive communications (e.g., commands, data) from a host processor (not illustrated in FIG. 43) over system bus 4302. In at least one embodiment, I/O unit 4306 communicates with host processor directly via system bus 4302 or through one or more intermediate devices such as a memory bridge. In at least one embodiment, I/O unit 4306 may communicate with one or more other processors, such as one or more of PPUs 4300 via system bus 4302. In at least one embodiment, I/O unit 4306 implements a Peripheral Component Interconnect Express ("PCIe") interface for communications over a PCIe bus. In at least one embodiment, I/O unit 4306 implements interfaces for communicating with external devices.

In at least one embodiment, I/O unit 4306 decodes packets received via system bus 4302. In at least one embodiment, at least some packets represent commands configured to cause PPU 4300 to perform various operations. In at least one embodiment, I/O unit 4306 transmits decoded commands to various other units of PPU 4300 as specified by commands. In at least one embodiment, commands are transmitted to front-end unit 4310 and/or transmitted to hub 4316 or other units of PPU 4300 such as one or more copy engines, a video encoder, a video decoder, a power management unit, etc. (not explicitly illustrated in FIG. 43). In at least one embodiment, I/O unit 4306 is configured to route communications between and among various logical units of PPU 4300.

In at least one embodiment, a program executed by host processor encodes a command stream in a buffer that provides workloads to PPU 4300 for processing. In at least one embodiment, a workload comprises instructions and data to be processed by those instructions. In at least one embodiment, buffer is a region in a memory that is accessible (e.g., read/write) by both host processor and PPU 4300—a host interface unit may be configured to access buffer in a system memory connected to system bus 4302 via memory requests transmitted over system bus 4302 by I/O unit 4306. In at least one embodiment, host processor writes command stream to buffer and then transmits a pointer to start of command stream to PPU 4300 such that front-end unit 4310 receives pointers to one or more command streams and manages one or more command streams, reading commands from command streams and forwarding commands to various units of PPU 4300.

In at least one embodiment, front-end unit 4310 is coupled to scheduler unit 4312 that configures various GPCs 4318 to process tasks defined by one or more command streams. In at least one embodiment, scheduler unit 4312 is configured to track state information related to various tasks managed by scheduler unit 4312 where state information may indicate which of GPCs 4318 a task is assigned to, whether task is active or inactive, a priority level associated with task, and so forth. In at least one embodiment, scheduler unit 4312 manages execution of a plurality of tasks on one or more of GPCs 4318.

In at least one embodiment, scheduler unit 4312 is coupled to work distribution unit 4314 that is configured to dispatch tasks for execution on GPCs 4318. In at least one embodiment, work distribution unit 4314 tracks a number of scheduled tasks received from scheduler unit 4312 and work distribution unit 4314 manages a pending task pool and an active task pool for each of GPCs 4318. In at least one embodiment, pending task pool comprises a number of slots (e.g., 32 slots) that contain tasks assigned to be processed by a particular GPC 4318; active task pool may comprise a number of slots (e.g., 4 slots) for tasks that are actively being processed by GPCs 4318 such that as one of GPCs 4318 completes execution of a task, that task is evicted from active task pool for GPC 4318 and one of other tasks from pending task pool is selected and scheduled for execution on GPC 4318. In at least one embodiment, if an active task is idle on GPC 4318, such as while waiting for a data dependency to be resolved, then active task is evicted from GPC 4318 and returned to pending task pool while another task in pending task pool is selected and scheduled for execution on GPC 4318.

In at least one embodiment, work distribution unit 4314 communicates with one or more GPCs 4318 via XBar 4320. In at least one embodiment, XBar 4320 is an interconnect network that couples many of units of PPU 4300 to other units of PPU 4300 and can be configured to couple work distribution unit 4314 to a particular GPC 4318. In at least one embodiment, one or more other units of PPU 4300 may also be connected to XBar 4320 via hub 4316.

In at least one embodiment, tasks are managed by scheduler unit 4312 and dispatched to one of GPCs 4318 by work distribution unit 4314. GPC 4318 is configured to process task and generate results. In at least one embodiment, results may be consumed by other tasks within GPC 4318, routed to a different GPC 4318 via XBar 4320, or stored in memory 4304. In at least one embodiment, results can be written to memory 4304 via partition units 4322, which implement a memory interface for reading and writing data to/from memory 4304. In at least one embodiment, results can be transmitted to another PPU 4304 or CPU via high-speed GPU interconnect 4308. In at least one embodiment, PPU 4300 includes, without limitation, a number U of partition units 4322 that is equal to number of separate and distinct memory devices 4304 coupled to PPU 4300. In at least one embodiment, partition unit 4322 will be described in more detail herein in conjunction with FIG. 45.

In at least one embodiment, a host processor executes a driver kernel that implements an application programming interface ("API") that enables one or more applications executing on host processor to schedule operations for execution on PPU 4300. In at least one embodiment, multiple compute applications are simultaneously executed by PPU 4300 and PPU 4300 provides isolation, quality of service ("QoS"), and independent address spaces for multiple compute applications. In at least one embodiment, an application generates instructions (e.g., in form of API calls) that cause driver kernel to generate one or more tasks for execution by PPU 4300 and driver kernel outputs tasks to one or more streams being processed by PPU 4300. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 45.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, deep learning application processor is used to train a machine learning model, such as a neural network, to predict or infer information provided to PPU 4300. In at least one embodiment, deep learning application processor 4300 is used to infer or predict information based on a trained machine learning model (e.g., neural network) that has been trained by another processor or system or by PPU 4300. In at least one embodiment, PPU 4300 may be used to perform one or more neural network use cases described herein.

In at least one embodiment, PPU 4300 is utilized to implement a discriminator that is trained to infer a viewpoint and a set of appearance attributes from an input image. In at least one embodiment, PPU 4300 is utilized to implement a generator that is trained to generate an image based on an input viewpoint and an input set of appearance parameters. In at least one embodiment, PPU 4300 is utilized to implement one or more neural networks comprising a discriminator and a generator, and PPU 4300 is utilized in connection with one or more processes that train one or more neural networks to identify an orientation of an object within an image in a self-supervised manner by at least computing one or more loss functions as part of training that evaluate one or more characteristics of images of a training set.

Figure 44:
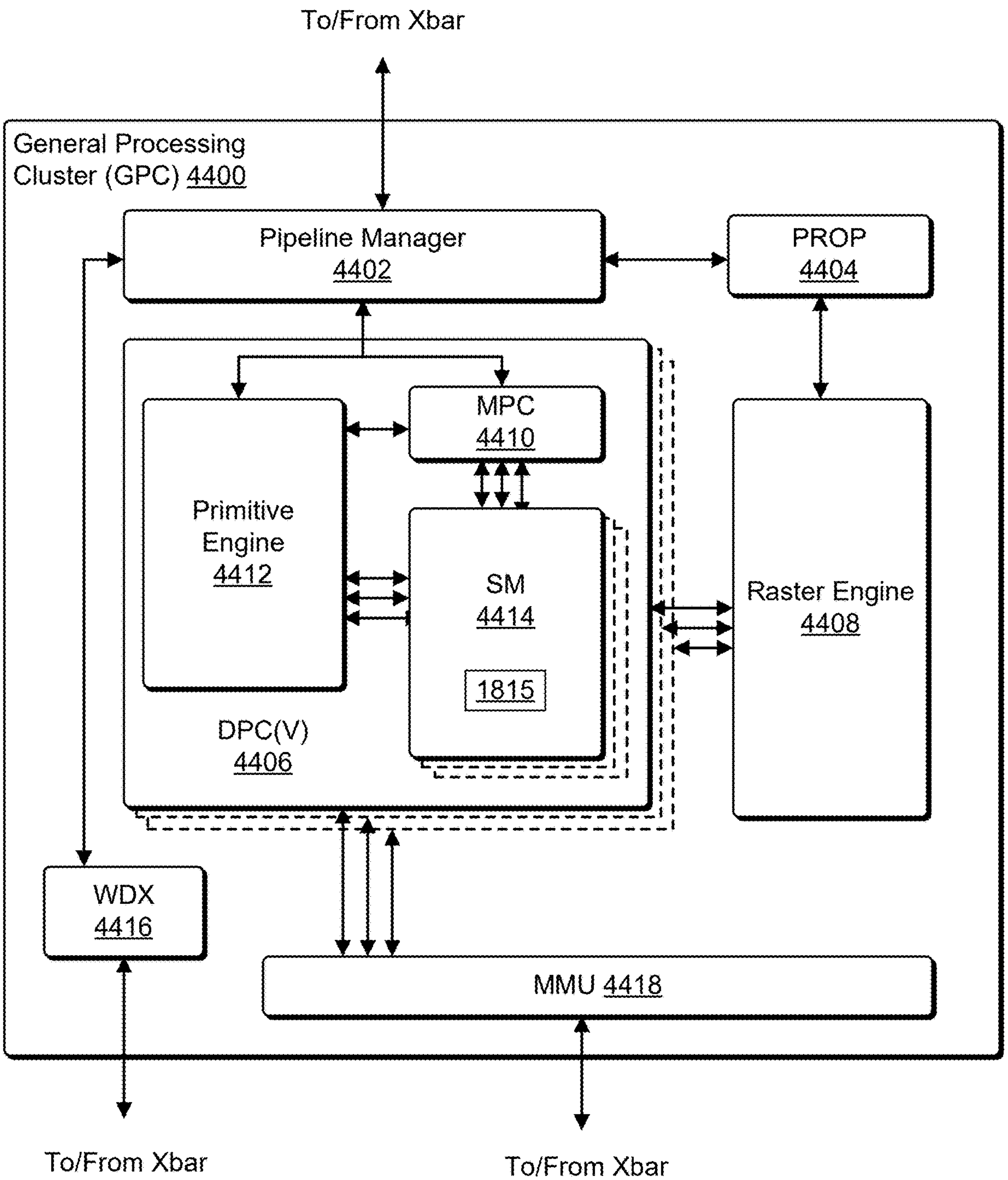
FIG. 44 illustrates a general processing cluster ("GPC"), according to at least one embodiment.

FIG. 44 illustrates a general processing cluster ("GPC") 4400, according to at least one embodiment. In at least one embodiment, GPC 4400 is GPC 4318 of FIG. 43. In at least one embodiment, each GPC 4400 includes, without limitation, a number of hardware units for processing tasks and each GPC 4400 includes, without limitation, a pipeline manager 4402, a pre-raster operations unit ("PROP") 4404, a raster engine 4408, a work distribution crossbar ("WDX") 4416, a memory management unit ("MMU") 4418, one or more Data Processing Clusters ("DPCs") 4406, and any suitable combination of parts.

In at least one embodiment, operation of GPC 4400 is controlled by pipeline manager 4402. In at least one embodiment, pipeline manager 4402 manages configuration of one or more DPCs 4406 for processing tasks allocated to GPC 4400. In at least one embodiment, pipeline manager 4402 configures at least one of one or more DPCs 4406 to implement at least a portion of a graphics rendering pipeline. In at least one embodiment, DPC 4406 is configured to execute a vertex shader program on a programmable streaming multi-processor ("SM") 4414. In at least one embodiment, pipeline manager 4402 is configured to route packets received from a work distribution unit to appropriate logical units within GPC 4400, in at least one embodiment, and some packets may be routed to fixed function hardware units in PROP 4404 and/or raster engine 4408 while other packets may be routed to DPCs 4406 for processing by a primitive engine 4412 or SM 4414. In at least one embodiment, pipeline manager 4402 configures at least one of DPCs 4406 to implement a neural network model and/or a computing pipeline.

In at least one embodiment, PROP unit 4404 is configured, in at least one embodiment, to route data generated by raster engine 4408 and DPCs 4406 to a Raster Operations ("ROP") unit in partition unit 4322, described in more detail above in conjunction with FIG. 43. In at least one embodiment, PROP unit 4404 is configured to perform optimizations for color blending, organize pixel data, perform address translations, and more. In at least one embodiment, raster engine 4408 includes, without limitation, a number of fixed function hardware units configured to perform various raster operations, in at least one embodiment, and raster engine 4408 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 4408 comprises fragments to be processed by any suitable entity such as by a fragment shader implemented within DPC 4406.

In at least one embodiment, each DPC 4406 included in GPC 4400 comprise, without limitation, an M-Pipe Controller ("MPC") 4410; primitive engine 4412; one or more SMs 4414; and any suitable combination thereof. In at least one embodiment, MPC 4410 controls operation of DPC 4406, routing packets received from pipeline manager 4402 to appropriate units in DPC 4406. In at least one embodiment, packets associated with a vertex are routed to primitive engine 4412, which is configured to fetch vertex attributes associated with vertex from memory; in contrast, packets associated with a shader program may be transmitted to SM 4414.

In at least one embodiment, SM 4414 comprises, without limitation, a programmable streaming processor that is configured to process tasks represented by a number of threads. In at least one embodiment, SM 4414 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 4414 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 4414 are described in more detail herein.

In at least one embodiment, MMU 4418 provides an interface between GPC 4400 and memory partition unit (e.g., partition unit 4322 of FIG. 43) and MMU 4418 provides translation of virtual addresses into physical addresses, memory protection, and arbitration of memory requests. In at least one embodiment, MMU 4418 provides one or more translation lookaside buffers ("TLBs") for performing translation of virtual addresses into physical addresses in memory.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, deep learning application processor is used to train a machine learning model, such as a neural network, to predict or infer information provided to GPC 4400. In at least one embodiment, GPC 4400 is used to infer or predict information based on a trained machine learning model (e.g., neural network) that has been trained by another processor or system or by GPC 4400. In at least one embodiment, GPC 4400 may be used to perform one or more neural network use cases described herein.

In at least one embodiment, GPC 4400 is utilized to implement a discriminator that is trained to infer a viewpoint and a set of appearance attributes from an input image. In at least one embodiment, GPC 4400 is utilized to implement a generator that is trained to generate an image based on an input viewpoint and an input set of appearance parameters. In at least one embodiment, GPC 4400 is utilized to implement one or more neural networks comprising a discriminator and a generator, and GPC 4400 is utilized in connection with one or more processes that train one or more neural networks to identify an orientation of an object within an image in a self-supervised manner by at least computing one or more loss functions as part of training that evaluate one or more characteristics of images of a training set.

Figure 45:
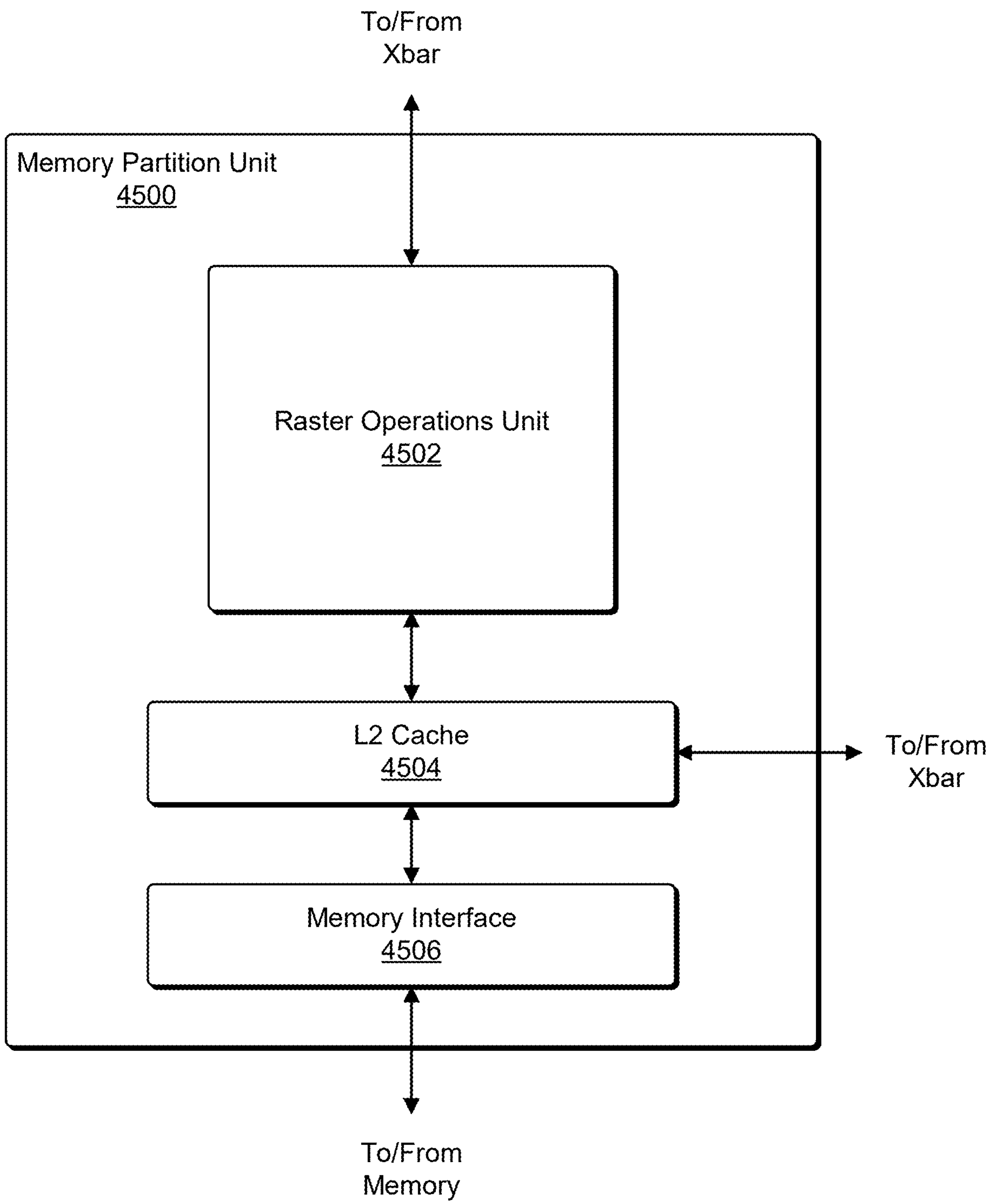
FIG. 45 illustrates a memory partition unit of a parallel processing unit ("PPU"), according to at least one embodiment.

FIG. 45 illustrates a memory partition unit 4500 of a parallel processing unit ("PPU"), in accordance with at least one embodiment. In at least one embodiment, memory partition unit 4500 includes, without limitation, a Raster Operations ("ROP") unit 4502; a level two ("L2") cache 4504; a memory interface 4506; and any suitable combination thereof; memory interface 4506 is coupled to memory; memory interface 4506 may implement 32, 64, 128, 1024-bit data buses, or like, for high-speed data transfer. In at least one embodiment, PPU incorporates U memory interfaces 4506, one memory interface 4506 per pair of partition units 4500, where each pair of partition units 4500 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 4506 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 4500 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 4308 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 4500 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 4304 of FIG. 43 or other system memory is fetched by memory partition unit 4500 and stored in L2 cache 4504, which is located on-chip and is shared between various GPCs, in accordance with at least one embodiment. Each memory partition unit 4500, in at least one embodiment, includes, without limitation, at least a portion of L2 cache associated with a corresponding memory device. In at least one embodiment, lower level caches are implemented in various units within GPCs. In at least one embodiment, each of SMs 4414 may implement a level one ("L1") cache wherein L1 cache is private memory that is dedicated to a particular SM 4414 and data from L2 cache 4504 is fetched and stored in each of L1 caches for processing in functional units of SMs 4414. In at least one embodiment, L2 cache 4504 is coupled to memory interface 4506 and XBar 4320.

ROP unit 4502 performs graphics raster operations related to pixel color, such as color compression, pixel blending, and more, in at least one embodiment. ROP unit 4502, in at least one embodiment, implements depth testing in conjunction with raster engine 4408, receiving a depth for a sample location associated with a pixel fragment from culling engine of raster engine 4408. In at least one embodiment, depth is tested against a corresponding depth in a depth buffer for a sample location associated with fragment. In at least one embodiment, if fragment passes depth test for sample location, then ROP unit 4502 updates depth buffer and transmits a result of depth test to raster engine 4408. It will be appreciated that number of partition units 4500 may be different than number of GPCs and, therefore, each ROP unit 4502 can, in at least one embodiment, be coupled to each of GPCs. In at least one embodiment, ROP unit 4502 tracks packets received from different GPCs and determines which that a result generated by ROP unit 4502 is routed to through XBar 4320.

Figure 46:
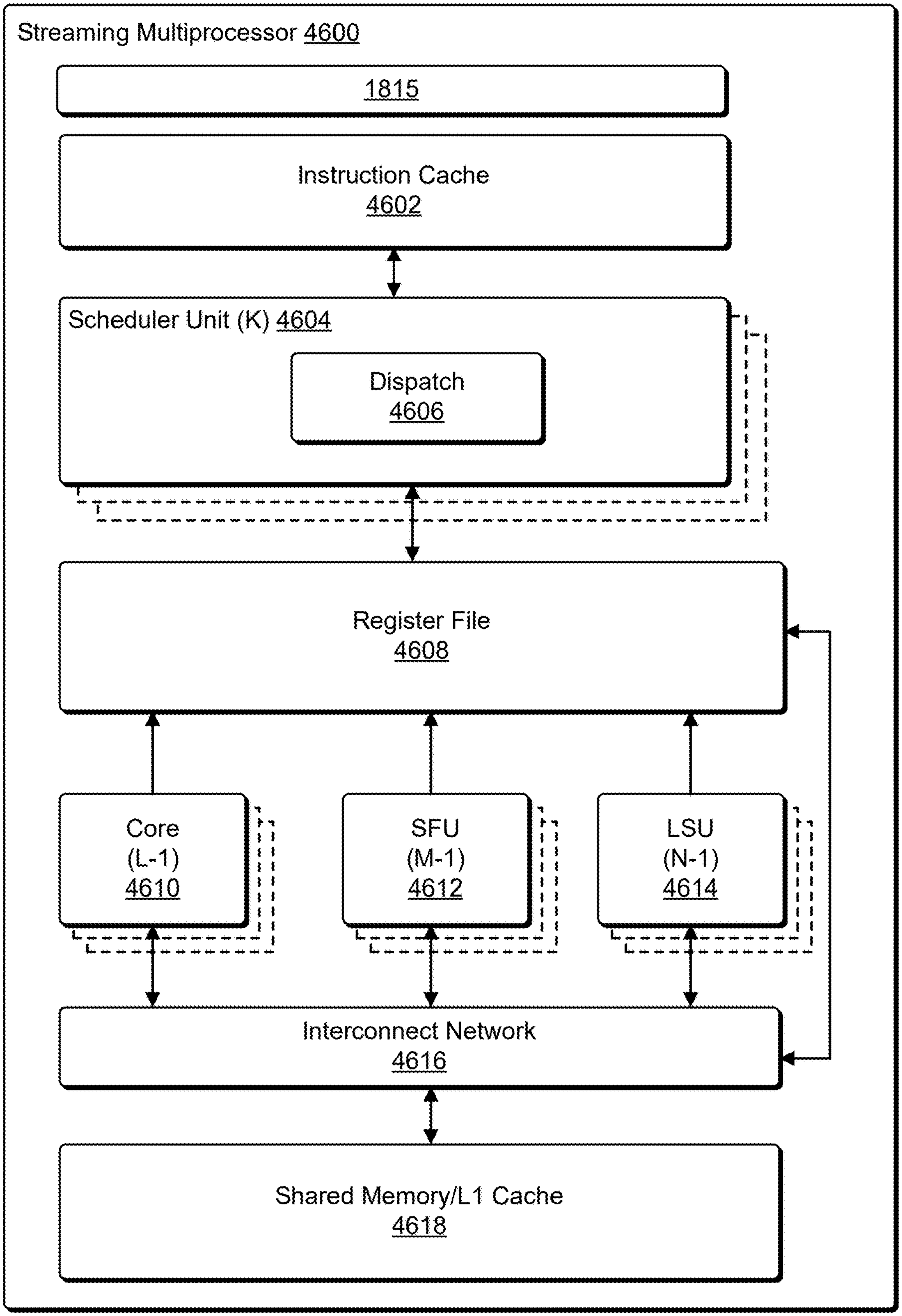
FIG. 46 illustrates a streaming multi-processor, according to at least one embodiment.

FIG. 46 illustrates a streaming multi-processor ("SM") 4600, according to at least one embodiment. In at least one embodiment, SM 4600 is SM of FIG. 44. In at least one embodiment, SM 4600 includes, without limitation, an instruction cache 4602; one or more scheduler units 4604; a register file 4608; one or more processing cores ("cores") 4610; one or more special function units ("SFUs") 4612; one or more load/store units ("LSUs") 4614; an interconnect network 4616; a shared memory/level one ("L1") cache 4618; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 4600. In at least one embodiment, scheduler unit 4604 receives tasks from work distribution unit and manages instruction scheduling for one or more thread blocks assigned to SM 4600. In at least one embodiment, scheduler unit 4604 schedules thread blocks for execution as warps of parallel threads, wherein each thread block is allocated at least one warp. In at least one embodiment, each warp executes threads. In at least one embodiment, scheduler unit 4604 manages a plurality of different thread blocks, allocating warps to different thread blocks and then dispatching instructions from plurality of different cooperative groups to various functional units (e.g., processing cores 4610, SFUs 4612, and LSUs 4614) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group and programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4606 is configured to transmit instructions to one or more of functional units and scheduler unit 4604 includes, without limitation, two dispatch units 4606 that enable two different instructions from same warp to be dispatched during each clock cycle. In at least one embodiment, each scheduler unit 4604 includes a single dispatch unit 4606 or additional dispatch units 4606.

In at least one embodiment, each SM 4600, in at least one embodiment, includes, without limitation, register file 4608 that provides a set of registers for functional units of SM 4600. In at least one embodiment, register file 4608 is divided between each of functional units such that each functional unit is allocated a dedicated portion of register file 4608. In at least one embodiment, register file 4608 is divided between different warps being executed by SM 4600 and register file 4608 provides temporary storage for operands connected to data paths of functional units. In at least one embodiment, each SM 4600 comprises, without limitation, a plurality of L processing cores 4610. In at least one embodiment, SM 4600 includes, without limitation, a large number (e.g., 128 or more) of distinct processing cores 4610. In at least one embodiment, each processing core 4610, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4610 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4610. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 4600 comprises, without limitation, M SFUs 4612 that perform special functions (e.g., attribute evaluation, reciprocal square root, and like). In at least one embodiment, SFUs 4612 include, without limitation, a tree traversal unit configured to traverse a hierarchical tree data structure. In at least one embodiment, SFUs 4612 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4600. In at least one embodiment, texture maps are stored in shared memory/L1 cache 4618. In at least one embodiment, texture units implement texture operations such as filtering operations using mip-maps (e.g., texture maps of varying levels of detail), in accordance with at least one embodiment. In at least one embodiment, each SM 4600 includes, without limitation, two texture units.

Each SM 4600 comprises, without limitation, N LSUs 4614 that implement load and store operations between shared memory/L1 cache 4618 and register file 4608, in at least one embodiment. Each SM 4600 includes, without limitation, interconnect network 4616 that connects each of functional units to register file 4608 and LSU 4614 to register file 4608 and shared memory/L1 cache 4618 in at least one embodiment. In at least one embodiment, interconnect network 4616 is a crossbar that can be configured to connect any of functional units to any of registers in register file 4608 and connect LSUs 4614 to register file 4608 and memory locations in shared memory/L1 cache 4618.

In at least one embodiment, shared memory/L1 cache 4618 is an array of on-chip memory that allows for data storage and communication between SM 4600 and primitive engine and between threads in SM 4600, in at least one embodiment. In at least one embodiment, shared memory/L1 cache 4618 comprises, without limitation, 128 KB of storage capacity and is in path from SM 4600 to partition unit. In at least one embodiment, shared memory/L1 cache 4618, in at least one embodiment, is used to cache reads and writes. In at least one embodiment, one or more of shared memory/L1 cache 4618, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 4618 enables shared memory/L1 cache 4618 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 4600 to execute program and perform calculations, shared memory/L1 cache 4618 to communicate between threads, and LSU 4614 to read and write global memory through shared memory/L1 cache 4618 and memory partition unit. In at least one embodiment, when configured for general purpose parallel computation, SM 4600 writes commands that scheduler unit 4604 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices and graphics card may be configured to interface with a PCIe slot on a motherboard of a desktop computer. In at least one embodiment, PPU may be an integrated graphics processing unit ("iGPU") included in chipset of motherboard.

Inference and/or training logic 1815 are used to perform inferencing and/or training operations associated with one or more embodiments. Details regarding inference and/or training logic 1815 are provided herein in conjunction with FIGS. 18A and/or 18B. In at least one embodiment, deep learning application processor is used to train a machine learning model, such as a neural network, to predict or infer information provided to SM 4600. In at least one embodiment, SM 4600 is used to infer or predict information based on a trained machine learning model (e.g., neural network) that has been trained by another processor or system or by SM 4600. In at least one embodiment, SM 4600 may be used to perform one or more neural network use cases described herein.

In at least one embodiment, SM 4600 is utilized to implement a discriminator that is trained to infer a viewpoint and a set of appearance attributes from an input image. In at least one embodiment, SM 4600 is utilized to implement a generator that is trained to generate an image based on an input viewpoint and an input set of appearance parameters. In at least one embodiment, SM 4600 is utilized to implement one or more neural networks comprising a discriminator and a generator, and SM 4600 is utilized in connection with one or more processes that train one or more neural networks to identify an orientation of an object within an image in a self-supervised manner by at least computing one or more loss functions as part of training that evaluate one or more characteristics of images of a training set.

At least one embodiment of the disclosure can be described in view of the following clauses:

Clause 1. A processor comprising: one or more circuits to help train one or more neural networks to identify an orientation of an object within an image based, at least in part, on one or more characteristics of the object other than the object's orientation.

Clause 2. The processor of clause 1, wherein the one or more circuits are to help train the one or more neural networks on a collection of images of a same category as the image.

Clause 3. The processor of any of clauses 1-2, wherein ground truth annotations are unavailable for at least a portion of the collection of images.

Clause 4. The processor of any of clauses 1-3, wherein the one or more characteristics of the object includes symmetric consistency between the image of the object and a flipped image of the object.

Clause 5. The processor of any of clauses 1-4, wherein one or more circuits are to help train the one or more neural networks to generate a second image of the object having a second orientation.

Clause 6. The processor of any of clauses 1-5, wherein the object's orientation is encoded on a set of parameters comprising an azimuth parameter, an elevation parameter, and a tilt parameter.

Clause 7. A system, comprising:

one or more processors to calculate parameters to help train one or more neural networks to identify an orientation of an object within an image based, at least in part, on one or more characteristics of the object other than the object's orientation; and one or more memories to store the parameters.

Clause 8. The system of clause 7, wherein the one or more processors to calculate the parameters to help train the one or more neural networks are to help train the one or more neural networks on a collection of images of different objects of a same category as the object.

Clause 9. The system of any of clauses 7-8, wherein the one or more processors are to train the one or more neural networks by at least:

obtaining an input image;

using a discriminator to determine at least a predicted viewpoint and a predicted set of appearance parameters;

using a generator to create a synthetic image based at least in part on the predicted viewpoint and the predicted set of appearance parameters; and computing a viewpoint consistency loss based at least in part on the input image and the synthetic image.

Clause 10. The system of any of clauses 7-9, wherein the input image is a real image.

Clause 11. The system of any of clauses 7-10, wherein the one or more processors are to train the one or more neural networks by at least:

obtaining a first viewpoint and a first set of appearance parameters;

using a generator to create a synthetic image based at least in part on the first viewpoint and the first set of appearance parameters;

using a discriminator to predict, based on the synthetic image, a second viewpoint and a second set of appearance parameters;

computing a viewpoint consistency loss based at least in part on the first viewpoint and the second viewpoint; and computing a reconstruction loss based at least in part on the first image and the generates synthetic image.

Clause 12. The system of any of clauses 7-11 wherein the one or more processors are to train the one or more neural networks by at least:

using a generator to create a first synthetic image based at least in part on a first viewpoint and a set of appearance parameters;

performing a transform on the first viewpoint to obtain a second viewpoint;

using the generator to create a second synthetic image based at least in part on the second viewpoint and the set of appearance parameters; and computing a symmetry loss based at least in part on the first synthetic image and the second synthetic image.

Clause 13. The system of any of clauses 7-12, wherein the transform flips the first viewpoint horizontally to obtain the second viewpoint.

Clause 14. A method, comprising training one or more neural networks to identify an orientation of an object within an image based, at least in part, on one or more characteristics of the object other than the object's orientation.

Clause 15. The method of clause 14, wherein training the one or more neural networks comprises training the one or more neural networks in a self-supervised manner on a collection of images of different objects of a same category as the object within the image.

Clause 16. The method of any of clauses 14-15, wherein training the one or more neural networks in the self-supervised manner comprises using a set of loss functions to evaluate the one or more characteristics of the object other than the object's orientation.

Clause 17. The method of any of clauses 14-16, wherein the object is of a first category and the method further comprising training the one or more neural networks to identify a second orientation of a second object using a second collection of images, wherein:

the second object is of a second category different from the first category; and the second collection of images is of objects of the second category different from the second object.

Clause 18. The method of any of clauses 14-17, wherein training the one or more neural networks in the self-supervised manner comprises training the one or more neural network to at least:

obtain an input image;

use a discriminator to predict, from the input image, a viewpoint and a set of parameters;

use a generator to create a synthetic image based at least in part on the viewpoint and the set of parameters; and compute one or more gradients and update parameters of the discriminator based at least in part on the synthetic image.

Clause 19. The method of any of clauses 14-18, wherein the generator is a deep generative model.

Clause 20. The method of any of clauses 14-19, wherein the deep generative model is a renderer, variational autoencoder, or generative adversarial network (GAN).

Clause 21. The method of any of clauses 14-20, wherein the object is a vehicle.

Clause 22. A processor comprising: one or more circuits to identify one or more orientations of an object within an image based, at least in part, on one or more characteristics of the object other than the object's orientation.

Clause 23. The processor of clause 22, wherein the one or more circuits are to train one or more neural networks to identify the one or more orientations of the object within the image.

Clause 24. The processor of any of clauses 22-23, wherein the one or more neural networks are trained on a collection of images of different objects of a same category as the object.

Clause 25. The processor of any of clauses 22-24, wherein ground truth annotations are unavailable for the collection of images.

Clause 26. The processor of any of clauses 22-25, wherein the one or more characteristics of the object includes symmetric consistency between the image of the object and a flipped image of the object.

Clause 27. The processor of any of clauses 22-26, wherein the object's orientation is encoded on a set of parameters comprising an azimuth parameter, an elevation parameter, and a tilt parameter.

Clause 28. A system, comprising:

one or more memories; and one or more processors to identify one or more orientations of an object within an image based, at least in part, on one or more characteristics of the object other than the object's orientation.

Clause 29. The system of clause 28, wherein the one or more processors are to train one or more neural networks to identify the one or more orientations of the object within the image based, at least in part, on the one or more characteristics of the object other than the object's orientation.

Clause 30. The system of any of clauses 28-29, wherein the one or more processors to train the one or more neural networks are to help train the one or more neural networks on a collection of images with different objects, wherein the different objects are of a same category as the object.

Clause 31. The system of any of clauses 28-30, wherein the one or more processors to train the one or more neural networks are to train the one or more neural networks by at least:

computing a first set of gradients to update a first set of parameters of a generator; and computing a second set of gradients to update a second set of parameters for a discriminator.

Clause 32. The system of any of clauses 28-31 wherein the one or more processors to train the one or more neural networks are to train the one or more neural networks by at least computing a disentanglement loss by at least:

using a first viewpoint and first set of appearance parameters to generate a first synthetic image;

using the first viewpoint and a second set of appearance parameters to generate a second synthetic image; and using a second viewpoint and the first set of appearance parameters to generate a third synthetic image.

Clause 33. The system of any of clauses 28-32, wherein the one or more orientations are relative to a canonical orientation.

Clause 34. The system of any of clauses 28-33, wherein the one or more orientations each comprise an azimuth parameter, an elevation parameter, and a tilt parameter.

Clause 35. A method, comprising: identifying one or more orientations of an object within an image based, at least in part, on one or more characteristics of the object other than the object's orientation.

Clause 36. The method of clause 35, wherein one or more neural networks are trained to perform the identifying of the one or more orientations of the object within the image based, at least in part, on the one or more characteristics of the object other than the object's orientation.

Clause 37. The method of any of clauses 35-36, wherein the one or more neural networks are trained in a self-supervised manner on a collection of images that share a same label as the image, the label indicative of a characteristic other than the object's orientation.

Clause 38. The method of any of clauses 35-37, wherein the one or more neural networks are trained in the self-supervised manner to identify orientations of the collection of images based on labels other than orientations of the collection of images.

Clause 39. The method of any of clauses 35-38, wherein the one or more neural networks comprise:

a generator to create synthetic images based at least in part on a specified viewpoint and a specified set of appearance parameters; and a discriminator to determine, from one or more images, a predicted viewpoint and a predicted set of appearance parameters.

Clause 40. The method of any of clauses 35-39, wherein the generator is a deep generative model.

Clause 41. The method of any of clauses 35-40, wherein the object is a human.

Clause 42. The method of any of clauses 35-41, wherein the object's orientation is encoded on a set of parameters comprising an azimuth parameter, an elevation parameter, and a tilt parameter.

Clause 43. A car comprising: one or more cameras to capture images of one or more objects and one or more neural networks to identify one or more orientations of the one or more objects based, at least in part, on one or more characteristics of the object other than the object's orientation.

Clause 44. The car of clause 43, wherein the one or more neural networks are trained in a self-supervised manner on a collection of images that share a same label as the image, the label indicative of a characteristic other than the object's orientation.

Clause 45. The car of any of clauses 43-44, wherein the one or more characteristics of the object includes symmetric consistency between the image of the object and a flipped image of the object.

Clause 46. The car of any of clauses 43-45, wherein one or more neural networks are trained to generate a second image with the object's orientation.

Clause 47. The car of any of clauses 43-46, wherein the one or more processors are to train the one or more neural networks by at least:

obtaining an input image;

using a discriminator to determine at least a predicted viewpoint and a predicted set of appearance parameters;

using a generator to create a synthetic image based at least in part on the predicted viewpoint and the predicted set of appearance parameters; and computing a viewpoint consistency loss based at least in part on the input image and the synthetic image.

Clause 48. The car of any of clauses 43-47, wherein the orientation of the object is a three-dimensional orientation.

Clause 49. The car of any of clauses 43-48, wherein the object is a human.

Clause 50. The car of any of clauses 43-49, wherein the object is a vehicle other than the car.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 2404 and/or secondary storage. Computer programs, if executed by one or more processors, enable system 2400 to perform various functions in accordance with at least one embodiment. In at least one embodiment, memory 2404, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 2402; parallel processing system 2412; an integrated circuit capable of at least a portion of capabilities of both CPU 2402; parallel processing system 2412; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 2400 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 2412 includes, without limitation, a plurality of parallel processing units ("PPUs") 2414 and associated memories 2416. In at least one embodiment, PPUs 2414 are connected to a host processor or other peripheral devices via an interconnect 2418 and a switch 2420 or multiplexer. In at least one embodiment, parallel processing system 2412 distributes computational tasks across PPUs 2414 which can be parallelizable—for example, as part of distribution of computational tasks across multiple graphics processing unit ("GPU") thread blocks. In at least one embodiment, memory is shared and accessible (e.g., for read and/or write access) across some or all of PPUs 2414, although such shared memory may incur performance penalties relative to use of local memory and registers resident to a PPU 2414. In at least one embodiment, operation of PPUs 2414 is synchronized through use of a command such as syncthreads( ) wherein all threads in a block (e.g., executed across multiple PPUs 2414) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising: one or more circuits to help train one or more neural networks to identify an orientation of an object within an image based, at least in part, on one or more labels indicating one or more characteristics of the object other than the object's orientation.

2. The processor of claim 1, wherein the one or more circuits are to help train the one or more neural networks on a collection of images of a same category as the image.

3. The processor of claim 2, wherein ground truth annotations are unavailable in at least a portion of the collection of images.

4. The processor of claim 1, wherein the one or more characteristics of the object include symmetric consistency between the image of the object and a flipped image of the object.

5. The processor of claim 1, wherein the one or more circuits are to help train the one or more neural networks to generate a second image of the object having a second orientation.

6. The processor of claim 1, wherein the object's orientation is encoded on a set of parameters comprising an azimuth parameter, an elevation parameter, and a tilt parameter.

7. A system, comprising:

one or more processors to calculate parameters to help train one or more neural networks to identify an orientation of an object within an image based, at least in part, on one or more labels indicating one or more characteristics of the object other than the object's orientation; and one or more memories to store the parameters.

8. The system of claim 7, wherein the one or more processors to calculate the parameters to help train the one or more neural networks are to help train the one or more neural networks on a collection of images of different objects of a same category as the object.

9. The system of claim 8, wherein the one or more processors are to train the one or more neural networks by at least:

obtaining an input image;

using a discriminator to determine at least a predicted viewpoint and a predicted set of appearance parameters;

using a generator to create a synthetic image based, at least in part, on the predicted viewpoint and the predicted set of appearance parameters; and computing a viewpoint consistency loss based, at least in part, on the input image and the synthetic image.

10. The system of claim 9, wherein the input image is a real image.

11. The system of claim 8, wherein the one or more processors are to train the one or more neural networks by at least:

obtaining a first viewpoint and a first set of appearance parameters;

using a generator to create a synthetic image based, at least in part, on the first viewpoint and the first set of appearance parameters;

using a discriminator to predict, based, at least in part, on the synthetic image, a second viewpoint and a second set of appearance parameters;

computing a viewpoint consistency loss based, at least in part, on the first viewpoint and the second viewpoint; and computing a reconstruction loss based, at least in part, on the image and the synthetic image.

12. The system of claim 8, wherein the one or more processors are to train the one or more neural networks by at least:

using a generator to create a first synthetic image based, at least in part, on a first viewpoint and a set of appearance parameters;

performing a transform on the first viewpoint to obtain a second viewpoint;

using the generator to create a second synthetic image based, at least in part, on the second viewpoint and the set of appearance parameters; and computing a symmetry loss based, at least in part, on the first synthetic image and the second synthetic image.

13. The system of claim 12, wherein the transform flips the first viewpoint horizontally to obtain the second viewpoint.

14. A method, comprising: training one or more neural networks to identify an orientation of an object within an image based, at least in part, on one or more labels indicating one or more characteristics of the object other than the object's orientation.

15. The method of claim 14, wherein training the one or more neural networks comprises training the one or more neural networks in a self-supervised manner on a collection of images of different objects of a same category as the object within the image.

16. The method of claim 15, wherein training the one or more neural networks in the self-supervised manner comprises using a set of loss functions to evaluate the one or more characteristics of the object other than the object's orientation.

17. The method of claim 15, wherein the object is of a first category and the method further comprises training the one or more neural networks to identify a second orientation of a second object using a second collection of images, wherein:

the second object is of a second category different from the first category; and the second collection of images is of objects of the second category different from the second object.

18. The method of claim 15, wherein training the one or more neural networks in the self-supervised manner comprises training the one or more neural network to at least:

obtain an input image;

use a discriminator to predict, from the input image, a viewpoint and a set of parameters;

use a generator to create a synthetic image based, at least in part, on the viewpoint and the set of parameters; and compute one or more gradients and update parameters of the discriminator based, at least in part, on the synthetic image.

19. The method of claim 18, wherein the generator is a deep generative model.

20. The method of claim 19, wherein the deep generative model is a Tenderer, variational autoencoder, or generative adversarial network (GAN).

21. The method of claim 14, wherein the object is a vehicle.

22. A processor, comprising: one or more circuits to identify one or more orientations of an object within an image based, at least in part, on one or more labels indicating one or more characteristics of the object other than the object's one or more orientations.

23. The processor of claim 22, wherein the one or more circuits are to train one or more neural networks to identify the one or more orientations of the object within the image.

24. The processor of claim 23, wherein the one or more neural networks are trained on a collection of images of different objects of a same category as the object.

25. The processor of claim 24, wherein ground truth annotations are unavailable in the collection of images.

26. The processor of claim 22, wherein the one or more characteristics of the object includes-symmetric consistency between the image of the object and a flipped image of the object.

27. The processor of claim 22, wherein the object's one or more orientations are encoded on a set of parameters comprising an azimuth parameter, an elevation parameter, and a tilt parameter.

28. A system, comprising:

one or more memories; and one or more processors to identify one or more orientations of an object within an image based, at least in part, on one or more labels indicating one or more characteristics of the object other than the object's one or more orientations.

29. The system of claim 28, wherein the one or more processors are to train one or more neural networks to identify the one or more orientations of the object within the image based, at least in part, on the one or more labels indicating the one or more characteristics of the object other than the object's one or more orientations.

30. The system of claim 29, wherein the one or more processors to train the one or more neural networks are to help train the one or more neural networks on a collection of images with different objects, wherein the different objects are of a same category as the object.

31. The system of claim 29, wherein the one or more processors to train the one or more neural networks are to train the one or more neural networks by at least:

computing a first set of gradients to update a first set of parameters of a generator; and computing a second set of gradients to update a second set of parameters of a discriminator.

32. The system of claim 29, wherein the one or more processors to train the one or more neural networks are to train the one or more neural networks by at least computing a disentanglement loss by at least:

using a first viewpoint and a first set of appearance parameters to generate a first synthetic image;

using the first viewpoint and a second set of appearance parameters to generate a second synthetic image; and using a second viewpoint and the first set of appearance parameters to generate a third synthetic image.

33. The system of claim 28, wherein the one or more orientations are relative to a canonical orientation.

34. The system of claim 28, wherein the one or more orientations each comprise an azimuth parameter, an elevation parameter, and a tilt parameter.

35. A method, comprising: identifying one or more orientations of an object within an image based, at least in part, on one or more labels indicating one or more characteristics of the object other than the object's one or more orientations.

36. The method of claim 35, wherein one or more neural networks are trained to perform the identifying of the one or more orientations of the object within the image based, at least in part, on the one or more labels indicating the one or more characteristics of the object other than the object's one or more orientations.

37. The method of claim 36, wherein the one or more neural networks are trained in a self-supervised manner on a collection of images that share a same label of the one or more labels as the image, the label indicative of a characteristic of the one or more characteristics of the object other than the object's one or more orientations.

38. The method of claim 37, wherein the one or more neural networks are trained in the self-supervised manner to identify orientations of the collection of images based, at least in part, on labels other than the orientations of the collection of images.

39. The method of claim 37, wherein the one or more neural networks comprise:

a generator to create synthetic images based, at least in part, on a specified viewpoint and a specified set of appearance parameters; and a discriminator to determine, from one or more images, a predicted viewpoint and a predicted set of appearance parameters.

40. The method of claim 39, wherein the generator is a deep generative model.

41. The method of claim 37, wherein the object is a human.

42. The method of claim 37, wherein the object's one or more orientations are encoded on a set of parameters comprising an azimuth parameter, an elevation parameter, and a tilt parameter.

43. A car, comprising: one or more cameras to capture images of one or more objects, and one or more neural networks to identify one or more orientations of the one or more objects based, at least in part, on one or more labels indicating one or more characteristics of the one or more objects other than the one or more objects' one or more orientations.

44. The car of claim 43, wherein the one or more neural networks are trained in a self-supervised manner on a collection of images that share a same label of the one or more labels as the images, the label indicative of a characteristic of the one or more characteristics of the one or more objects other than the one or more objects' one or more orientations.

45. The car of claim 43, wherein the one or more characteristics of the one or more objects include symmetric consistency between the images of the one or more objects and flipped images of the one or more objects.

46. The car of claim 43, wherein the one or more neural networks are trained to generate a second image with the one or more objects' one or more orientations.

47. The car of claim 43, wherein one or more processors are to train the one or more neural networks by at least:

obtaining an input image;

using a discriminator to determine at least a predicted viewpoint and a predicted set of appearance parameters;

using a generator to create a synthetic image based, at least in part, on the predicted viewpoint and the predicted set of appearance parameters; and computing a viewpoint consistency loss based, at least in part, on the input image and the synthetic image.

48. The car of claim 43, wherein the one or more orientations of the one or more objects are a three-dimensional orientation.

49. The car of claim 43, wherein the one or more objects are a human.

50. The car of claim 43, wherein the one or more objects are a vehicle other than the car.

51. The processor of claim 1, wherein the one or more circuits are to help train the one or more neural networks by generating a second image based, at least in part, on the object's orientation.

52. The processor of claim 51, wherein the one or more circuits are to help train the one or more neural networks by computing at least one loss function based, at least in part, on the image and the generated second image.

* * * * *